United States Patent [19]

Kosugi et al.

[11] Patent Number: 5,694,265
[45] Date of Patent: Dec. 2, 1997

[54] DISK APPARATUS FOR DETECTING POSITION OF HEAD BY READING PHASE SERVO PATTERN

[75] Inventors: Tatsuhiko Kosugi; Susumu Yoshida; Makoto Chiba; Syuichi Hashimoto; Masahide Kanegae, all of Kawasaki, Japan

[73] Assignee: Fujitsu Limited, Japan

[21] Appl. No.: 298,052

[22] Filed: Aug. 30, 1994

[30] Foreign Application Priority Data

Apr. 19, 1994 [JP] Japan .................................. 6-080006
Jun. 3, 1994 [JP] Japan .................................. 6-122106

[51] Int. Cl.$^6$ ............................. G11B 5/596; G11B 5/09
[52] U.S. Cl. ...................... 360/77.05; 360/53; 360/78.14
[58] Field of Search ........................... 360/77.02, 77.05, 360/78.14, 78.09, 51

[56] References Cited

U.S. PATENT DOCUMENTS

| | | | |
|---|---|---|---|
| 4,390,912 | 6/1983 | Hetrich et al. | 360/78.14 |
| 4,549,232 | 10/1985 | Axmear et al. | 360/77.07 |
| 4,642,562 | 2/1987 | Collins et al. | 360/77.08 |
| 4,679,103 | 7/1987 | Workman | 360/78.14 |
| 4,783,705 | 11/1988 | Moon et al. | 360/78.12 |
| 4,803,572 | 2/1989 | Haruna et al. | 360/60 |
| 4,969,059 | 11/1990 | Volz et al. | 360/77.04 X |
| 5,164,866 | 11/1992 | Sano et al. | 360/77.08 |
| 5,193,034 | 3/1993 | Tsuyoshi et al. | 360/77.08 X |
| 5,420,726 | 5/1995 | Mathews et al. | 360/46 |
| 5,420,730 | 5/1995 | Moon et al. | 360/77.08 |

Primary Examiner—Aristotelis Psitos
Assistant Examiner—Regina Y. Neal
Attorney, Agent, or Firm—Greer, Burns & Crain, Ltd.

[57] ABSTRACT

A duty pulse is formed by setting in response to a leading edge of a clock synchronized with a peak detection of a servo frame read signal by a peak detecting circuit and by resetting by a signal by which a zero-cross point of a read signal of a phase servo pattern was detected. A head position signal is formed by integrating the duty pulse. Since there is a deviation of the timings between the peak detection and the zero-cross detection, a duty ratio is measured so as to be adjusted to 50% in the on-track state of a target cylinder. The timings for a reference clock and a zero-cross detection pulse are delayed and adjusted accordingly.

51 Claims, 84 Drawing Sheets

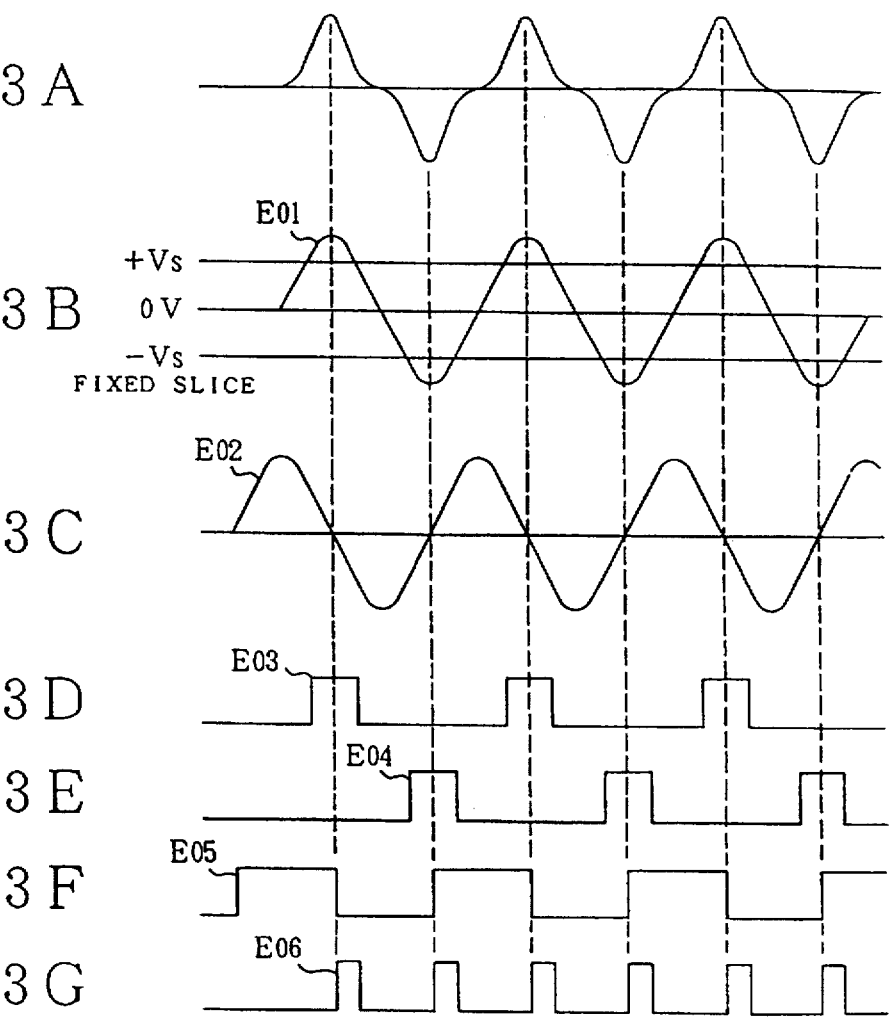

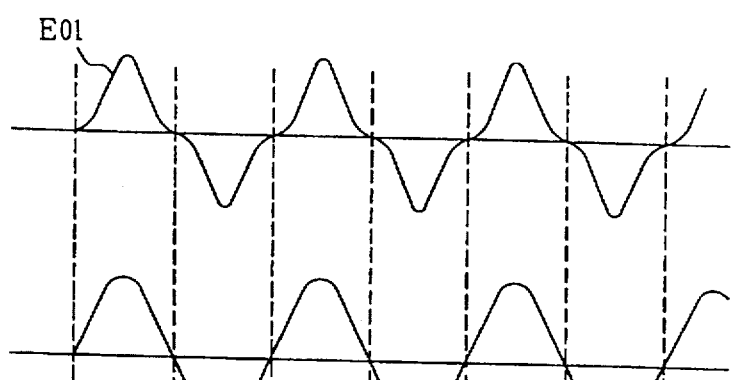
FIG. 16A
FIG. 16B
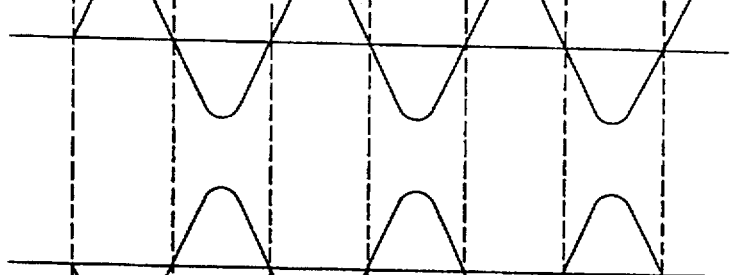
FIG. 16C
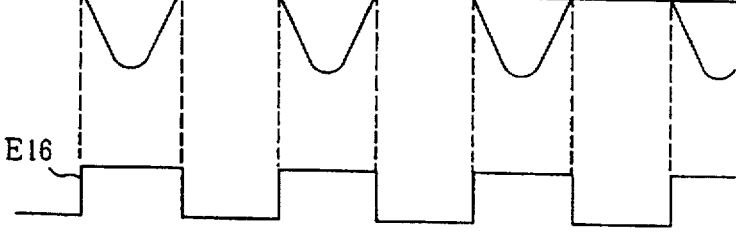
FIG. 16D

FIG. 25

| CYLINDER NO. | CYLINDER RELATIVE POSITION | WRITE SIGNAL PHASE NO. | | | |
|---|---|---|---|---|---|
| | | EVEN1 | ODD1 | ODD2 | EVEN2 |
| 2 | −2.5 | 6 | A | A | 6 |
| 2 | −2.0 | 8 | 8 | 8 | 8 |
| | −1.5 | A | 6 | 6 | A |
| 3 | −1.0 | C | 4 | 4 | C |
| | −0.5 | E | 2 | 2 | E |
| 0 | 0.0 | 0 | 0 | 0 | 0 |
| | +0.5 | 2 | E | E | 2 |
| 1 | +1.0 | 4 | C | C | 4 |
| | +1.5 | 6 | A | A | 6 |
| 2 | +2.0 | 8 | 8 | 8 | 8 |
| | +2.5 | A | 6 | 6 | A |

8 CYLINDERS → 8 PATTERNS

FIG. 26

| CYLINDER NO. | CYLINDER RELATIVE POSITION | MASTER CLOCK SELECTION PHASE NO. | | | |
|---|---|---|---|---|---|
| | | EVEN1 | ODD1 | ODD2 | EVEN2 |
| 2 | −2.0 | 0 | 0 | 0 | 0 |
| 3 | −1.0 | 4 | C | C | 4 |
| 0 | 0.0 | 8 | 8 | 8 | 8 |
| 1 | +1.0 | C | 4 | 4 | C |

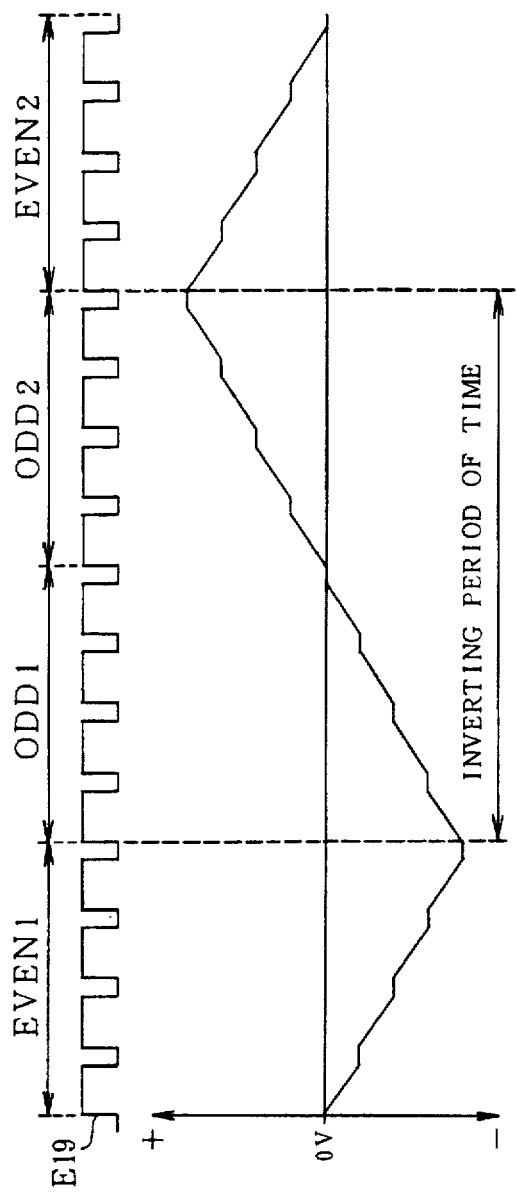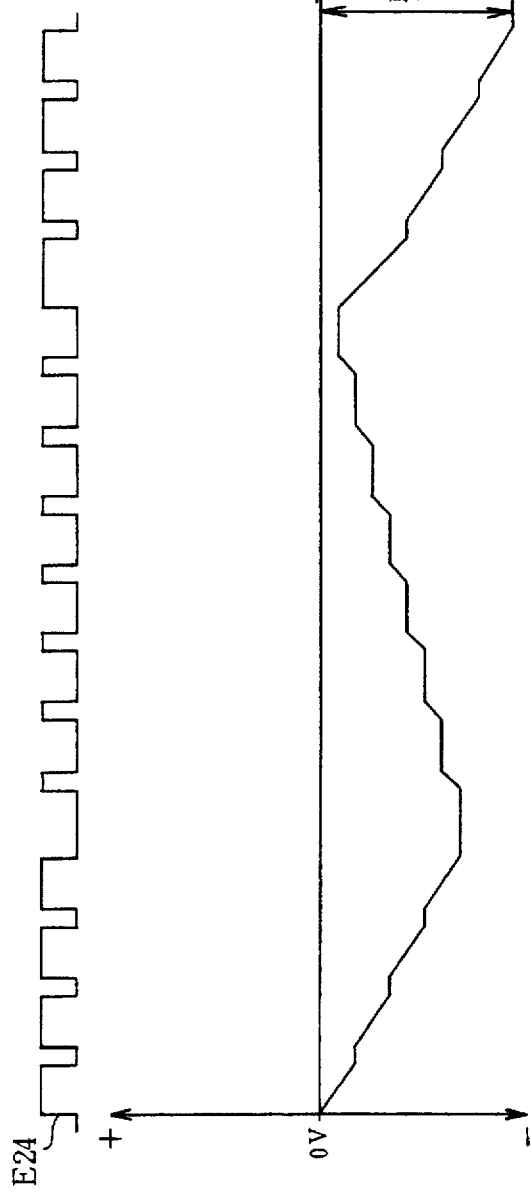

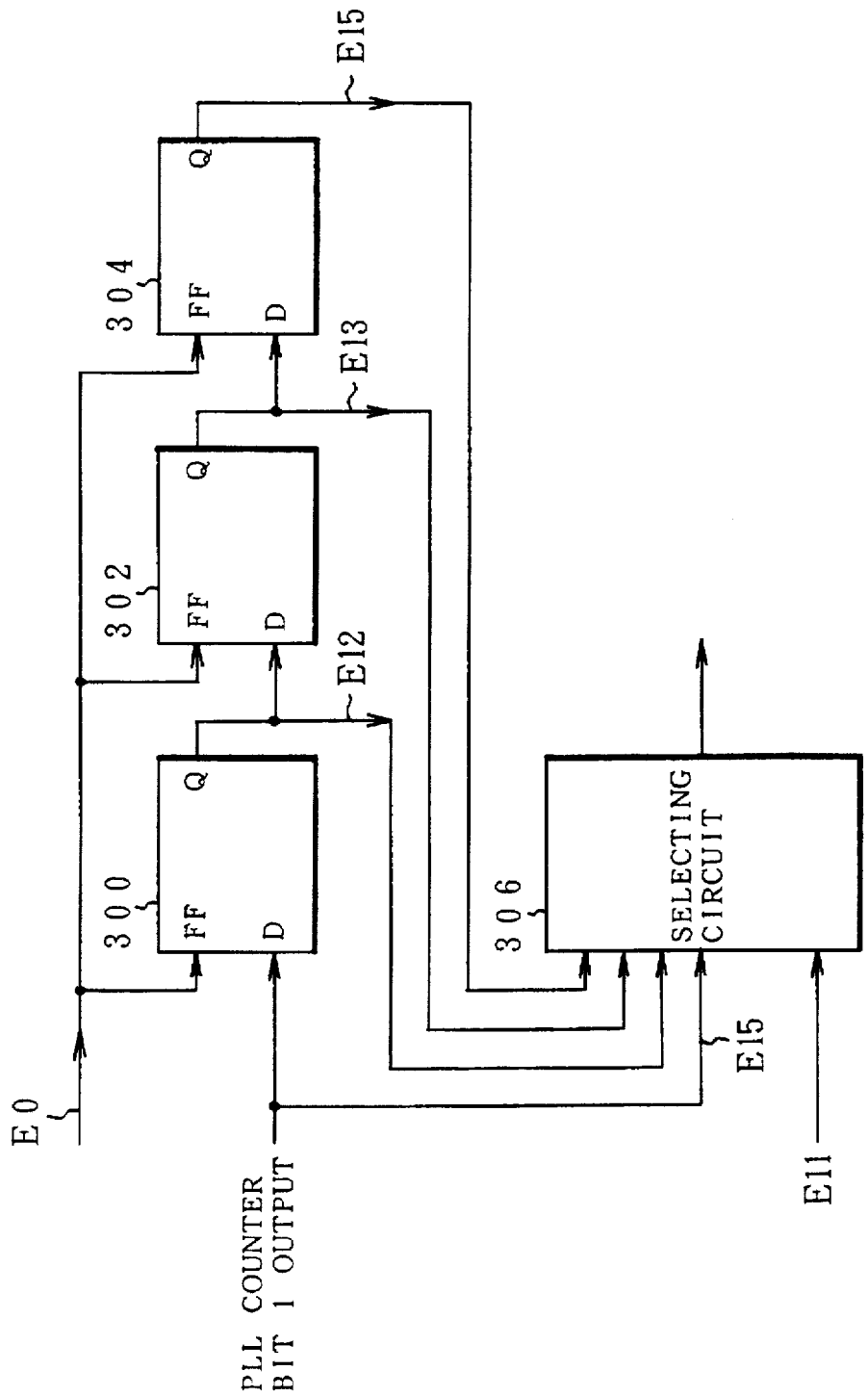

FIG. 38

| DELAY ELEMENT | DELAY TIME (nsec) |
|---|---|
| b0 | 12 |
| b1 | 12 |
| b2 | 12 |
| b3 | 12 |
| b4 | 12 |
| b5 | 12 |
| b6 | 5 |
| b7 | 5 |

FIG. 39

| TABLE NO. I | DELAY TIME |
|---|---|
| 0 | $\tau 0$ |
| 1 | $\tau 1$ |
| 2 | $\tau 2$ |
| 3 | $\tau 3$ |
| ⋮ | ⋮ |
| 254 | $\tau 254$ |
| 255 | $\tau 255$ |

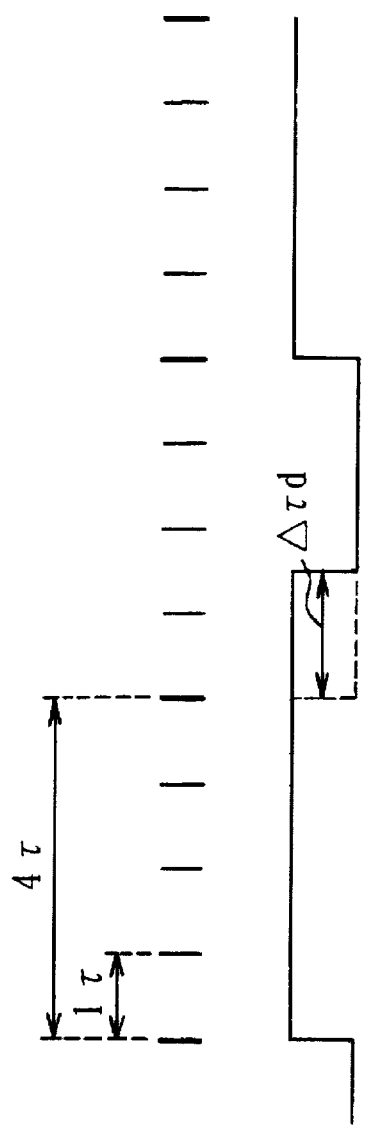
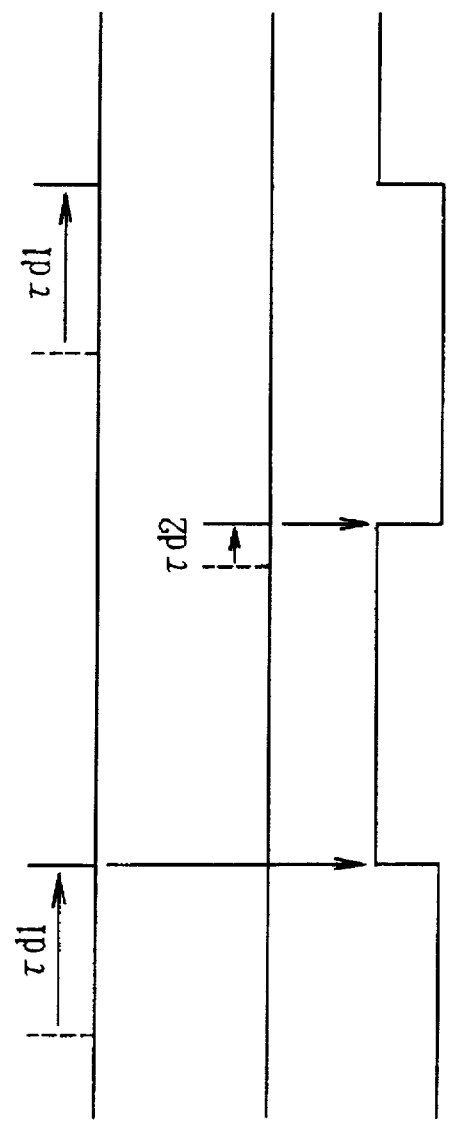
FIG. 40A
FIG. 40B
FIG. 40C
FIG. 40D
FIG. 40E

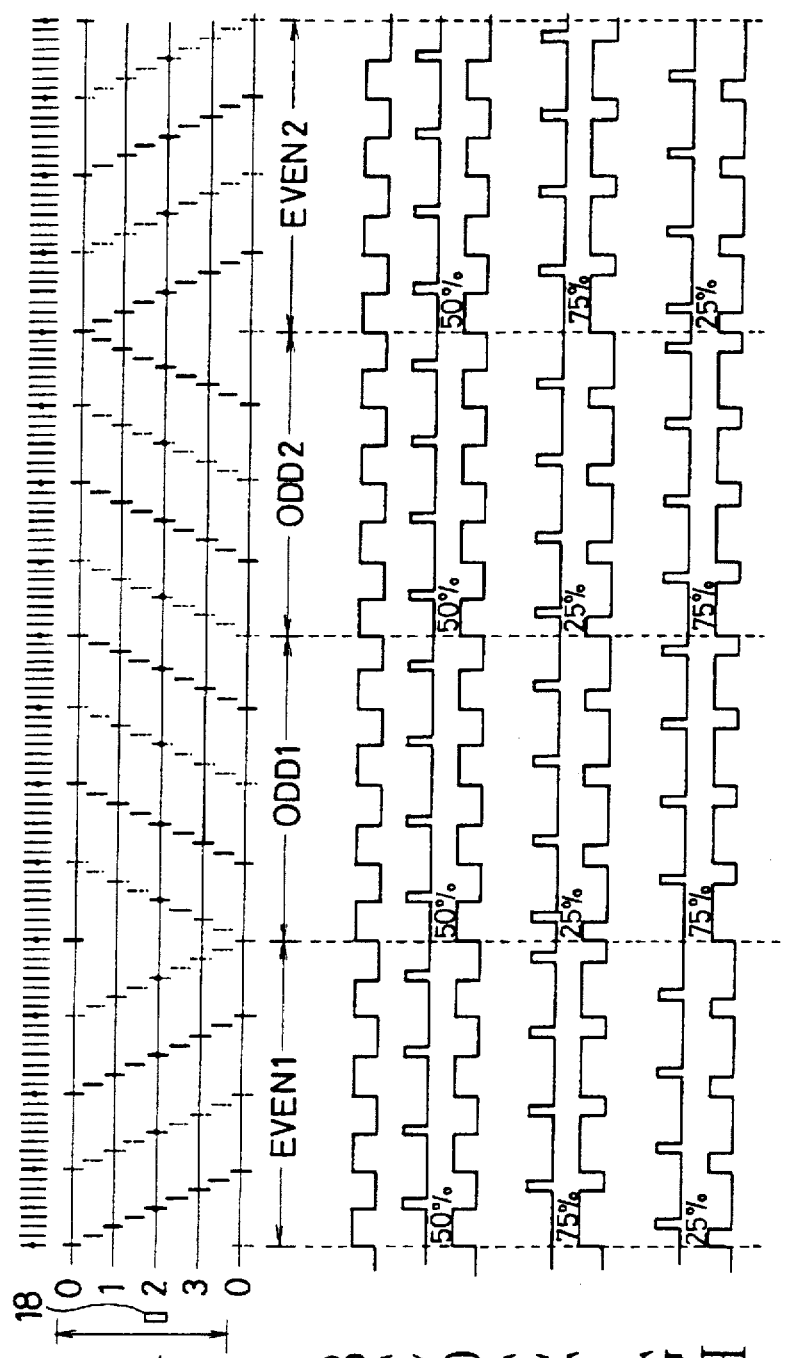

| CYLINDER NO | MASTER CLOCK PHASE NO. |
|---|---|
| 0 | C (1 2) |
| 1 | E (1 4) |
| 2 | 0 |
| 3 | 2 |

| CENTER CYLINDER NO. | MASTER CLOCK PHASE NO. | | | |
|---|---|---|---|---|
| | EVEN1 | ODD1 | ODD2 | EVEN2 |
| 0 | C | C | C | C |
| 1 | E | E | E | E |
| 2 | 0 | 0 | 0 | 0 |
| 3 | 2 | 2 | 2 | 2 |

FIG. 56

| CENTER CYLINDER NO. | FWD SEEK MASTER CLOCK PHASE NO. | | | | REV SEEK MASTER CLOCK PHASE NO. | | | | 236 |
|---|---|---|---|---|---|---|---|---|---|
| | EVEN1 | ODD1 | ODD2 | EVEN2 | EVEN1 | ODD1 | ODD2 | EVEN2 | |
| 0 | 2 | 2 | E | E | E | E | 2 | 2 | |
| 1 | C | C | 0 | 0 | 0 | 0 | C | C | |
| 2 | E | E | 2 | 2 | 2 | 2 | E | E | |
| 3 | 0 | 0 | C | C | C | C | 0 | 0 | |

FIG. 58

| CENTER CYLINDER NO. | FWD SEEK MASTER CLOCK PHASE NO. | | | | REV SEEK MASTER CLOCK PHASE NO. | | | | 258 |
|---|---|---|---|---|---|---|---|---|---|
| | EVEN1 | ODD1 | ODD2 | EVEN2 | EVEN1 | ODD1 | ODD2 | EVEN2 | |
| 0 | 0 | 2 | C | E | E | C | 2 | 0 | |
| 1 | 2 | C | E | 0 | 0 | E | C | 2 | |
| 2 | C | E | 0 | 2 | 2 | 0 | E | C | |
| 3 | E | 0 | 2 | C | C | 2 | 0 | E | |

| CENTER CYLINDER NO. | MASTER CLOCK PHASE NO. | | | |
|---|---|---|---|---|
| | EVEN1 | ODD1 | ODD2 | EVEN2 |
| 0 | E | 2 | E | 2 |
| 1 | 0 | C | 0 | C |
| 2 | 2 | E | 2 | E |
| 3 | C | 0 | C | 0 |

| RELATIVE CYLINDER POSITION | SERVO WRITE SIGNAL PHASE NO. | | | |
|---|---|---|---|---|
| | EVEN1 | ODD1 | ODD2 | EVEN2 |
| −2.50 | D | 3 | 4 | C |
| −2.50 | D | 3 | 4 | C |
| −2.00 | D | 3 | 4 | C |
| −1.75 | D | 3 | 4 | C |
| −1.50 | D | 3 | 3 | D |
| −1.25 | E | 2 | 3 | D |
| −1.00 | E | 2 | 2 | E |
| −0.75 | F | 1 | 2 | E |
| −0.50 | F | 1 | 1 | F |
| −0.25 | 0 | 0 | 1 | F |
| 0.00 | 0 | 0 | 0 | 0 |
| +0.25 | 1 | F | 0 | 0 |
| +0.50 | 1 | F | F | 1 |
| +0.75 | 2 | E | F | 1 |
| +1.00 | 2 | E | E | 2 |
| +1.25 | 3 | D | E | 2 |
| +1.50 | 3 | D | D | 3 |
| +1.75 | 4 | C | D | 3 |
| +2.00 | 4 | C | D | 3 |
| +2.25 | 4 | C | D | 3 |
| +2.50 | 4 | C | D | 3 |

4 CYLINDERS

POSITION DETECTION REGION

FIG. 72

| CYLINDER RELATIVE NO. | CYLINDER RELATIVE POSITION | MASTER CLOCK SELECTION PHASE NO. | | | |
|---|---|---|---|---|---|
| | | EVEN1 | ODD1 | ODD2 | EVEN2 |
| 3 | -1.00 | 6 | A | A | 6 |
| 0 | 0.00 | 8 | 8 | 8 | 8 |
| 1 | +1.00 | A | 6 | 6 | A |

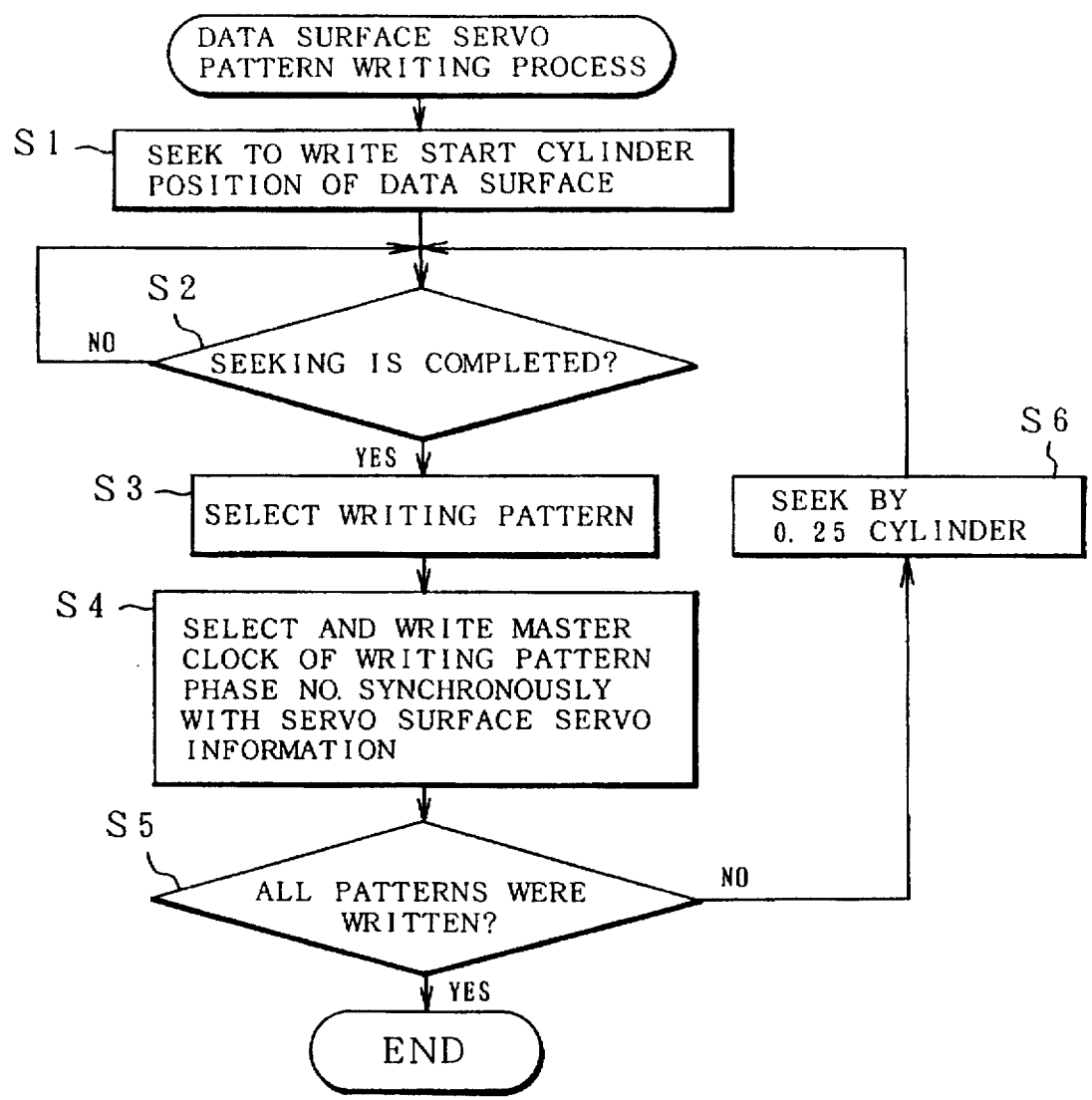

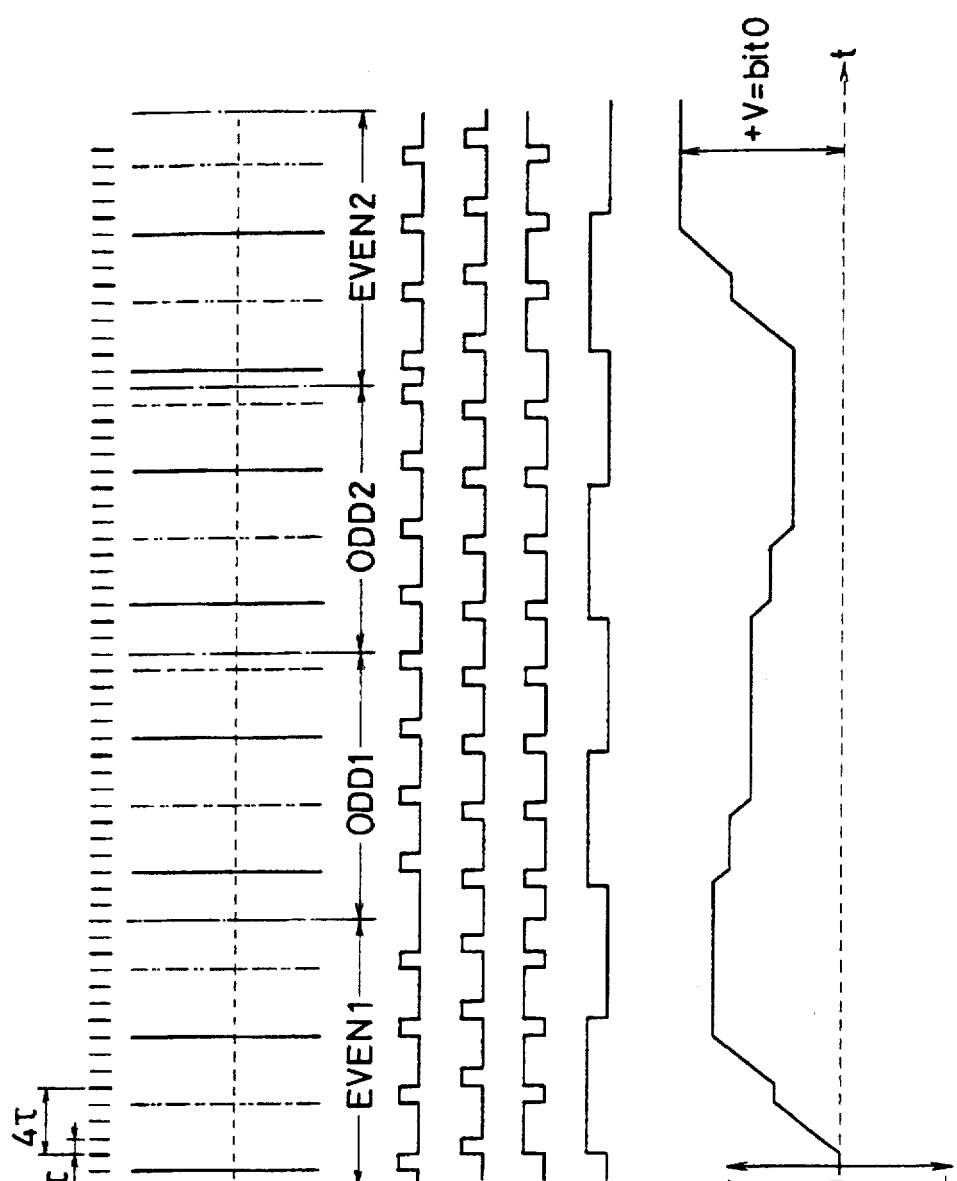

FIG. 83

| CYLINDER ADDRESS | YAW ANGLE OFFSET |
|---|---|
| A0000 ~ A0050 | $\Delta W00$ |
| A0051 ~ A0100 | $\Delta W02$ |
| A0101 ~ A0150 | $\Delta W03$ |
| ⋮ | ⋮ |
| A3950 ~ A4000 | $\Delta W79$ |

DISK APPARATUS FOR DETECTING POSITION OF HEAD BY READING PHASE SERVO PATTERN

BACKGROUND OF THE INVENTION

The present invention relates to a disk apparatus for detecting a head position by judging a phase of servo information which has been recorded on a disk and, more particularly, to a disk apparatus for detecting a head position by detecting a zero-cross point of a servo information read waveform.

A magnetic disk apparatus is a memory device for moving a head in the radial direction of a rotating magnetic disk and positioning the head to a target track, for reading data from the track of the magnetic disk by the magnetic head, and for writing the data to the track. In the magnetic disk apparatus, it is important to improve a recording density, particularly, track density in order to increase a memory capacity and to realize a miniaturization. A performance of about 10 msec as a seeking time of the head is required to realize a high processing speed. Therefore, a digital servo circuit using a high speed processor is used as a positioning circuit of the head. When the digital servo circuit is used, it is sufficient to detect the position only at the time of the sampling timing. A different circuit from an analog servo position detecting circuit is also required as a servo head position detecting circuit of a.

A servo pattern of the two-phase system which has been generally widely used has problems such that a frequency band of a demodulating circuit of a position signal rises and the apparatus is easily affected by noises as the track density of the magnetic disk increases. In the servo pattern of the two-phase system, the peak of the waveform which is obtained by reading servo information recorded on a servo surface of the magnetic disk is detected and the position is detected on the basis of the height of the detected peak. Although the height of the peak can be continuously obtained, there is a problem such that an influence of noises and a level fluctuation on the magnetic disk medium surface directly exert an influence on a detection amount of the position.

Therefore, methods of recording a servo pattern as phase information and detecting and processing a position signal by a phase difference of the servo information have been proposed in U.S. Pat. Nos. 4,549,232 and 4,642,562 and the like.

FIG. 1 shows a conventional phase servo pattern. According to the phase servo pattern, the servo surface of a magnetic disk is divided into four cylinder units of 0, 1, 2, and 3 and servo information of different phases is recorded in the circumferential direction of the . Namely, one phase servo pattern is divided into a first field EVEN1, a second field ODD, and a third field EVEN2. A servo pattern of the same phase is recorded in the first and third fields EVEN1 and EVEN2, a pattern of an opposite phase is recorded in the second field ODD, and the position of a moving head is read out at the center position in the second field ODD.

FIG. 2 shows a detection of a phase difference in the first and third fields EVEN1 and EVEN2. In this instance, the servo pattern is recorded by setting four reference clocks into one period. A case where the positions in the four cylinders of Nos. 0 to 3 can be detected is shown as an example. It is now assumed that a reference phase of the reference clock is a phase shown by a bold line in the diagram. When the head exits at a position 600 as a center of the No. 2 cylinder, the phase difference between the clock reference phase and a read pulse of the phase servo pattern is equal to ½ of the servo pattern period as shown by a phase difference signal 610. When the head exists at a position 620 as a center of the first cylinder, the phase difference between the clock reference phase and the read pulse of the servo pattern is equal to ¼ period as shown by a phase difference signal 630. When the head exists at a position 640 as a center of the third cylinder, the phase difference between the reference phase and the read pulse of the servo pattern is equal to ¾ period as shown by a phase difference signal 650. Further, when the head exists at the center of the No. 0 cylinder, the phase difference between the clock reference phase and the read pulse of the servo pattern is equal to zero or one period.

FIG. 3 shows a detection of the phase difference in the second field ODD. For example, when the head exists at a position 660 as a center of the No. 2 cylinder, the phase difference between the clock reference phase and the read pulse of the servo pattern is equal to ½ period as shown by a phase difference detection signal 670. When the head exists at a position 680 as a center of the No. 3 cylinder, the phase difference between the clock reference phase and the read pulse of the servo pattern is equal to ¼ period as shown by a phase difference detection signal 690. Therefore, the position of the magnetic head in any one of the cylinders of Nos. 0 to 3 can be detected by detecting the phase difference.

In the detection of the head position using the phase servo pattern, the peak of the read waveform from the servo surface is detected, a phase difference from the clock reference phase is detected a plurality of times, and the mean phase difference is set to a position signal. Since the phase difference detection is executed a plurality of times, although the position signal cannot be continuously obtained, the apparatus is hardly influenced by the noises due to the averaging process. If a level fluctuation of the disk medium surface is so small that the peak detection does not fluctuate, the position can be precisely detected. Further, in the digital-like positioning control of the head, since it is sufficient to obtain position information at every sampling period, continuous information is unnecessary and the position detection using a phase servo pattern is suitable.

A clock source having a fixed phase of a crystal oscillator or the like is used in the conventional apparatus. Therefore, when the rotation of the disk fluctuates, the phase difference with the servo pattern cannot be accurately detected, so that a position detecting accuracy deteriorates. In the crystal oscillator, an oscillating frequency may also fluctuates depending on temperature. Accordingly, the phase of the clock reference fluctuates, the phase difference with the servo pattern cannot be accurately detected, and the position detecting accuracy deteriorates. In the conventional apparatus, since an exclusive-use processor executes the position detecting process by the calculation of the mean value after the phase differences were detected, when the seeking speed rises, a processing speed of the processor cannot follow it and it is difficult to seek at a high speed.

Further in the conventional apparatus, in the case where the head moves in a range of four cylinders of Nos. 0 to 3, the phase difference changes within a range of 0 to 1 period (four clocks). Although the phase difference has a continuous change width of four clocks in the No. 2 cylinder as a center, change widths of the phase differences are small in the No. 0, 1, and 3 cylinders. Therefore, a detection range of the head position is narrow in a coarse control and the seek control is difficult.

In order to solve such problems, the same inventors as the present invention have proposed "Servo position detecting apparatus of disk apparatus" in U.S. Pat. No. 5,523,900. In the disk apparatus, a training region in which timing information has been recorded is provided before a servo region of the disk. A PLL circuit as a clock generation source is phase synchronized and a reference clock which is synchronized with the servo pattern of the disk is Generated. Therefore, the reference clock of a specific phase can be generated regardless of a fluctuation of a disk rotation and a fluctuation of an environmental temperature. The phase difference with the servo pattern is accurately detected and the detecting accuracy of the head position is raised. According to the detecting process of the position signal, a duty pulse such that a duty ratio changes in a range of 0 to 100% in accordance with the head position in the first to third fields is formed. A capacitor is switched to the charging mode, the discharging mode, and the charging mode and is integrated in accordance with the order of the first, second, and third fields by using the duty pulse, and the head position signal is detected as an integration voltage of the capacitor.

In this instance, the phase servo information is set so that the sum of the first and third fields is almost equal to that of second field. The duty ratios of the first, second, and third fields are equal to 50%, 50%, and 50% and the integrating voltage is equal to zero in an on-track state to the target cylinder. It is sufficient for the processor to A/D convert the integration signal and to read out by the detection of the analog-like position signal by the integrating circuit. The position detection corresponding to the high speed seeking operation can be executed. Further, what is called a cylinder switching to select the reference clock corresponding to the target cylinder among a plurality of reference clocks of difference phases is automatically executed. Even when any one of the No. 0 to 3 cylinders is set to the target cylinder, therefore, the position signal in which the target cylinder as a center cylinder changes in a range of ±2 cylinders is always obtained. The coarse control and the on-track control can be precisely executed.

Although the peak of the read signal of the phase servo information obtained from the servo head is detected and the position signal of the head is formed in the disk apparatus which has already been proposed, there is a problem such that the apparatus is easily affected by noises and a jitter easily occurs in the peak detection. That is, the peak detection is executed in a manner such that the read signal obtained from the servo head is level sliced and, after that, the signal is differentiated. Accordingly, there are problems such that the peak detection is executed at an erroneous timing due to noises which are mixed into the read waveform and a jitter which makes the phase fluctuate easily occurs and as a result, the head positioning accuracy deteriorates.

In the disk apparatus which has already been proposed, it is ideal that a duty signal obtained from the servo information during the on-track operation has duty ratios of 50%, 50%, and 50% in the Nos. 1 to 3 fields. Actually, however, the duty ratio cannot be set to 50% due to a delay in the circuit. Therefore, when the duty ratios are set to, for example, 40%, 40%, and 40% in the on-track state, the duty pulse becomes thin or when the duty ratios are set to 60%, 60%, and 60%, the duty pulse becomes fat. In the on-track control, the head is set into the on-track state under the condition of (even field) - (odd field) =0

Therefore, there is no problem in terms of accuracy of the on-track control when the duty ratio is always equal to 60% or 40%. In the case where the seeking operation is executed, however, there is a problem such that when the duty ratio is equal to 50% in the on-track state, the seeking operation can be executed in a range of −50% to +50% and, on the contrary, when the duty ratio is equal to, for example, 40% in the on-track state, the seeking operation can be executed only in a range of −40% to +60%, so that a margin for the high speed seeking operation is reduced.

Since an analog integrating circuit is used, an error occurs between the charging current and the discharging current of the capacitor and the integration voltage is not equal to zero even when the duty ratio is equal to 50%, so that the position detecting accuracy deteriorates.

On the other hand, in the phase servo pattern, the position in only a range of, for example, four cylinders of every two cylinders before and after the target cylinder as a center can be detected. Thus, there are problems such that the head moving speed which is defined by the number of the moving cylinders at every sampling period of the position detection has to be suppressed within four cylinders, the seeking speed is limited, and the seeking operation cannot be executed at a high speed.

In the coarse control in case of detecting the head position every sampling period, the next head position is predicted from the previous and present head positions and a target speed is set. Since the coarse control is executed in accordance with the target speed pattern of the acceleration, constant speed, and deceleration, however, when the prediction based on a simple speed is merely executed, the deviation between the predicted position and the actual position is large and there is a fear such that the position prediction fails and a seeking error occurs.

Further, in the conventional disk apparatus using the two-phase servo pattern, the servo information is recorded to a specific cylinder of the data surface in order to realize the thermal offset measurement or the yaw angle offset measurement. Therefore, it is also necessary to similarly record a phase servo pattern to the specific cylinder of the data surface even in case of using the phase servo pattern. In this case, the data head to execute the reading and the writing operations of the data surface comprises two heads of a write head and a read head for the servo head for reading the servo information on the servo surface. Particularly, a small MR head using a magnetoresistive element is used as a read head. Therefore, there is a problem such that even if the same phase servo pattern as that on the servo surface is recorded on the data surface, continuous head position signals cannot be obtained from the read signal by the small MR head.

In addition to the problems mentioned above, the following various kinds of subjects in order to assure the performance of the disk apparatus must be solved: namely, the measurement and correction of the yaw angle offset; the adjustment of the center value for a D/A converter provided in the driving system of the voice coil motor (VCM); the rezero operation as an initializing process in association with the power-on-start; the automatic adjustment to the optimum state of the servo system; the optimization of the on-track slice value at the time of erasing; and the like.

SUMMARY OF THE INVENTION

According to the present invention, a disk apparatus which can detect position using phase servo information and which is resists effects from noises or jitter is provided. According to the disk apparatus of the invention, the phase servo information is recorded on the servo surface of the disk medium. That is, a plurality of servo frames in which four cylinders on the servo surface is set to one unit are arranged in the circumferential direction of each cylinder. A training region, a marker region, an index/guard band region, and a servo region are provided in each servo frame. The servo region is divided into a first field (EVEN1), a second field (ODD1), a third field (ODD2), and a fourth field (EVEN2). Servo information having a phase change of the position is recorded in the first and fourth fields (EVEN1, EVEN2). Servo information having an opposite phase change is recorded in the second and third fields (ODD1, ODD2).

Timing information is recorded in the training region which exists in front of the servo region in the rotating direction and marker information to decide the servo region is recorded in the marker region. Further, a plurality sets of index information and guard band information are simultaneously recorded in the guard band/index region. With respect to the index/guard band region, either one of the information is detected according to the majority decision of the result of the reading of the plurality sets of index information and guard band information.

A read pulse is detected by a read pulse detecting circuit section from a read signal of a servo frame which is read by the servo head. The read pulse detecting circuit section is constructed by, for example, a peak detecting circuit section and a zero-cross detecting circuit section.

The peak detecting circuit section detects the peak timing of read waveforms of a timing signal of the training region, a marker signal of the marker region, and an index signal and a guard band signal of the index/guard band region and generates a read pulse (peak detection pulse).

The zero-cross detecting circuit section detects the zero-cross timing of the read signal of the servo information and generates a zero-cross detection signal which is used for the head position detection. Further, a low pass filter is provided at the front stage of the zero-cross detecting circuit section. The recording pattern of the phase servo information of the invention is recorded in a manner such that the phases are different at a pitch of 0.5 cylinder. The waveform of the read signal of the target cylinder is reduced because it is influenced by the recording patterns on both sides which were recorded so as to be deviated by 0.5 cylinder. The peak becomes dull and a jitter occurs in the peak detection pulse as a demodulation signal in the peak detection. Therefore, with respect to the read signal of the phase servo information, the zero-cross point is detected and the demodulation signal is obtained. In case of the zero-cross detection, a zero-cross detection pulse as a demodulation signal which is accurately synchronized with the phase pattern can be obtained without being influenced by the dull peak portion due to the adjacent phase patterns. Further, by providing a low pass filter at the front stage, the noises of the read signal can be reduced, the signal of the zero-cross portion can be promptly made rise and, further, the accuracy of the demodulation signal which is synchronized with the recording pattern of the phase servo can be raised.

It is possible to detect the zero-cross points with respect to all of the read signals in the training region, marker region, index/Guard band region, and servo region. It is also possible to detect the peaks with respect to all of the read signals.

A clock generating circuit section generates a reference clock having a reference phase whose phase is synchronized with the timing signal of the training region. A master clock forming circuit section sets the reference clock from the clock generating circuit section to a reference phase, forms a plurality of master clocks having different phases, selects the master clock of the phase corresponding to the target cylinder in which the servo head is to be located on the track, and outputs the selected master clock (cylinder switching function).

According to the detection of the head position signal, a duty pulse having a duty ratio corresponding to the phase difference from the reference phase of the master clock to the zero-cross detection pulse is generated by a duty pulse forming circuit section. An integrating circuit section integrates the duty pulse and generates a position signal indicative of the position of the servo head.

According to the invention, a disk apparatus by which a duty pulse having a duty ratio of 50% can be obtained in an on-track state even if a circuit delay is provided. In an initializing process just after the power source is turned on, a duty measurement circuit section measures the duty ratio of the duty pulse in the on-track state of the servo head for the specific target cylinder. The duty measurement circuit section obtains an integration signal indicative of the duty ratio by inverting the duty pulse corresponding to the second and third fields of the servo information and outputs the same integrating circuit section. The result of the measurement of the duty measurement circuit section is given to a duty adjustment circuit section by which the duty ratio of the duty pulse is adjusted to 50% in the on-track state of the target cylinder. The duty adjustment circuit section comprises a first delay circuit section to delay a reference timing of the master clock and to decrease the duty ratio and a second delay circuit section to delay a timing of a zero-cross detection pulse and to increase the duty ratio.

The first delay circuit section has a shifting circuit to delay the master clock step by step by a predetermined time within one period of the reference clock and selects either one of the shifting stage outputs of the shifting circuit and gives a desired delay amount to the master clock. The second delay circuit section has a plurality of delay elements (delay lines) having fixed delay amounts and selects and serially connects the plurality of the delay elements and gives a desired delay amount to a zero-cross detection pulse clock.

According to the invention, when the reference clock is synchronously controlled by the peak detection and the servo information is detected at the zero-cross point, the duty ratio of the duty pulse based on the phase difference detection in the on-track state is inevitably deviated from 50%. However, by measuring the duty ratio and by performing the delay adjustment so that the duty ratio is set to 50%, the offset of the position signal which is obtained by the integrating circuit in the on-track state can be eliminated. The delay adjustment also corrects the deviation of the duty ratio due to the circuit delay.

The adjustment to set the duty ratio of the duty pulse to 50% is applied as it is with respect to the detection of the head position by the servo information recorded on the data surface. That is, the duty ratio is similarly measured in a state in which the head is switched from the servo head to the data head by a selecting circuit section and the duty ratio is delay adjusted to 50%.

According to the invention, a disk apparatus which eliminates various kinds of errors concerning the integrating operation and maintains the integrating circuit in the optimum state is provided. An integration error measuring circuit section to measure the integration error and an integration error correcting circuit section are provided for the circuit adjustment of the integrating circuit section. The integration error measuring circuit section falsely supplies the duty pulse corresponding to the on-track state in which the servo head is moved to an arbitrary target cylinder position on the servo surface to the integrating circuit section at the time of the initializing process of the power-on-start, thereby measuring the integration error. Specifically, the duty pulse such that the duty ratios in all of the first to fourth fields of the servo information are equal to 50% is falsely generated and is supplied as a zero-cross detection pulse (read pulse) to a duty pulse forming circuit section. After the initializing process, the integration error correcting circuit section corrects the position signal obtained from the integrating circuit section by the measured integration error, thereby obtaining the correct position signal. As mentioned above, by executing the correction such that the variation of the integrating circuit is eliminated from the position data obtained by measuring the integration error signal and A/D converted, the position can be detected at a higher accuracy.

The integration error measuring circuit section measures a cylinder gain indicative of a head movement amount per cylinder. In the measurement, at the time of the initializing process of the power-on-start, the generating mode is switched from the generation of a duty pulse which is equivalent to an on-track state in which the servo head was moved to an arbitrary target cylinder to the generation of a duty pulse which is equivalent to a state in which the servo head was moved in a direction by a distance of one cylinder or the generation of a duty pulse which is equivalent to a state in which the servo head was moved in the opposite direction by a distance of one cylinder, and the position changes are measured by the integrating circuit section, respectively. The position change amount per cylinder is obtained on the basis of the results of the above-mentioned measurements and is set as a cylinder gain which is used for the head positioning control after the initializing process. Specifically, in the duty pulse forming circuit section, a duty pulse such that the duty ratios in all of the first to fourth fields of the servo information are equal to 50% is generated at the target cylinder position, a duty pulse whose duty ratio changes to 25%, 75%, 75%, and 25% at the position where head was moved by a distance of −1 cylinder is generated, and a duty pulse whose duty ratio changes to 75%, 25%, 25%, and 75% at the position where the head was moved by a distance of +1 cylinder is generated.

According to the present invention, a disk apparatus which enables a high speed seeking operation of the head moving speed which exceeds four cylinders per sampling period is provided. In the seek control using the phase servo information, the head position detection signal is discretely obtained. Therefore, the seek control circuit section has: a speed detecting circuit section to detect the head moving speed at the time of the seeking operation every sampling period at which a position signal is formed; and a position predicting circuit section for predicting the head position at the next sampling time point every sampling period and for allowing a clock selecting circuit section to select the reference clock of the phase corresponding to the target cylinder obtained by the position prediction.

The position predicting circuit section switches the target cylinder in each of the first to fourth fields of the servo region in accordance with the head moving speed during the seeking operation and allows the clock selecting circuit section to select the master clock of the corresponding phase. According to the switching of the target cylinder, the number of switching stages in the first to fourth fields and the number of changes of the target cylinders in every switching operation are increased as the head moving speed is high.

For example, in the case where the head moving speed which is defined by the number of movement cylinders at the sampling period lies within the number of repetitive cylinders of the servo information, the position predicting circuit section allows the clock selecting circuit section to select the master clock of the corresponding phase in the first to fourth fields without switching the target cylinder. Namely, in the case where the number of repetitive cylinders of the servo information is equal to four cylinders, when the head moving speed lies within a range of −4 cylinders to +4 cylinders, the master clock of the phase corresponding to the center target cylinder is selected in the first to fourth fields without switching the target cylinder.

In the case where the head moving speed which is defined by the number of movement cylinders at the sampling period exceeds the number of repetitive cylinders of the servo information, the position predicting circuit section divides the fields into the first and second fields and the third and fourth fields and switches the target cylinder into two stages and allows the master clock of the corresponding phase to be selected. For example, in the case where the number of repetitive cylinders of the servo information is equal to four, when the head moving speed lies within a range of −2 cylinders to +6 cylinders, the target cylinder is switched to the target cylinder which is smaller than the center cylinder by one cylinder in the first and second fields. Further, in the third and fourth fields, the target cylinder is switched to the cylinder which is larger than the center cylinder by one cylinder and the master clock of the corresponding phase is selected, respectively.

Further, when the head moving speed is increased, the position predicting circuit section divisionally switches the target cylinder into four stages in each of the first to fourth fields, thereby allowing the master clock of the corresponding phase to be selected. In this case, it is sufficient to increase the number of switching cylinders in the head moving direction as 1, 2, 3, . . . in association with an increase.

As a result, by switching the cylinder in the first to fourth fields according to the head speed at the time of the seeking operation, even at a head speed exceeding the range of ±4 cylinders as a limit of the position signal detection, the head position is accurately detected and the seeking operation at a high speed can be realized.

According to the present invention, a disk apparatus which can accurately predict the position in association with the movement of the head is provided. In order to improve the accuracy of the position prediction in the seek control, the position predicting circuit section detects the acceleration of the head movement and predicts the head position at the next sampling time point. In the prediction including the acceleration, for example, the number of movement cylinders depending on the head acceleration is added to the present position on the basis of the head drive current and the predicting position is calculated. As a result, by including the change of the head position by the acceleration, the position can be more accurately predicted and the seek error due to the large deviation of the position prediction can be prevented.

According to the invention, a disk apparatus to record the phase servo pattern adaptive to the small MR head (read head) provided in the data head onto the data surface is provided. For this purpose, a data surface servo writing circuit section to write the servo information onto the data surface is provided. According to the data surface servo writing circuit section, the servo information having phase changes of the position in the first and fourth fields (EVEN1 and EVEN2) among the four divided fields and the servo information having the opposite phase changes in the second and third fields (ODD1 and ODD2) are recorded in each of a plurality of servo frames arranged in the circumferential direction of the specific cylinder on the data surface, thereby forming the servo region. In this instance, since the small MR head is used as a read head of the data head as compared with the servo head, even if the same servo information as that on the servo surface is recorded, the position signal which linearly changes in association with the head movement cannot be obtained. Therefore, for example, in the case where the servo information has been recorded at a 0.5 cylinder pitch on the servo surface, the data surface servo writing circuit section writes the servo information at the same 0.5-cylinder pitch which is the same as that on the servo surface and also writes each of the servo information of the first field (EVEN1) and the fourth field (EVEN2) and the phase information of the second field (ODD1) and the third field (ODD2) so as to be deviated from each other by only a 0.25 cylinder pitch.

In order to enable the servo information to be written onto the servo surface as mentioned above, a writing pulse of 16 phases synchronized with the leading and trailing edges of the reference clock is generated. While seeking the head by 0.25 cylinder at a time, the writing pulse of the phase number in the first to fourth fields corresponding to each of the cylinder positions is selected and the servo pattern is written. Generally, in the case where the number of repetitive cylinders of the servo information recorded on the servo surface is set to N, the data surface servo writing circuit section generates (4N) kinds of writing pulses which are obtained by making the writing pulses derived by dividing the frequency of the reference clock into 1/N different from each other by (¼)N period at a time as compared with the phase of the reference clock. The data surface servo writing circuit also selects the writing pulse of a predetermined phase specified by a writing cylinder from among the writing pulses and writes the servo information corresponding to the servo information on the servo surface into the servo region of the data surface.

According to the invention, there is provided a disk apparatus in which data bits 0 and 1 can be read and written from/to the specified cylinder out of the user region on the data surface by using the phase servo information by using a head position detecting circuit section. In order to realize such a function, a data writing circuit section for writing data onto the specified cylinder out of the user region on the data surface by using servo information and a data reading circuit section for reading the servo information written by the data writing circuit section and for reconstructing the data are provided.

The data writing circuit section writes the servo information by using the duty pulse in which the duty ratios in the first and fourth fields and those in the second and third fields are different in correspondence to writing data bits 0 and 1. For example, the servo information is written by using the duty pulse whose duty ratios in the first to fourth fields are equal to 25%, 75%, 75%, and 25% in correspondence to the writing data bit 0. The servo information is written by using the duty pulse whose duty ratios in the first to fourth fields are equal to 75%, 25%, 25%, and 75% in correspondence to data bit 1.

The data reading circuit section supplies the read signal of the servo information on the data surface to the duty pulse forming circuit section, thereby generating the duty pulse. Further, the integrating circuit section reconstructs data bit 0 or 1 from the signal obtained by integrating the duty pulse. The servo information for the data surface is written to the outer rim cylinder existing out of the user region on the data surface in order to use it for the off-track measurement of the data surface. The servo information is also further written to the innermost cylinder in order to use it for the measurement of a yaw angle offset of the head drive mechanism.

According to the invention, a disk apparatus in which yaw angle offsets of the reading head when the data head is rotated and positioned to the innermost and outermost cylinders by the head arm are measured and can be corrected is provided. At the time of the initializing process of the power-on-start, the data head having the writing head and reading head integratedly is positioned to each of the outer rim and inner rim cylinders on the data surface on the basis of the servo information on the servo surface and the yaw angle offsets of the reading head which is caused by the rotation of the head arm are measured on the basis of the servo information of each of the cylinders. Each of the measured yaw angle offsets in the inner and outer rims are used for an interpolating calculation to obtain the yaw angle offset at each of the cylinder positions. A correction table in which the cylinder address is used as an index is formed. The correction table can also store the yaw angle offsets on a unit basis of a predetermined number of cylinders. According to the yaw angle offset correction, for example, when a read error on the data surface occurs, the yaw angle offsets are corrected and the retry operation is executed.

According to the disk apparatus of the invention, a conversion output signal of a D/A converter for a VCM is converted to a drive signal corresponding to the polarity and size for the reference voltage which gives a middle-point thereof and the drive current is supplied to the VCM. Therefore, there is a possibility such that an error occurs between the output center value obtained by D/A converting the center value of the input drive data and the reference voltage. Therefore, at the time of the initializing process of the power-on-start, the head drive data for the D/A converter is changed from the center value, errors which will occur until the A/D conversion output signal coincides with the reference voltage are obtained. After the initializing process, the errors are measured from the head drive data which is supplied to the D/A converter and the apparatus is corrected so as to eliminate the center error.

For the automatic adjustment of the servo system, a coarse time which is required until the control mode is switched from the coarse control to the fine control by the seeking operation is measured while varying the pain which decides the acceleration or deceleration of the target speed pattern which is used for the speed control as an adjustment value. The absolute integration value of the position error for a period of time until the head enters the on-track state after the control mode was switched to the fine control in the seeking operation is measured while varying the pain which decides the acceleration or deceleration of the target speed pattern which is used for the speed control as an adjustment value. The sum of the coarse times and the absolute integration values of the position errors which were obtained by the measurements is used as an evaluating function and the minimum adjustment value is detected as an optimum value and the servo system is automatically adjusted.

Further, the on-track slice value to judge the on-track state upon erasing is changed to the enlarged value for the on-track slice value upon reading and writing.

The above and other objects, features, and advantages of the present invention will become more apparent from the following detailed description with reference to the drawings.

BRIEF DESCRIPTION OF THE DRAWINGS

FIGS. 13A to 13G are timing charts for the peak detecting operation in FIG. 12;

FIGS. 16A to 16D are timing charts for the zero-cross detecting operation in FIG. 15;

FIG. 25 is an explanatory diagram of combinations of the phase numbers of the write signals which are used for writing on the servo surface;

FIG. 26 is an explanatory diagram of combinations of the phase numbers of master clocks which are used for switching cylinders;

FIGS. 33A to 33D are timing charts showing the measuring operation of duty ratios by the integration control section in FIG. 32;

FIG. 34 is a circuit block diagram of a shifter in FIG. 10;

FIG. 38 is an explanatory diagram of a delay time of a delay element which is used in the variable delay circuit in FIG. 36;

FIG. 39 is an explanatory diagram of table information which decides a delay time of the variable delay circuit in FIG. 36;

FIGS. 40A to 40E are timing charts for delay adjustment to a duty ratio 50% by the shifter in FIG. 10 and the variable delay circuit;

FIGS. 43A to 43H are timing charts for the formation of duty pulses which are used for the error measurement of the integrating circuit;

FIG. 56 is an explanatory diagram of combinations of the master clock phase numbers which are used in the respective fields in FIG. 55;

FIG. 58 is an explanatory diagram of combinations of the master clock phase numbers which are used in the respective fields in FIG. 57;

FIG. 71 is an explanatory diagram of combinations of phase numbers of the write signal which is used for writing the servo pattern onto the data surface of the invention;

FIG. 72 is an explanatory diagram of combinations of phase numbers of the master clock which is used for reading the servo patterns on the data surface of the invention;

FIG. 73 is a flowchart for the writing operation of the servo pattern on the data surface according to invention;

FIGS. 75A to 75F show phase servo patterns of data bit 1 and timing charts for the reading operation according to the invention;

FIG. 83 is an explanatory diagram of an offset correction table which is formed by the yaw angle offset measurement of FIG. 82;

DETAILED DESCRIPTION OF THE PREFERRED EMBODIMENTS

Hardware construction

Figure 1:
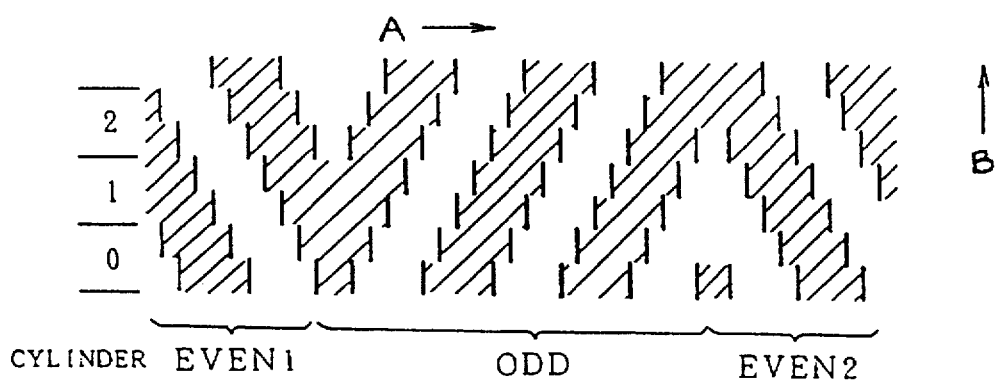
FIG. 1 is an explanatory diagram of a conventional phase servo pattern.
Figure 2:
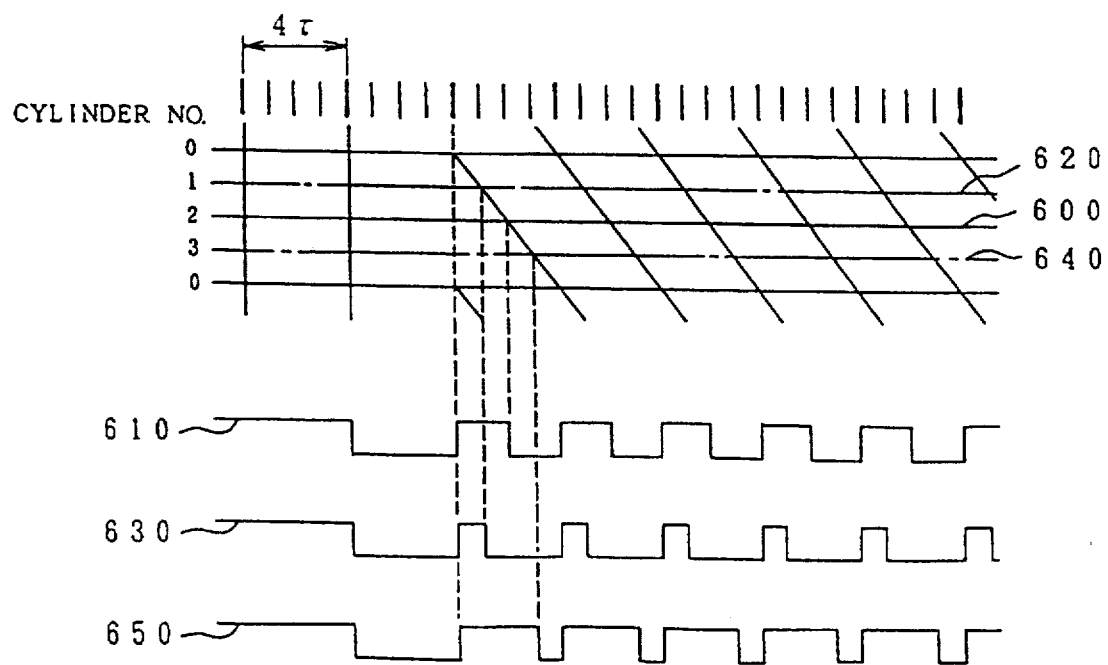
FIG. 2 is a timing chart showing duty pulses in the first and third fields EVEN1 and EVEN2 when the head is located on the track of each of the cylinder numbers 1, 2, and 3 in FIG. 1.
Figure 3:
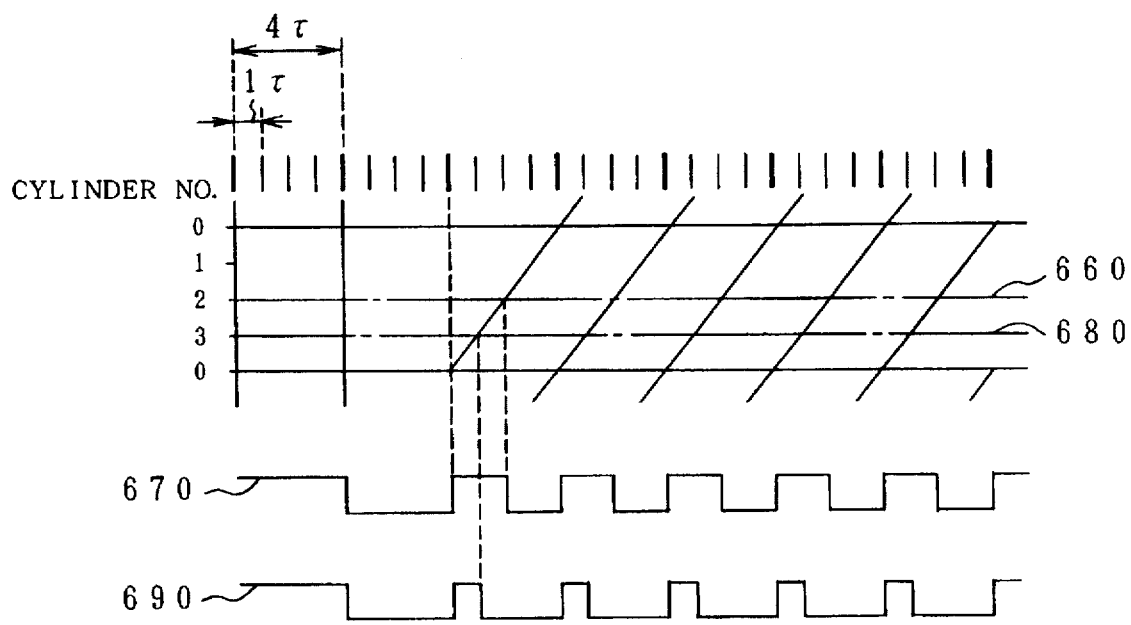
FIG. 3 is a timing chart showing duty pulses in the second field ODD when the head is located on the track of each of the cylinder numbers 2 and 3 in FIG. 1.
Figure 4:
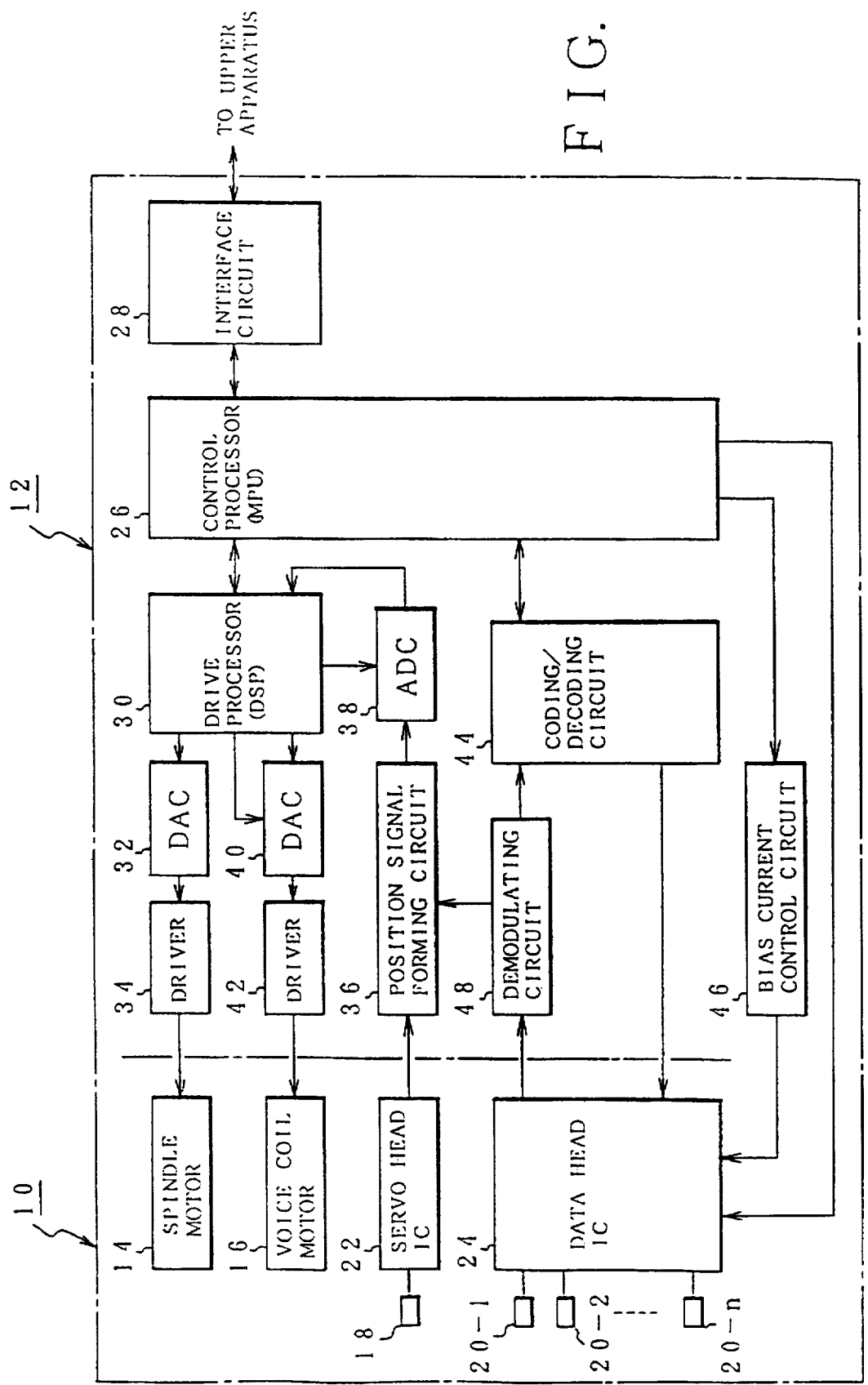
FIG. 4 is a block diagram of a hardware construction of the invention.

In FIG. 4, the disk apparatus of the invention is constructed by a disk enclosure 10 and a drive controller 12. A spindle motor 14 to rotate a disk and a voice coil motor (hereinafter, referred to as a VCM) 16 to move a head are provided in the disk enclosure 10. A servo head 18 and a servo head IC 22 are provided in order to read out information on a servo surface of a magnetic disk. Further, data heads 20-1 to 20-n and a data head IC 24 are provided in order to read or write information on a plurality of data surfaces. Each of the data heads 20-1 to 20-n has a writing head and a reading head integratedly in a head portion. A magnetic head is used as a writing head and an MR head using a magnetoresistive element is used as a reading head.

In this instance, among the core widths of the writing heads and reading heads provided in the servo head 18 and the data heads 20-1 to 20-n, there are the relations such that the core width of the servo head 18 has the largest value and that of the writing head has the second largest value and that of the reading head (MR head) has the smallest value. For example, when it is now assumed that a track pitch on the data surface is equal to 7 μm, the core width of the servo head 18 is equal to 7 μm which is almost equal to the track pitch. On the other hand, the core width of the writing head provided in the data head is equal to 6 μm. Further, the core width of the MR head as a reading head is equal to about 3 μm which is half that of the writing head.

A control processor 26 is provided for the drive controller 12. The control processor 26 is coupled with an upper disk control unit through an interface circuit 28 and receives various kinds of commands such as seek command, read command, write command, and the like and executes a corresponding process. A drive processor 30 to execute a head positioning control is provided under the control processor 26. A digital signal processor is used as a drive processor 30. A position signal forming circuit 36 is provided to detect the head position for the drive processor 30.

A read signal of the servo head 18 is input to the position signal forming circuit 36. According to the invention, phase servo information is recorded on the data surface of the disk medium. On the basis of the read signal of the phase servo information, the position signal forming circuit 36 forms a position detection signal indicative of the head position. The position signal from the position signal forming circuit 36 is converted to the digital data by an A/D converter 38 and is sent to the drive processor 30. The drive processor 30 controls the spindle motor 14 through a D/A converter 32 and a driver 34. The drive processor 30 drives the VCM 16 through a D/A converter 40 and a driver 42 and executes a position control of the head.

As a positioning control of the head by the drive processor, a seek control for moving the head to a target cylinder on the basis of the seek command and an on-track control for maintaining an on-track state when the head reaches the target cylinder are executed. The seek control is constructed by a coarse control and a fine control. The coarse control is a control to move the head to the position just before the target cylinder in accordance with a target speed pattern. The fine control is a control to switch the control mode from the speed control to the position servo control when the head reaches the position just before the target cylinder, for example, the position which is a 0.5 cylinder before the target cylinder by the coarse control and to pull in the head to the target cylinder.

On the other hand, a coding/decoding circuit 44, a demodulating circuit 48, and a bias current control circuit 46 are provided to read or write data for the data surface of the disk medium. A well-known circuit can be used as a circuit of the read/write system.

Further in the invention, an equivalent phase servo pattern corresponding to the phase servo pattern on the servo surface is recorded in the specific cylinder on the data surface of the disk medium, that is, an inner guard band region which is located in the edge portion on the inner side and in an outer guard band region which is located on the outer side for a user region. In order to read out the phase servo pattern on the data surface by the reading head provided in the data head and to detect the head position, the read signal of the reading head from the data head 24 is supplied to the position signal forming circuit 36 through the demodulating circuit 48.

Figure 5:
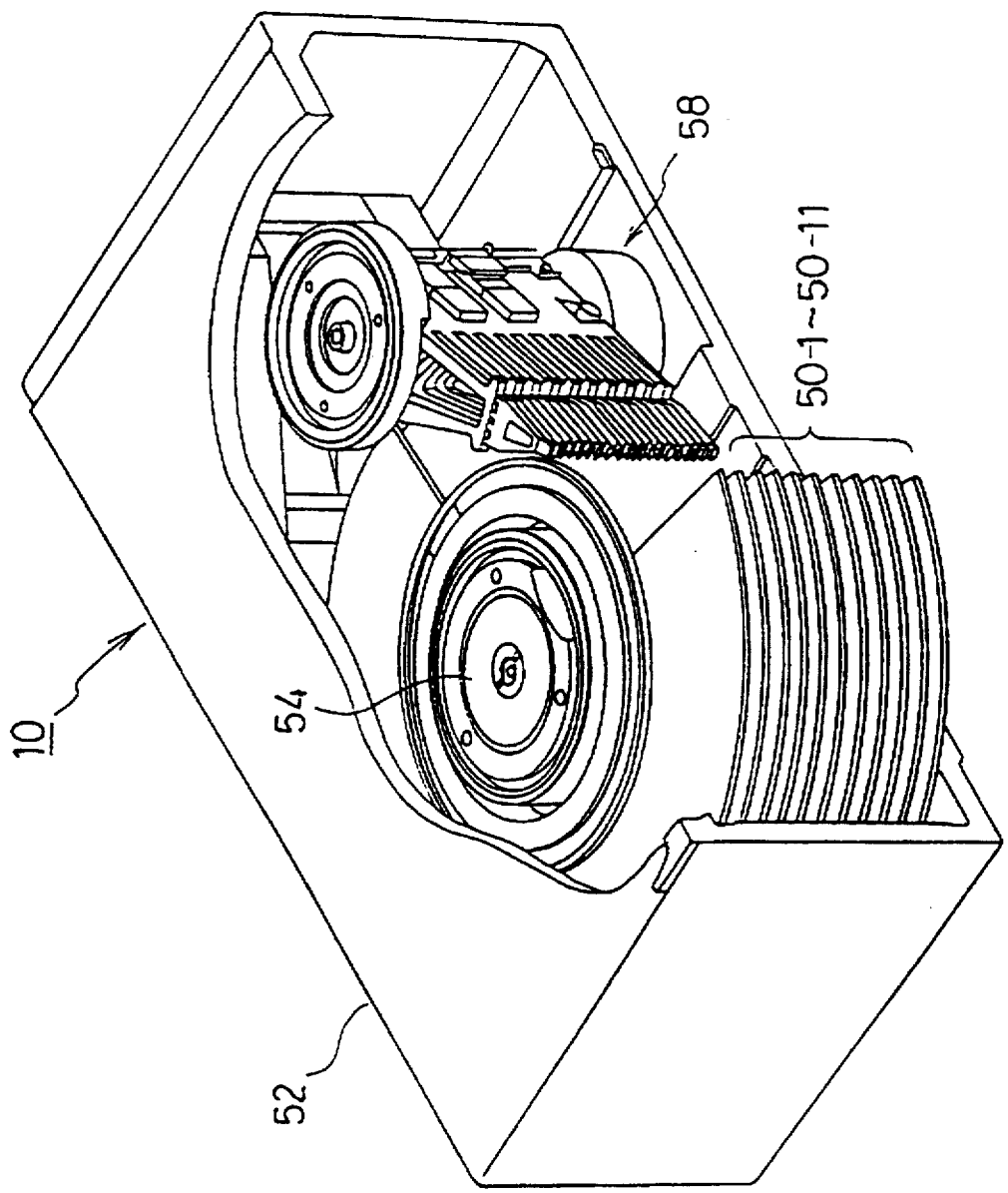
FIG. 5 is an explanatory diagram showing a structure of a disk enclosure in FIG. 4.

FIG. 5 shows an internal construction of the disk enclosure 10 in FIG. 4. Eleven magnetic disks 50-1 to 50-11 are rotatably assembled by being supported by a rotary shaft 54 and are rotated by a spindle motor (not shown) provided in the lower portion. A head actuator 58 is provided on the right side of the magnetic disks 50-1 to 50-11. The heads provided on the tip portions of the head actuator 58 are movable in the radial direction of each medium surface of each of the magnetic disks 50-1 to 50-11. In the embodiment, the disks each having a diameter of 5.25 inches are used as magnetic disks 50-1 to 50-11.

Figure 6:
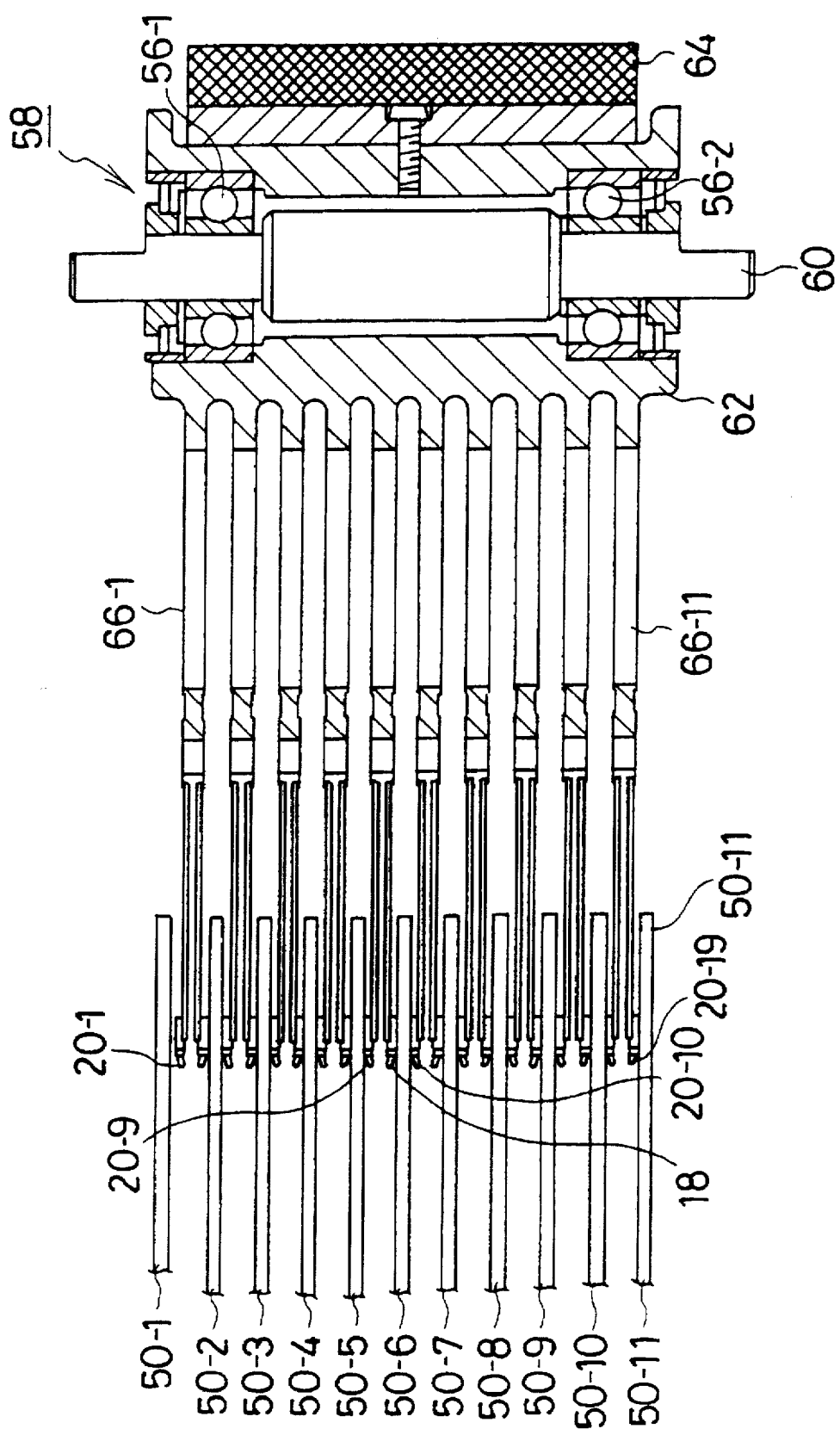
FIG. 6 is a side sectional view of a head actuator in FIG. 4.

FIG. 6 is a vertical sectional view of the head actuator 58 in FIG. 5. In the head actuator 58, a block 62 is rotatably attached to a shaft 60 which is fixedly provided through upper and lower bearings 56-1 and 56-2. A coil 64 of the VCM 16 is attached on the right side of the block 62. Eleven arms 66-1 to 66-11 are provided on the left side of the block 62. Two heads are supported through a pair of spring arms at each edge of the arms 66-1 to 66-11. In the embodiment, 20 heads are provided for the eleven magnetic disks 50-1 to 50-11. The upper nine heads are the data heads 20-1 to 20-9 and the servo head 18 is subsequently provided. The remaining ten heads subsequent to the servo head 18 are the data heads 0-10 to 20-19. The disk surfaces of the magnetic disks 0-1 to 50-11 which face the data heads 20-1 to 20-19 are used as data surfaces which are used to write and read data. On the other hand, the medium surface on the upper side of the magnetic disk 50-6 over which the servo head 18 is located is used as a servo surface to which the servo information has been recorded on all of the tracks. In the invention, the phase servo patterns have been recorded on the servo surface. The reason why the medium surface of the central magnetic disk 50-6 among the magnetic disks 50-1 to 50-11 which faces the servo head 18 is used as a servo surface is because by positioning the servo surface at the center, the distances to the farthest magnetic disks 50-1 and 50-11 can be minimized and the offset amount as a position fluctuation in each of the data surfaces for the servo surface by a mechanical deformation due to a temperature change is minimized.

Functional construction of disk apparatus

Figure 7:
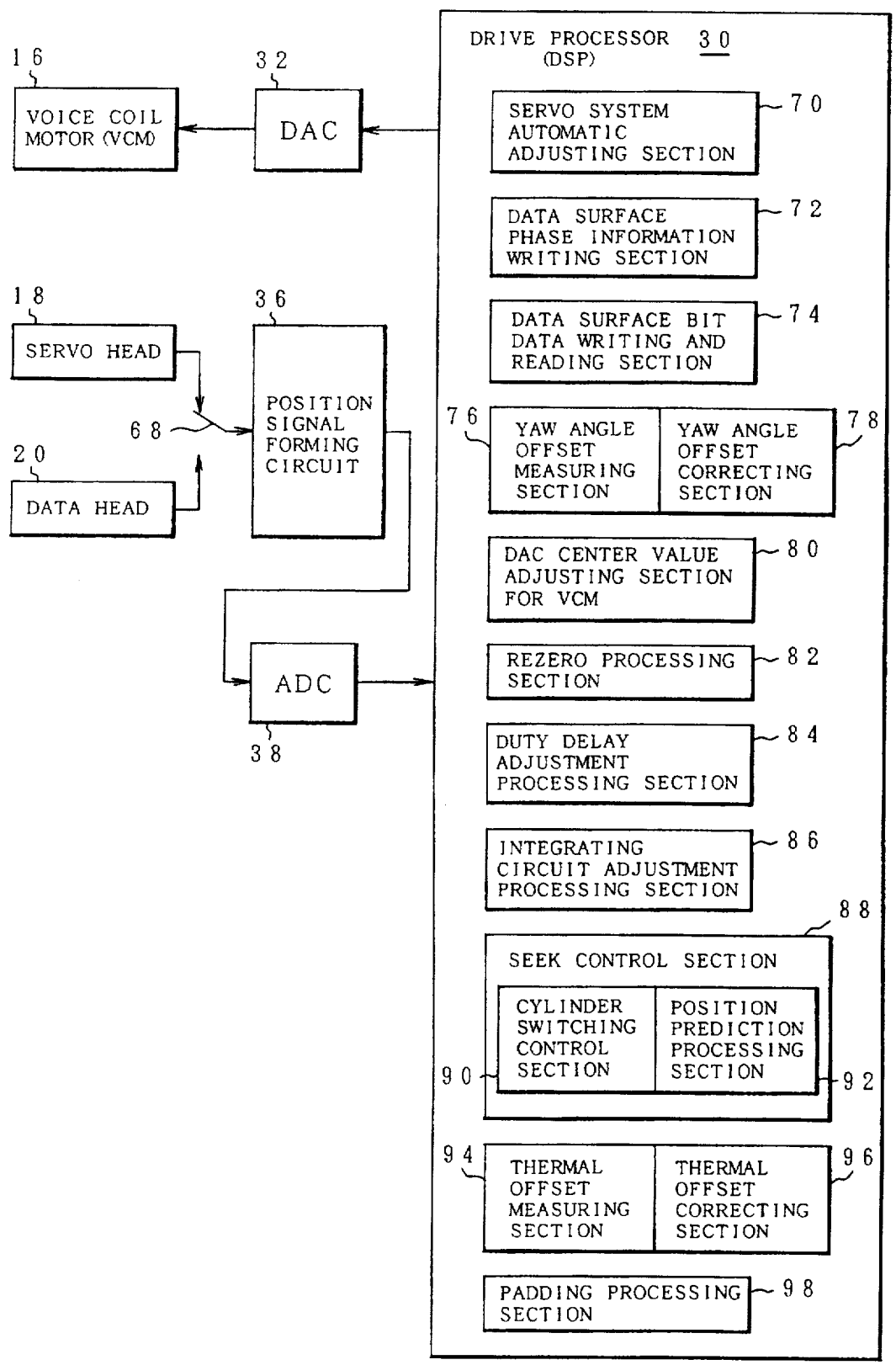
FIG. 7 is a functional block diagram of the invention.

FIG. 7 shows various control functions regarding the positioning control of the head as a central function in the disk apparatus of the invention. The VCM 16, servo head 18, data head 20, D/A converter 32 for the VCM 16, position signal forming circuit 36, and A/D converter 38 are shown as a hardware which is directly associated with the control functions of the drive processor 30. With respect to the data head, although a plurality of data heads are actually provided, one data head 20 is representatively shown for simplicity of explanation. Since the position signal forming circuit 36 forms a position signal from the phase servo pattern on the servo surface or the phase servo pattern on the data surface, the switching is shown by a virtual change-over switch 68.

To the drive processor 30 of the drive controller 12, as a processing section to realize the control functions of the invention, there are provided: a servo system automatic adjusting section 70; a data surface phase information writing section 72; a data surface bit data writing and reading section 74; a yaw angle offset measuring section 76; a yaw angle offset correcting section 78; a DAC center value adjusting section 80 for the VCM; a rezero processing section 82; a duty delay adjustment processing section 84; an integrating circuit adjustment processing section 86; a cylinder switching control section 90 as a function of a seek control section 88; a position prediction processing section 92; a thermal offset measuring section 94; a thermal offset correcting section 96; and further, a padding processing section 98. Although the details of each of the processing sections provided for the drive processor 30 will be made clear from the description hereinlater, the outline of the processing sections will be explained as follows.

The servo system automatic adjusting section 70 adjusts an adjustment value to decide inclinations (speed gains) at the times of the acceleration and deceleration in the target speed pattern which is used for the coarse control to the optimum value through a simulation of the seek control at the final stage of the manufacturing step in which the writing of the phase servo patterns onto the servo surface has been completed by an exclusive-use apparatus such as a servo writer.

The data surface phase information writing section 72 writes the phase servo pattern which is peculiar to the data surface and from which a position signal can be formed by the reading (MR head) in the data head corresponding to the servo information of the servo surface onto the specific cylinders of the inner guard band and outer guard band on the data surface by using the writing head (magnetic head) provided for the data head 20. The writing of the phase servo pattern onto the data surface is also executed in the final manufacturing step of the disk apparatus.

The data surface bit data writing and reading section 74 reads or writes the data such as various kinds of set data, machine numbers, and the like of the disk apparatus from/to space regions other than the user region of the data surface by using the writing and reading functions of the phase servo information in a single body state in which the drive controller 12 in FIG. 4 isn't connected to the upper disk control unit. The function by the data surface bit data writing and reading section 74 is also used at the final stage of the manufacturing step of the disk apparatus or at the time of the system configuration in the installation site.

The yaw angle offset measuring section 76 measures the offsets at the innermost and outermost positions of the head due to the driving of the VCM 16 by using the phase servo patterns written in the inner guard band region and outer guard band region of the data surface by the data surface phase information writing section 72. The yaw angle offset correcting section 78 corrects the offsets of the reading head at the time of the reading of the data surface by the reading head on the basis of the measurement result of the yaw angle offset measuring section 76. The measuring process by the yaw angle offset measuring section 76 is executed at the time of the initializing process by the power-on-start.

The DAC center value adjusting section 80 for the VCM adjusts the center value of the D/A converter 32 which is used to supply the drive current to the VCM 16 at the time of the initializing process of the power-on-start.

The rezero processing section 82 executes the rezero operation, for example, to move the head locating in the innermost contact start/stop region to the outermost position.

The duty delay adjustment processing section 84 adjusts a point at which the duty ratio of the duty pulse which is generated from the position signal forming circuit 36 in the on-track state is deviated from 50% in association with that the detection of the read signal of the phase servo information was performed by the zero-cross detection, thereby enabling the duty pulse of the duty ratio 50% to be always formed in the on-track state.

The integrating circuit adjustment processing section 86 executes the adjustment of the integration error of the integrating circuit which executes the integrating operation on the basis of the duty pulse provided in the position signal forming circuit 36 and the measurement of the cylinder gain indicative of the change amount of the head position signal per cylinder.

The cylinder switching control section 90 of the seek control section 88 switches the target cylinder to decide the pseudo master clock which is used to form the position signal by the position signal forming circuit 36 on the basis of the seeking speed. The position prediction processing section 92 predicts the accurate position including the acceleration in addition to the speed with respect to the position prediction at the next sampling time since the position signal forming circuit 36 needs to know the target cylinder to which the head locates at the next sampling time and to switch to the corresponding master clock.

In the seek control section 88 of the invention, a track crossing pulse isn't used as in the head position control by the conventional 2-phase servo but the coarse control (speed control) is executed by using the head position signal which is discretely obtained every predetermined sampling period which is decided by the forming period of the position signal of the position signal forming circuit 36. Such a coarse control using no track crossing pulse has been disclosed in the specification of "Head positioning control apparatus and control method of disk drive" of International Patent Application No. WO92/11636 filed by the same applicant as the present invention on Jun. 27, 1991. Simply explaining, the drive processor 30 obtains the head moving speed from the present head position and the previous head position, predicts the head position at the next sampling time, and calculates the number of remaining cylinders for the target cylinder. The drive processor obtains the target speed from the target speed pattern which has been preset by the number of the remaining cylinders, calculates the current value of the VCM 16 corresponding to the difference between the actual speed and the target speed at that time, and drives the VCM 16 through the D/A converter 32.

The thermal offset measuring section 94 seeks the data head to the phase servo pattern written in the outer guard band region of the data surface and uniformly detects, for example, 16 offsets of one circumference of the cylinder in association with the temperature fluctuation of the apparatus and forms a thermal offset correction table in which each rotating position is used as an address. The thermal offset correcting section 96 uses the correction table formed by the thermal offset measuring section 94 and corrects the position control signal which is output to the D/A converter 32 in case of the on-track control. Although the measuring process by the thermal offset measuring section 94 can be executed at the time of the power-on-start and in accordance with a predetermined time schedule after the power-on-start, in the invention, the disk apparatus monitors an idle state in which no command is received and when it is regarded that no command is received, the thermal offset process is executed.

When an erase command for a specific cylinder is received from the upper disk control unit, the padding processing section 98 changes the on-track slice value indicative of the allowable range of the head positioning signal in the erasing operation to the on-track slice value which was enlarged as compared with those in the normal reading and writing operations. Therefore, even in the case where the off-track is large, the erasing operation is continued as long as possible within a range in which the adjacent tracks are not erased.

Figure 8:
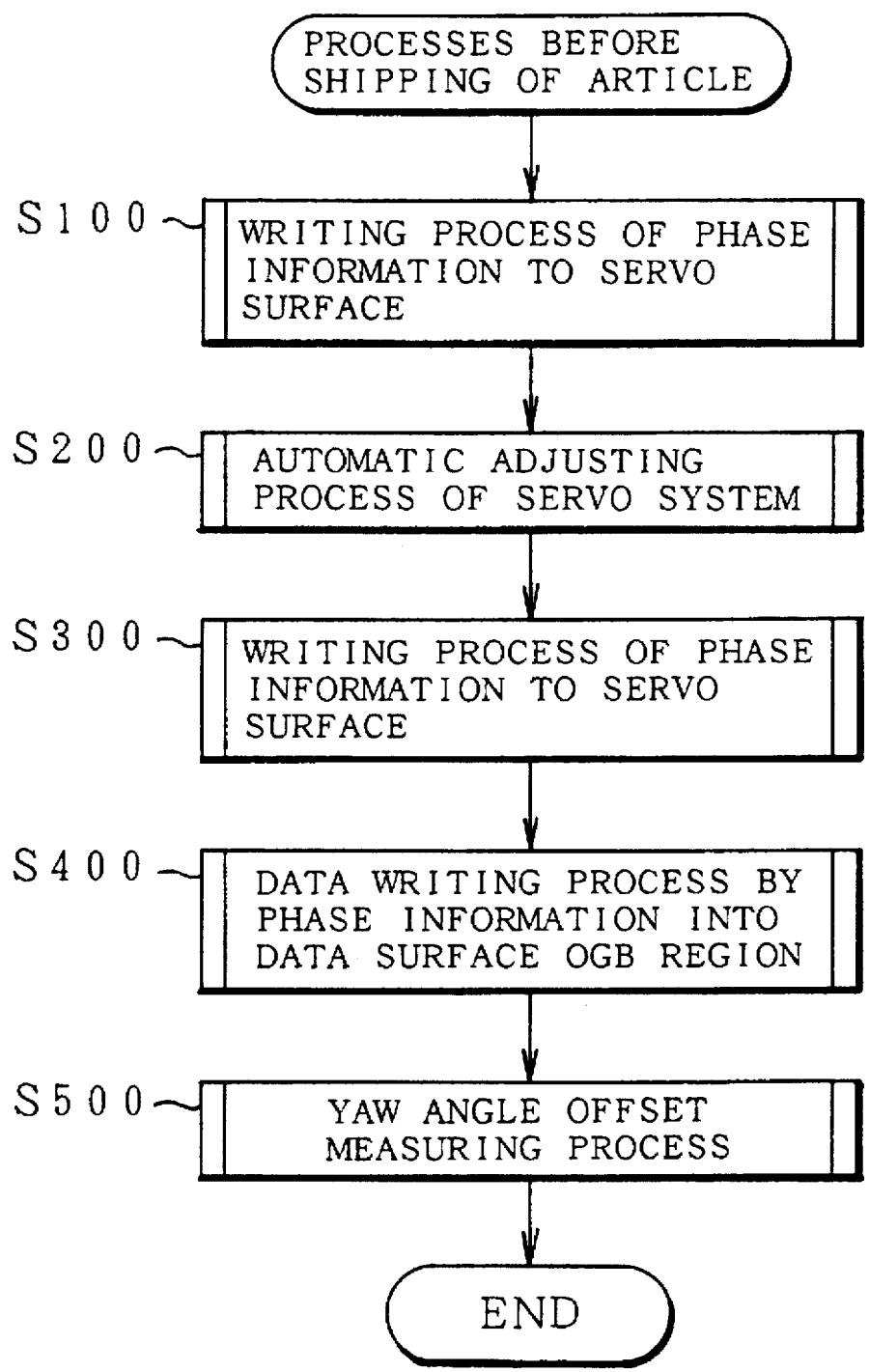
FIG. 8 is a flowchart for processes before a disk apparatus of the invention is shipped.

FIG. 8 shows a series of processes which are executed at the final stage of the assembling processes before shipping of an article in the processing section of the drive processor 30 in FIG. 7. At the final stage of the manufacturing processes before shipping of the article, first in step S100, the writing process of the phase servo pattern for the servo surface is executed. The writing process of the phase servo pattern is Generally executed by using an exclusive-use servo writer. After the writing of the phase servo pattern for the servo surface was finished, in the next step S200, an automatic adjusting process of the servo system, namely, an optimization adjusting process of the adjustment value to decide the inclination of the acceleration or deceleration of the target speed pattern in the coarse control is executed by using the servo system automatic adjusting section 70. After the automatic adjusting process of the servo system was finished, in step S300, the writing process of the phase servo pattern for the data surface is executed by using the data surface phase information writing section 72. In the subsequent step S400, the writing process to write various kinds of data necessary for the sole disk apparatus to vacant cylinders in the outer Guard band region (OGB1) and inner Guard band region (IGB1) of the data surface by using the data surface bit data writing and reading section 74 and by using the phase servo pattern is executed. In step S500, a yaw angle offset process is executed in a manner such that the data head is sequentially sought to the inner guard band region (IGB1) and outer guard band region (OGB1) to which the phase servo patterns have been written, the yaw angle offsets of the reading head (MR head) provided in the data head in the innermost and outermost regions are measured, the yaw angle offsets at the user cylinder positions are obtained by the linear interpolation, and a correction table is formed. The processes as mentioned above are the processes at the final stage of the assembling processes before shipping of the article. The other processes are executed through the initializing process in association with the power-on-start on-start after the disk apparatus was installed, the seek control based on the upper command after completion of the initializing process, and the reading/writing operations.

Figure 9:
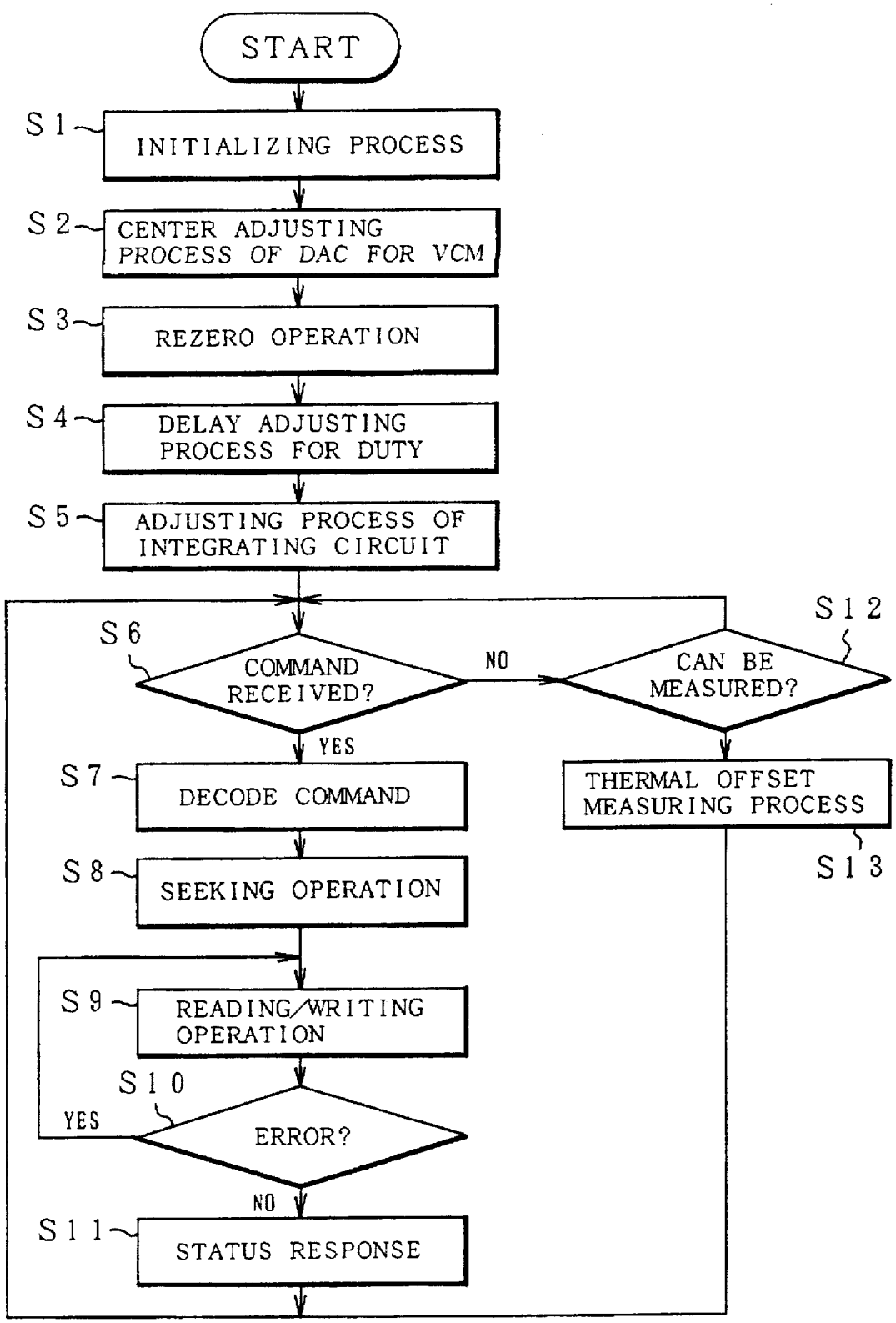
FIG. 9 is a flowchart showing a whole processing operation of the disk apparatus of the invention.

FIG. 9 shows the whole processing operation in an operating state of the disk apparatus of the invention. When the power-on-start of the disk apparatus due to the turn-on of the power source is executed, first in step S1, the basic initializing process including a program load initialization diagnosis or the like is executed. In step S2, a center value adjusting process of the D/A converter 32 for the VCM is executed by the DAC center value adjusting section 80 for the VCM. In step S3, the rezero processing section 82 is activated and the rezero operation to seek the head to the outer guard band region (OGB1) and to obtain the absolute value of the cylinder address is executed. The processing routine advances to step S4 and a delay adjusting process to adjust the duty ratio of the duty pulse in the on-track state in the position signal forming circuit 36 to 50% is executed by using the duty delay adjustment processing section 84. In the subsequent step S5, the integrating circuit adjustment processing section 86 is activated and an error correction value by the detection of the integration error when the head is in the on-track state in which the position signal of the integrating circuit provided in the position signal forming circuit 36 is equal to zero is formed. Further, an adjusting process of the integrating circuit including the measurement of the cylinder gain indicative of the change amount of the position signal when the head is moved by one cylinder is executed. When the above-mentioned series of processes in steps S1 to S5 due to the power-on-start have been completed, the disk apparatus enters a ready state and waits for the command from the upper disk control unit in step S6.

In step S6, when a command in association with the execution of the input/output commands in the upper disk control unit is received, the command is decoded in step S7. In case of a normal input/output request, since a seek command is first received, the seeking operation is executed in step S8 and the head is sought to the target cylinder, thereby setting the head into the on-track state. When the seeking operation is completed, in step S9, the reading or writing operation in response to the reading or writing command obtained subsequently is executed. In the case where the existence of an error is judged in step S10 by the completion of the reading or writing operation, the processing routine is returned to step S9 and the reading or writing operation is retried. When there is no error, a status response indicative of a normal end is returned to the upper disk control unit in step S11 and the process is finished. The processing routine is again returned to step S6. On the other hand, when the apparatus waits for a command in step S6, the disk apparatus is in an idle state. In case of the idle state, the processing routine advances to step S12 and a check is made to see if a predetermined measuring process can be executed. When a state in which no command is received continues and it is judged that the measurement can be performed, step S13 follows and a thermal offset measuring process by the thermal offset measuring section 94 is executed in the invention.

Position signal forming circuit

Figure 10:
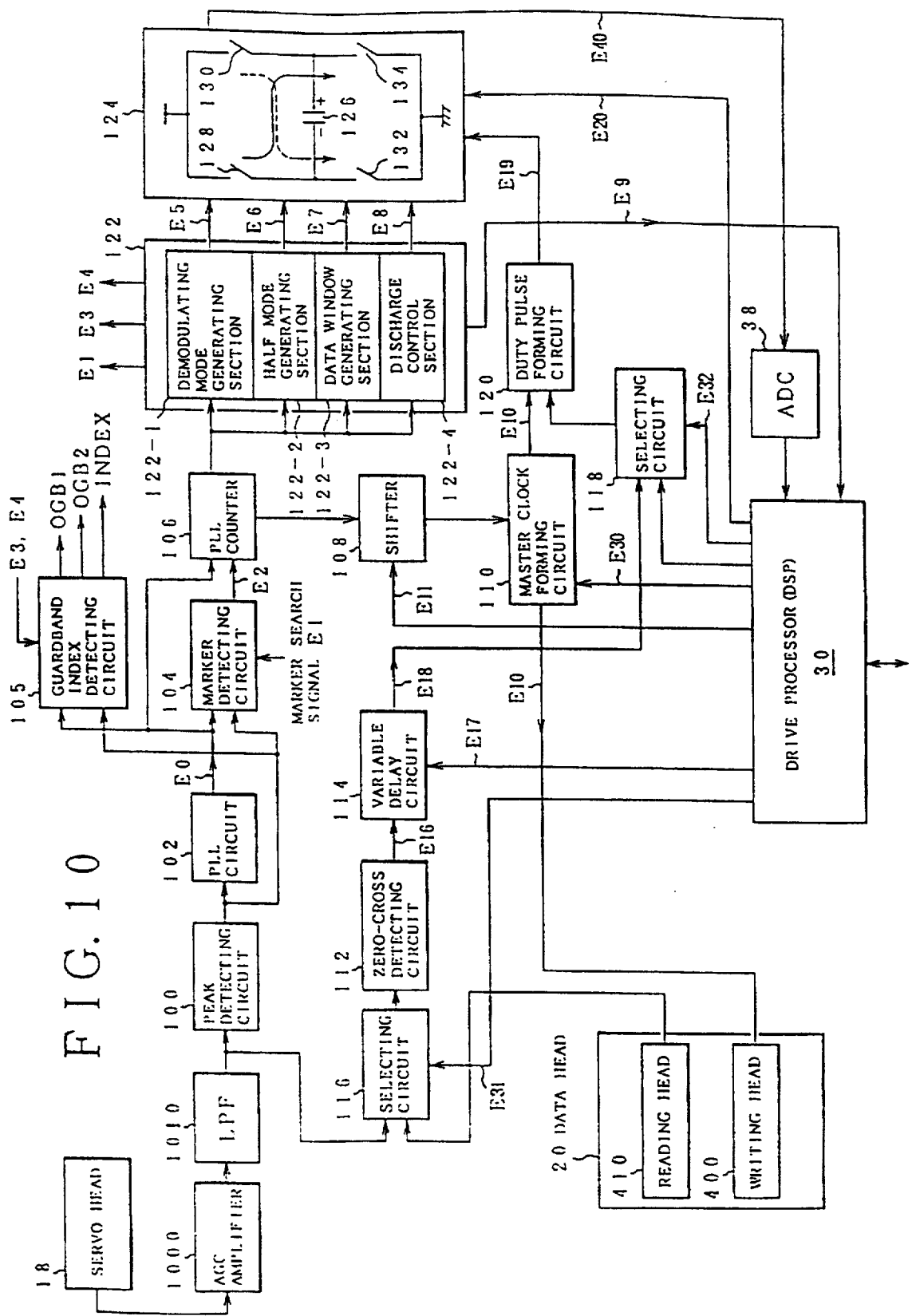
FIG. 10 is a block diagram of a position signal forming circuit in FIG. 4.
Figure 11A:
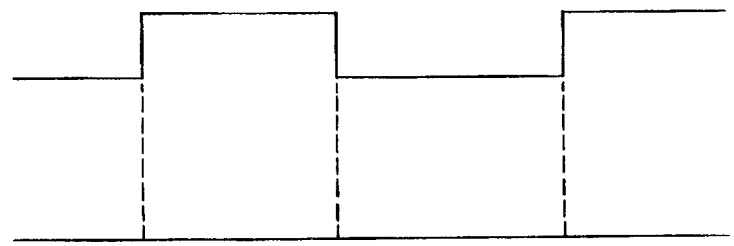
FIGS. 11A to 11D are explanatory diagrams of the magnetic recording of servo patterns.
Figure 11B:
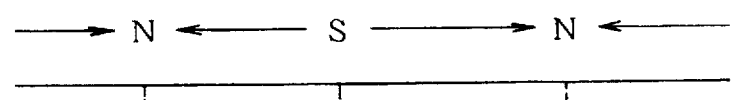

FIG. 10 shows the position signal forming circuit 36 provided for the drive controller 12 in FIG. 4. The read signal on the servo surface which was read out by the servo head 18 is amplified by an AGC amplifier 1000. A low pass filter (hereinafter, referred to as a LPF) 1010 performs a noise elimination and a waveform equalization with respect to the amplified read signal and supplies the processed signal into a peak detecting circuit 100, so that a peak detection pulse (read pulse) which detected the peak timing of the read waveform is generated. Magnetical recording and reading operations for the servo and data surfaces of the disk will now be described. FIG. 11A shows a write signal. In response to the leading edge of the write signal, a polarity of a medium of FIG. 11B is magnetized to the N polarity. In response to the trailing edge of the write signal, the polarity of the medium is magnetized to the S polarity. As for the read signal of FIG. 11C which read the magnetizing state of the medium, a positive read waveform is obtained in the magnetized portion of the N polarity of the medium and a negative read waveform is obtained in the magnetized portion of the S polarity. In the actual servo pattern, since an interval between the N and S polarities is very short, the shape of the read waveform becomes a continuous sine waveform. FIG. 11D is a diagram schematically expressing the magnetizing state of the medium of FIG. 11B. The magnetized portion of the N polarity is shown by a solid line 212 and the magnetized portion of the S polarity is shown by a broken line 214. The following track recording state of the phase servo pattern is expressed by the solid line 212 indicative of the N polarity magnetizing state and the broken line 214 indicative of the S polarity magnetizing state.

Figure 11C:
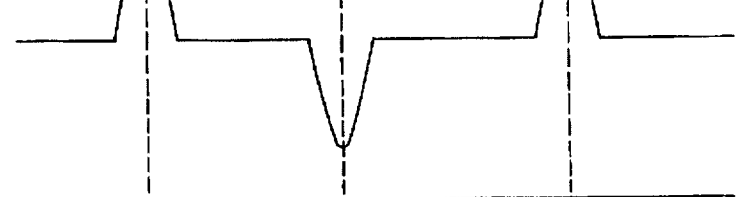
Figure 11D:
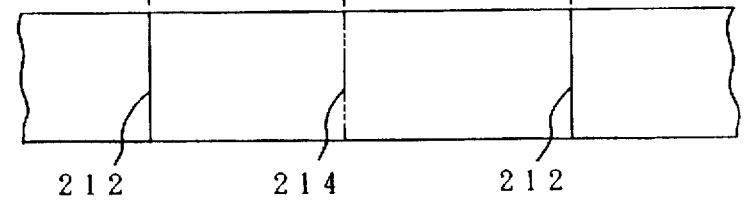

The peak detecting circuit 100 in FIG. 10 detects the peak timing of the read waveform of the read signal of FIG. 11C and generates the peak detection pulse which rises at the peak timing. Specifically speaking, the peak detecting circuit 100 forms the peak detection pulse on the basis of a gate signal and a differentiation pulse which are obtained by slicing the read waveform by a predetermined level.

Figure 12:
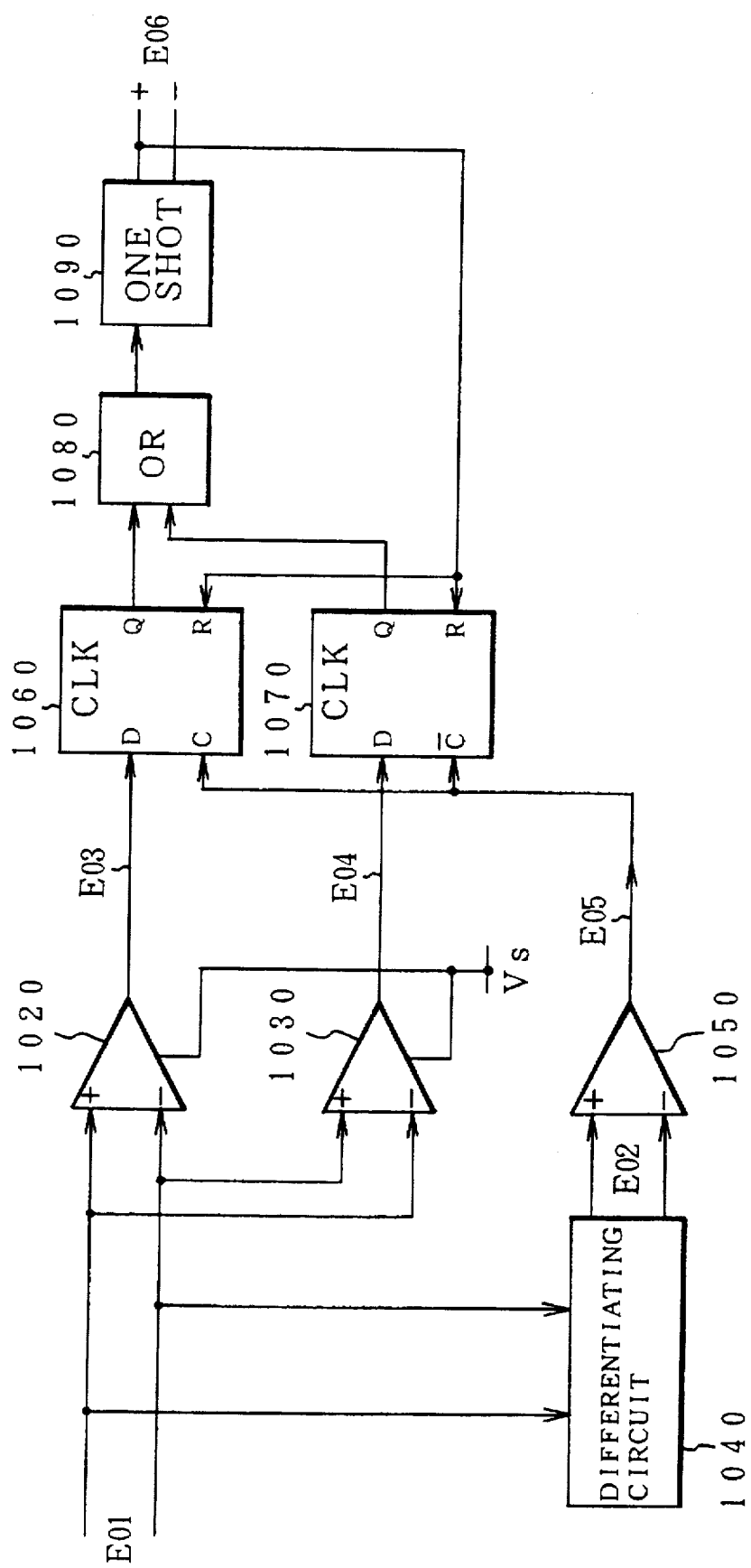
FIG. 12 is a circuit block diagram of a peak detecting circuit in FIG. 10.

FIG. 12 shows an embodiment of the peak detecting circuit 100. Operational amplifiers 1020 and 1030 construct a slicing circuit. A read signal E01 which was amplified by the AGC amplifier 1000 in FIG. 10 and whose noises were eliminated by the LPF 1010 is supplied to the operational amplifiers 1020 and 1030. A fixed slice voltage Vs is set into the operational amplifiers 1020 and 1030. The operational amplifier 1020 which performs a non-inversion amplification sets the slice voltage Vs to the plus side on the basis of 0 V serving as a middle-point voltage as a reference and generates a slice signal E03 obtained by slicing the amplitude portion on the plus side of the input read signal E01 by the slice voltage Vs. On the contrary, the operational amplifier 1030 which performs an inversion amplification sets the slice voltage to −Vs on the basis of 0 V serving as a middle-point as a reference and generates a slice signal E04 obtained by slicing the read waveform on the minus side of the input read signal E0 by the slice voltage −Vs. On the other hand, the read signal E01 is differentiated by a differentiating circuit 1040 and is supplied to a zero-cross detecting circuit 1050. Since the differentiation waveform which is obtained by differentiating the read signal E01 has a zero-cross point in the peak portion of the read signal E01, such a zero-cross point is detected by the zero-cross detecting circuit 1050. A zero-cross detection signal E05 is set to the signal which detected the peak timing of the read signal E01. The slice signal E03 is supplied to a D terminal of a D-FF (D-type flip-flop) 1060 and the slice signal E04 is similarly supplied to a D terminal of a D-FF 1070. In this instance, a clock terminal C of the D-FF 1070 is an inversion input terminal. The zero-cross detection signal E05 is given to the clock terminal of each of the D-FFs 1060 and 1070. Each of the slice signals E03 and E04 functions as a gate signal. After the slice signal E03 rose to the logical level 1, when the zero-cross detection signal E05 similarly rises to the logical level 1, the setting operation of the D-FF 1060 is performed, so that a Q output is set to the logical level 1. On the other hand, after the slice signal E04 rose to the logical level 1, when the zero-cross detection signal E05 falls to the logical level 0, the setting operation of the D-FF 1070 is performed, so that the Q output is set to the logical level 1. An OR circuit 1080 triggers a one-shot multivibrator 1090 by getting the OR of the Q outputs of the D-FFs 1060 and 1070, thereby generating a peak detection signal E06 having a predetermined pulse width. The peak detection signal E04 is returned to a reset terminal R of each of the D-Ffs 1060 and 1070 and is reset for the next peak detection.

The operation of the peak detecting circuit will now be described. The read signal from the servo head causes a distortion of the waveform in FIG. 13A. However, by passing through the filter 1010 in FIG. 10, the read signal is set to a filter output signal E01 in FIG. 13B and the signal is supplied to the peak detecting circuit. For the filter output signal E01, the slice voltages +Vs and −Vs are set in the operational amplifiers 1020 and 1030. Due to this, the operational amplifier 1020 generates the slice signal E03 of FIG. 13D as a gate signal. The operational amplifier 1030 similarly generates the slice signal E04 of FIG. 13E as a gate signal. On the other hand, a differentiation signal E02 from the differentiating circuit 1040 has a zero-cross point at the peak timing of the read signal of FIG. 13C. The differentiation signal E02 is supplied to the zero-cross detecting circuit 1050, thereby generating the zero-cross detection signal E05 synchronized with the zero-cross point of FIG. 13F.

When seeing from the middle-point voltage of 0 V, it is possible to regard that the zero-cross detecting circuit 1050 inputs the differentiation signal E02 of FIG. 13C to a plus input terminal and inputs a signal which is obtained by inverting the differentiation signal E02 to a minus input terminal. As a comparison output of the input signals of the plus and minus inputs, the zero-cross detection signal E05 of FIG. 13F which was raised to the logical level 1 in the positive half cycle of the differentiation signal E02 is generated.

When the zero-cross detection signal E05 rises to the logical level 1 in a state in which the slice signal E03 is set to the logical level 1, the Q output of the D-FF 1060 is set to the logical level 1 and one peak detection pulse E06 show in FIG. 13G is generated from the one-shot multivibrator 1090 via the OR circuit 1080. Subsequently, after the slice signal E04 was raised to the logical level 1, when the zero-cross detection signal E05 falls to the logical level 0 at the next zero-cross detection, the setting operation of the D-FF 1070 is executed, the Q output is set to the logical level 1, and the one-shot multivibrator 1090 is triggered via the OR circuit 1080, thereby generating the next peak detection pulse E06.

The output of the peak detection circuit 100 is given to a PLL circuit 102 and a marker detecting circuit 104. The PLL circuit 102 generates a reference clock synchronously with the peak detection pulse based on the reading of the timing signal recorded in a training region at the head position of the servo frame, which will be apparent by an explanation hereinlater. As an oscillating frequency of the PLL circuit 102, 20 MHz is used in the embodiment. Therefore, one clock period τ is equal to 50 nsec. The marker detecting circuit 104 detects a marker signal of a marker region subsequent to the training region of the servo frame.

A guard band index detecting circuit 105 detects a guard band signal or an index signal of a guard band index region subsequent to the marker region. The marker detecting circuit 104 is set to the operable state by receiving a marker search signal E1. On the other hand, the guard band index detecting circuit 105 is also set to the guard band detecting state by receiving a guard band search signal E3 and is set to the index detecting state by receiving an index search signal E4.

The marker detecting circuit 104 generates a marker detection signal E2. On the other hand, the guard band index detecting circuit 105 generates a first outer guard band detection signal OGB1, a second outer guard band detection signal OGB2, and an index signal INDEX.

A PLL counter 106 counts the number of clocks of the PLL circuit 102 from the time point when the marker detection signal E2 from the marker detecting circuit 104 is obtained. Therefore, as a value of the PLL counter 106, a count value indicative of information recording positions in the guard band index section and the servo pattern section subsequent to the time point of the marker detection as a start point is provided.

Figure 14A:
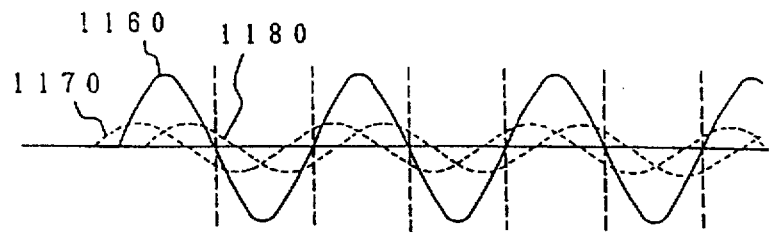
FIGS. 14A to 14C are timing charts showing a problem at the time of the peak detection of a phase servo read signal.
Figure 14B:
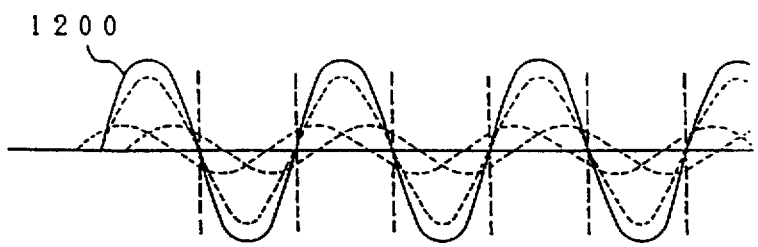
Figure 14C:
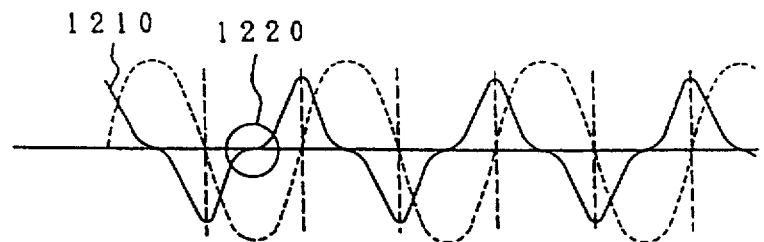

On the other hand, the output of the servo head 18 is given to a zero-cross detecting circuit 112 which functions as a part of the read pulse detecting section through a selecting circuit 116. According to the invention, with respect to the read signal of the phase servo provided at the end of the servo frame, the zero-cross detection is performed instead of the peak detection. This is because there is a problem such that the peak detection of the read signal of the phase servo information is weak against the noises and a jitter occurs easily. The reason will now be further described in detail. The phase servo information recorded on the servo surface is the pattern having a phase deviation of, for example, 0.5 cylinder. The read signal by the servo head is influenced by the adjacent servo zone, so that the signal amplitude decreases or the peak portion becomes dull. FIG. 14A shows a read signal 1160 of the phase servo pattern in a target cylinder, a pattern read signal 1170 of the adjacent cylinder which is deviated by +0.5 cylinder, and a pattern read signal 1180 of the adjacent cylinder which is deviated by −0.5 cylinder. The read signal which is actually obtained from the servo head is a read signal 1200 of FIG. 14B obtained by synthesizing those three signals. Therefore, the read signal 1200 is differentiated as shown in FIG. 14C, thereby detecting the peak from the zero-cross point of a differentiation signal 1210. As a waveform portion 1220 is enlargedly shown in FIG. 14D, however, a waveform distortion such that an inclination of the waveform becomes dull occurs at a zero-cross point 1230, so that it becomes a cause of the phase jitter. As a result, there is a problem such that a position deciding precision of the head is deteriorated. According to the invention, with respect to the phase servo read signal, the zero-cross detection is performed instead of the peak detection, so that the read signal of the phase servo can be certainly detected even if the noises are mingled.

Figure 15:
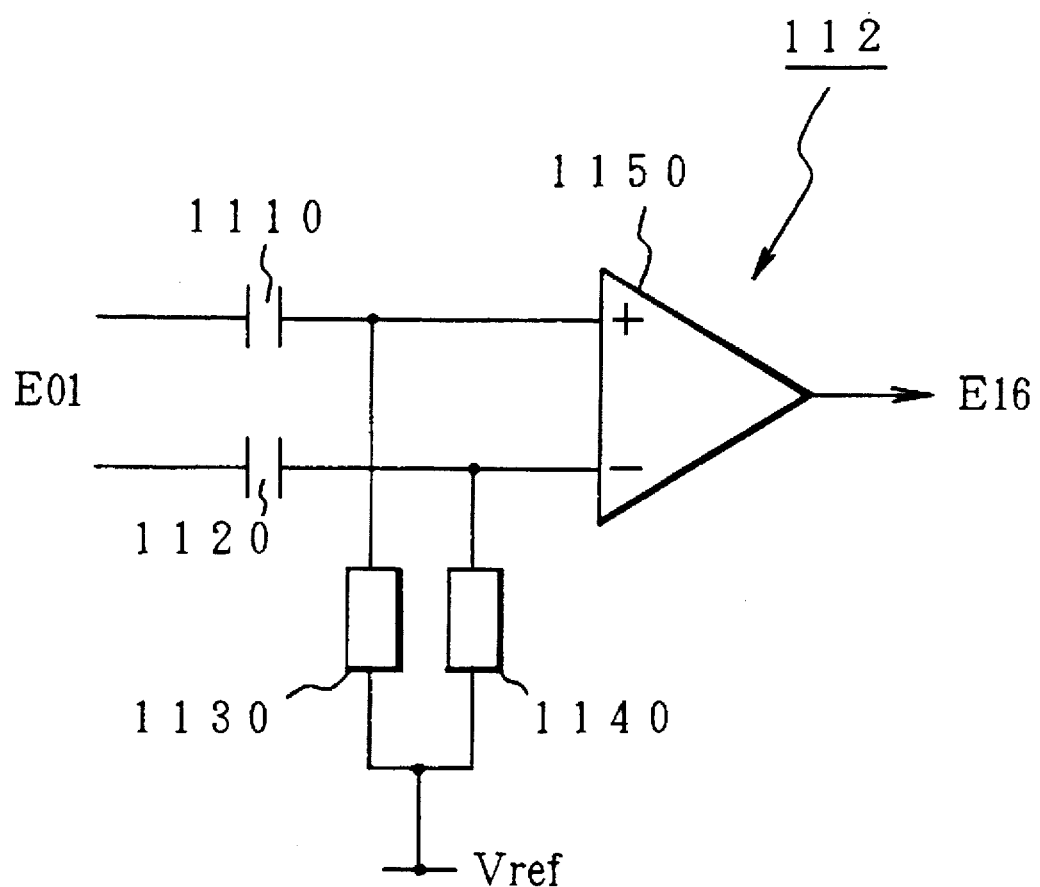
FIG. 15 a circuit block diagram of a zero-cross detecting circuit in FIG. 10.

FIG. 15 shows an embodiment of the zero-cross detecting circuit 112. The zero-cross detecting circuit 112 has an operational amplifier 1150 and receives the read signal E01 from the LPF 1010 at the front stage at a non-inversion input terminal (plus input terminal) and an inversion input terminal (minus input terminal) of the operational amplifier 1150 through capacitors 1110 and 1120, respectively, by the AC coupling. A predetermined reference voltage Vref is applied as a bias voltage to an input of the operational amplifier 1150 subsequent to the capacitors 1110 and 1120 through resistors 1130 and 1140.

The operation of the zero-cross detecting circuit 112 will now be described. A read signal of FIG. 16A is a signal before passing through the LPF 1010 and has a waveform distortion such that the zero-cross point becomes dull. When the read signal passes through the LPF 1010, the rising speed of the zero-cross point can be raised as shown in FIG. 16B. The read signal E01 is supplied as a differential signal of two signal lines. When the read signal E01 supplied to the operational amplifier 1150 by the AC coupling of the capacitors 1110 and 1120 is seen on the basis of the middle-point voltage which was set by the reference voltage Vref as a reference, the read signal E01 on the non-inversion input terminal (plus) side has a signal waveform of FIG. 16B. On the contrary, the read signal E01 on the inversion input terminal (minus) side becomes an inversion input signal of FIG. 16C. Due to this, the operational amplifier 1150 operates as a comparator for comparing the non-inversion input signal and the inversion input signal which is obtained by inverting the non-inversion input signal. Therefore, for a period of time of the half cycle in which the non-inversion input signal is higher than the inversion input signal, a zero-cross detection pulse E16 which is set to the logical level 1 in FIG. 16D is generated. The zero-cross detecting circuit in FIG. 15 is the same as the zero-cross detecting circuit 1050 used in the peak detecting circuit in FIG. 12.

In the zero-cross detection for the read signal of the phase servo information, the zero-cross timing between the positive read waveform of the N polarity and the negative read waveform of the S polarity in the read signal of FIG. 11C is detected. Therefore, in the peak detection of the read waveform, detection timing of the zero-cross detection inevitably has a phase delay for the detection timing of the peak detection of the read waveform. Namely, with respect to the reference clock by the PLL circuit 102, the synchronizing control by the peak detection is performed and the read pulse based on the reading of the phase servo inherently needs to be synthesized with the clock of the PLL circuit 102. However, by setting to the zero-cross point, a phase delay inevitably occurs for the reference clock.

The phase delay by the zero-cross detection is adjusted by a variable delay circuit 114 and a shifter 108, thereby making it possible to form a duty pulse having a 50% duty ratio such that the integration voltage is equal to 0 in the on-track state. In this instance, the shifter 108 digitally delays and adjusts the leading edge of the pulse signal which is obtained by dividing a frequency of the reference clock of the PLL circuit 102 which is obtained as a second bit output of the PLL counter 106 into ¼ in a range of three stages from 0τ to 3τ. On the contrary, the variable delay circuit 114 delays the leading timing of the zero-cross detecting circuit 112 in an analog manner by the selective connection of a plurality of analog delay elements. The delay adjustment by the shifter 108 and the variable delay circuit 114 will be explained hereinlater in detail.

A master clock forming circuit 110 forms a master clock of a period 4τ which is obtained by dividing the frequency of the reference clock having a phase which was determined in correspondence to the target cylinder into ¼ and generates as a master clock signal E10. The switching of the master clock having the phase corresponding to the target cylinder is executed by a cylinder switching signal E30 from the drive processor 30. In the on-track control, the master clock of the phase corresponding to the target cylinder on which the head is positioned at present is selected by the switching of the cylinder by the cylinder switching signal E30. On the other hand, at the time of the seek control, by adding the real speed which was obtained from the preceding and present head positions and, further, the acceleration, the master clock of the phase corresponding to the target cylinder at the next predictive position which was predicted is selected.

A duty pulse forming circuit 120 is a setting/resetting circuit and is set at the leading edge (reference phase) of the master clock signal E10 corresponding to the target cylinder from the master clock forming circuit 110 and is reset at the trailing edge (detection phase) of the zero-cross detection pulse which is obtained through a selecting circuit 118. The duty pulse forming circuit 120 generates a duty pulse E19 whose duty ratio is set to 50%, 50%, and 50% in the first field (EVEN1), second field (ODD1), third field (ODD2), and fourth field (EVEN2) of the phase servo pattern in the on-track state of the servo head 18.

The duty pulse E19 from the duty pulse forming circuit 120 is given to an integrating circuit 124. The integrating circuit 124 fundamentally comprises: a capacitor 126; and four switch elements 128, 130, 132, and 134 which are bridge coupled to the capacitor 126. The ON/OFF operations of the switch elements 132 and 134 on the lower side of the capacitor 126 are controlled by the duty pulse E19. On the other hand, the switching of the switch elements 128 and 130 on the upper side of the capacitor 126 is controlled in accordance with the first to fourth fields of the phase servo pattern.

In this instance, when the polarity of the position signal which is extracted from both ends of the capacitor 126 is set to plus on the right side and to minus on the left side as shown in the diagram, the integrating operation by the switching of the switch elements 128, 130, 132, and 134 in the first to fourth fields is performed in the following manner. First, in the first and fourth fields (EVEN1, EVEN2), when the switch element 128 on the upper side of the capacitor 126 is turned on and the switch element 130 is turned off. The switch element 130 is turned on or off by the duty pulse E19 in such a state. Due to this, the capacitor 126 is charged through a path shown by a solid line, thereby increasing the position signal when it is seen as a voltage across the capacitor 126 to the minus side. On the other hand, in the second and third fields (ODD1, ODD2), when the switch element 130 on the upper side of the capacitor 126 is turned on and the switch element 128 is turned off, the switch element 132 is turned on or off by the duty pulse E19 in such a state. Therefore, the capacitor 126 is charged through a path shown by a broken line, thereby increasing the position signal when it is seen as a polarity shown in the diagram to the plus side.

The duty pulse E19 which is formed in the on-track state of the target cylinder has a duty ratio 50% in all of the fields and has the same number of pulses in each field. Therefore, at the time point when the integrating operation of the duty pulses of four fields is finished, the integration voltage of the capacitor 126 is set to 0. When the servo head is deviated from the on-track state in which the head is located on the target cylinder, the duty ratio is deviated from 50%, so that the voltage according to the change of the duty ratio is derived in the capacitor 126.

Specifically speaking, when the servo head 18 is moved to the minus direction, namely, the outer side for the target cylinder, the duty ratios of the first and fourth fields (EVEN1, EVEN2) decrease and the duty ratios of the second and third fields (ODD1, ODD2) contrarily increase. On the other hand, when the servo head 18 is moved to the plus direction, namely, the inner side for the target cylinder, the duty ratios of the first and fourth fields (EVEN1, EVEN2) increase and the duty ratios of the second and third fields (ODD1, ODD2) decrease.

The switching control of every field of the switch elements 128 and 130 on the upper side of the capacitor 126 in the integrating circuit 124 is performed by output signals E5, E6, E7, and E8 from a coincidence detecting circuit 122. The coincidence detecting circuit 122 judges the coincidence between a count value of the PLL counter 106 and a predetermined value and generates a signal corresponding to each coincident position. That is, in addition to the search signals E1, E3, and E4 for the marker detecting circuit 104 and guard band index detecting circuit 105, the coincidence detecting circuit 122 generates the demodulation mode signal E5 indicative of the first to fourth fields by a demodulating mode generating section 122-1. The half mode signal E6 indicative of the position signal detection time point serving as a boundary of the second and third fields is generated by a half mode generating section 122-2. The data window signal E7 which validates the duty pulse for the integrating circuit 124 in the period of the first to fourth fields is generated by a data window generating section 122-3.

Further, the discharge control signal E8 which discharges and resets the capacitor 126 is generated at a timing other than the duty pulse generating period of time over the first to fourth fields by a discharge control section 122-4. In the discharge resetting by the discharge control signal E8, the switch elements 128 and 130 provided for the integrating circuit 124 are turned off and the switch elements 132 and 134 are turned on.

A position signal E40 obtained as a voltage across the capacitor 126 of the integrating circuit 124 is fetched into the drive processor 30 by an interruption signal E9 which is obtained at the end timing of the servo frame by the A/D converter 38.

On the other hand, according to the invention, the phase servo pattern is written into the inner guard band region (IGB1) and the outer guard band region (OGB1) on the data surface. To enable the head position to be detected by the phase servo pattern on the data surface, a read signal of a reading head 410 provided for the data head 20 is supplied to the zero-cross detecting circuit 112 through the selecting circuit 116. The selecting circuit 116 is switched by a control signal E31 from the drive processor 30. That is, in the ordinary servo control, the selecting circuit 116 is switched to the servo head 18 side. On the contrary, when the phase servo pattern on the data surface is read out, the selecting circuit 116 is switched to the data head 20 side on a unit basis of a predetermined number of servo frames in one rotation of the cylinder. Namely, the phase servo information on the data surface is read out while discretely switching to the data head 20 for the on-track control by the phase servo information on the servo surface, thereby performing, for example, the thermal offset measurement or the yaw angle offset measurement.

Further, according to the invention, after the phase servo information was written on the servo surface by the servo writer, the disk apparatus has a function to write the phase servo pattern onto the data surface by itself. Due to this, the write signal for writing is formed by the master clock forming circuit 110 and is supplied to a writing head 400 of the data head 20, thereby writing the servo information onto the data surface.

Further, in order to obtain the position signal by the integrating circuit 124 by falsely forming a duty pulse having an arbitrary duty ratio by the duty pulse forming circuit 120, the selecting circuit 118 is provided. The selecting circuit 118 switches a pseudo read pulse from the drive processor 30 and the zero-cross detection pulse which is obtained by the zero-cross detecting circuit 112 by a control signal E32. The formation of the duty pulse by the generation of the pseudo read pulse by the drive processor 30 is used for the measurement of the duty ratio of the actual duty pulse which is used for the adjustment of the duty 50% which is performed by the shifter 108 and the variable delay circuit 114.

Servo frame

Figure 17:
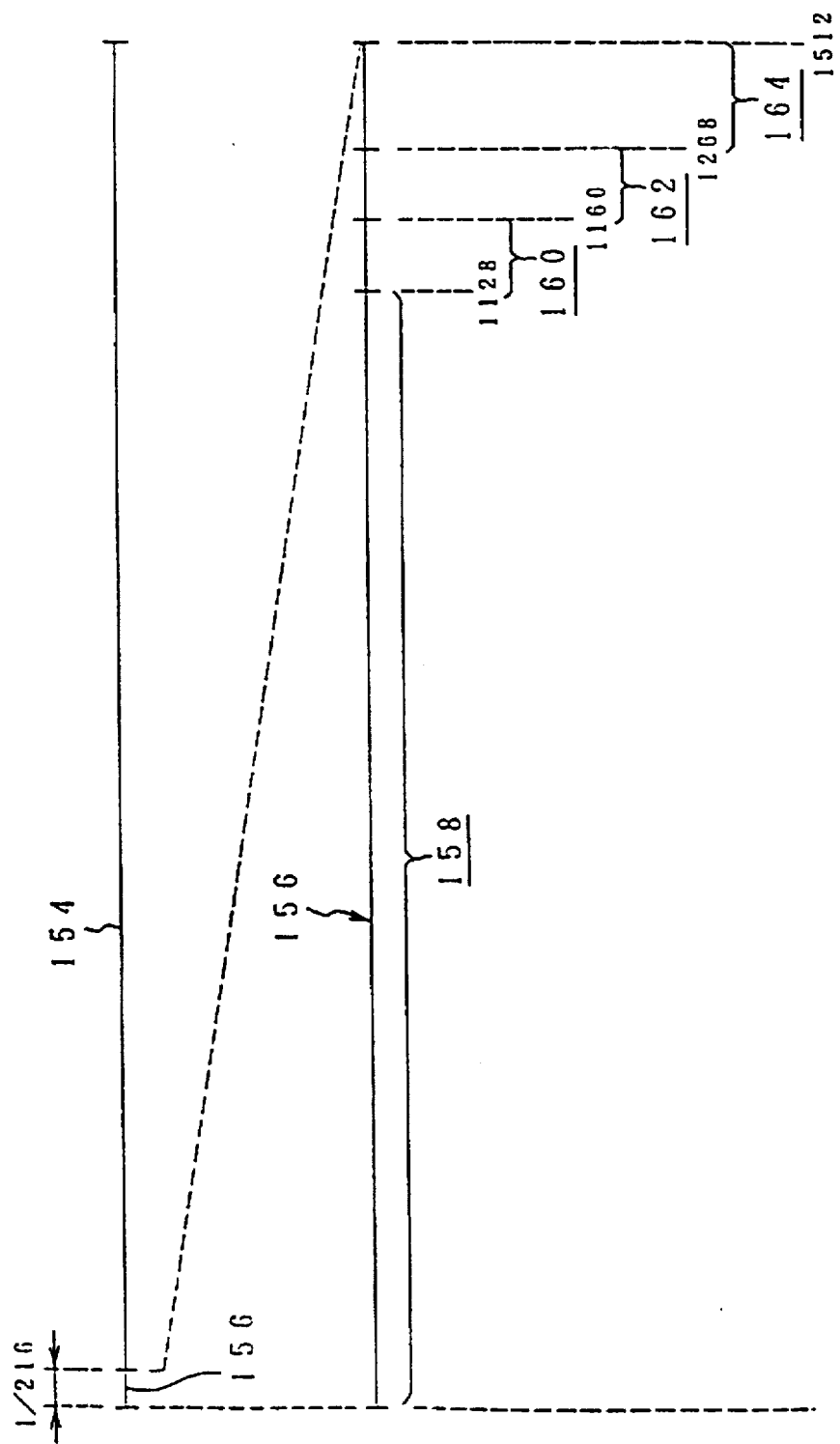
FIG. 17 is an explanatory diagram of a servo frame of the invention recorded on a servo surface.

In FIG. 17, the servo information of one cylinder recorded on the servo surface of the disk apparatus of the invention is developed on a straight line. A servo region 154 of one rotation of the disk is divided into, for example, 216 sections, thereby forming 216 servo frames 156. In this instance, the number of clocks in the servo region 154 of one rotation of the disk is fixedly determined. One servo frame 156 comprises a training section 158, a marker section 160, a guard band index section 162, and a servo pattern section 164 as enlargedly shown. Assuming that the start position of the servo frames 156 is set to 0, as shown by the count values of the reference clocks of 20 MHz, each region has the following count value. The training section 158 has the count value of 0 to 1128. The marker section 160 has the count value of 1128 to 1160. The guard band index section 162 has the count value of 1160 to 1268. The servo pattern section 164 has the count value of 1268 to 1512.

FIGS. 18A, 18B, 19, 20, and 21 show magnetic recording states of the training section 158, marker section 160, guard band index section 162, and servo pattern section 164 which are provided for the servo frames 156. In this instance, with respect to each of the training section 158 in FIG. 18A, marker section 160 in FIG. 18B, and the guard band index section 162 in FIG. 19, a reference clock 166 is shown by a scale of 4τ as a four-clock period. On the other hand, as for the servo pattern sections 164 in FIGS. 20 and 21, the reference clock 166 is shown by a scale of 1τ as a one-clock period.

Figure 18A:
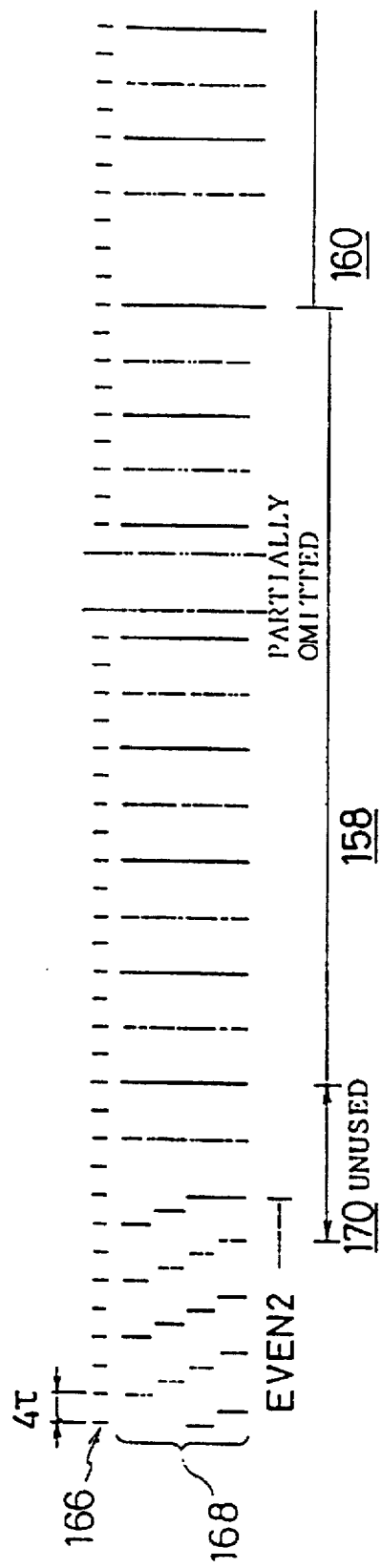
FIGS. 18A and 18B are explanatory diagrams of magnet recording patterns in a training section and a marker section in FIG. 17.

In the training section 158 in FIG. 18A, a timing signal for synchronizing the phase of the PLL circuit 102 in FIG. 10 is recorded. The timing signal of the training section 158 is read out and the peak detection pulse is obtained by 4τ, so that the PLL circuit 102 performs a synchronous oscillation of 1τ=50 nsec, namely, 20 MHz, which is synchronized with the actual disk rotation.

Figure 18B:
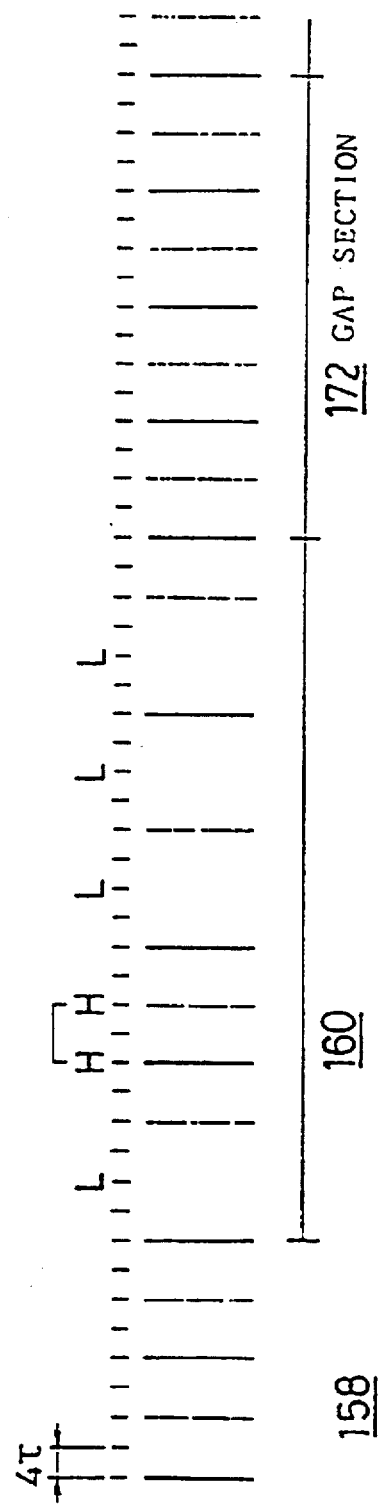

FIG. 18B shows the marker section 160 subsequent to the training section 158. The marker section 160 performs a role to decide the position in the servo frame and starts the counting operation of the PLL counter 106 provided in the marker detection in FIG. 10, thereby performing various kinds of coincidence judgments by the coincidence detecting circuit 122. Although the read signals of "LHH-HHLHLHLH" are obtained from the marker section 160. By the coincidence detection of a 6-bit pattern such as "L□HH□L□L□L□" among those read signals as shown in the diagram, the marker detection is executed.

Figure 19:
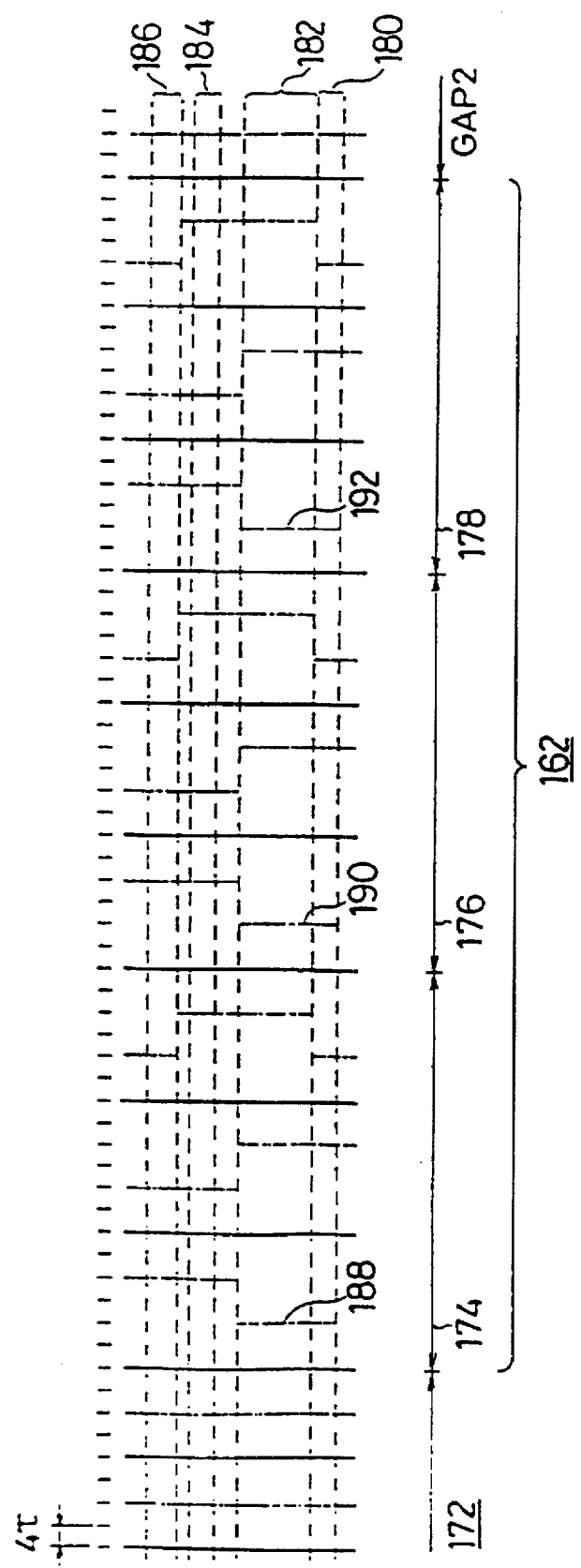
FIG. 19 is an explanatory diagram of magnetic recording patterns in a guard band index section in FIG. 17.

FIG. 19 shows the guard band index section 162. According to the invention, the guard band index section 162 is divided into three regions of a first majority deciding section 174, a second majority deciding section 176, and a third majority deciding section 178. In each region, the same signal is repetitively recorded. When two or more coincidence information are obtained from the three first to third majority deciding sections 174, 176, and 178 obtained from the read signal of the guard band index section 162, the guard band index detecting circuit 105 in FIG. 10 judges the guard band and index detection and raises the detecting performances of the guard band and index. The servo surface is divided into an inner guard band region (IGB1) 180, a user region 182, a first outer guard band region (OGB1) 184, and a second outer guard band region (OGB2) 186 from the inner side in the radial direction. Index information 188, 190, 192 are recorded in the inner guard band region 180, user region 182, and first and second outer guard band regions 184 and 186.

Figure 20:
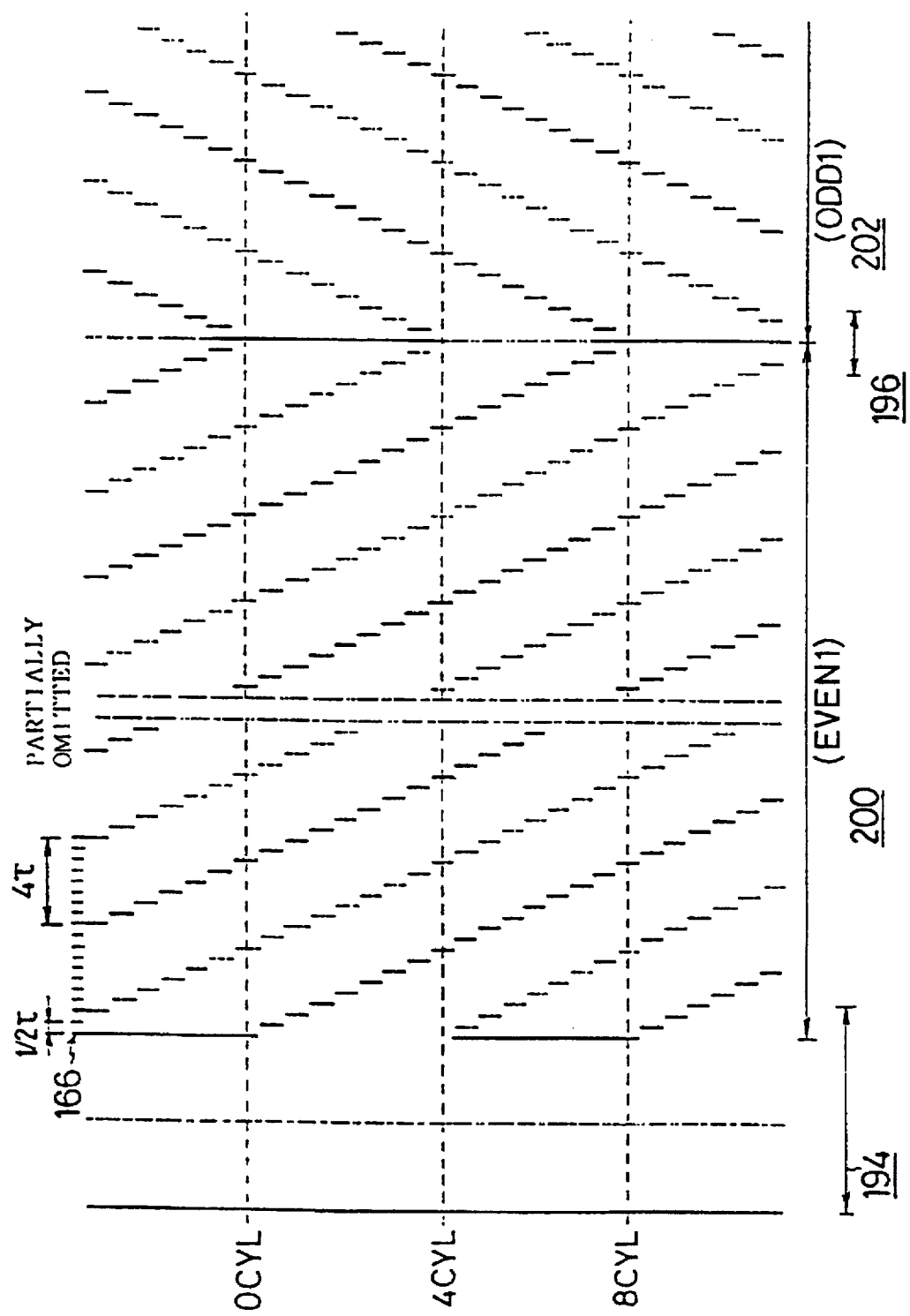
FIG. 20 is an explanatory diagram of magnetic recording patterns in the former half two fields of a servo pattern section in FIG. 17.
Figure 21:
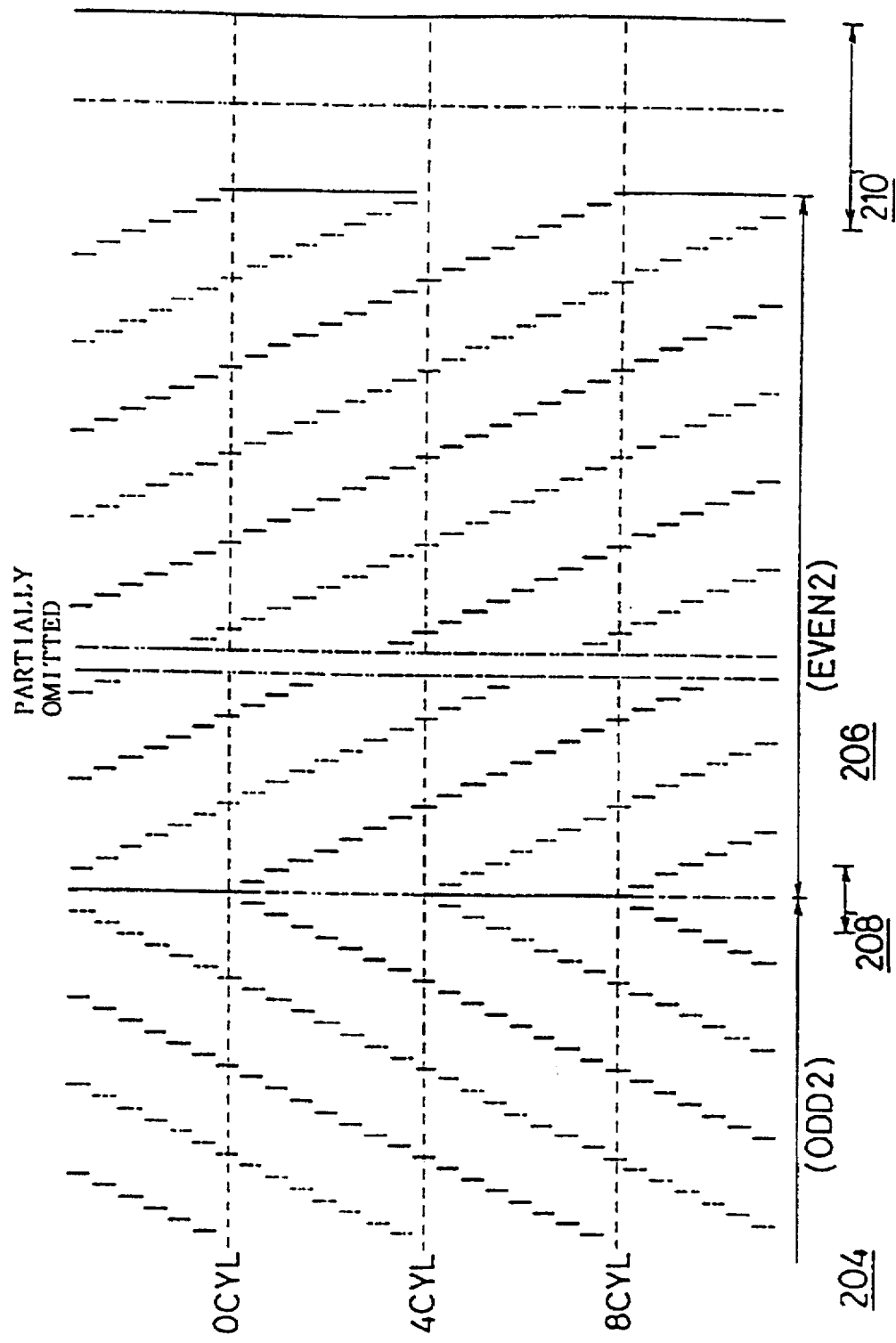
FIG. 21 is an explanatory diagram of magnetic recording patterns in the latter half two fields in the servo pattern section in FIG. 17.

FIGS. 20 and 21 show the details of the servo pattern section 164 in which the phase servo patterns were recorded. The servo pattern section 164 comprises a first field 200 and a second field 202 which are shown in FIG. 20 and a third field 204 and a fourth field 206 which are shown in FIG. 21. In the following diagrams, as shown in "( )", the first field 200 is set to (EVEN1), the second field 202 is set to (ODD1), the third field 204 is set to (ODD2), and the fourth field 206 is set to (EVEN2).

Each region of the first to fourth fields has the same length except unused sections 194, 196, 208, and 210. Specifically speaking, when 4τ of four periods of the reference clock is set to a reference length, each field has a length of (4τ×10). In each of the first and fourth fields 200 and 206 serving as (EVEN1) and (EVEN2), a pattern in which the phase is shifted by 1τ each time the head is moved by 0.5 cylinder in the increasing direction (inner direction) on the plus side of the cylinder number is written at a period of 8τ. On the other hand, with respect to the second and third fields 202 and 204 serving as (ODD1) and (ODD2), a pattern is written so that the phase is shifted in the opposite direction. Each phase servo pattern is repeated every 4 cylinders.

Writing of phase servo pattern

The writing of the phase servo patterns shown in FIGS. 20 and 21 is executed by using an exclusive-use servo writer. Since the disk apparatus of the invention has a function to write the phase servo pattern onto the data surface by itself after the phase servo pattern was written on the servo surface, the principle of writing of the phase servo pattern onto the servo surface will now be described as a prerequisite of the phase servo pattern onto the data surface.

Figure 22:
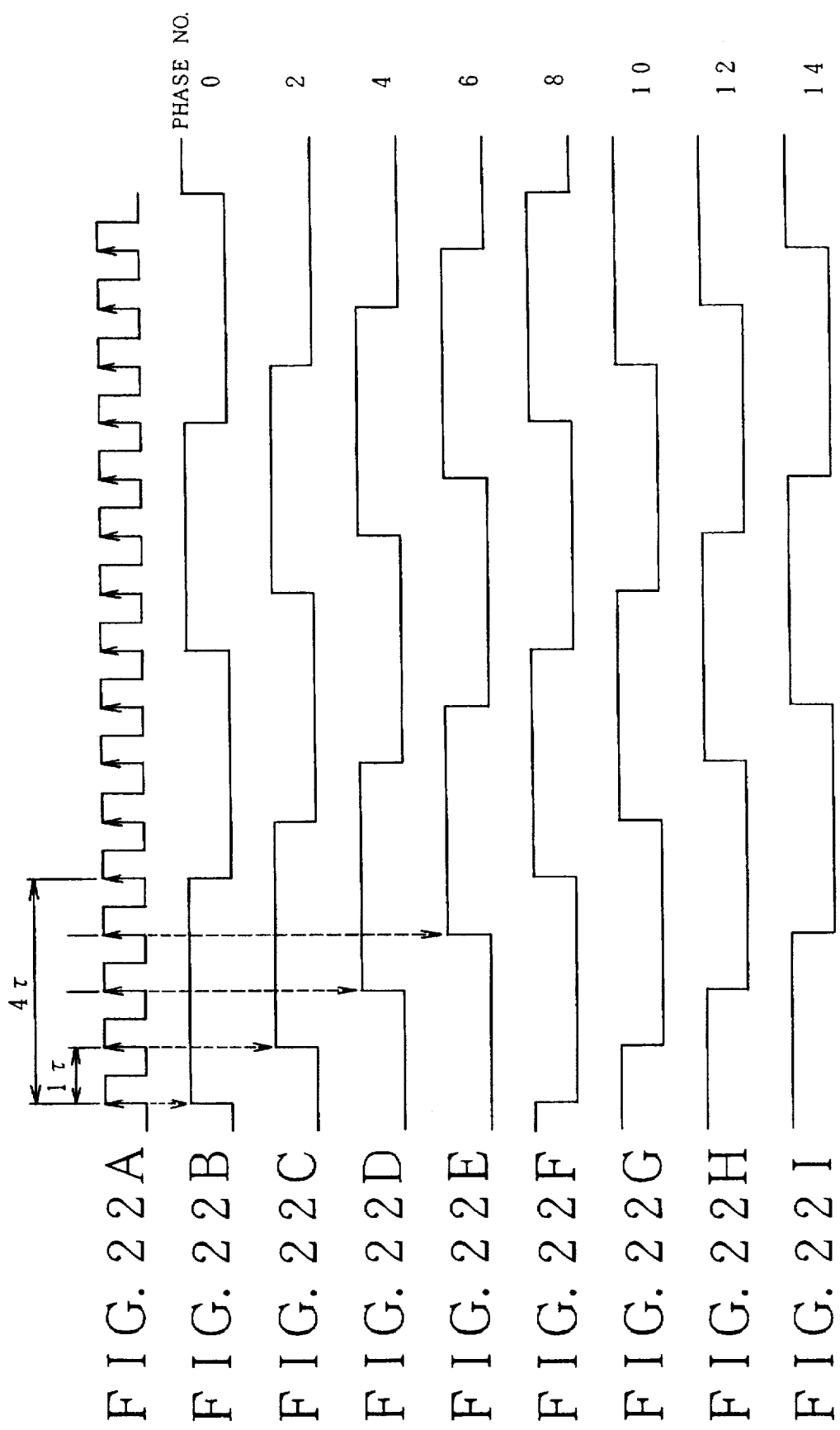
FIGS. 22A to 22I are timing charts showing eight kinds of write signals having even numbers which are used for writing servo patterns.

FIG. 22A shows a clock serving as a reference and the clock is the same as the clock by the PLL circuit 102 in FIG. 10. FIG. 22B shows a bit 2 output when the clock from the PLL circuit 102 is counted by the PLL counter 106 and the output is set to the pulse signal obtained by dividing the frequency of the PLL clock into ¼. The pulse signal is set to the write signal of the phase No. 0. FIGS. 22A to 22I show signals obtained by sequentially phase shifting the write signal of the phase No. 0 by a period of 1τ of the clock and the signals are set to write signals of the phase Nos. 2, 4, 6, 8, 10, 12, and 14. With respect to the writing of the servo pattern onto the servo surface, the combinations of the eight write signals having even phase Nos. of FIGS. 22B to 22I are used.

Figure 23:
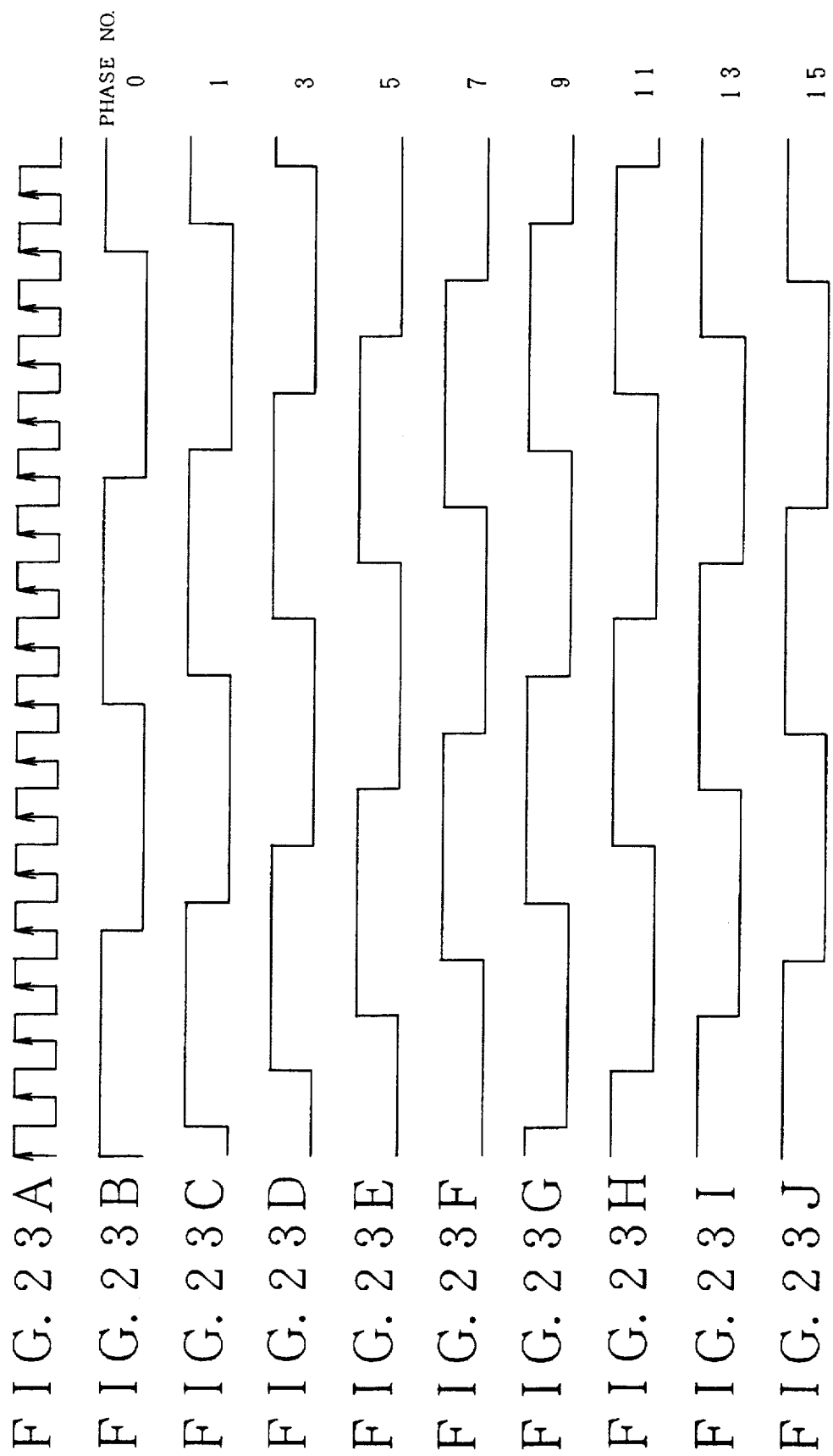
FIGS. 23A to 23J are timing charts showing eight kinds of write signals having odd numbers which are used for writing servo patterns.

FIGS. 23A to 23I show write signals having odd phase Nos. 1, 3, 5, 7, 9, 11, 13, and 15 which are further needed when the disk apparatus of the invention writes the phase servo pattern onto the data surface. Namely, the clock of FIG. 23A is a clock obtained by inverting the PLL clock of FIG. 22A and the trailing timing of the clock before the inversion is set to the leading timing. By using the inverted PLL clock of FIG. 23A and by executing the phase shift of the bit 2 output of the PLL counter 106 in FIG. 23B by 1τ at a time, the write signals having the odd phase numbers in FIGS. 23C to 23I can be obtained. In the following descriptions, as for the phase Nos. 10, 11, 12, 13, 14, and 15, they are shown by the hexadecimal numbers of A, B, C, D, E, and F.

Figure 24:
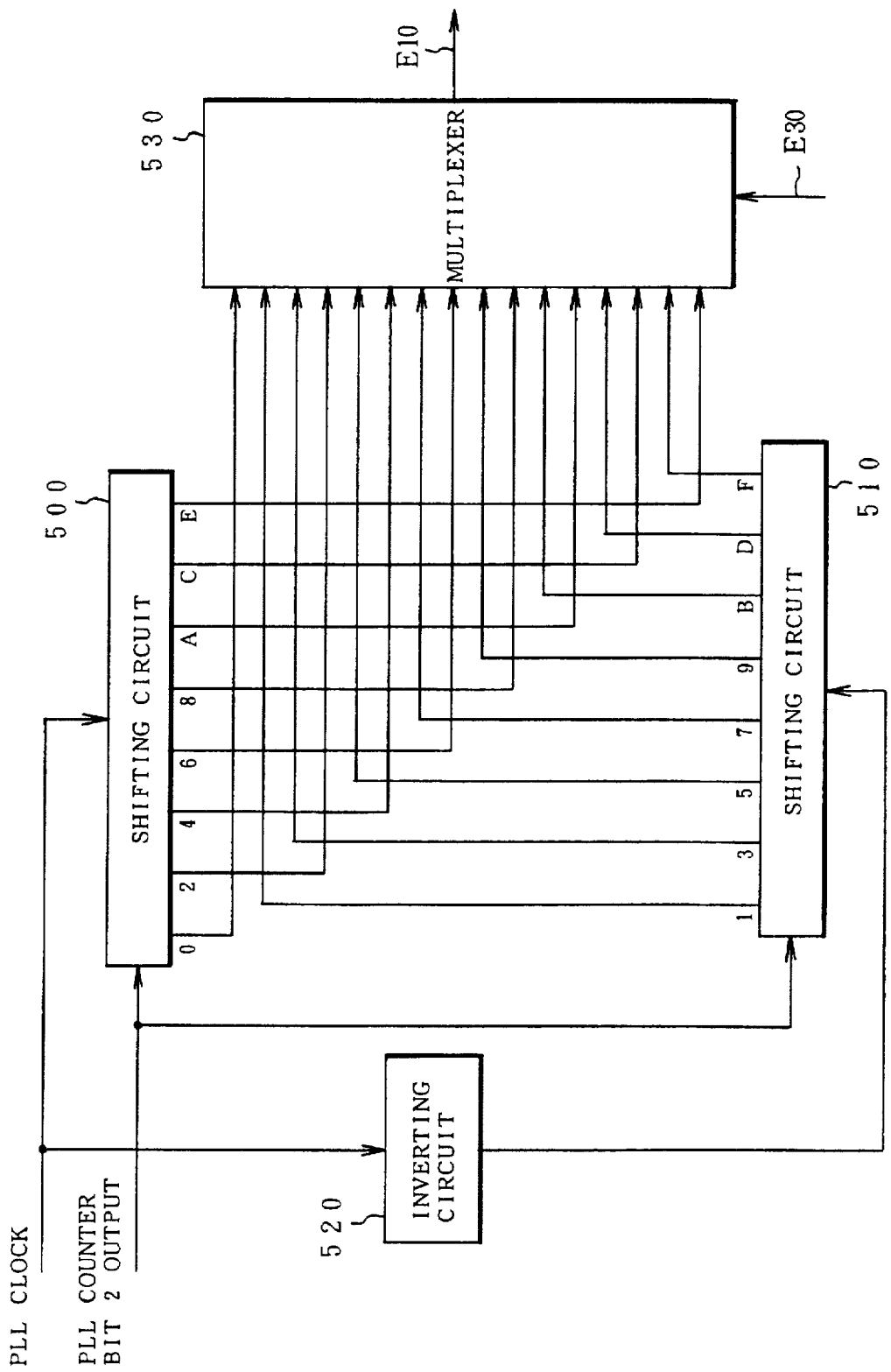
FIG. 24 is a circuit block diagram of a master clock forming circuit in FIG. 10.

FIG. 24 shows a circuit for forming the write signals of phase Nos. 0 to 16 in FIGS. 22A to 22I and FIGS. 23B to 23I. The circuit is realized as a master clock forming circuit 110 in FIG. 10. The PLL clock is supplied to a shifting circuit 500 as a shift pulse. On the other hand, the inversion PLL clock which is inverted by an inverting circuit 520 is supplied to a shifting circuit 510 as a shift clock. The bit 2 output of the PLL counter 106 is supplied to each of the shifting circuits 500 and 510. The shifting circuit 500 sequentially generates the eight kinds of write signals serving as phase Nos. 0, 2, 4, 6, 8, A, C, and E at every 1τ synchronously with the PLL clock. On the other hand, the shifting circuit 510 sequentially generates the write signals of the odd phase Nos. serving as phase Nos. 1, 13, 5, 7, 9, B, D, and F so as to have a delay of 0.5τ for the shifting circuit 500. A multiplexer (selecting circuit) 530 selects either one of the 16 kinds of write signals which are generated from the shifting circuits 500 and 510 so as to have a phase deviation of 0.5τ.

FIG. 25 shows the write signal phase numbers at the time when the phase servo patterns in FIGS. 22A to 22I and 23B to 23I are written while seeking the servo head by every 0.5 cylinder. According to the invention, the combinations of the write signals of the same phase number are repeatedly used on a unit basis of four cylinders. Although such a writing of the phase servo pattern onto the servo surface is not executed by the disk apparatus itself, the writing of the phase servo pattern onto the data surface is performed by the disk apparatus itself. That is, while reading out the written phase servo information by the servo head and locating, the disk apparatus itself can also write the phase servo pattern onto the data surface.

FIG. 26 shows the phase numbers for selecting the master clocks which are used for switching of the master clock corresponding to the target cylinder when reading the phase servo pattern written on the servo surface in accordance with FIG. 25. With respect to the writing of the phase servo pattern, it is performed on a unit basis of 0.5 cylinders. As for the master clock corresponding to the target cylinder, however, it is performed on a one-cylinder unit basis and it is repeated every four cylinders. Therefore, assuming that the cylinder numbers from the outer side to the inner side are set to 0 to 3, in correspondence to the cylinder Nos. 0 to 3 as target cylinders, the master clock according to the pattern of the corresponding phase number is formed by the master clock forming circuit 110. Specifically speaking, the circuit shown in FIG. 24 is provided for the master clock forming circuit 110, it is sufficient that the drive processor 30 allows the multiplexer 530 to switch and select the selection signal of the phase number corresponding to the cylinder number of the target cylinder every first and fourth fields in accordance with the patterns in FIG. 26. As mentioned above, when the position is detected by reading out the phase servo information of the servo surface, four kinds of combinations of the phase Nos. 0, 4, 8, and 12 among sixteen kinds of master clock signals in FIGS. 22A to and 23B to 23I are used.

Position detection by reading phase servo pattern

Figure 27:
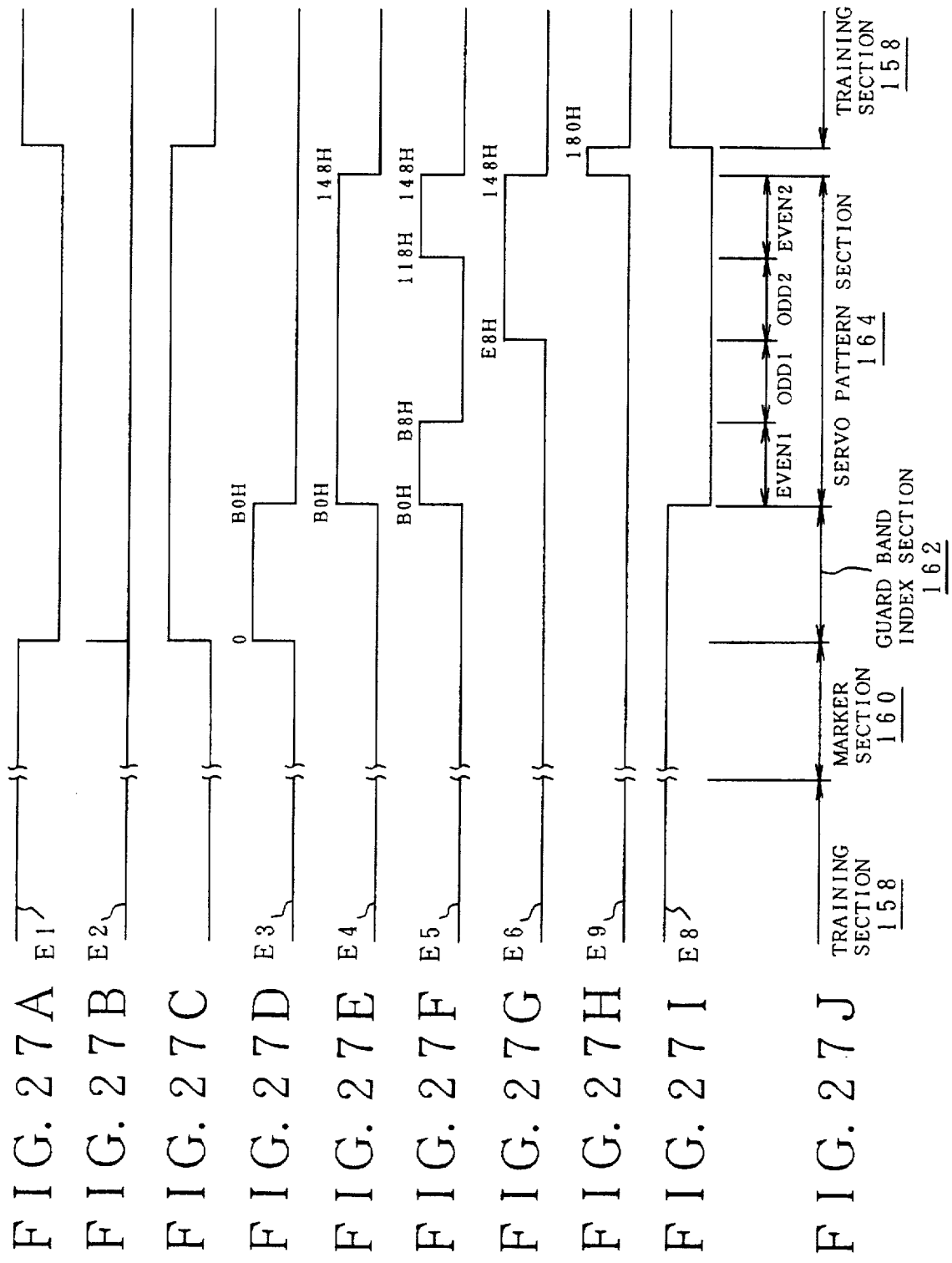
FIGS. 27A to 27J are timing charts for a judging state of a servo frame by a coincidence judging circuit in FIG. 10.

Each signal which is generated from the coincidence detecting circuit 122 in FIG. 10 at the time when the phase servo pattern of the servo surface is read out by the disk apparatus of the invention will now be described. When the synchronization of the PLL circuit 102 by the timing signal read out from the training region at the head position by the reading of the servo frame is completed, the marker detection signal E2 of FIG. 27B is generated from the marker detecting circuit 104 by detecting the marker region. By the marker detection signal E2, the PLL counter 106 is set to the operative state as shown in FIG. 27C, thereby starting the counting of the clock signal E0 from the PLL circuit 102. In this instance, a period of time from the marker detection till the reading of the position signal of the frame end is determined to 180 H by the hexadecimal count value of the PLL counter 106. Therefore, the counting operation is performed for the period of time until the hexadecimal count value of 180 H is obtained. The marker search signal E1 in FIG. 27A for making the detecting operation of the marker detecting circuit 104 effective is also generated for the same period.

Subsequently, the guard band index detection signal E3 of FIG. 27D is obtained for a period of time from 0 to B0 H as hexadecimal count values. The guard band index search signal E4 of FIG. 27E which is now effective rises, thereby prohibiting the detecting operation of the guard band index detecting circuit 105. The period from B0 H to 148 H as hexadecimal count values when the guard band index search signal E4 is at the H level is the reading period of the servo pattern section 164. For the reading period of the servo pattern section 164, the coincidence detecting circuit 122 generates the demodulation mode signal E5 of FIG. 27F which changes in the first field (EVEN1), second and third fields (ODD1, ODD2), and fourth field (EVEN2). Due to this, the integrating circuit 124 selectively turns on or off the switch elements 128 and 130 on the upper side of the capacitor 126 for each field period. The integrating circuit 124 also generates the half mode signal E6 which gives the position detection point as a middle point of the servo pattern section 164 in FIG. 27G.

The interruption signal E9 of FIG. 27H is generated for a period of time until the next training section 158 after completion of the servo pattern section 164. At such a timing, the drive processor 30 fetches the position signal which is determined by the voltage across the capacitor 126 of the integrating circuit 124 converted by the A/D convertor 38. Further, as shown in FIG. 27I, the discharge control signal E8 which is effective for the period of time other than the generating period of the servo pattern section 164 and the interruption signal E9 is generated, thereby setting the capacitor 126 of the integrating circuit 124 into the discharge resetting state, namely, the zero-voltage state.

Figure 28:
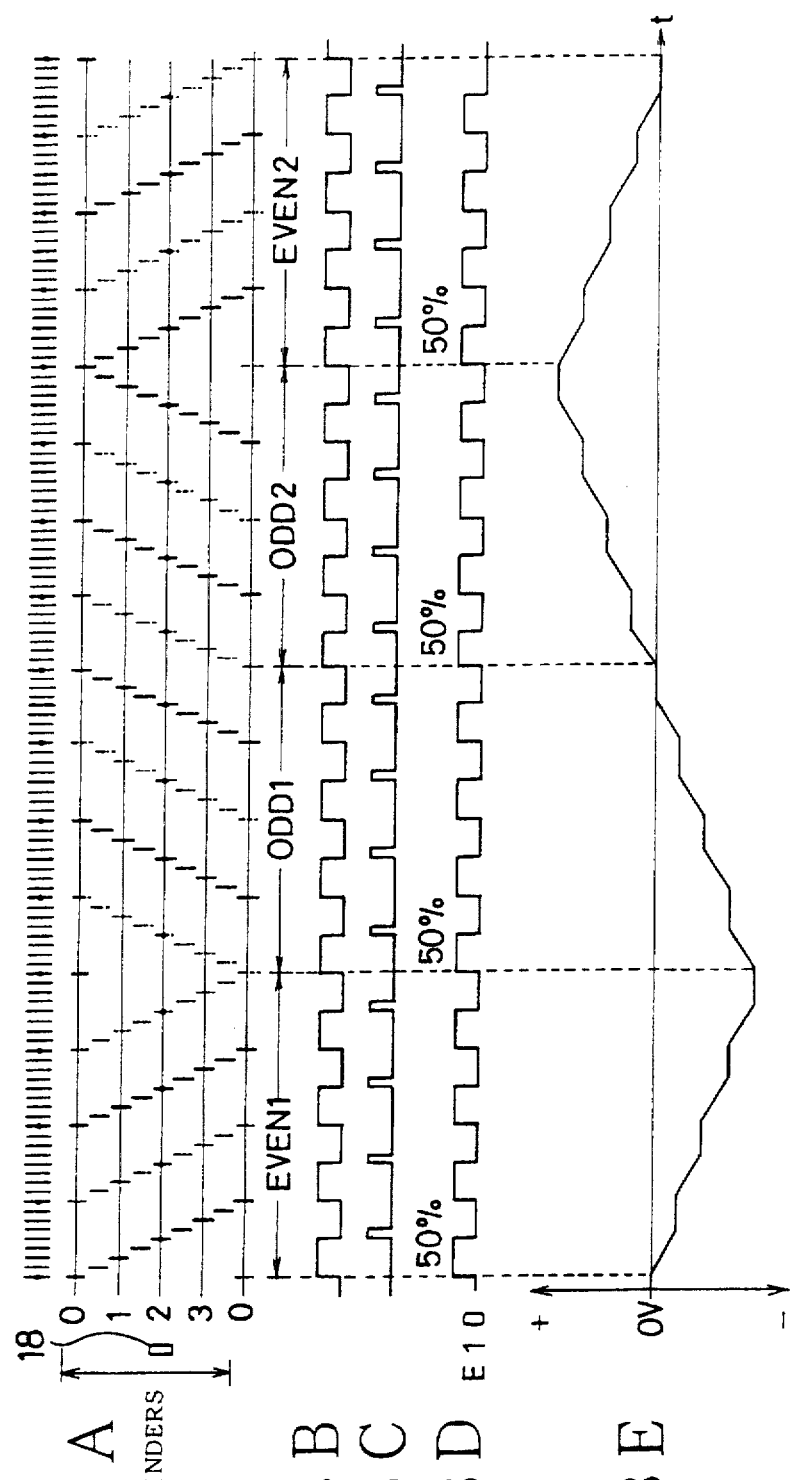
FIGS. 28A to 28E are timing charts showing position detections in the on-track state.

The changes of the phase servo pattern based on the servo surface, master clock, read pulse by the zero-cross detection, duty pulse, and further, the terminal voltage of the capacitor 126 of the integrating circuit 124 based on the duty pulse according to the disk apparatus of the invention will now be described hereinbelow. In FIG. 28A, the servo pattern on the servo surface is repeated for every four cylinders of the cylinder Nos. 0 to 3. It is now assumed that the servo head 18 is located on the track of the central cylinder No. 2. In such a state, a master clock having the reference phase which is advanced by 4τ for the phase servo pattern recorded to the cylinder No. 2 is selected. Therefore, the duty pulse E19 of FIG. 28B is set at the leading edge of the reference clock of FIG. 28A at every 4τ and is reset at the leading edge of the read pulse of FIG. 28C by the reading of the phase servo pattern by the servo head 18. Since the head is in the on-track state, the duty ratios are equal to 50% in all of the first to fourth fields (EVEN1, ODD1, ODD2, and EVEN2). In such a state of the duty ratio of 50%, the terminal voltage of the capacitor 126 of the integrating circuit 124 is set as shown in FIG. 28E. First, the capacitor 126 is charged in the first field (EVEN1) in the minus direction. Subsequently, it is charged in the second field (ODD1) in the plus direction. When the terminal voltage passes through 0 V, the capacitor 126 is further charged in the third field (ODD2) in the plus direction. Finally, in the fourth field (EVEN2), it is charged in the minus direction in a manner similar to the first field (EVEN1). The capacitor voltage is equal to 0 indicative of the on-track state at the time of completion of the reading of the phase servo pattern.

In the case where the servo head 18 seeks in the minus direction and is set to the on-track state at the cylinder No. 1 or 0, by selecting the master clock of the reference phase that is advanced by 4τ for the phase servo pattern of each track, the duty pulse E19 of the duty ratio 50% is similarly obtained. This point shall also apply to the case where the servo head 18 seeks the cylinder No. 3 in the plus direction. Thus, the head position signal which linearly changes in correspondence to the head position can be formed at the position of ±2 cylinders for the cylinder position in the on-track state.

Measurement and delay adjustment of duty ratio

Figure 29:
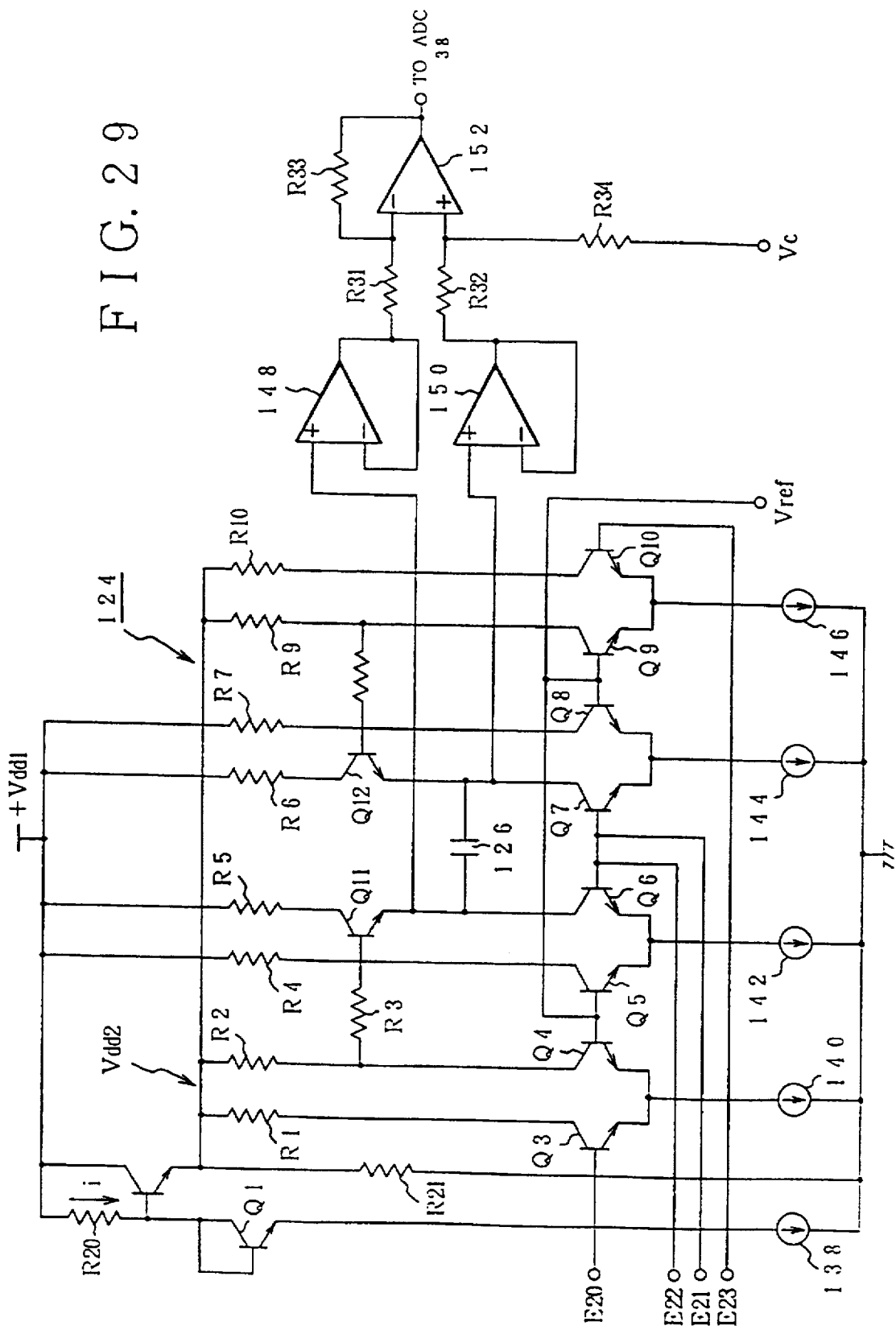
FIG. 29 is a circuit diagram of an integrating circuit in FIG. 10.

FIG. 29 shows an embodiment of the integrating circuit 124 in FIG. 10. The integrating circuit 124 is made operative by a first power source +Vdd1 and a second power source +Vdd2. In the embodiment, the second power source +Vdd2 is formed from the first power source +Vdd1 by a circuit comprising a resistor R20, a transistor Q1, a constant current source 138, and a transistor Q2. In this instance, the transistors Q1 and Q2 operate as a diode for assuring a voltage between the base and emitter. When the constant current of the constant current source 138 is set to i and the voltage between base and emitter of the transistors Q1 and Q2 is set to $V_{BE}$, the second power source Vdd2 is given by the following equation.

$$Vdd2 = Vdd1 - \{(R20 \times i) + V_{BE}\}$$

That is, the second power source voltage Vdd2 is set to the voltage obtained by subtracting the voltage drop of the resistor R20 by the constant current i and the voltage $V_{BE}$ between the base and emitter from the first power source voltage Vdd1. Eight transistors Q3, Q4, Q5, Q6, Q7, Q8, Q9, and Q10 which operate as current switches are connected in parallel to such a power source voltage through resistors R1, R2, R4, R5, R6, R7, R9, and R10. Among those transistors Q3 to Q10, differential circuits are constructed by the transistor pairs Q3 and Q4, Q5 and Q6, Q7 and Q8, and Q9 and Q10. Constant current sources 140, 142, 144, and 146 are connected to the common emitter side of those differential circuits. Control signals E20, E21, E22, and E23 are supplied from an integrating control circuit section shown in FIG. 32 to the transistors Q3, Q6, Q7, and Q10 of the differential circuits. Namely, the control signal E20 controls the transistor Q3, the control signal E21 controls the transistor Q7, the control signal E22 controls the transistor Q6, and the control signal E23 controls the transistor Q10. For the transistors Q3, Q7, Q6, and Q10 which are controlled by the control signals E20, E21, E22, and E23 as mentioned above, each of the differentially connected transistors Q4, Q8, Q5, and Q10 performs the inverse ON/OFF operation. Transistors Q11 and Q12 are serially connected to the transistors Q6 and Q7 and the capacitor 126 is connected between them.

Due to this, the switching circuit of the bridge type shown in the integrating circuit 124 in FIG. 10 is constructed by the transistors Q11, Q12, Q6, and Q7. The switching between the servo transistors (Q3 and Q4), and (Q9 and Q10) to control the transistors Q1 and Q2 locating on the upper side of the capacitor 126 is controlled in accordance with the first to fourth field periods by the demodulation mode signal E5 from the demodulating mode generating section 122-1 provided for the coincidence detecting circuit 122 shown in FIG. 10. Therefore, the control signal E20 for the transistor Q3 and the control signal E23 for the transistor Q10 are formed from the demodulation mode signal. On the other hand, the ON/OFF operations of the two transistors Q6 and Q7 located on the lower side of the capacitor 126 are controlled by the control signals E21 and E23 based on the duty pulse E19 from the duty pulse forming circuit 120 shown in FIG. 10. Namely, the control signal E21 is changed in accordance with the duty pulse in the first and fourth fields and the capacitor 126 is charged by the constant current along the path which is determined by the transistor Q11, capacitor 126, transistor Q7, and further constant current source 144 by the ON/OFF operation of the transistor Q7. On the other hand, in the second and third fields, the control signal E22 is changed by the duty pulse and turns on or off the transistor Q6 and the constant current is supplied through the path comprising the transistor Q12, capacitor 126, transistor Q6, and constant current source 142, thereby charging the capacitor 126.

The terminal voltage of the capacitor 126 is supplied to a differential amplifier 152 through operational amplifiers 148 and 150 operating as voltage followers and, further, the resistors R1 and R2. A pain of the differential amplifier 152 is determined by a center voltage Vc which is supplied via a feedback resistor R33 and a resistor R34 from the drive processor 30. Further, the reference voltage Vref is given to each base of the transistors Q4, Q5, Q8, and Q9, thereby setting the reference voltage as a middle-point which gives a relative charging voltage when it is seen from the power source voltage. Therefore, the terminal voltage of the capacitor 126 is charged or discharged to the plus side or minus side around the reference voltage Vref as a center.

The integrating operation based on the control signals E20, E21, E22, and E23 which are supplied in the on-track state of the servo head of the integrating circuit 124 in FIG. 29 will now be described. In FIG. 30A, the phase servo pattern of 4 cylinders is simplified and shown. For the reading of such a phase servo pattern, the control signal E20 in FIG. 30B is set to the H level in each of the first and fourth fields (EVEN1, EVEN2) and turns on the transistor Q3 and turns off the transistor Q4, thereby turning on the transistor Q11. The control signal E23 in FIG. 30C is set to the H level in the second and third fields (ODD1, ODD2) and turns on the transistor Q10 and turns off the transistor Q9, thereby turning on the transistor Q12. FIG. 30A shows an on-track state in which the servo head 18 is located on the cylinder No. 2. The clock pulse in FIG. 30D is selected as a master clock and the read pulse in FIG. 30E is obtained. Therefore, the duty pulse E19 in FIG. 30F has a duty ratio of 50% in each of the first to fourth fields. For such a duty pulse E19, the control signal E21 in FIG. 30G is changed in correspondence to the duty pulse E19 in the first and fourth fields (EVEN1, EVEN2) and turns on or off the transistor Q7, thereby allowing the capacitor 126 to perform the integrating operation by supplying a constant current from the constant current source 144 to the capacitor 126 via the transistor Q11 in the on-state at that time.

On the other hand, the control signal E22 in FIG. 30H is changed in accordance with the duty pulse E19 in the second and third fields (ODD1, ODD2) and a constant current determined by the constant current source 142 is supplied to the capacitor 126 in the opposite direction via the transistor Q12 in the on-state at that time by turning on or off the transistor, thereby performing the integrating operation. Further, the data window signal E7 in FIG. 30I is used for the actual integrating operation. The charging operation in one and opposite directions of the capacitor 126 is performed by the control signals E21 and E22 for a period of time during which the data window signal E7 is at the H level. Since the servo head 18 is now in the on-track state at the cylinder No. 2, the voltage across the capacitor at the end of the integrating operation of the first to fourth fields is equal to 0 V.

Deviation of duty ratio in on-track state

The duty ratio of the duty pulse formed on the basis of the reading of the phase servo pattern to make the integrating circuit 124 in FIG. 29 operative is ideally set to 50% in the on-track state. However, as shown in the embodiment of FIG. 10, the synchronization of the PLL circuit 102 is performed by detecting the peak of the read signal, while the detection of the phase servo pattern is performed by the zero-cross detection. Therefore, the timing for the zero-cross detection is inevitably deviated from that of the reference phase. The duty pulse having the duty ratio of 50% cannot be obtained in the on-track state.

Figure 31:
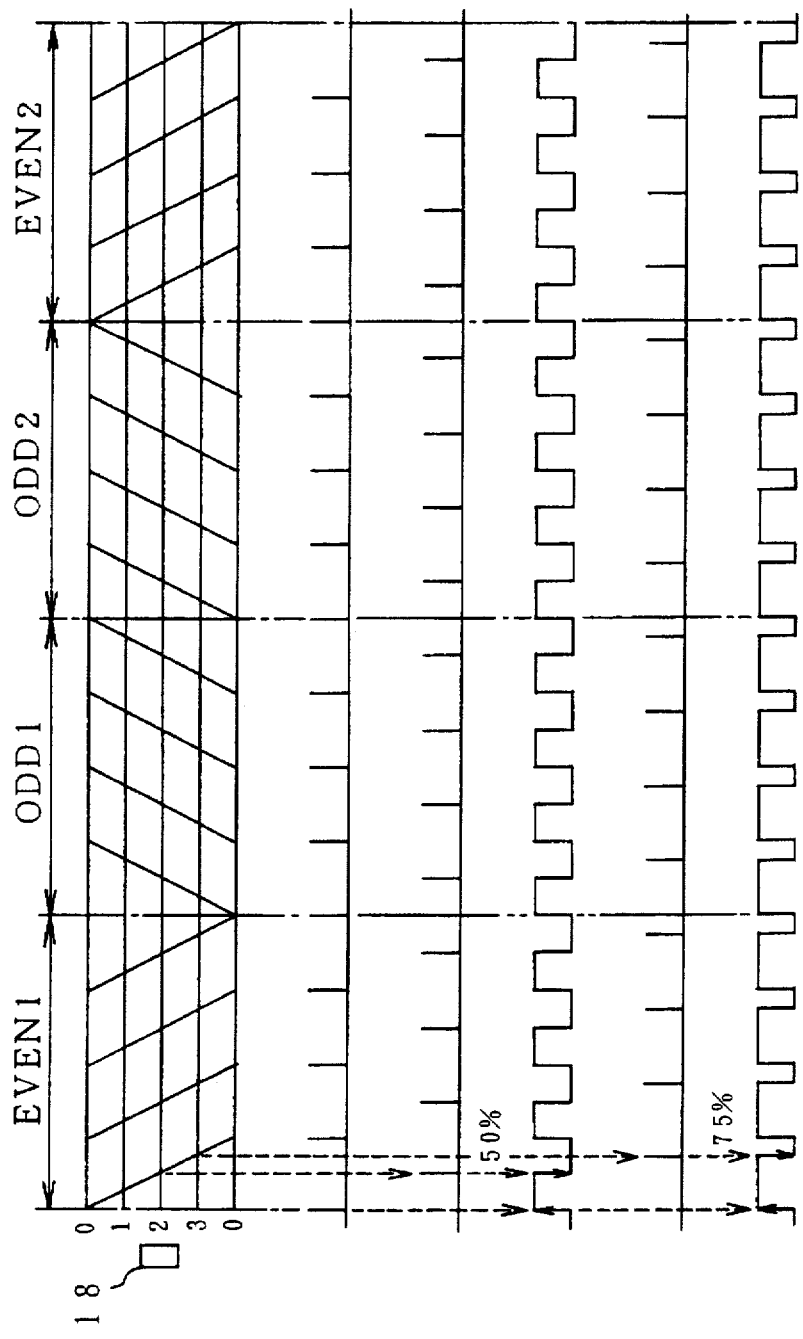
FIGS. 31A to 31F are timing charts for a difference of the duty ratios by the peak detection and the zero-cross detection.

A difference between the duty ratio in case of peak detecting with respect to the reading of the phase servo pattern and the duty ratio in case of performing the zero-cross detection as in the invention will now be described. As shown in FIG. 31A, when the servo head 18 is positioned on the track of the cylinder of cylinder No. 2 among four cylinders, a set timing in the duty pulse forming circuit 120 is obtained by the selection of the master clock as a reference phase of FIG. 31B. In case of the peak detection, as shown in FIG. 31C, a peak detecting timing which coincides with the timing for the magnetic recording of the servo pattern is obtained. In this case, as shown in FIG. 31D, the duty pulse has a duty ratio of 50% in each of the first to fourth fields.

In the zero-cross detection of the invention, however, as shown in FIG. 31E, the zero-cross detecting timing has a delay time for the peak detecting timing. Thus, the duty ratio of the duty pulse is set to 75% in the on-track state as shown in FIG. 31F. As mentioned above, the reason why the duty ratio in the on-track state is not equal to 50% is because a circuit delay in the analog circuit system arbitrarily occurs in addition to the zero-cross detection and various duty ratios out of 50% are derived in the on-track state for every disk apparatus.

In the disk apparatus of the invention, therefore, the duty ratio of the duty pulse which is obtained in the on-track state is first measured. In order to set the measured duty ratio to 50%, by setting delay amounts for the shifter 108 and variable delay circuit 114 shown in FIG. 10, the adjusting state of the duty ratio of 50% is automatically formed at the time of the initializing process of the power-on start.

Figure 32:
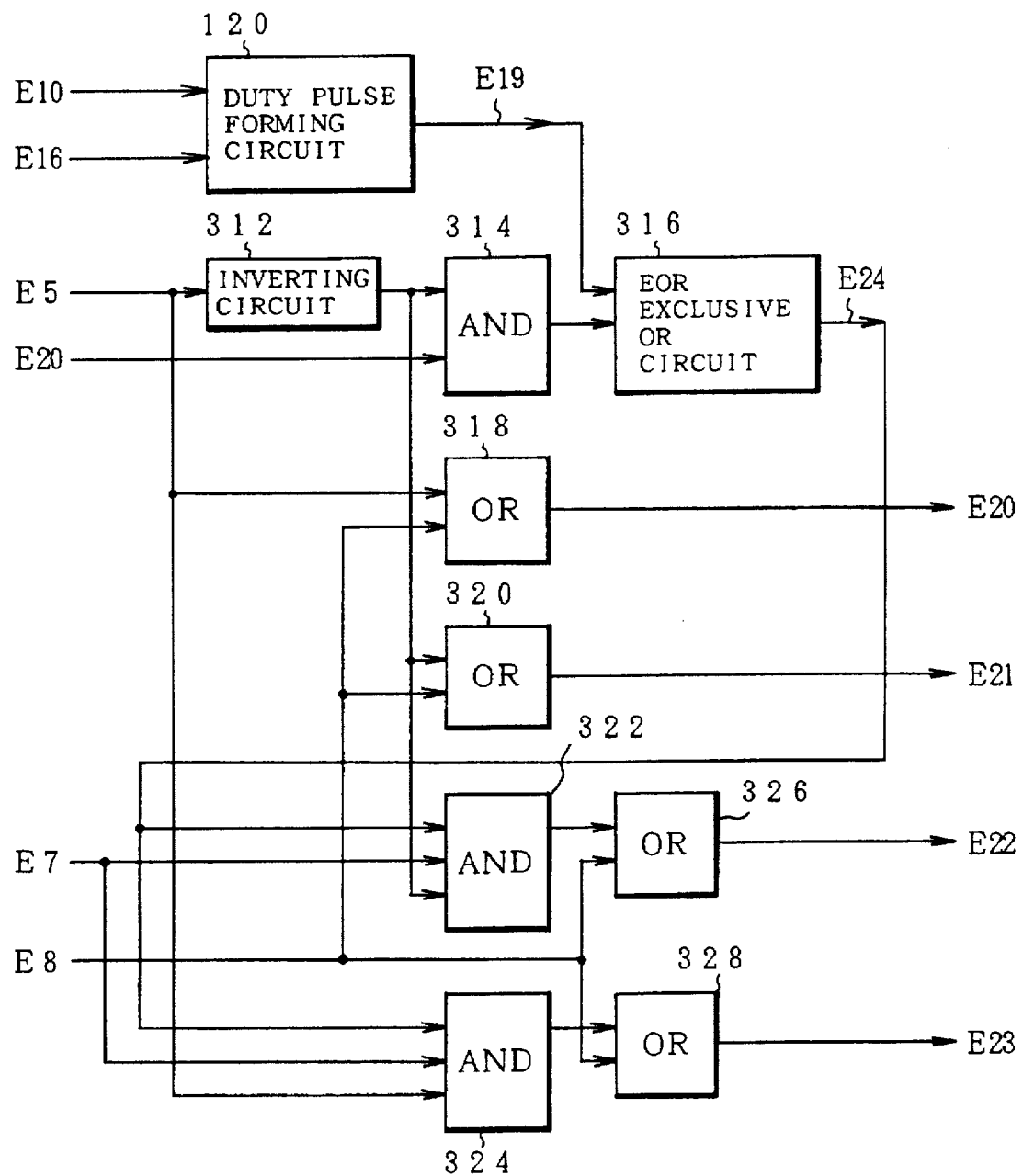
FIG. 32 is a circuit block diagram of an integration control section in FIG. 29.

FIG. 32 shows an embodiment of an integration control section constructing a part of the integrating circuit 124 in FIG. 29 in which a function to measure the actual duty ratio of the duty pulse E19 which is obtained in the on-track state is assembled. The integration control section comprises: an inverting circuit 312; AND circuits 314, 322, and 324; OR circuits 318, 320, 326, and 328; and an exclusive OR circuit (EOR) 316. Among them, the AND circuit 314 and the EOR circuit 316 are provided to measure the duty ratio. In the circuit, on the basis of the ODD region inversion signal E20 from the drive processor 30, a duty signal which is obtained by inverting the pulses of the second and third fields ODD1 and ODD2 of the duty pulse E19 which is output from the duty pulse forming circuit 120. A circuit section excluding the inverting circuit section of the ODD regions produces the control signals E20, E23, E21, and E22 of FIGS. 30B, 30C, 30G, and 30H by using the demodulation mode signal E5, data window signal E7, and discharge control signal E8 from the coincidence detecting circuit 122 locating at the front stage.

The duty pulses and integrating operations of the capacitor when the ODD region inversion signal E20 from the drive processor 30 is disabled and when it is enabled are as follows. FIG. 33A shows the duty pulse E19 which is obtained in a non-measuring state of the duty ratio and shows a pulse train in which duty pulses in all of the periods of the first to fourth fields exceed, for example, a duty ratio 50%. FIG. 33B shows a change in integration voltage by the duty pulse E19 in the non-measuring state of the duty ratio, namely, a change in voltage across the capacitor 126. Even if the duty ratio is deviated from 50%, the final integration voltage is set to the zero voltage. There is fundamentally no problem with respect to the position control in the on-track state. However, when the position signal changes in a range of ±2 cylinders, the position detection has to be performed. Therefore, now assuming that the duty ratio in the on-track state is equal to 75%, the duty ratio changes to −50% to +50% in a range of two cylinders. Thus, a change in duty pulse lies within a range from +25% to +125%. When the duty ratio exceeds +125% and 100%, the position cannot be detected. On the contrary, when the duty ratio is equal to, for example, 25% lower than 50%, the duty ratio similarly changes in a range from −50% to +50% in a range of four cylinders. The duty ratio of the duty pulse which is obtained as a result lies within a range from −25% to +75%. When the duty ratio is equal to a minus value, the position cannot be detected. From the above reason as mentioned above, it is necessary that the duty ratio of the duty pulse in the on-track state is maintained to 50%.

Figure 30:
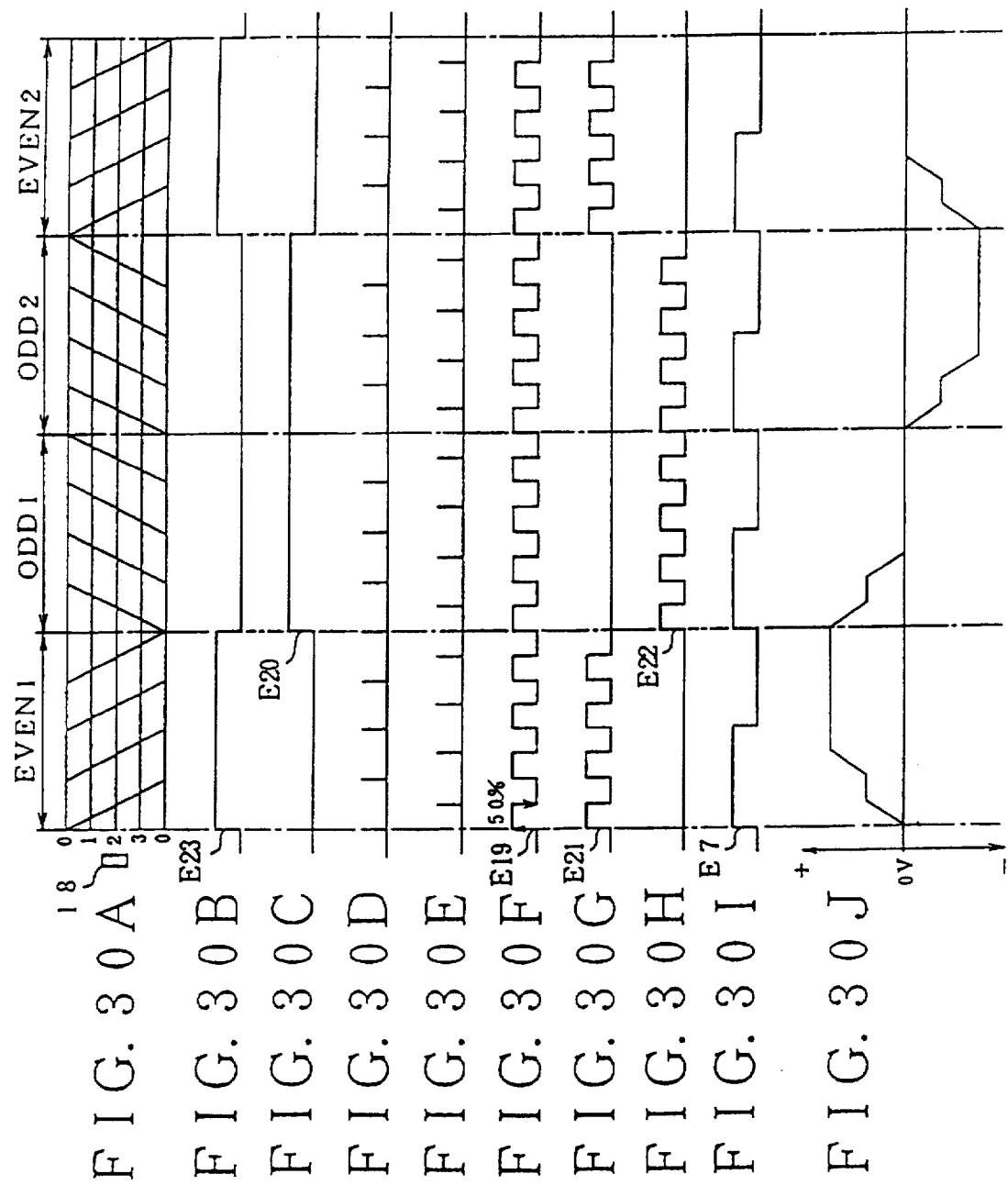
FIGS. 30A to 30J are timing charts for the position detecting operation by an integrating circuit in FIG. 10.

FIG. 33C shows an output signal E24 which is generated from the EOR circuit 316 when the ODD region inversion signal E20 from the drive processor 30 is set into an enable state for the discharge control section in FIG. 30 and an integration voltage of the capacitor 126 based on the output signal E24. In this case, the duty pulse E19 of FIG. 33A is inverted with respect to the periods of time of the second and third fields ODD1 and ODD2. As an integration voltage which is finally derived, a duty ratio measurement voltage which was changed to the minus side by only the increase amount of the duty ratio for 50% can be obtained for 0 voltage of the duty ratio of 50%. FIGS. 33C and 33D show examples in the case where the duty ratio was increased.

When the duty ratio is smaller than 50%, the measurement voltage which is finally derived is equal to the measurement voltage on the plus side. By such a measuring function, the drive processor 30 can actually measure the duty ratio of the duty pulse E19 generated from the duty pulse forming circuit 120.

FIG. 34 shows an embodiment of the shifter 108 in FIG. 10. The shifter 108 comprises D-type flip-flops (DFFs) 300, 302, and 304 and a selecting circuit 306. The three D-FFs 300, 302, and 304 construct a shift register by serially connecting them. A bit 1 output from the PLL counter 106 provided at the front stage, namely, the frequency division pulse obtained by dividing the frequency of a PLL clock E0 of 20 Mhz into ½ is input to the D-FF at the first stage. The PLL clock E0 is supplied as a shift clock to the D-FFs 300, 302, and 304. In case of an oscillating frequency of 20 Mhz, the clock period 1τ of the PLL clock E0 is equal to 50 nsec. The bit 1 output of the PLL counter and output signals E12, E13, and E15 of the D-FFs 300, 302, and 304 constructing the shift register are input to the selecting circuit 306. The bit 1 output of the PLL counter is shown as a signal E15. The selecting circuit 306 receives a selection signal E11 for the delay control decided on the basis of the measurement result of the duty ratio in the drive processor 30 and selects either one of the inputs and generates as a reference clock to the master clock forming circuit 110.

Figure 35A:
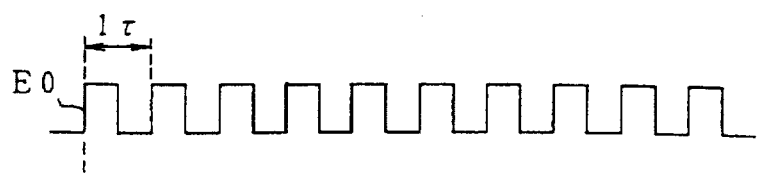
FIGS. 35A to 35F are timing charts for the delay operation of the shifter in FIG. 34.
Figure 35B:
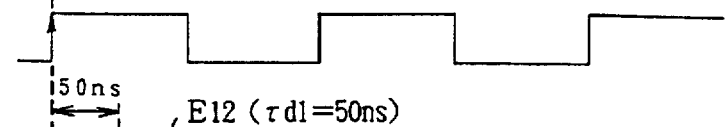
Figure 35C:
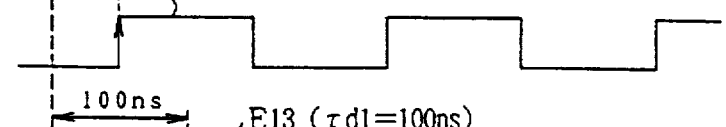
Figure 35D:
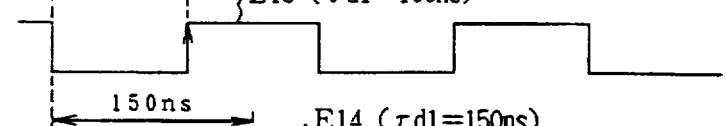
Figure 35E:
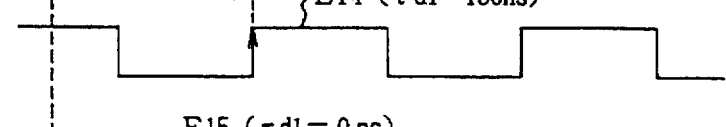
Figure 35F:
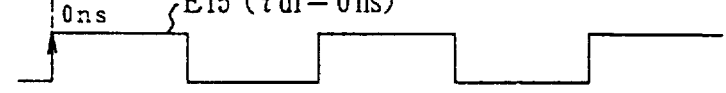

The delay adjustment by the shifter 108 will now be described. FIG. 35A shows the PLL clock E0. In case of 20 Mhz, it is set to 50 nsec. The bit 1 output of the PLL counter in FIG. 35B is a pulse obtained by dividing the frequency of the PLL clock E0 into ½. As shown in the signal E15 of FIG. 35F, the bit 1 output is directly given to the selecting circuit 306. In this case, the delay amount is equal to 0 nsec. FIG. 35C shows the output signal E12 of the D-FF 300. The output signal E12 is a signal delayed by only the period 1τ of the PLL clock E0, namely, 50 nsec. FIG. 35D shows the output signal E13 of the D-FF 302 at the second stage. The output signal E13 is a signal delayed by only 100 nsec. Further, FIG. 35E shows the output signal E14 of the D-FF 304 at the third stage. The output signal E14 is a signal delayed by 150 nsec. As mentioned above, the shifter 108 in FIG. 32 gives the digital-like delay amounts corresponding to the delay times 0, 50, 100, and 150 nsec to the PLL clock E0. The delay amount which is digitally set by the shifter 108 now assumes τd1.

Figure 36:
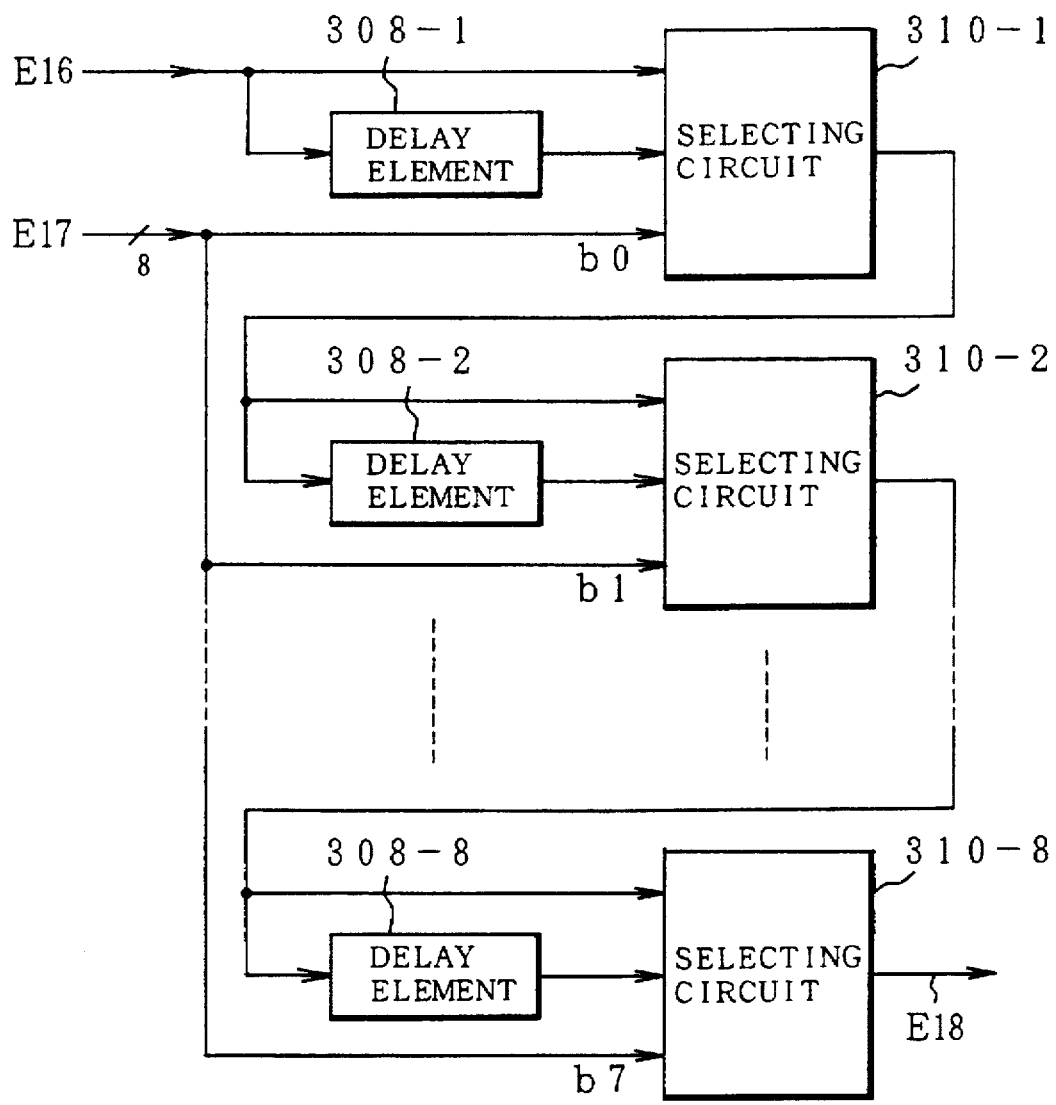
FIG. 36 is a circuit block diagram of a variable delay circuit in FIG. 10.

FIG. 36 shows an embodiment of the variable delay circuit 114 in FIG. 10. The variable delay circuit 114 comprises eight delay elements 308-1 to 308-8 and eight selecting circuits 310-1 to 310-8. Two inputs of the direct connection from the front stages of the delay elements 308-1 to 308-8 and the paths via the delay elements 308-1 to 308-8 are connected to the input stages of the selecting circuits 310-1 to 310-8, respectively. Therefore, by selecting either one of the two inputs by each of the selecting circuits 310-1 to 310-8, the delay elements of the necessary number can be serially connected from the input stage to the output stage. Each of the selecting circuits 310-1 to 310-8 is controlled by the selection signal E17 from the drive processor 30. As delay elements 308-1 to 308-8, for example, delay elements having a delay time of 12 nsec are used for the delay elements 308-1 to 308-6 and delay elements having a delay time of 5 nsec are used for the delay elements 308-7 and 308-8.

The selection signal E17 from the drive processor 30 comprises signals b7 to b0 of eight bits corresponding to the delay elements 308-1 to 308-8. The bit signals b0 to b7 are sequentially input in accordance with the order of the selecting circuits 310-1 to 310-8. When each bit of the bit signals b0 to b7 is set to the H (high) level (bit 1), the selecting circuits 310-1 to 310-8 select the lines from the delay elements 308-1 to 308-8. On the contrary, when the bit signals b0 to b7 are set to the L (low) level (bit 0), the lines which bypass the delay elements 308-1 to 308-8 are selected.

The relations of the selection delay times for the bits b0 to b7 of the selection signal E17 from the drive processor 30 are as shown in a table of FIG. 38. By such an 8-bit selection signal E17, the drive processor 30 can set 256 kinds of delay times τ0 to τ255 of the table No. I=0 to 255 in FIG. 39 which are designated by the table No. I in which eight bits are expressed by decimal notation. The table No. I=0 relates to the case where the delay time τ0=0 nsec and there is no delay amount. The delay time τ255 of I=255 is equal to 82 nsec which gives the maximum delay amount. The delay times τ0 to τ255 are not arranged in accordance with the magnitude relations of the delay times. The selection of the optimum delay time is decided by repeating the setting of the delay time and the measurement of the duty ratio. Each of the delay times shown in FIGS. 38 and 39 has actually a variation of a certain extent and the ideal design values are merely shown here.

Figure 37:
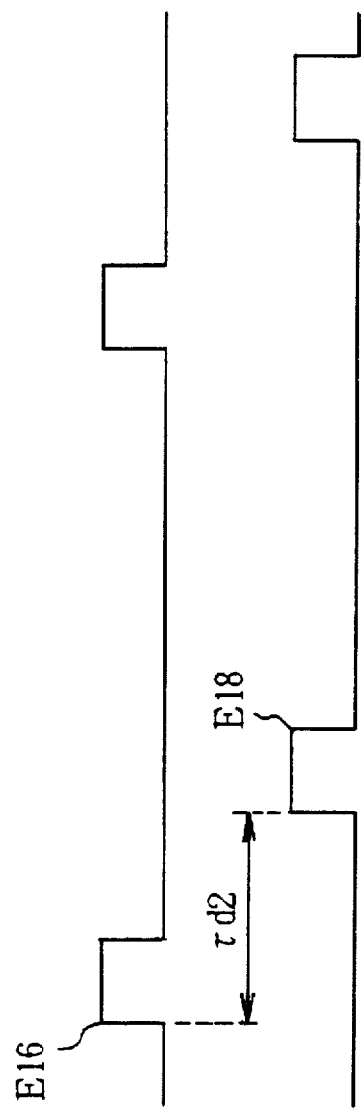
FIGS. 37A and 37B are timing charts for the delay operation of a variable delay circuit in FIG. 36.

The delay operation of the variable delay circuit 114 in FIG. 34 will now be described. The variable delay circuit 114 delays the zero-cross detection signal E16 derived by the zero-cross detecting circuit 112. The zero-cross detection signal E16 gives a reset timing of the duty pulse in the duty pulse forming circuit 120, so that the reset timing is delayed. That is, FIG. 37A shows the zero-cross detection signal E16 which is input from the zero-cross detecting circuit 112. An arbitrary delay time τd2 is set by a selection signal E17 from the drive processor 30. A delay output signal E18 of FIG. 37B is derived from the selecting circuit 310-8 at the final stage.

The delay adjusting operation of the duty pulse by the shifter 108 in FIG. 32 and the variable delay circuit 114 in FIG. 34 is executed in the following manner. FIG. 40A shows a leading timing of the PLL clock E10. It is now assumed that the duty pulse before correction of FIG. 40B is set to 4τ and the duty ratio exceeds 50%. As shown in FIG. 40C, by inverting the second and third fields ODD1 and ODD2 of the duty pulse, the duty ratio of the duty pulse is obtained as an integration voltage of the capacitor 126 by the integrating circuit 124 and is supplied to the drive processor 30, so that a delay amount which needs to be adjusted is decided. For example, in case of FIG. 40B, in order to obtain the duty ratio of 50%, it is necessary to reduce the duty of an amount of Δτd exceeding 4τ. In this case, to realize the delay amount Δτd which needs to be adjusted, the drive processor 30 determines the delay of the PLL clock E10 of a 50 nsec unit for the shifter 108 and the delay amount τd2 of the zero-cross detecting timing by the variable delay circuit 114. That is, the values of the set delay amounts τd1 and τd2 are decided so as to satisfy the following equation.

$$\tau d = \tau d1 + \tau d2 = 100 \text{ nsec}$$

FIG. 40C shows the setting of τd1=100 nsec for the shifter 108. FIG. 40E shows the setting of the delay of τd2 of the zero-cross detecting timing for the variable delay circuit 114. Thus, a correction duty pulse which was corrected to the duty ratio of 50% in FIG. 40E can be obtained from the duty pulse forming circuit 120.

Figure 41:
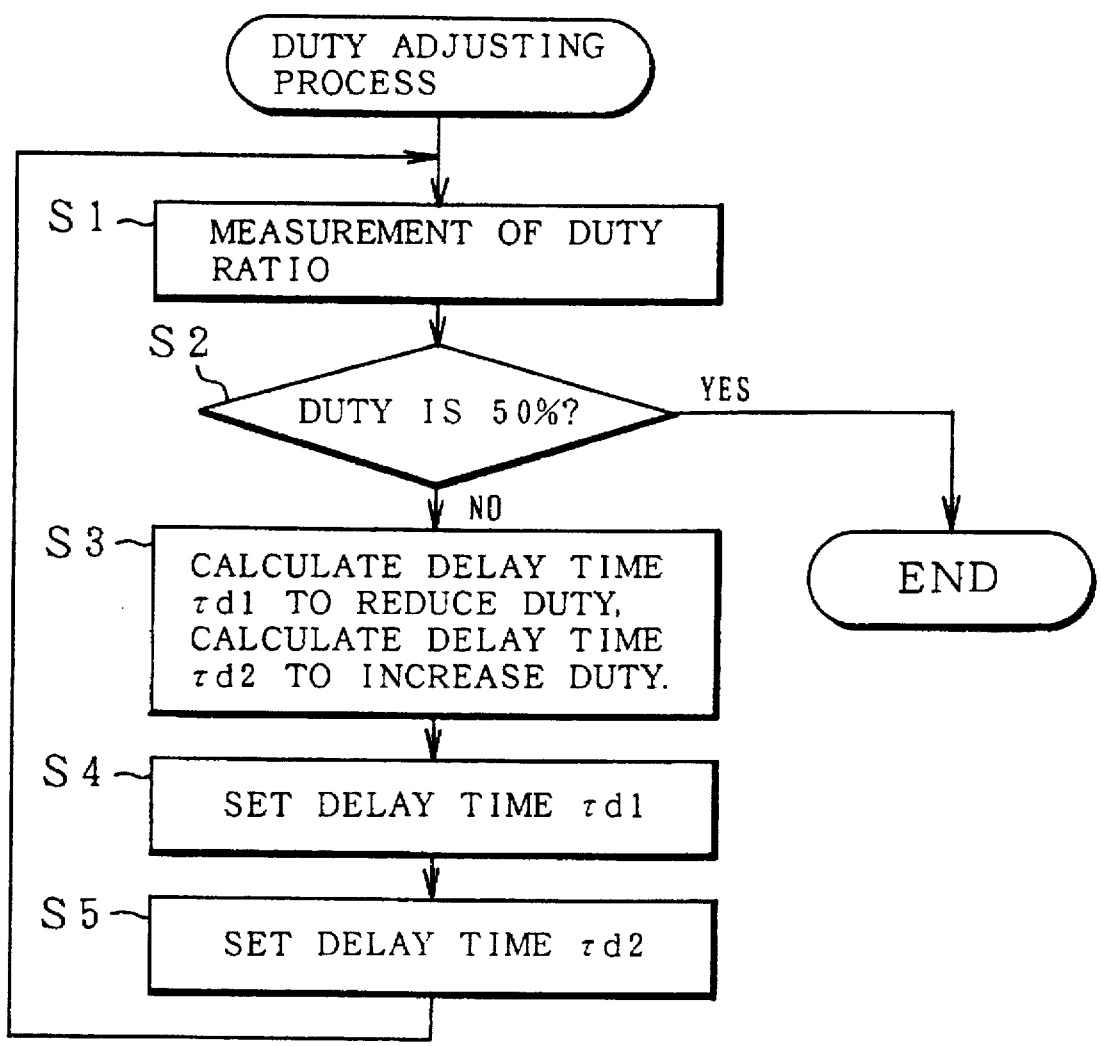
FIG. 41 is a flowchart for a duty adjusting process of the invention.

A flowchart of FIG. 41 shows the duty adjusting process by the drive processor 30. First, in step S1, the duty ratio is measured by inverting the second and third fields ODD1 and ODD2 in an on-track state in which the servo head 18 is located to the proper target cylinder. When the measured duty ratio is equal to 50% in step S2, the processing routine is finished without performing the adjusting process. When the duty ratio doesn't equal to 50%, on the basis of the measured duty ratio, the calculation of the delay time τd1 to reduce the duty ratio and the calculation of the delay time τd2 to increase the duty ratio are executed in step S3. The calculated delay times are set into the shifter 108 and the variable delay circuit 114 in steps S4 and S5, respectively. The processing routine is returned to step S1 and the duty ratio is measured. The above processes in steps S1 to S5 are repeated until the duty ratio 50% is obtained in step S2. The duty ratio adjusting process is executed in the initializing process after the power-on-start as shown in step S4 in the flowchart of FIG. 9.

Figure 42:
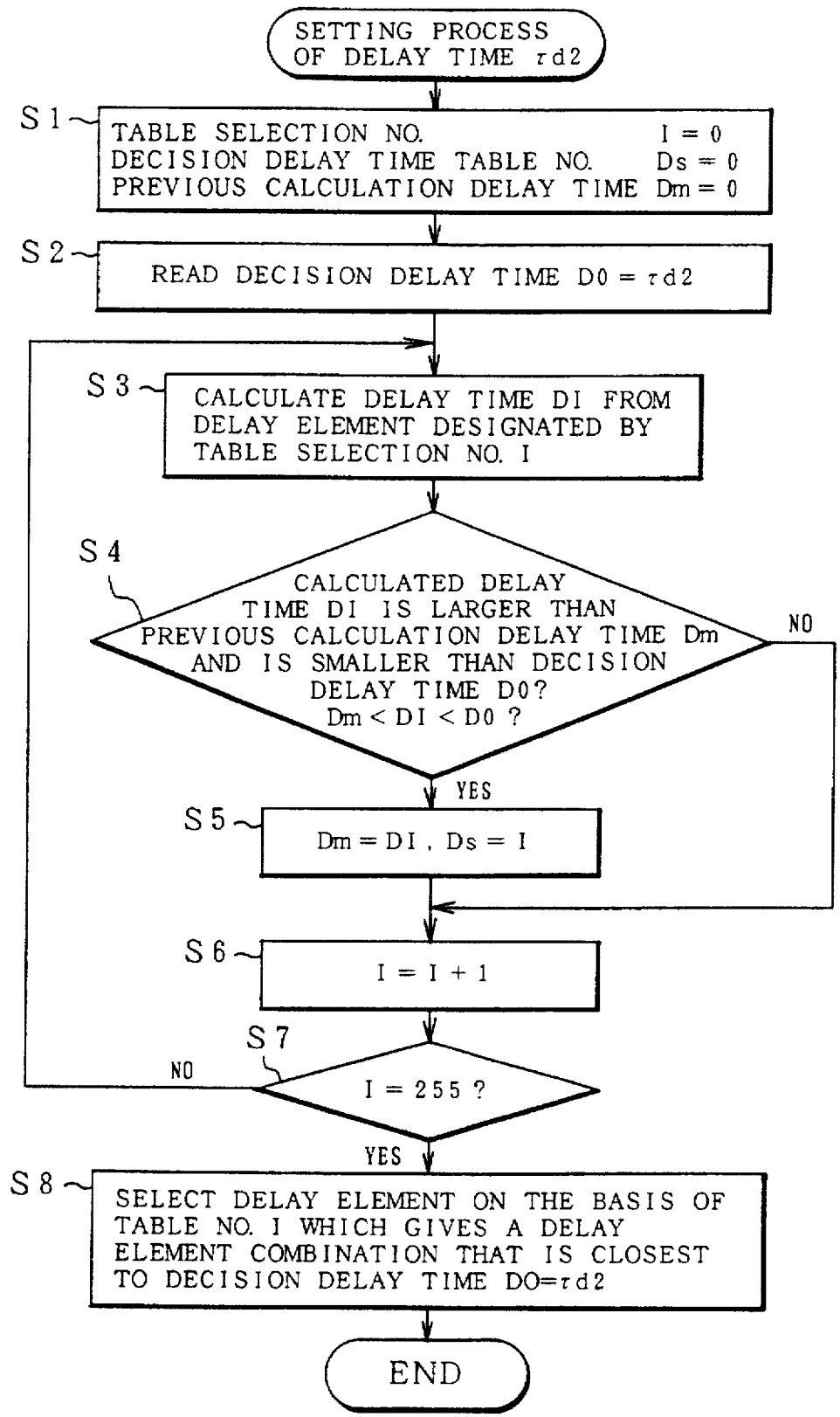
FIG. 42 is a flowchart for a setting process of the delay time for the variable delay circuit.

A flowchart of FIG. 42 relates to a subroutine for the setting process of the delay time τd2 for the variable delay circuit 114 which is executed in step S4 in FIG. 41. In the subroutine, table information of FIG. 39 is used. First, in step S1, the table selection No. I of the table in FIG. 39, a table No. Ds of the delay time which is finally decided, and a delay time Dm derived by the preceding calculation are initialized to 0. In step S2, the decision delay time τd2 for the variable delay circuit 114 which was decided by the duty measurement is read as D0. In step S3, a delay time Di is calculated from the combination of the delay elements designated by the initialized table selection No. I=0. In the embodiment, since the delay times have previously been provided as table information of FIG. 39, it is sufficient to merely retrieve the table. In the case where the table is not used, a delay time DI is calculated from the combination of the delay elements designated by the table selection No. I. In step S4, a check is made to see if the calculated delay time DI is larger than the previous calculated delay time Dm and is smaller than the decision delay time D0 read in step S2 or not. If YES in step S4, this means that the calculated delay time Dm which is decided by the table selection No. I selected at present is effective, so that step S5 follows. The delay time DI obtained at present is set into the calculated delay time Dm and, further, the table No. I is set into the decision delay time table No. Ds. If NO in step S4, the process in step S5 is not performed but the delay time of the table selection number is ignored. In step S6, the table selection No. I is increased by "1". Until the table No. reaches the final table No. I=255 in step S7, the processes in steps S3 to S7 are repeated. By repeating the above processes, the table No. I serving as the delay time that is nearest to the decision delay time D0=τd2 read in step S2 can be determined. In final step S8, the selection signal E17 based on the decided table No. I is output to the variable delay circuit 114 and the delay time that is nearest to the delay time τd2 is set. The selection signal E17 at this time corresponds to the data in which the decimal value of the table No. I shown in FIG. 39 is expressed by eight bits. The selection of the delay element is unconditionally determined by the bit correspondence.

[Adjustment of integrating circuit]

In the integrating circuit 124 in FIG. 29, an amount of current which is supplied to the capacitor 126 is decided by the constant current sources 142 and 144. However, a variation occurs in a resistor used in the constant current circuit to realize the constant current sources 142 and 144, further, in a capacitance of the capacitor 126 in the manufacturing process. Therefore, the currents are supplied from both directions to the capacitor 126 on the basis of the duty pulse of the duty ratio 50% in the on-track state and the terminal voltage must be ideally set to 0 V. However, a voltage across the capacitor which is deviated to either one of both sides is accurately generated. The error voltage of the capacitor 126 in the on-track state is supplied to the drive processor 30 as a deviation amount from the cylinder center in the position detection signal, so that a position detecting accuracy deteriorates. In the disk apparatus of the invention, therefore, the error voltage of the capacitor 126 in case of the duty ratio 50% is measured by the function of the integrating circuit adjustment processing section 86 provided for the drive processor 30. At the time of the head position control, there is executed a correction using the correct position data by subtracting the error from the position signal fetched from the A/D converter 38.

As for the measurement of the error voltage of the capacitor 126 in the on-track state, the control signal E32 is output to the selecting circuit 118 by the drive processor 30 shown in FIG. 10, the read pulse corresponding to the pseudo zero-cross detection pulse from the drive processor 30 is supplied to the duty pulse forming circuit 120 by the selecting circuit 118, and the duty ratio of the duty pulse E19 is controlled by the drive processor 30, thereby measuring the error voltage in case of the duty ratio 50% in the integrating circuit 124. Further, the duty pulse that is equivalent to a state in which the head was sought by a length of ±1 cylinder for the target cylinder is falsely generated through the selecting circuit 118, the position signal is measured by the integrating circuit 124, and the cylinder gain indicative of the position detection data per one cylinder is measured. Therefore, the capacitor error voltage of the integrating circuit 124 and the cylinder gain as position detection data indicative of the head movement amount of one cylinder can be measured by only the formation of the pseudo duty pulse without actually moving the servo head 18.

Three kinds of read pulses which are generated to the duty pulse forming circuit 120 through the selecting circuit 118 by the drive processor 30 for measurement of the integration error voltage and cylinder gain will now be described. FIG. 43A shows phase servo patterns on the servo surface. The servo head 18 is located on the track of the cylinder of No. 2. In such an on-track state, a master clock of FIG. 43B is supplied to the duty pulse forming circuit 120. The duty pulse is set in response to the leading edge of the master clock. The duty pulse is reset by an on-track read pulse from the drive processor 30 which is sent via the selecting circuit 118. As shown in FIG. 4C, the on-track read pulse is generated so as to have a phase difference of 4τ for the leading edge of the master clock. Due to this, the duty pulse of the duty ratio 50% in FIG. 43D is falsely formed and the integrating circuit 124 can be made operative. FIG. 43E shows a master clock signal when the servo head 18 is in an on track state over cylinder No. 3.

FIG. 43F shows a +1 seek read pulse which is output from the drive processor 30 and which corresponds to a state in which the servo head 18 existing on the track of the cylinder number in FIG. 43A was sought by a length of one cylinder in the plus direction. The +1 seek read pulse corresponds to the read pulse when the servo head 18 was moved to the cylinder No. 3 in FIG. 43A and is generated with a phase delay of 6τ for the leading edge of the master clock. By the +1 seek read pulse, the duty pulse whose duty ratio is equal to 75% in the first and fourth fields EVEN1 and EVEN2 and is equal to 25% in the second and third fields ODD1 and ODD2 in FIG. 43G can be falsely generated.

Further, in FIG. 43H, a pulse corresponding to the read pulse derived when the servo head 18 is sought by one cylinder in the minus direction from the on-track state and is moved to the cylinder No. 1 is generated as a −1 seek read pulse by the drive processor 30. The −1 seek read pulse is a pulse which is phase shifted by 2τ for the leading edge of the master clock in the first and fourth fields (EVEN1, EVEN2) and is phase shifted by 6τ for the reference clock in the second and third fields (ODD1, ODD2). Thus, the duty pulse of the duty ratio of 25% in the first and fourth fields (EVEN1, EVEN2) and of the duty ratio of 75% in the second and third fields (ODD1, ODD2) shown in FIG. 43H can be falsely generated by the −1 seek read pulse.

Figure 44A:
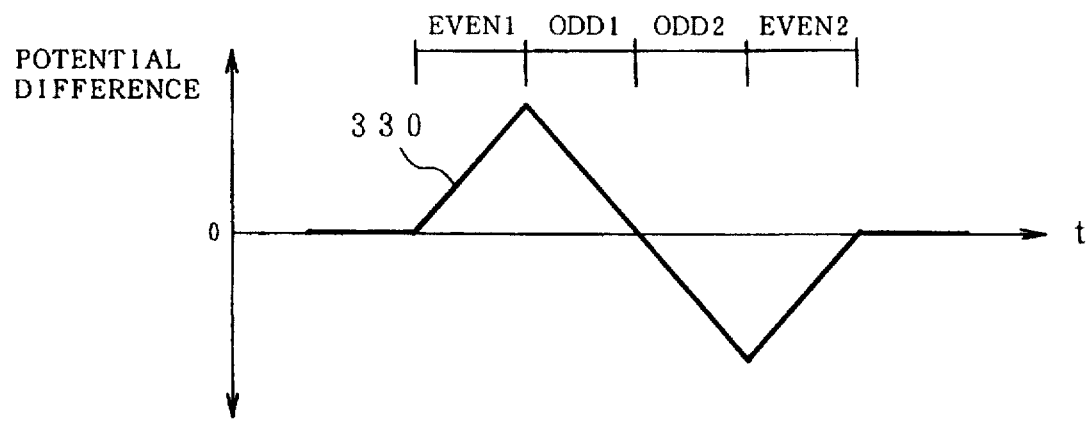
FIGS. 44A and 44B are timing charts for the measuring operation of an integration error according to the invention.
Figure 44B:
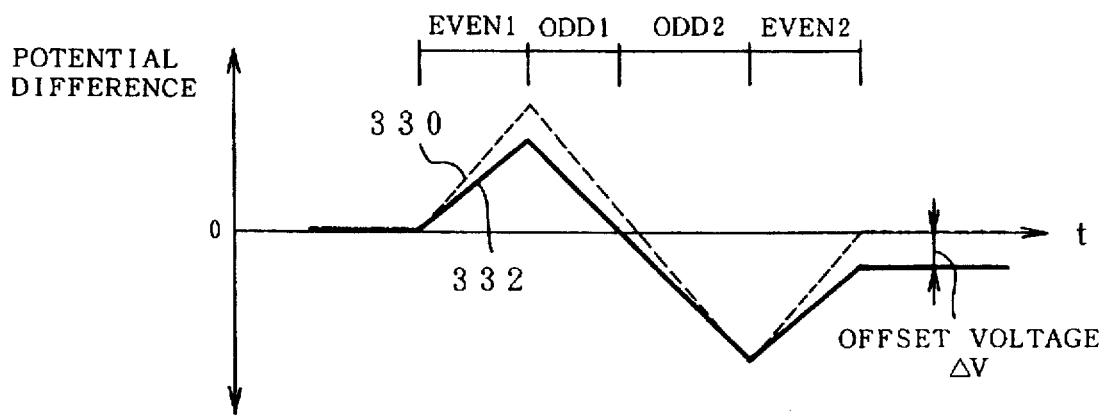

FIG. 44A shows an ideal potential difference when the on-track read pulse of FIG. 43C is generated and the integrating circuit 124 is made operative by the pseudo duty pulse of the duty ratio 50% by the drive processor 30. Such a change 330 of the potential difference is finally set to 0. However, actually, when the integrating circuit 124 is made operative by the duty pulse of the duty ratio 50% based on the on-track read pulse, as shown in FIG. 44B, the potential difference of the capacitor 126 changes as shown in characteristics 332 shown by a solid line for the ideal characteristics 330 shown by a broken line due to variations of resistance and capacitance. The offset voltage ΔV finally remains as an error voltage. The drive processor 30 allows the A/D converter 38 to fetch and hold the offset voltage ΔV. In the subsequent head position control, the offset voltage ΔV is eliminated from one data fetched from the A/D converter 38, thereby producing the correct position data.

Figure 45:
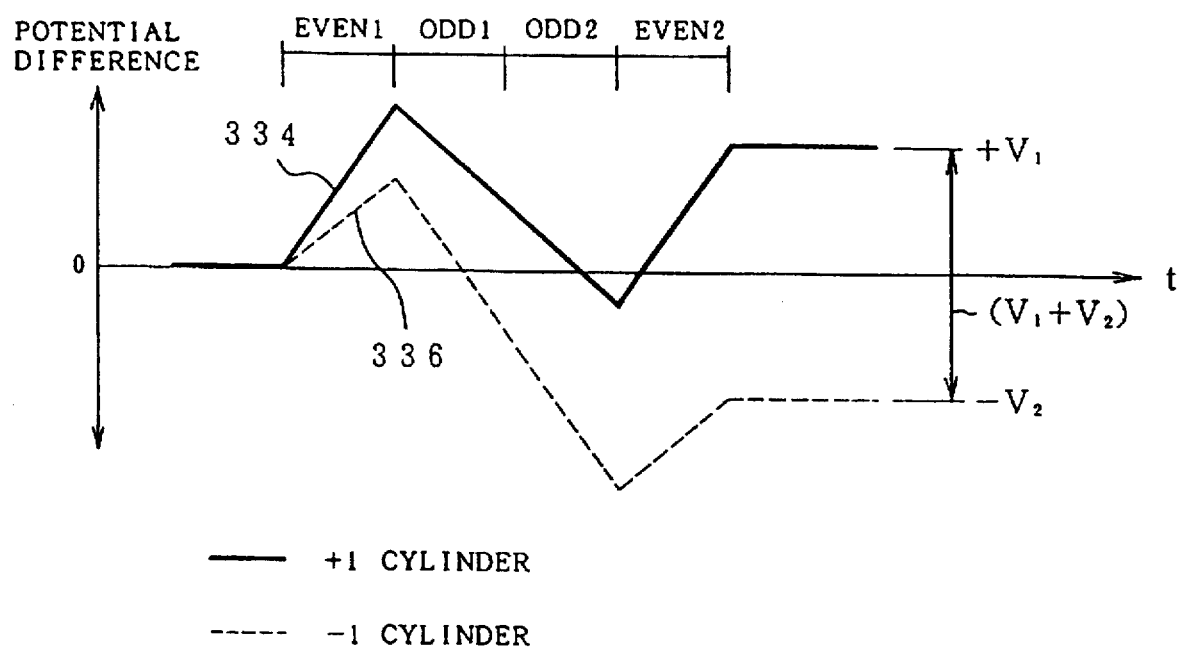
FIG. 45 is a timing chart for the measuring operation of a cylinder gain according to the invention.

FIG. 45 shows a change in potential difference of the capacitor 126 due to the generation of the +1 cylinder read pulse and −1 cylinder read pulse for obtaining a cylinder gain. Actual characteristics 334 show a change when the head is falsely sought by +1 cylinder. In this case, a potential difference of +V1 is obtained. Characteristics 336 shown by a broken line show a change in potential difference when the head is sought by −1 cylinder. In this case, a potential difference of −V2 is derived.

The drive processor 30 obtains a change power of the potential difference +V1 when seeking the head by +1 cylinder and the potential difference −V2 when seeking the head by −1 cylinder as (V1+V2). By dividing the change power by two cylinders, the potential difference per one cylinder, namely, the change in position signal is obtained as a cylinder gain.

Figure 46:
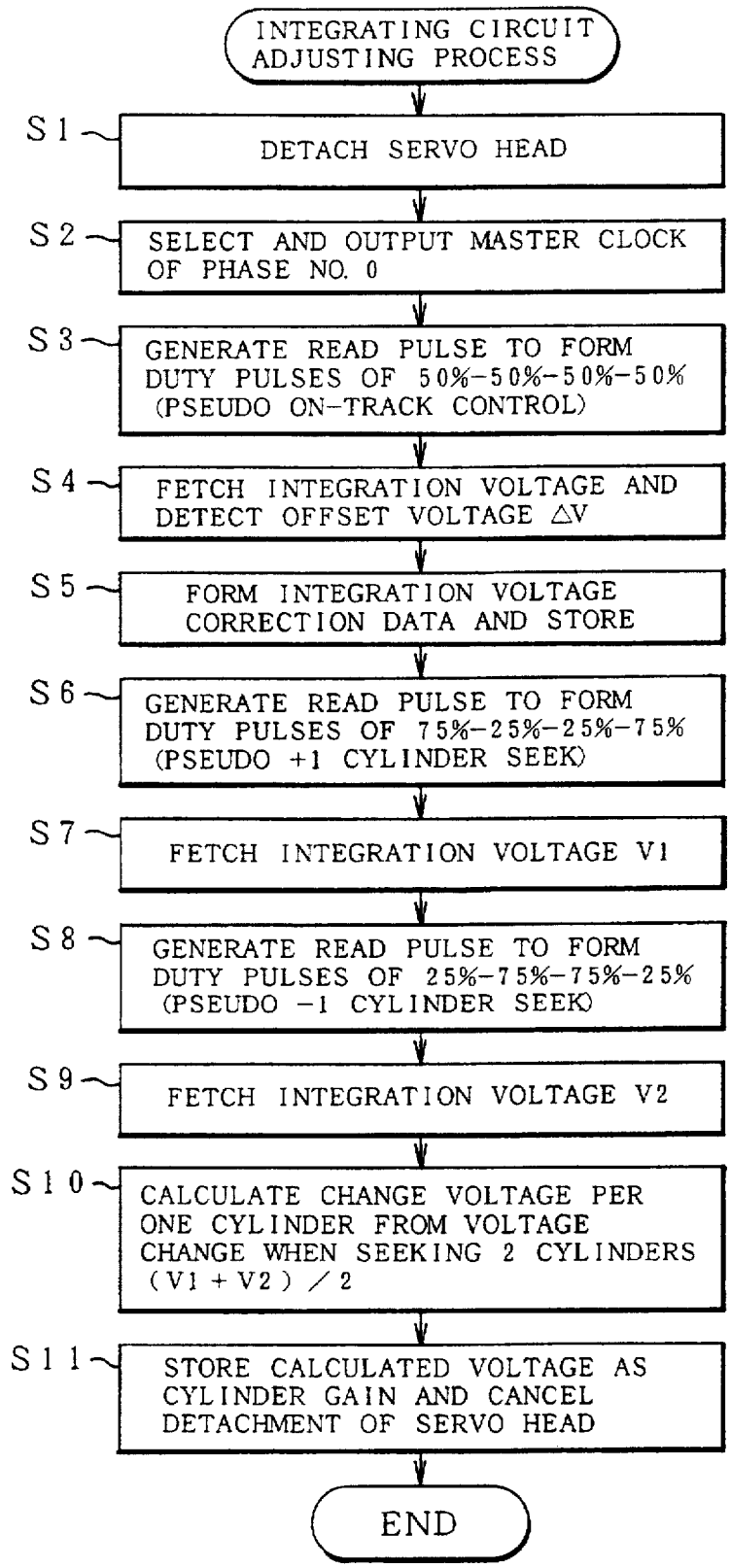
FIG. 46 is a flowchart for the integrating circuit adjusting process of the invention.

A flowchart of FIG. 46 shows an adjusting process of the integrating circuit by the drive processor 30. First, in step S1, the selecting circuit 118 is switched and the servo head 18 is removed, thereby enabling the pseudo read pulse to be supplied from the drive processor 30 to the duty pulse forming circuit 120. In step S2, the master clock of the phase No. 0 is selected by the cylinder switching signal E30 and is generated as a master clock E10 from the master clock forming circuit 110. In step S3, an on-track read pulse for making the duty pulse of a duty ratio 50% in the whole field is generated, thereby producing a pseudo on-track control state. In step S4, the integration voltage derived by the generation of the on-track read pulse is fetched and the offset voltage ΔV is detected. After it was detected, the integration voltage correction data is formed in step S5, thereby enabling such data to be used in the subsequent correcting process. The cylinder gain is measured by the processes in steps S6 to S11. First, in step S6, a read pulse to form the duty pulse for seeking the head by +1 cylinder whose duty ratio changes to 75%, 25%, 25%, and 75% is generated, thereby producing a pseudo +1 cylinder seeking state. In step S7, an integrating voltage V1 at that time is fetched. In step S8, a read pulse to form the duty pulse of the duty ratio changes to 25%, 75%, 75%, and 25% is generated, thereby falsely producing the −1 cylinder seeking state. In step S9, an integrating voltage V2 at that time is fetched. In step S10, a change voltage per one cylinder is calculated as (V1+V2)/2 from the voltage change, namely, (V1+V2) when the head is sought by two cylinders. In final step S11, the calculated voltage is stored as a cylinder gain and the removal of the servo head is cancelled. Such an adjusting process of the integrating circuit is also executed at the time of the initializing process in association with the power-on-start of the disk apparatus as shown in step S5 in FIG. 9.

[Position prediction including acceleration component]

In the seek control in the disk apparatus of the invention using the phase servo information, a track crossing pulse is not used as in the conventional disk apparatus using a two-phase phase servo pattern. Therefore, in the speed control, with respect to the calculation of the number of remaining cylinders up to the target cylinder to obtain the target speed, the next head moving position is predicted at every sampling period of the position detection. The number of remaining cylinders up to the target cylinder is obtained from the predicted head moving position and the target speed is obtained from the target speed pattern corresponding to the number of remaining cylinders, thereby performing the speed control. As for such a prediction of the head position in the speed control during the seeking operation, only the speed prediction is executed in the conventional disk apparatus.

Figure 47:
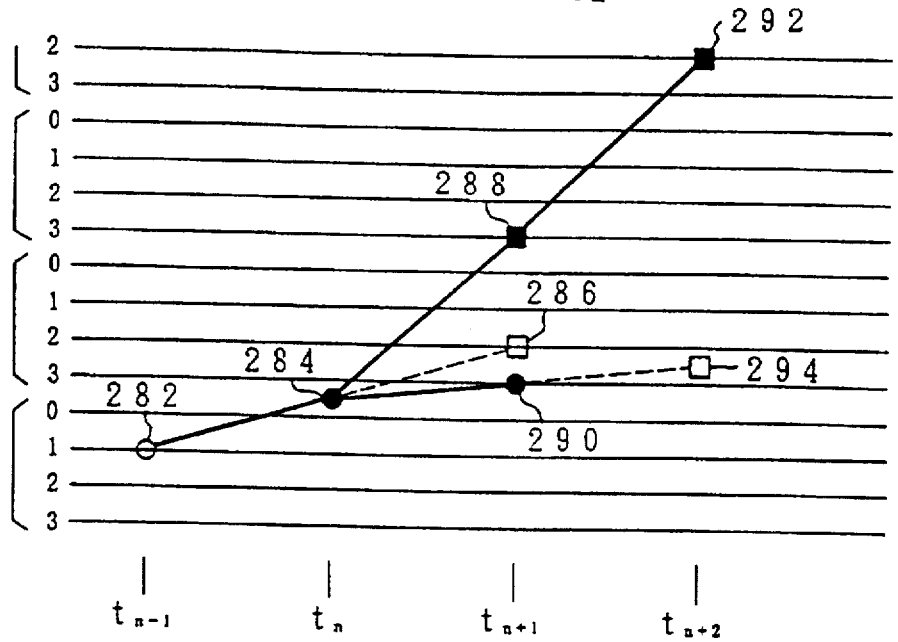
FIG. 47 is an explanatory diagram of the position prediction by only a speed component.

FIG. 47 shows the conventional prediction of the head moving position by only the speed component. It is now assumed that the head is located at a position 284 at a sampling timing $t_n$. It is also assumed that the head is located at a position 282 at a preceding sampling time point $t_{n-1}$. In this case, the head moving speed is obtained from the present and preceding head positions 284 and 282, thereby predicting a head position 286 at a next sampling time point $t_{n+1}$. When the predictive position 286 is decided, the number of remaining cylinders up to the target cylinder is obtained. Therefore, the corresponding target speed is obtained from the number of remaining cylinders with reference to the target speed pattern and is set into the speed control section, thereby executing the speed control. At the same time, since the phase servo information is repeated every four cylinders of the cylinder Nos. 0 to 3, the cylinder No. 2 corresponding to the predictive position 286 is obtained. There is performed a cylinder switching to select the master clock that is used in the position detection based on the phase servo pattern at the next sampling time point $t_{n+1}$.

In the head speed control during the seeking operation, however, the target speed pattern indicates the acceleration, constant speed, and deceleration. At the times of the acceleration and deceleration, the pattern has an acceleration component whose detecting speed changes at each sampling time point. For example, during the acceleration, it is assumed that the actual head position is located at a position 288 for the predictive position 286 at the sampling time point $t_{n+1}$. The actual moving position 288 exceeds the present position 284 by four cylinders. Therefore, at the sampling time point $t_{n+1}$, even at the actual head position 288, the head position can be recognized only in a range of ±2 cylinders from the predictive position 286 as a center, so that it is judged that the head was moved to the same position 290 of the cylinder No. 3 as the actual position 288 one cylinder before the predictive position 286. Therefore, the predictive position at the next sampling time point $t_{n+2}$ of the sampling time point $t_{n+1}$ is set to a position 294 and is largely deviated from an actual head moving position 292. At this time point, the head position cannot be known and a seek error occurs. Therefore, the present invention is characterized in that in addition to the speed component, the acceleration component is fetched to the prediction of the next head position at every sampling time point.

Figure 48:
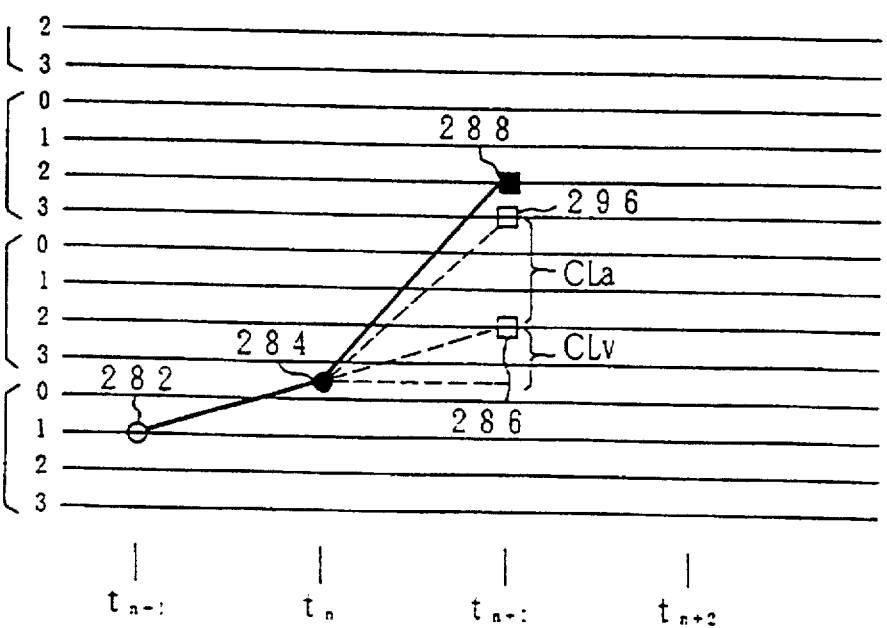
FIG. 48 is an explanatory diagram of the position prediction including an acceleration component of the invention.

FIG. 48 shows the prediction of the head position in the disk apparatus of the invention in which the acceleration component is added as well as the speed component. The sampling time points $t_{n-1}$ and $t_n$ are located at the same positions as those shown in FIG. 39. Now, assuming that the head is located at the position 284 at the sampling time point $t_n$, by subtracting the preceding head position 282 from the present head position 284, the number of cylinders indicative of the head speed at the sampling period is obtained. That is, the head moving speed is defined as the number of cylinders traversed per sampling period in the position detection. The predictive position by only the speed component at the next sampling time point $t_{n+1}$ is located at the position 286 in a manner similar to FIG. 47. That is, the number CLv of cylinders indicative of the head movement amount at the next sampling time point $t_{n+1}$ can be obtained by the speed component. Further, in the invention, the number CLa of cylinders indicative of the head movement amount by the acceleration at the next sampling time point $t_{n+1}$ is calculated from the acceleration component at the present sampling time point $t_n$. The number CLa of cylinders indicative of the head movement amount by the acceleration component is calculated, for example, on the basis of the drive current that is supplied to the VCM 16 which is driving the head. Specifically speaking, the number CLa of cylinders indicative of the head movement amount by the acceleration speed component is obtained by $$CLa = (VCM\ instructed\ current\ value) \times (acceleration\ correction\ coefficient)$$

The acceleration correction coefficient gives the number of moving cylinders at the sampling period per unit instructed current and can be experimentally determined.

Figure 49:
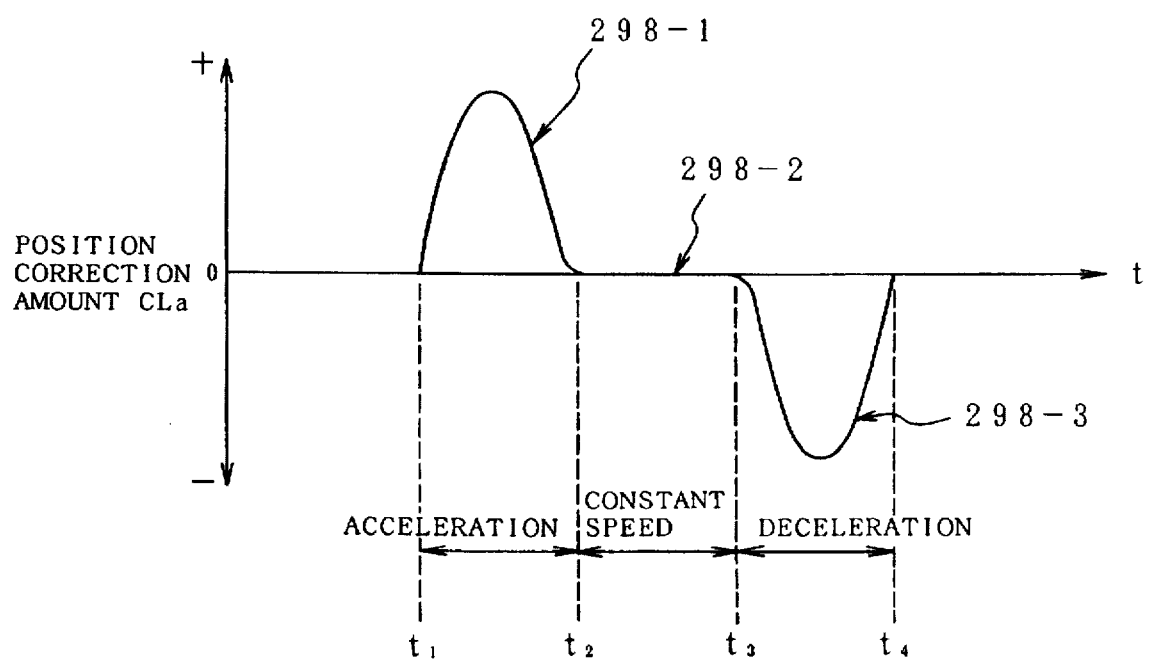
FIG. 49 is a timing chart for the predicting process of an acceleration component using a VCM drive current of the invention.

FIG. 49 shows a change during the speed control of the position correction amount CLa due to the acceleration component obtained by multiplying the acceleration correction coefficient to the VCM instructed current value. That is, the period between times t1 to t2 corresponds to the acceleration period. As shown by characteristics 298-1, the position correction amount CLa due to the acceleration changes in the plus direction. An interval shown by characteristics 298-2 for a period between times t2 to t3 is a constant speed interval. The position correction amount CLa due to the acceleration component is almost equal to 0. Further, an interval shown by characteristics 298-3 for a period between times t3 and t4 is a deceleration interval. The position correction amount CLa due to the deceleration and acceleration components has a minus value. Thus, as shown at the sampling time point $t_{n+1}$ in FIG. 48, the head position 296 can be predicted. A cylinder range in which the position can be detected for the actual head position 288 can be correctly predicted. At the next sampling time point $t_{n+1}$, since the actual position 288 is obviously deviated from the predictive position 296, the predictive position 296 is changed to the actual head position 288 and the position at the next sampling time point $t_{n+1}$ is predicted.

Figure 50:
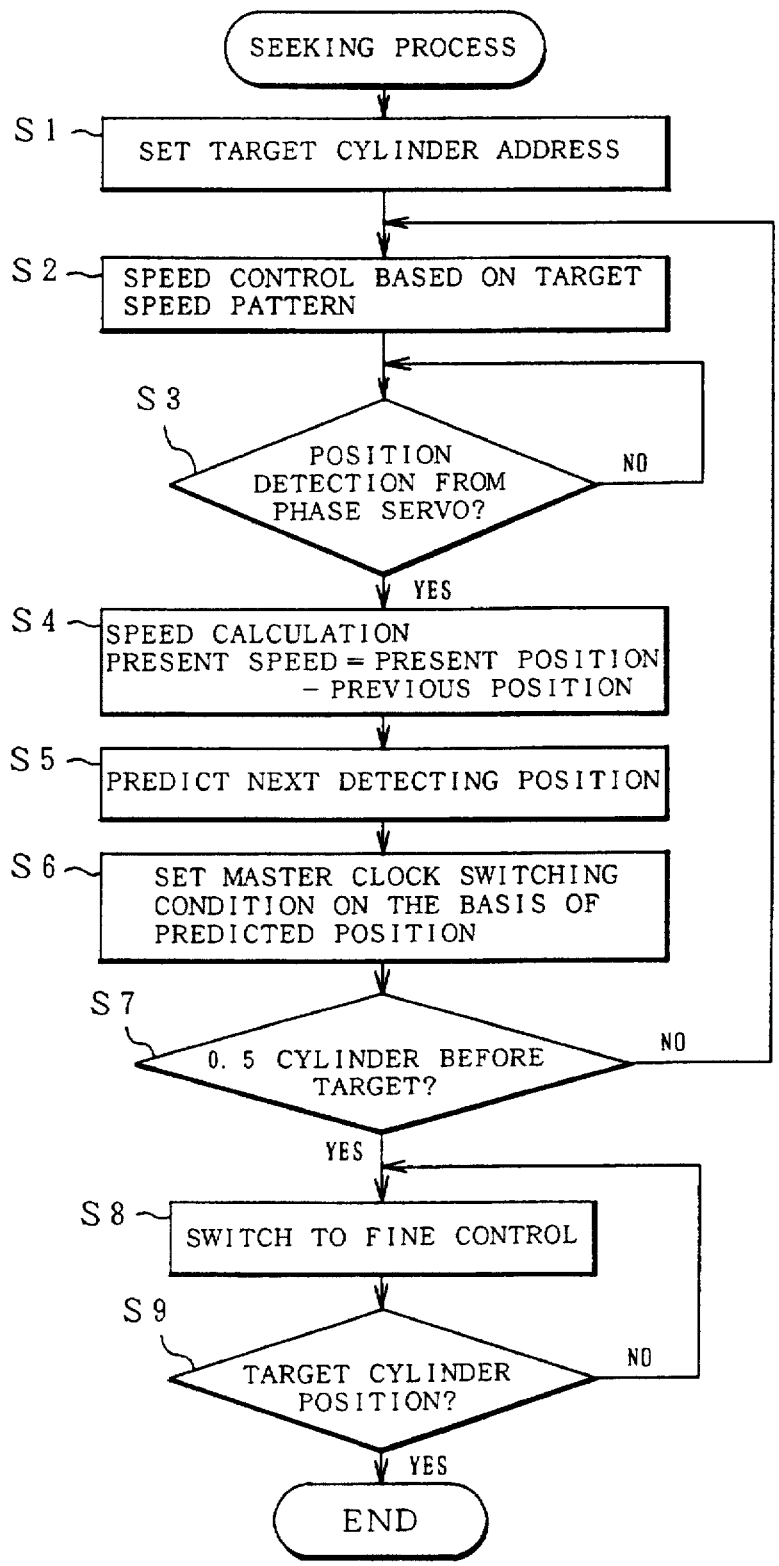
FIG. 50 is a flowchart for the seeking process in the disk apparatus of the invention.

A flowchart of FIG. 50 shows the seek control in the disk apparatus of the invention for performing the position prediction including the acceleration. First, in step S1, the target cylinder address is set. In step S2, the speed control (coarse control) based on the target speed pattern is started. In step S3, the presence or absence of the position detection based on the phase servo pattern is checked. The position is detected at a sampling period. When the position can be detected, in step S4, the head moving speed is obtained by subtracting the preceding position from the present position. In step S5, the detection position of the next head moving position is predicted. The predicting process is executed while including the speed component and the acceleration component. In step S6, the cylinder No. of the target cylinder is recognized on the basis of the predictive position and the switching conditions of the master clock are set. In step S7, a check is made to see if the number of remaining cylinders is less than 0.5 cylinder or not. The processes in steps S2 to S7 are repeated until the head reaches a position before the target cylinder by 0.5 cylinder. When it is judged that the head was moved to the position that is 0.5 cylinder before the target cylinder, step S8 follows and the control mode is switched from the speed control so far to the fine control to pull in the head to the head position indicative of the target cylinder. When the control mode is switched to the fine control, in step S9, a check is made to see if the target cylinder position lies within a range of an on-track slice value that has been predetermined for the target cylinder or not. If YES, by raising the on-track signal to the high level, the target cylinder position is recognized and a series of seeking processes are finished.

Figure 51:
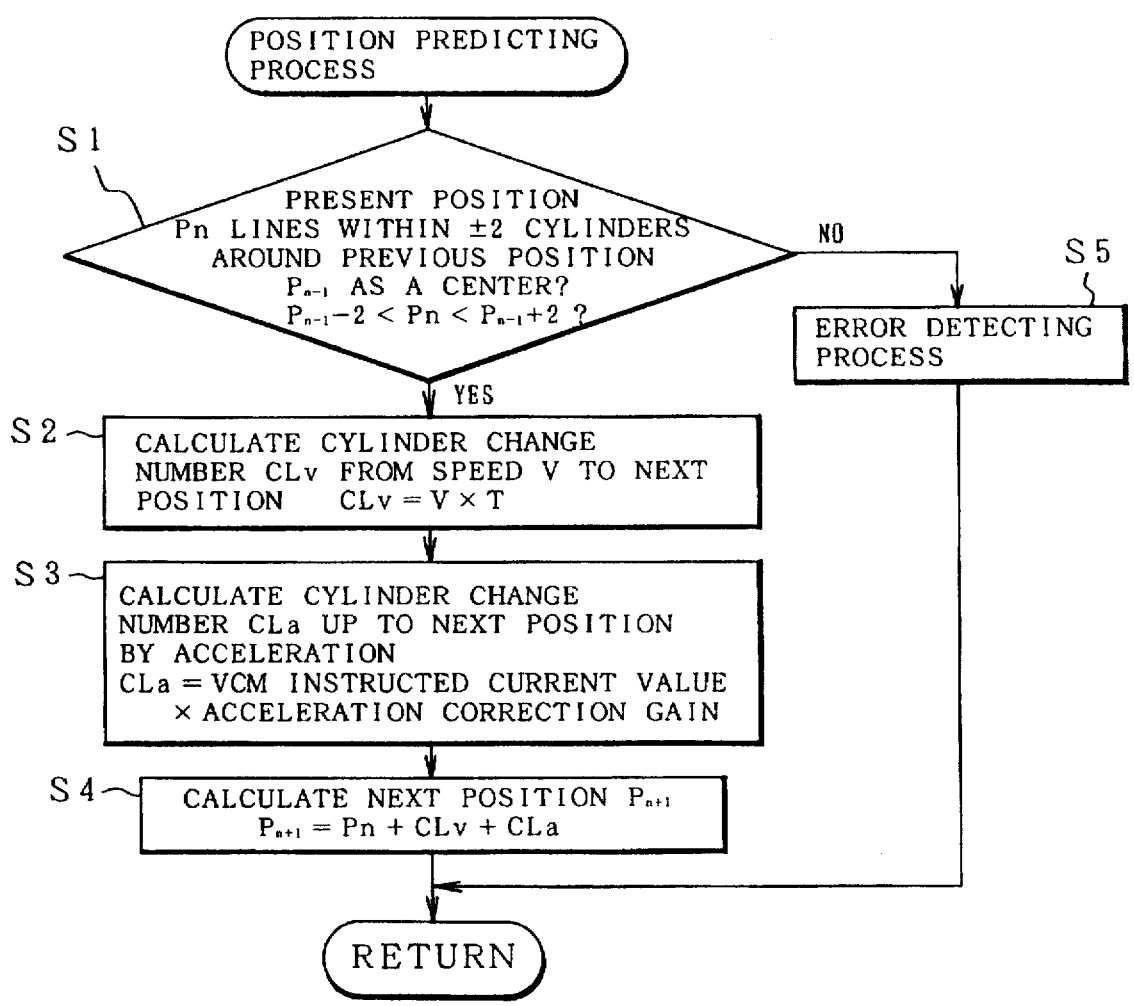
FIG. 51 is a flowchart for a position predicting subroutine of the invention.

A flowchart of FIG. 51 shows the details of the position prediction shown in step S5 in FIG. 50. In the position prediction of FIG. 43, a case where the highest speed of the head moving speed lies within a range of ±2 cylinders at every sampling period is shown as an example. First, in step S1, a check is made to see if the present position $P_n$ lies within ±2 cylinders around the preceding position $P_{n-1}$ as a center or not. If it exceeds the range of ±2 cylinders, this means that a run-away of the head occurred. Therefore, the processing routine advances to step S5 and an error detecting process is executed. If it lies within the range of ±2 cylinders, step S2 follows and the cylinder change number CLv up to the next detecting position is calculated from a head moving speed V that has already been obtained. In step S3, the cylinder change number CLa up to the next detecting position due to the acceleration is calculated. In final step S4, the cylinder change number CLv based on the speed and the cylinder change number CLa based on the acceleration are added to the present position $P_n$, thereby obtaining the next position $P_{n+1}$.

[Cylinder switching by seeking speed]

In the disk apparatus of the invention in which the head position is detected by using the phase servo pattern, the phase servo pattern has repetitively recorded every four cylinders. Therefore, in the phase servo region comprising the first to fourth fields (EVEN1, ODD1, ODD2, EVEN2), the position detection can be performed only at a head moving speed which doesn't exceed a range of ±2 cylinders around the target cylinder to be used for position detection as a center. Therefore, the head cannot be moved at a speed such that the passing speed of the phase servo region exceeds four cylinders. The seeking operation cannot be performed at a high speed.

Figure 52:
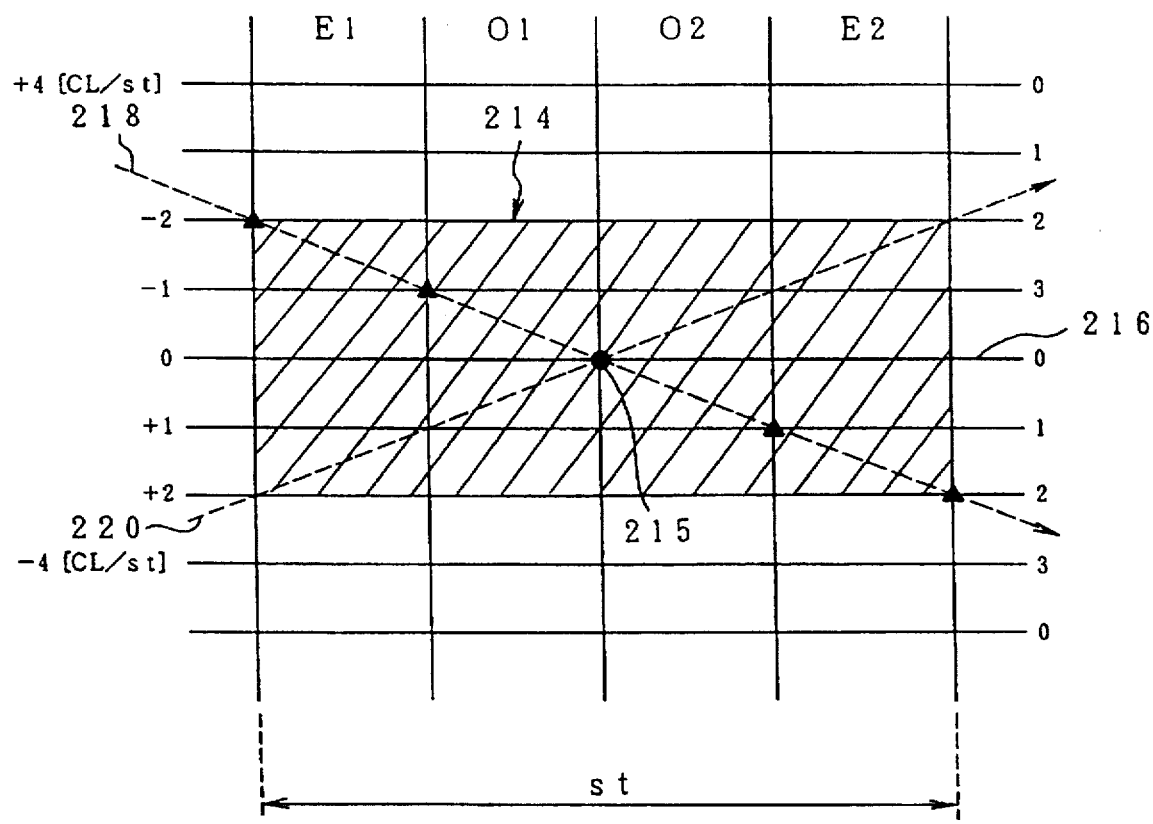
FIG. 52 is an explanatory diagram of a head moving speed having a speed range from +4 cylinders to −4 cylinders.

FIG. 52 shows a state of the head movement in the case where the passing speed of the phase servo region is limited to ±4 cylinders. The head moving speed in this case is equal to the value obtained by dividing the number of passing cylinders of the head when it is seen in the radial direction by a passing time width st of the servo region when it is seen in the circumferential direction and can be expressed by a unit of, for example, +4[CL/st]. In the following description, the head passing speed is merely expressed by the number of cylinders. A cylinder position 215 at which the head passes through a boundary point of the second and third fields ODD1 and ODD2 is detected from the phase servo pattern. Therefore, now assuming that the detected position 215 is located at the cylinder No. 0, the head position can be accurately detected so long as the passing speed is a passing speed of the phase servo region which doesn't exceed the hatched region 214 within a range of ±2 cylinders around the position of the cylinder No. 0 as a center. The cylinder on which the detected point 215 to be used for position detection of the head is defined as a center cylinder hereinbelow.

In case of FIG. 52, in the forward seek to the inner side in which the cylinder address increases in the plus direction, as shown in a head movement locus 218, the head movement passing the phase servo region 214 of four cylinders from the left upper corner to the right lower corner corresponds to +4 cylinders of the highest speed. On the contrary, with respect to the reverse seek in the minus direction, namely, outer direction in which the cylinder address decreases, as shown in a speed locus 220, the head movement passing through the phase servo region 214 of four cylinders from the right upper corner to the left lower corner corresponds to −4 cylinders of the highest seeking speed. Therefore, so long as the seeking speed lies within a range from +4 cylinders to −4 cylinders, the position detection of the position 215 can be also performed during the seeking operation in a manner similar to the on-track operation to the center cylinder 216. The position detection of the center cylinder 216 during the seeking operation is executed as a result of the position prediction shown in FIG. 51. The master clock phase No. for the cylinder No. indicative of the target cylinder in this case is as shown in a table of FIG. 53. That is, even during the seeking operation, the cylinder switching for selecting the master clock corresponding to the cylinder No. is executed in a manner similar to the case of the on-track state.

Figures 53, 54:
FIG. 53 is an explanatory diagram of the relation between the cylinder number which is used for switching cylinders and the master clock phase number.
FIG. 54 is an explanatory diagram of combinations of the master clock phase numbers which are used in the respective fields in FIG. 52.

FIG. 54 shows the master clock phase Nos. 0, 2, C and E in respective fields EVEN1, ODD1, ODD2, and EVEN2 of the phase servo region when the head moving speed lies within ±4 cylinders as shown in FIG. 52. In a manner similar to the case of the on-track state, the same master clock is used in all of the fields. For the disk apparatus in which the head moving speed is limited to a value within the range of ±4 cylinders around the center cylinder to be used for head position detection during the seeking operation as a center as mentioned above, according to the invention, the head passing position of the center cylinder can be detected even at a head moving speed exceeding ±4 cylinders.

Figure 55:
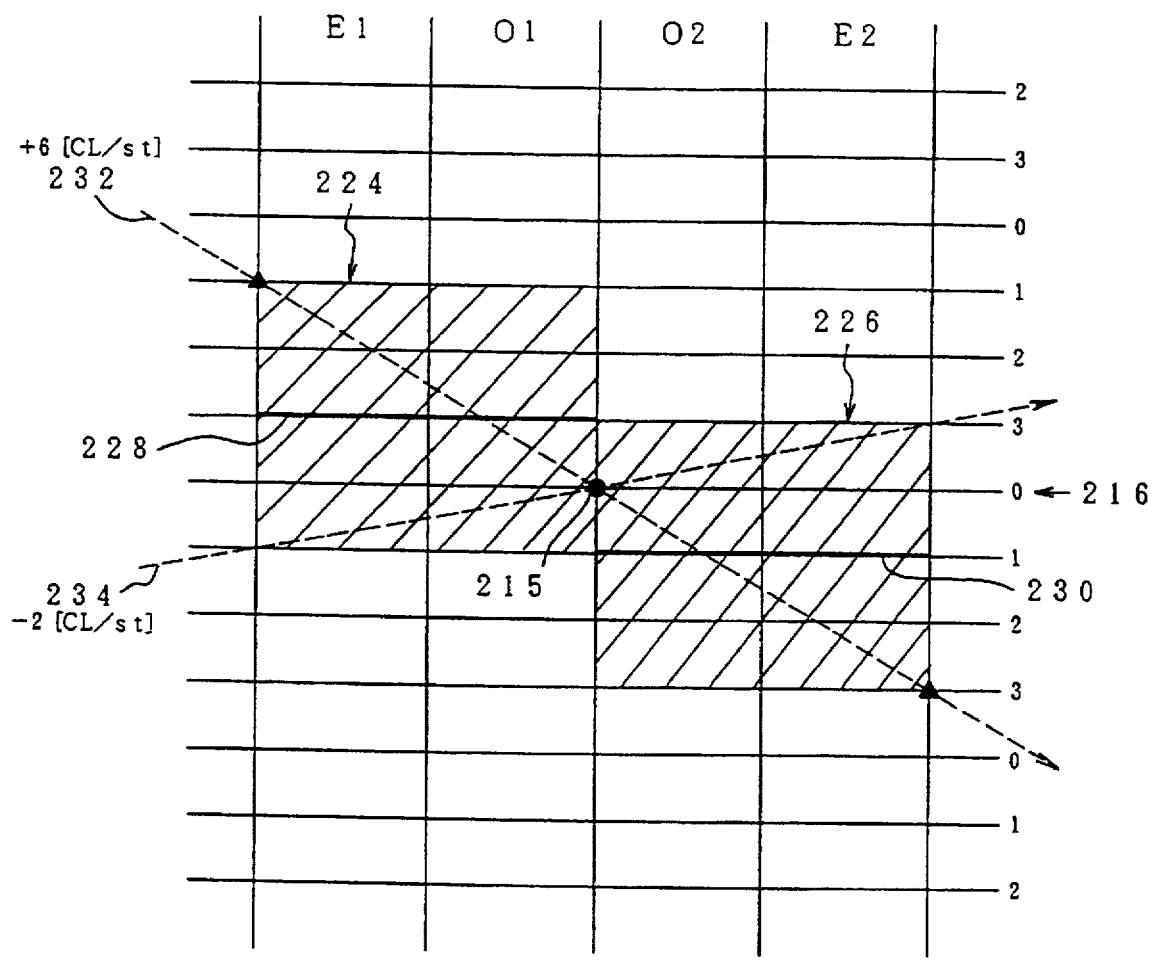
FIG. 55 is an explanatory diagram of the head moving speed having a speed range from +6 cylinders to −2 cylinders.

FIG. 55 shows the cylinder switching in the case where the highest speed of the head moving speed in the forward direction is set to +6 cylinders. That is, in the conventional disk apparatus, the same master clock is used for all of four fields constructing one phase servo region. However, according to such a method, the seeking speed is limited to ±4 cylinders. Therefore, the invention is characterized in that the cylinder is switched in the field of the phase servo region.

FIG. 55 shows the cylinder switching of two stages in which the master clock is switched to two stages in the phase servo region separately for the former half two fields and the latter half two fields. That is, a first center cylinder 228 and a second center cylinder 230 which are deviated by ±1 cylinder for the center cylinder 216 of the detecting position 215 to be used for head position detection are set. With respect to the first field (EVEN1) and second field (ODD1), the cylinder switching of the master clock corresponding to the first center cylinder 228 is executed. As for the latter half third field (ODD2) and fourth field (EVEN2), the cylinder switching of the master clock corresponding to the second center cylinder 230 is executed. Due to this, with respect to the forward seek in which the cylinder address increases, the head movement in which +6 cylinders is set to the highest speed as shown in a speed locus 232 can be realized. On the other hand, with regard to the seek in the reverse direction in which the cylinder address decreases, the speed locus passing through the head detecting position 215 is limited to a range of ±1 cylinder as shown in a speed locus 235 and the highest speed is set to −2 cylinders.

FIG. 56 shows the relation between the master clock phase No. at the time of the forward seek for the center cylinder 216 having the head detecting position 215 in case of enabling the seeking speed in a range from +6 cylinders to −2 cylinders in FIG. 55 to be realized and the master clock phase No. at the time of the reverse seek. The cylinder switching is performed at two stages so as to obtain the master clocks of the phase Nos. which are different for the former half first and second fields (EVEN1, ODD1) and the latter half third and fourth fields (ODD2, EVEN2). For example, in the FWD of the master cylinder No. 0, the phase Nos. in the first and second fields (EVEN1, ODD1) are both 2 and the phase Nos. in the third and fourth fields (ODD2, EVEN2) are both E.

Figure 57:
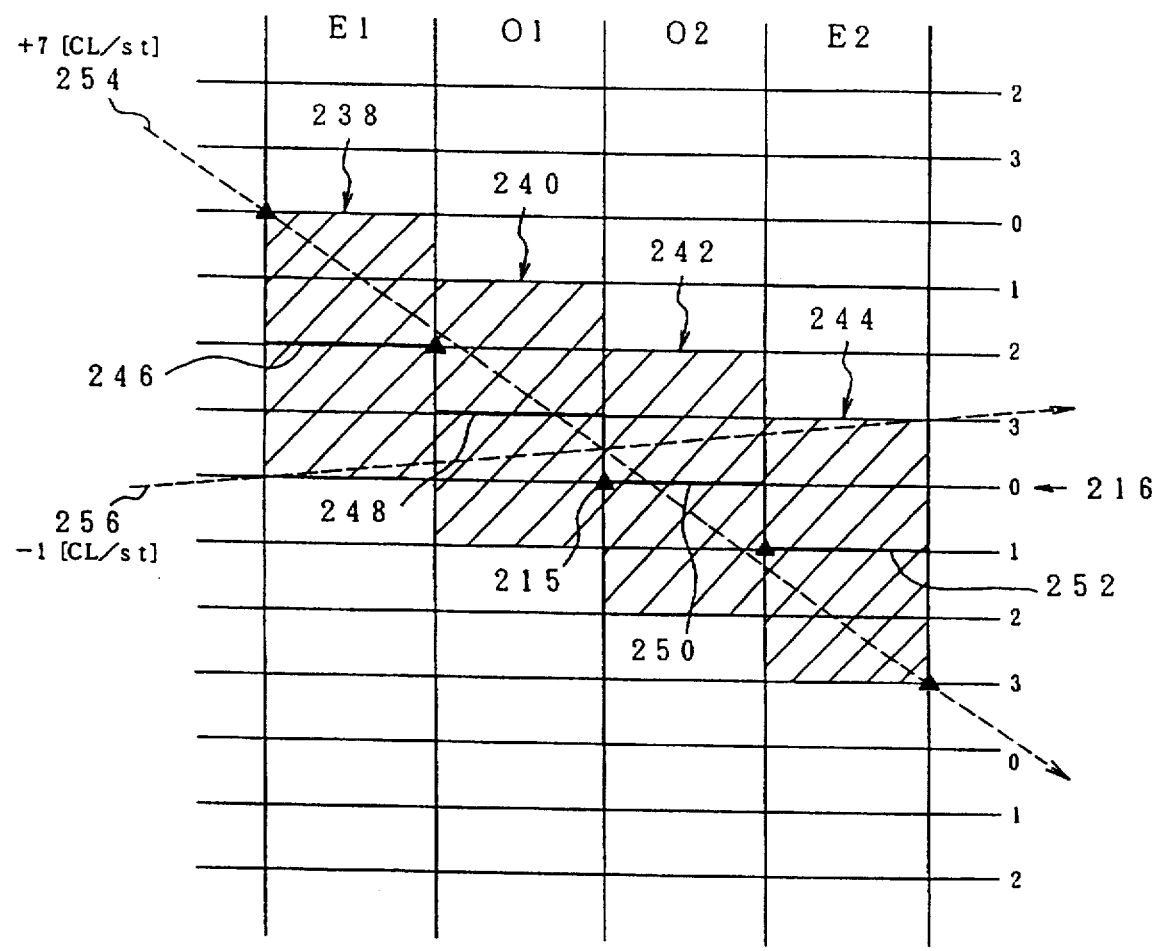
FIG. 57 is an explanatory diagram of the head moving speed having a speed range from +7 cylinders to −1 cylinder.

FIG. 57 shows the cylinder switching in case of setting the highest speed in the forward direction into +7 cylinders. In this case, the cylinder switching is executed step by step every field of the first to fourth fields. That is, a first center cylinder 246, a second center cylinder 248, a third center cylinder 250, and a fourth center cylinder 252 are set so as to be sequentially deviated by one cylinder at a time in accordance with the order from the first field to the fourth field for the center cylinder 216 having the detecting position 215. The third center cylinder 250 is the same as the center cylinder 216. Due to this, regions 238, 240, 242, and 244 of ±2 cylinders are set with regard to the center cylinders 246, 248, 250, and 252, respectively. The highest seeking speed in the forward direction in which the cylinder address increases in this instance is set to +7 cylinders as shown in a speed locus 254. On the other hand, the highest seeking speed is limited to −1 cylinder with respect to the reverse seek in the minus direction in which the cylinder address decreases.

FIG. 58 shows the correspondence relation between the master clock phase Nos. 0, 2, C and E in each field in the cylinder switching of FIG. 57 and the cylinder Nos. 0, 1, 2 and 3 of the center cylinder having the head detecting position 215. In any of the cases, the cylinder switching in which the phase Nos. of the master clocks which differ step by step in the first to fourth fields is executed.

Figure 59:
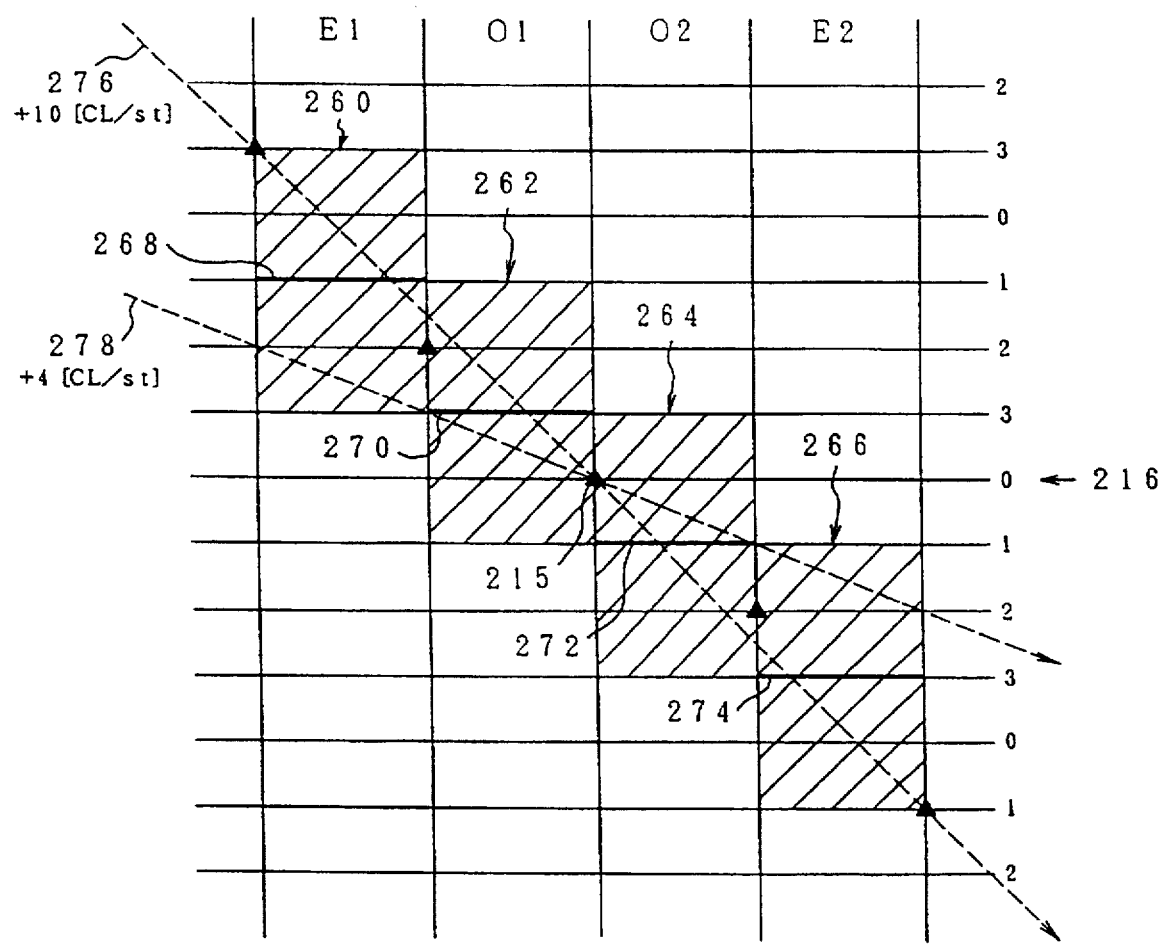
FIG. 59 is an explanatory diagram of the head moving speed having a speed range from +10 cylinders to +4 cylinders.

FIG. 59 shows the cylinder switching in case of setting the highest speed in the forward direction to +10 cylinders. According to the cylinder switching, the cylinder switching is executed every field in a manner similar to FIG. 57. In case of FIG. 57, the cylinder switching for each field has been performed every other cylinders. However, in FIG. 59, the cylinder switching is performed every two cylinders. That is, a first center cylinder 268, a second center cylinder 270, a third center cylinder 272, and a fourth center cylinder 274 are set so as to have an interval of two cylinders around the center cylinder 216 having the head detecting position 215 as a center. Regions 260, 262, 264, and 266 as a range of ±2 cylinders are set for the center cylinders 268, 270, 272, and 274, respectively. Therefore, the highest speed in the forward direction is set to +10 cylinders as shown in a speed locus 276. On the other hand, the lowest cylinder speed of the forward seek is restricted for the head highest speed and is set to +4 cylinders as shown in a speed locus 278. Therefore, in the cylinder switching of FIG. 59, the head can be moved at a seeking speed in a range from +4 cylinders to 10 cylinders.

Figures 60, 61:
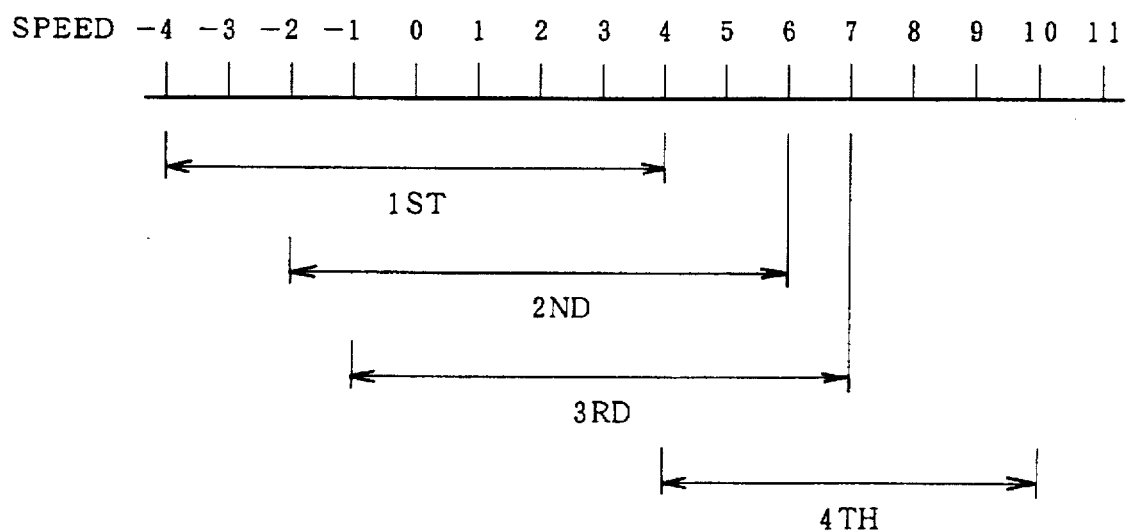
FIG. 60 is an explanatory diagram of combinations of the master clock phase numbers which are used in the respective fields in FIG. 59.
FIG. 61 is an explanatory diagram of variable speed patterns of the seeking speed by FIGS. 52, 55, 57, and 59.

FIG. 60 shows the correspondence relation between the combination of the phase Nos. 0, 2, C and E of the master clocks which are used for cylinder switching in FIG. 59 and the center cylinder Nos. 0, 1, 2 and 3 of the center cylinder 216 to which the head detecting position 215 belongs.

FIG. 61 shows a kind of speed change pattern of the seeking speed in case of setting the cylinder switching in FIG. 52 with respect to the head moving speed to the first speed (1ST), the cylinder switching in FIG. 55 to the second speed (2ND), the cylinder switching in FIG. 57 to the third speed (3RD), and the cylinder switching in FIG. 59 to the fourth speed (4TH). Since the speed change pattern due to the cylinder switching can be realized as mentioned above, by detecting the head moving speed and by performing the cylinder switching in which the necessary speed range is selected, the apparatus can correspond to an arbitrary seeking speed. It will be understood that the above operation is substantially equivalent to a function similar to an automatic transmission used in automobiles.

Figure 62:
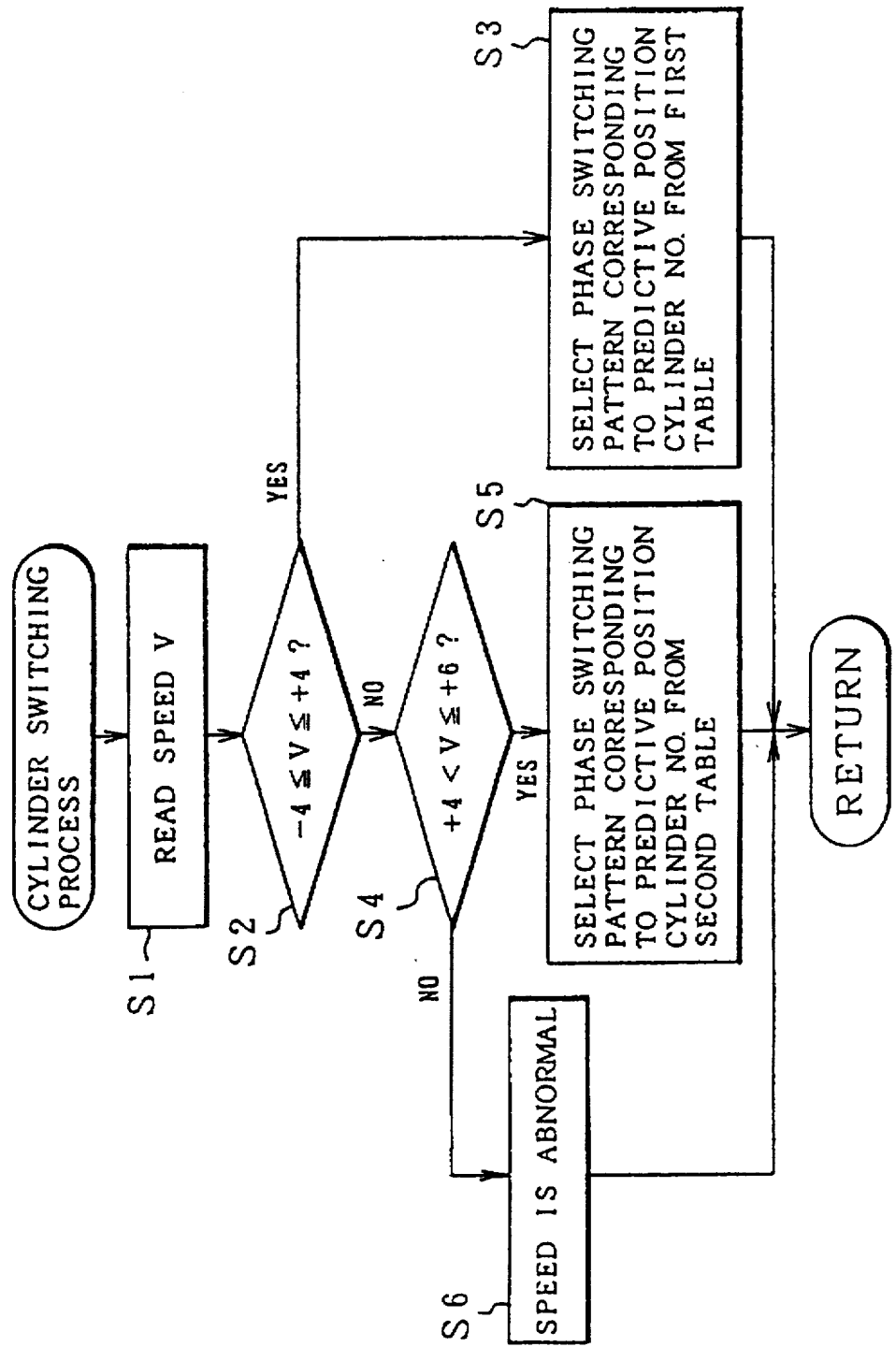
FIG. 62 is a flowchart for the cylinder switching process according to the seeking speed of the invention.

A flowchart of FIG. 62 shows a cylinder switching process using a speed switching of two stages of the first speed (1ST) and second speed (2ND) shown in FIG. 61. First, in step S1, the speed V is read. The speed V is obtained from a difference between the present head position and the preceding head position. In step S2, a check is made to see if the speed V lies within a range of ±4 cylinders or not. If YES, step S3 follows and the master clock phase No. is selected from so called a first speed table shown in FIG. 54 on the basis of the cylinder No. corresponding to the predictive position of the head to be detected next, thereby deciding a phase switching pattern. On the other hand, when the speed V exceeds the range of ±4 cylinders in step S2, step S4 follows and a check is made to see if the speed V lies within a range from −2 cylinders to +6 cylinders or not. If YES, step S5 follows and a phase switching pattern comprising the combination of the corresponding master clock phase Nos. is selected from so called a second speed table in FIG. 56 corresponding to the predicted cylinder number. In FIG. 59, the highest speed is set to +10 cylinders. However, the highest speed can be raised by further widening the cylinder interval of the center cylinder in each field into three or four cylinders.

[Phase servo pattern on data surface]

In the disk apparatus of the invention, even for a specific cylinder of the data surface, a phase servo pattern substantially equivalent to the phase servo pattern on the servo surface is also recorded, thereby enabling the head position to be detected from the read head (MR head) provided for the data head.

Figure 63:
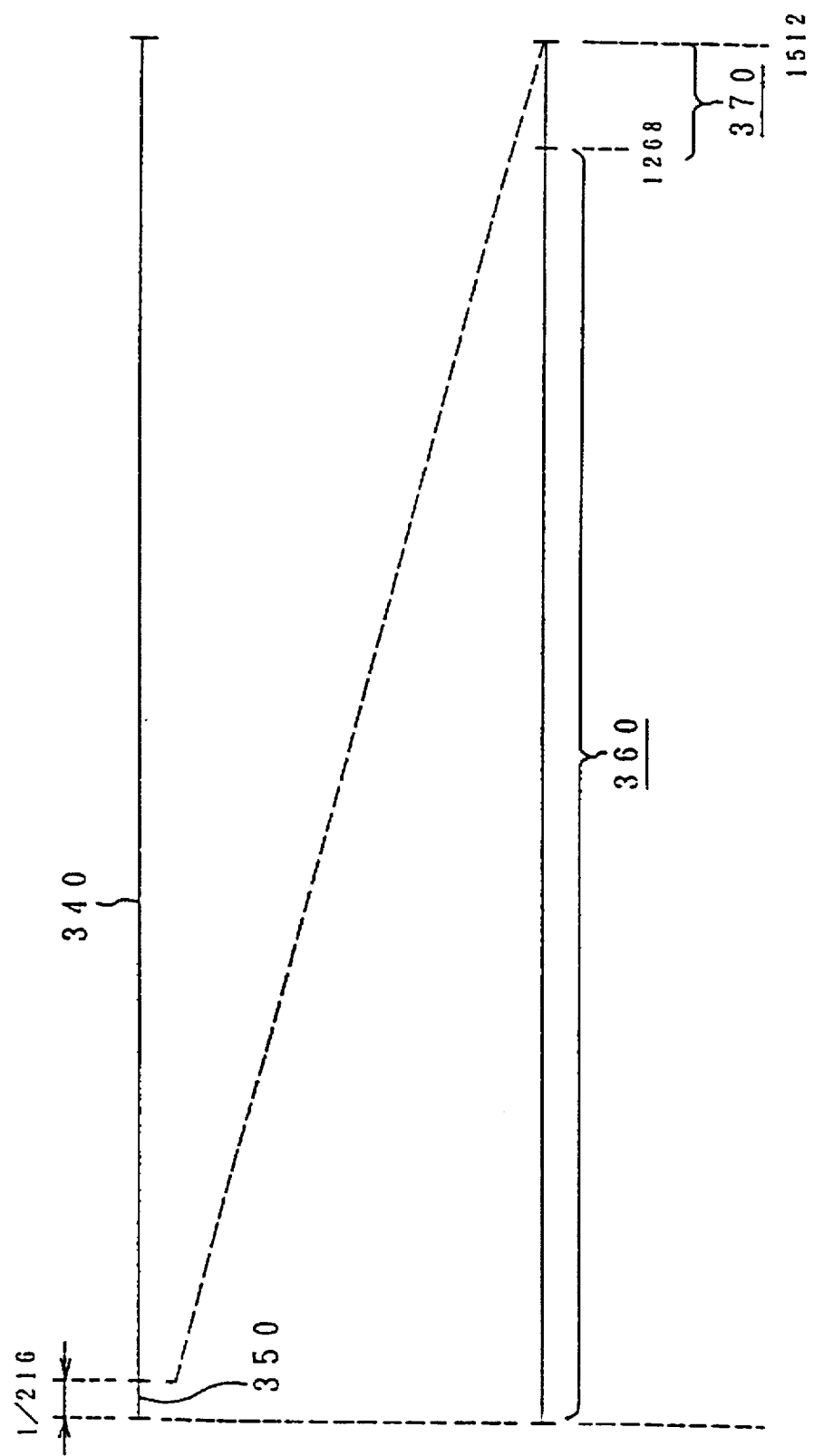
FIG. 63 is an explanatory diagram of a servo frame on a data surface of the invention.

FIG. 63 shows a frame construction of the phase servo pattern written on a specific cylinder of the data surface. A servo region 340 corresponding to one rotation of the disk which is shown by developing to a straight line is provided for, for instance, a specific cylinder in the outer guard band region OGB1 on the data surface and a specific cylinder of the inner guard band region IGB1. The servo region 340 of one rotation is divided into 216 regions and constructs 216 data surface servo frames 350 in a manner similar to the servo surface of FIG. 17. As enlargedly shown, the data surface servo frame 350 is constructed by an unused region 360 and a servo pattern section 370. The servo pattern section 370 has the same size as that of the servo pattern section 164 of the data surface in FIG. 17. Now, assuming that the count value of the reference clocks is set to 0 at the head of the servo frame, the servo pattern section 370 is set to a range of count values 1268 to 1512. A phase servo pattern that is divisionally shown in FIGS. 64 and 65 is recorded in the servo pattern section 370.

Figure 64:
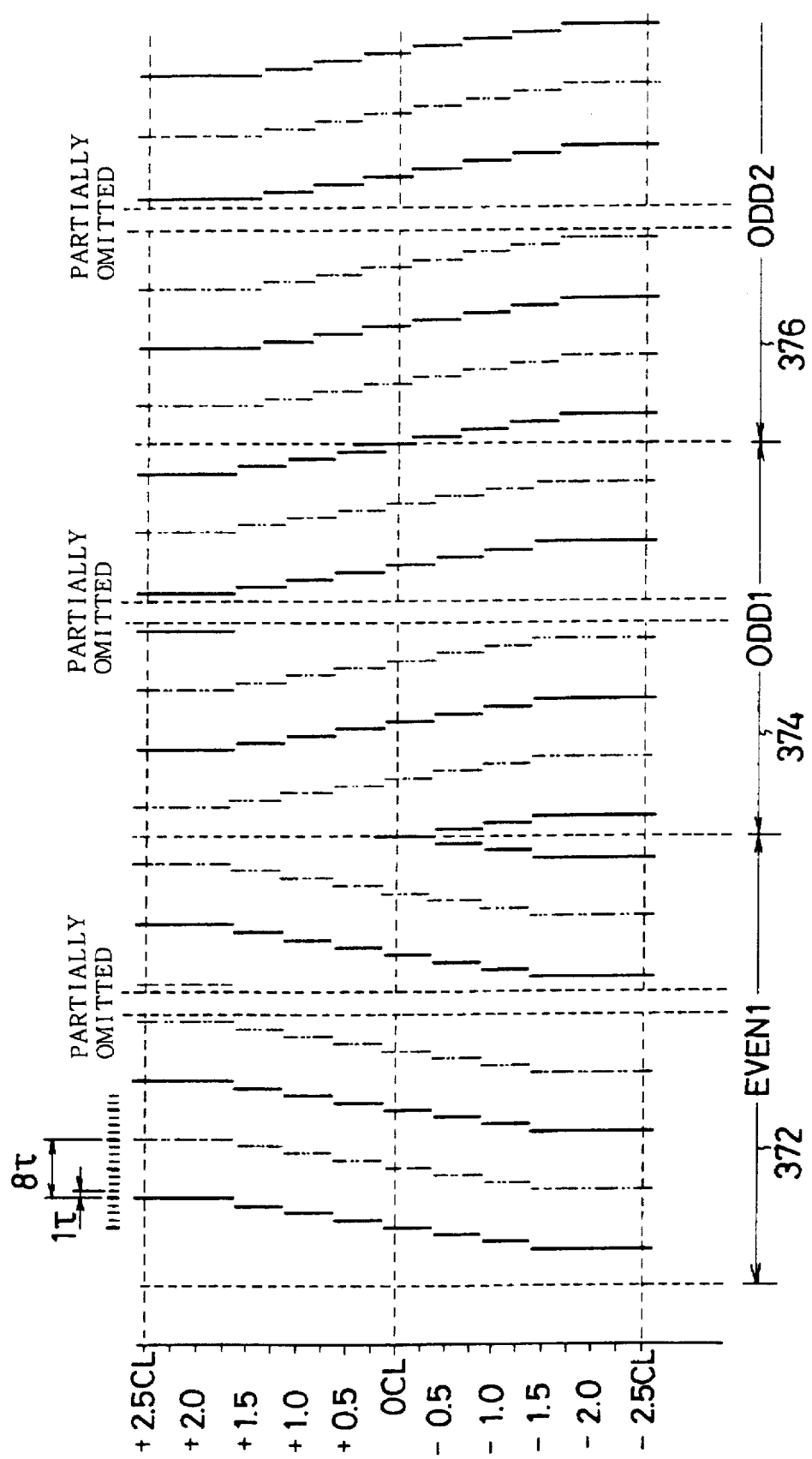
FIG. 64 is an explanatory diagram of magnetic recording patterns in the first to third fields of a servo pattern section in FIG. 63.
Figure 65:
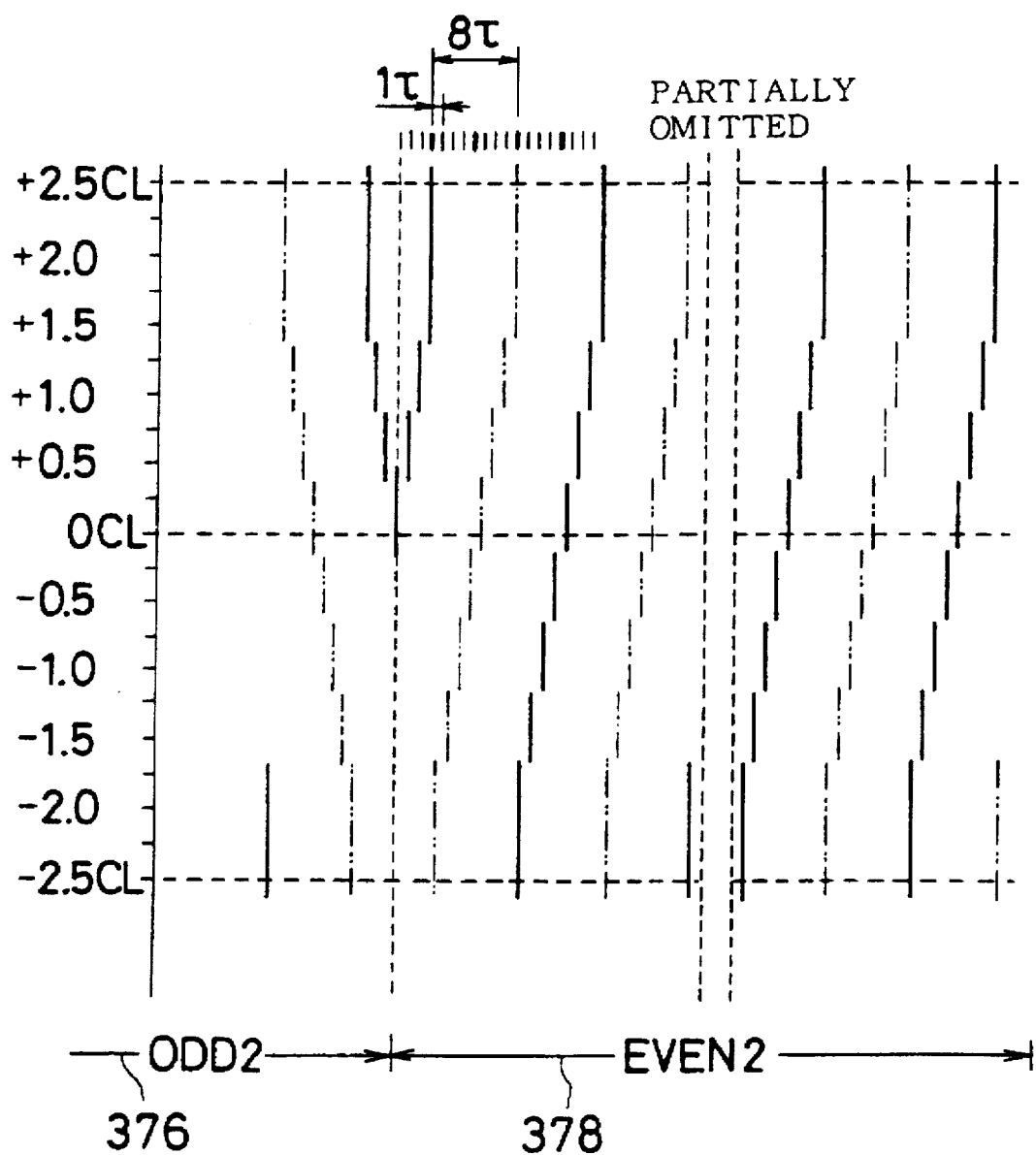
FIG. 65 is an explanatory diagram of magnetic recording patterns in the fourth field of the servo pattern section in FIG. 63.

In FIGS. 64 and 65, the phase servo pattern is divided into a first field 372, a second field 374, a third field 376, and a fourth field 378. As for the first to fourth fields, the first field 372 is called (EVEN1), the second field 374 is called (ODD1), the third field 376 is called (ODD2), and the fourth field 378 is called (EVEN2). Each of the first to fourth fields has a length of 4τ×10 corresponding to four periods of the reference clock excluding the unused region. The first and fourth fields have the same phase servo pattern. The second and third fields also have the same phase servo pattern. Further, the phase of the servo pattern of the first and fourth fields is opposite to the phase of the servo pattern of the second and third fields. This point shall also apply to the phase servo patterns on the servo surface.

Figure 66:
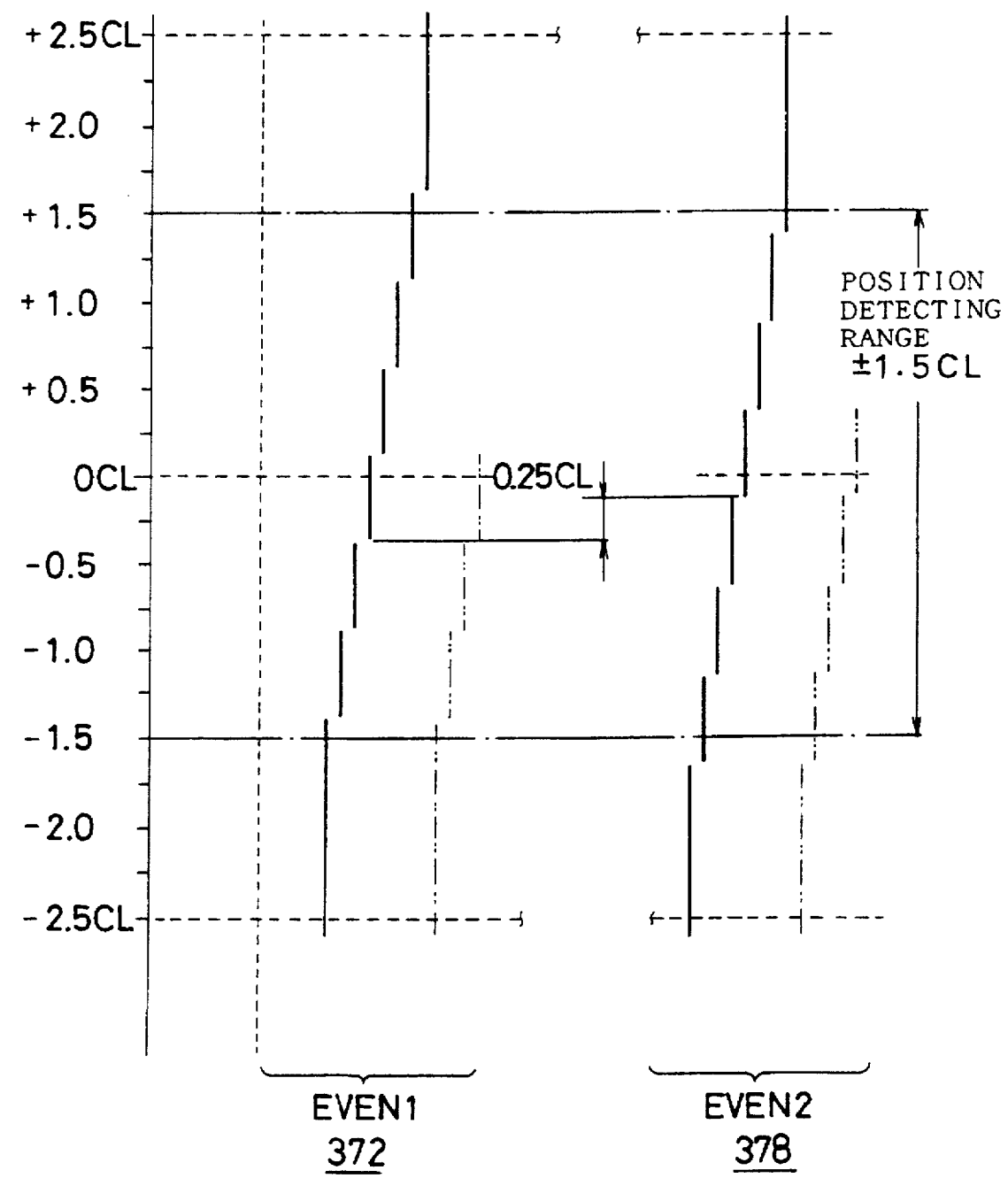
FIG. 66 is an explanatory diagram showing a comparison of the first field in FIG. 64 and the fourth field in FIG. 65.
Figure 67:
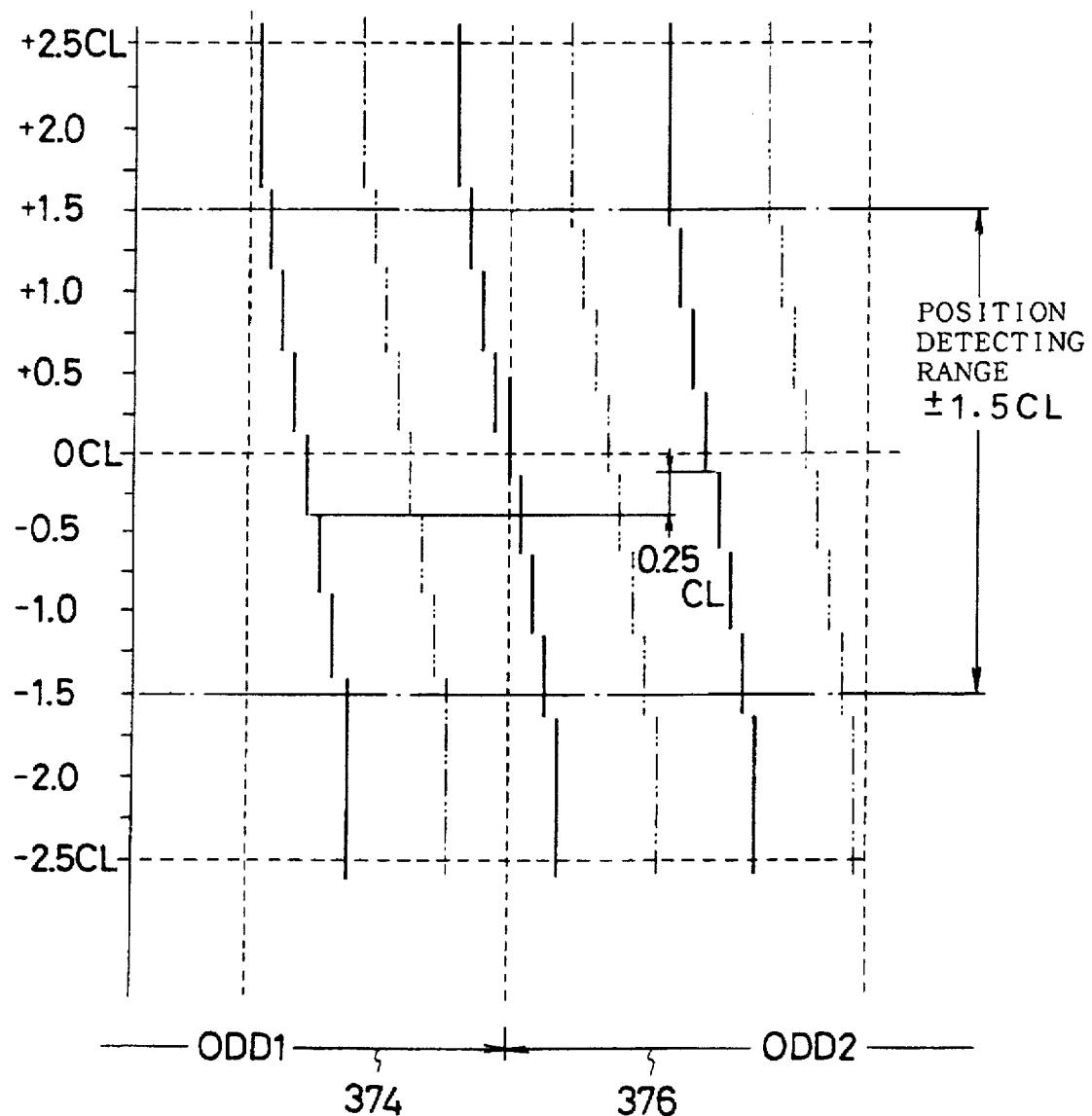
FIG. 67 is an explanatory diagram showing a comparison of the second and third fields in FIG. 64.

The phase servo patterns of the first to fourth fields differ from the phase servo patterns on the servo surface with respect to a point that a positional deviation in the radial direction of 0.25 cylinder exists between the phase patterns of the first field 372 (EVEN1) and fourth field 378 (EVEN2) as shown in FIG. 66. This point shall also apply to the relation between the second field 374 (ODD1) and third field 376 (ODD2) in FIG. 67. Further, as shown in FIGS. 66 and 67, the servo patterns on the data surface are recorded in a range of ±2.5 cylinders around the 0 cylinder as a target cylinder as a center. Moreover, with respect to the region exceeding a range of ±1.5 cylinders, patterns without a phase deviation are recorded so as not to detect the head position. Therefore, as for four cylinders in a head position detectable range on the servo surface, in case of the data surface, the number of cylinders serving as a head position detectable range is limited to three cylinders. The reason why the number of cylinders in a range where the head position can be detected is limited to three cylinders is because, as servo information which is recorded onto the data surface, it is intended to measure an offset in an on-track state in which the head is located at the cylinder of, for example, the cylinder No. 0 as a target cylinder. Therefore, it is sufficient to provide a head detecting range of about ±1.5 cylinders. The error of the head position exceeding such a range is inherently covered by the detection of the head position based on the phase servo information on the servo surface.

The reason why the phase servo patterns of the first and fourth fields in FIG. 66 are deviated by 0.25 cylinder in the radial direction and the phase servo patterns of the second and third fields in FIG. 67 are also deviated by 0.25 cylinder in the radial direction are because a core width of the read head using the MR head provided for the data head 20 is smaller than that of the servo head 18 and it is necessary to prevent that a dead zone occurs in the position detection in case of using the same phase servo pattern as that of the servo head 18. The above relation will now be described hereinbelow.

Figure 68:
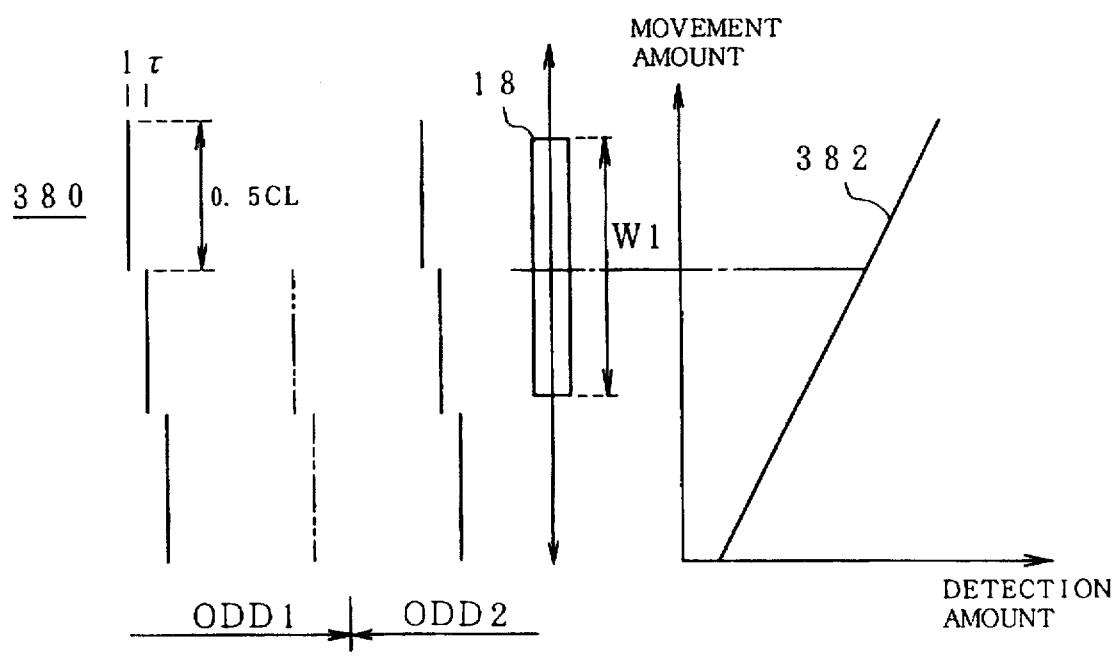
FIG. 68 is an explanatory diagram of a position detection by the servo head on the servo surface.

FIG. 68 shows the relation of the detection amount to the head movement amount when the phase servo pattern on the servo surface is read out by the servo head. A boundary portion between the second and third fields (ODD1 and ODD2) in the servo frame of a servo surface 380 is taken out and a core width W1 of the servo head 18 is equal to a value of about one cylinder. For example, when a track pitch assumes 7.5 μm, the core width W1 of the servo head 18 is equal to 7 μm. For such a core width W1 of the servo head 18, the servo patterns are recorded on the servo surface 380 in the radial direction at a pitch of 0.5 cylinder. Since the servo head 18 always obtains the read signal while existing over two servo patterns, the detection amount linearly changes for the head movement amount as shown in characteristics 382.

Figure 69:
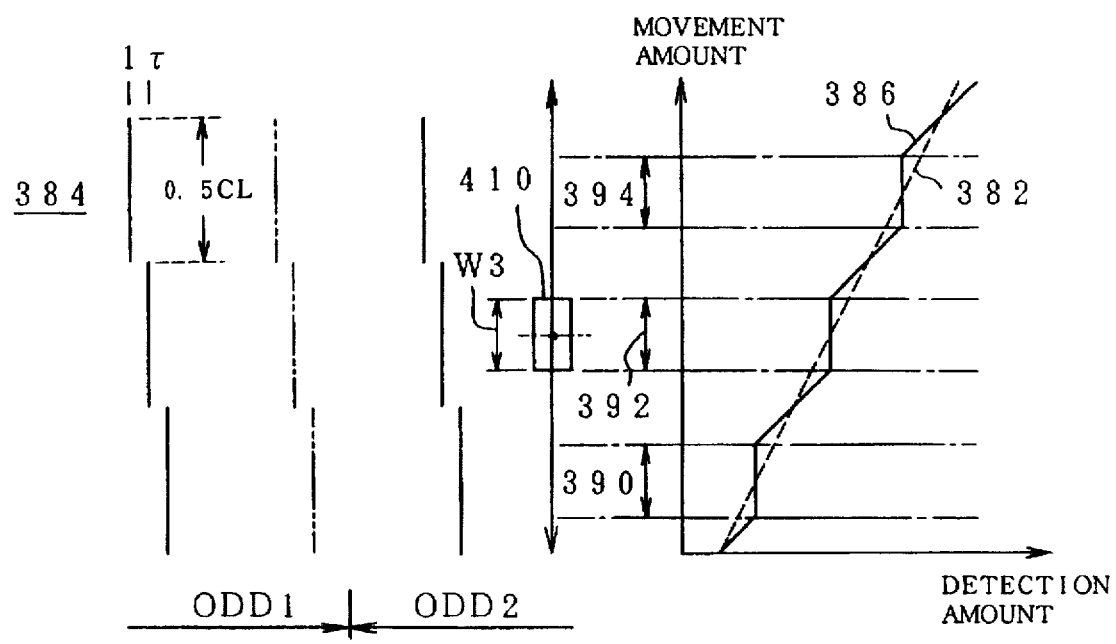
FIG. 69 is an explanatory diagram for explaining a problem in the case where the same pattern as that on the servo surface is recorded onto the data surface and is position detected by a reading head.

FIG. 69 shows the case where the same servo patterns as those on the servo surface 380 in FIG. 68 are recorded on a data surface 384. Since the read head 410 which is used to read out the servo pattern from the data surface 384 uses an MR head, a core width W3 is smaller than that of the servo head 18 and, for example, W3=3 μm, which is smaller than the half of the core width of the servo head 18. Therefore, when the same servo pattern as that on the servo head is read out by the read head 410 having such a small core width W3, the read head 410 reads the servo pattern having a width of 0.5 cylinder and dead zones 390, 392, and 394 in which the detection amount never changes even if the head position changes occur. Therefore, the relation of the detection amount for the head movement amount are as shown in characteristics 386 and the head position cannot be detected in accordance with the inherent characteristics 382 shown by a broken line.

Figure 70:
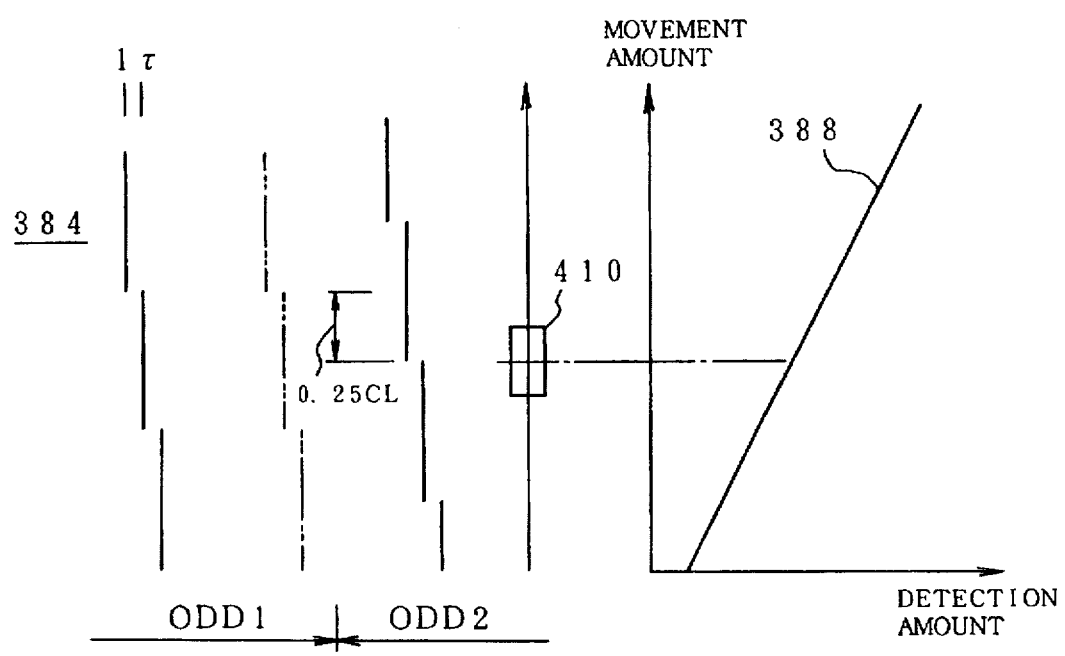
FIG. 70 is an explanatory diagram of the position detection by the servo pattern on the data surface of the invention.

To solve the above problem, according to the invention, as shown in FIG. 70, for example, the phase servo patterns of the second and third fields (ODD1 and ODD2) are recorded so as to be deviated by 0.25 cylinder in the radial direction. Due to this, even in case of using the read head 410 having the small core width W3, a dead zone such that the head continuously enters a special phase servo pattern due to the head movement doesn't occur. In a manner similar to the case of the servo surface, the detection amount for the head movement amount can be obtained as shown by linear characteristics 388. This point shall also apply to the relation between the first and fourth fields (EVEN1 and EVEN2).

As mentioned above, in order to write the phase servo patterns which are deviated by every 0.25 cylinder in the first and fourth fields (EVEN1 and EVEN2) and in the second and third fields (ODD1 and ODD2), 16 kinds of write signals of different phases are needed. That is, since each of the servo patterns in the former half first field 372 (EVEN1) and second field 374 (ODD1) in FIG. 64 has a length of 0.5 cylinder in the radial direction, eight kinds of write signals of different phases which are deviated by every 1τ are needed in a manner similar to the case of the servo surface. Further, with respect to the third field 376 (ODD2) in FIG. 64 and the fourth field 378 (EVEN2) in FIG. 65, since the positions are deviated by only 0.25 cylinder in the radial direction, eight kinds of write signals having different phases are further needed at the same writing cylinder position. Specifically, with respect to the former half first field (EVEN1) and second field (ODD1), eight kinds of write signals of the phase Nos. 0, 2, 4, 6, 8, 10, 12, and 14 shown in FIGS. 22A to 22I are used. With regard to the latter half third field (ODD2) and fourth field (EVEN2), eight kinds of write signals of the phase Nos. 1, 3, 5, 7, 9, 11, 13, and 15 shown in FIGS. 23B to 23I are used. Those 16 kinds of write signals having the phase Nos. 0 to 15 are supplied from the master clock forming circuit 110 having the circuit construction shown in FIG. 17 in the writing mode of the servo information onto the data surface.

FIG. 71 shows the phase Nos. of the write signals when writing the phase servo patterns onto the data surface shown in FIGS. 64 and 65 on a unit basis of 0.25 cylinder with respect to a range of ±2.5 cylinders around the cylinder of the cylinder No. 0 as a target cylinder as a center. Among them, with respect to the region exceeding ±1.5 cylinders for the cylinder position 0.00 as a target cylinder, the same pattern is repeated and the writing of the phase servo information that is effective in the range of ±1.5 cylinders is given. Specifically, the servo pattern is written at the timing of each servo frame while selecting the phase Nos. of the servo write signals shown in FIG. 71 every first to fourth fields while seeking the head on a unit basis of 0.25 cylinder from the position that is offset by, for example, −2.5 cylinders in the on-track state to the target cylinder of the data surface based on the phase servo information on the servo surface.

FIG. 72 shows the selection phase Nos. of the master clocks (as many as three cylinders) based on the cylinder switching which are used when the phase servo patterns on the data surface shown in FIGS. 64 and 65 by the read head provided in the data head and the position is detected. The cylinder of the cylinder relative No. 0 is set to a target cylinder when reading the servo pattern on the data surface and there is no need to position the head into an on-track state with respect to ±1 cylinder on both sides. Therefore, it is sufficient to fixedly use only the master clock selection phase Nos. of the cylinder relative No. 0.

A flowchart of FIG. 73 relates to a writing process of servo patterns onto the data surface by the disk apparatus of the invention. As shown in FIG. 8, the writing process is executed at the stage after completion of the writing of the phase servo information onto the servo surface at the final stage of the producing step before shipping an article and after completion of the automatic adjustment of the servo system.

In FIG. 73, first, in step S1, the head is sought to the write start cylinder, namely, target cylinder on the data surface on the basis of the phase information of the servo surface. As a write start cylinder of the data surface, a specific cylinder in the outer guard band region OGB1 is used with respect to the writing of the phase servo information to the data surface for measurement of a thermal offset. With regard to the measurement of a yaw angle offset, since it is also necessary to measure an offset on the inner side, when the writing in the outer guard band region OGB1 is finished, a specific cylinder in the inner guard band region IGB1 is designated as a write cylinder. After completion of the seeking operation to the write start cylinder in step S2, the first write pattern is selected from FIG. 69 in a seeking state in which the head is offset by, for example, +2.5 cylinders or −2.5 cylinders.

In step S4, the master clock of the selected write pattern phase No. is selected synchronously with the servo state of the servo surface and the phase servo pattern is written every phase servo region in the servo frame. In step S5, a check is made to see if the writing of all of the patterns has been finished or not. In step S6, the head is offset sought by 0.5 cylinder and the processing routine is returned to step S2. The next write pattern is selected in step S3. The servo patterns are similarly written in step S4. The above processes are repeated until all of the patterns are written in step S5.

[Read/write by phase servo pattern from/to data surface]

In a relatively large disk apparatus, as shown in FIG. 4, the apparatus is constructed by: the disk enclosure 10 comprising the mechanism portion including the head and motor; and the drive controller 12 comprising the printed circuit board to control the disk enclosure. One drive module is constructed by integrating the disk enclosure and drive controller. One disk system constructs one apparatus by combining a plurality of drive modules to an upper disk control unit. Such a magnetic disk memory apparatus is constructed by using the printed circuit board of the disk enclosure 10 and drive controller 12 as a minimum unit. However, even in case of the same kind of apparatus, there are various disk enclosures 10 and drive controllers 12 and a combination of proper disk enclosure 10 and drive controller 12 has to be used. For this purpose, in the conventional disk apparatus, a dip switch or the like is provided for the printed circuit board on which the drive controller 12 was installed, thereby enabling a combining operation to be normally performed for a change of the disk enclosure 10 to be combined. However, according to such a construction, it is necessary to artificially judge the board of the disk enclosure 10 and to operate the dip switch on the drive controller 12 side and there is a fear of erroneous setting.

To prevent such a drawback, according to the disk apparatus of the invention, at an assembly completion stage of the disk enclosure 10, a proper drive controller 12 is combined and data necessary for the combination of the board of the disk enclosure or the like is written by using the phase servo information to a specific cylinder on the data surface, for example, an empty cylinder between the cylinder address No. 0 and the outer guard band region OGB1 on the outside. When the drive controller 12 is combined, the information of the disk enclosure is read out on the drive controller 12 side, thereby enabling various settings in association with the combination to be automatically performed. The data writing operation using the phase servo pattern for the specific cylinder of the data surface is executed by the drive processor 30 by using the function of the position signal forming circuit 36 shown in FIG. 10.

Figures 74A, 74B, 74C, 74D, 74E, 74F:
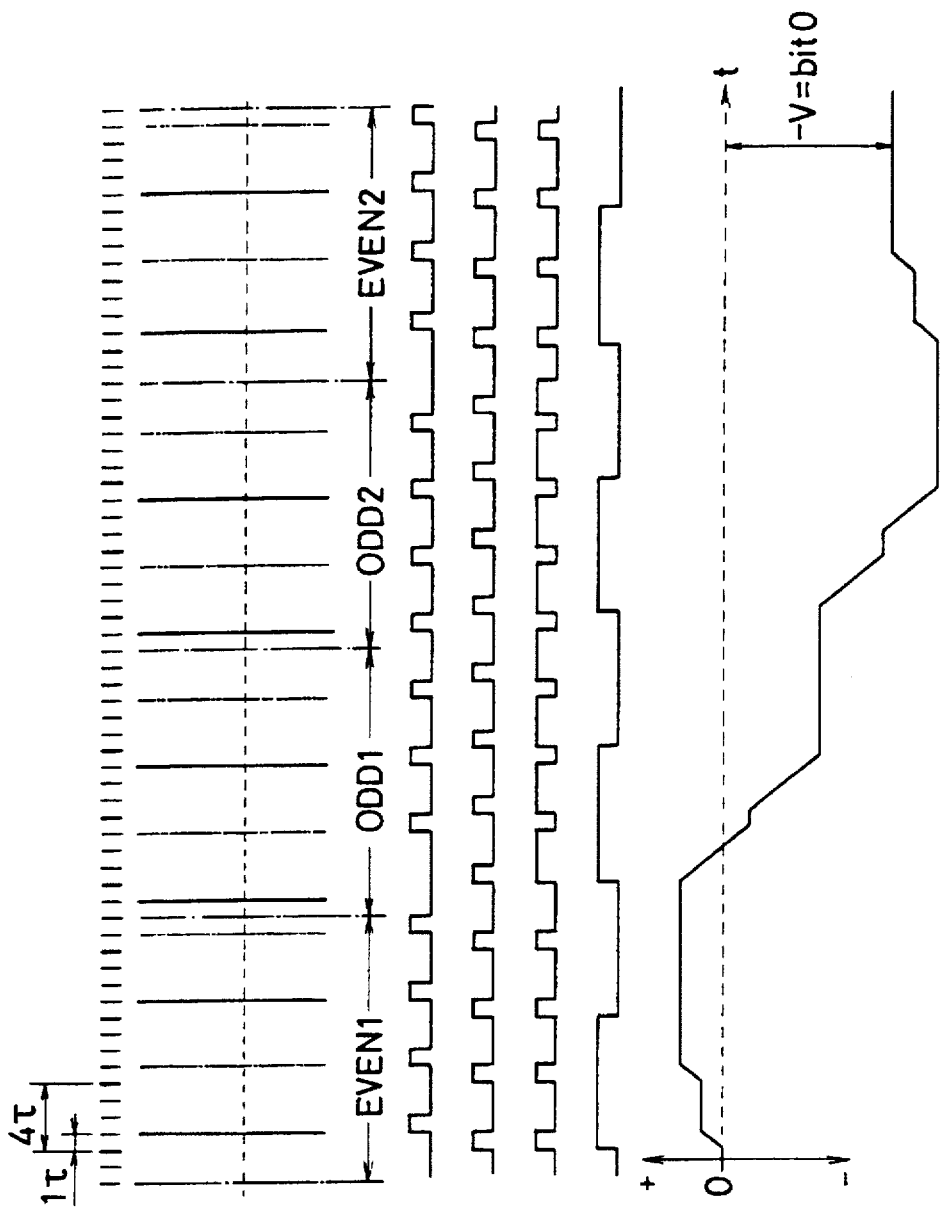
FIGS. 74A to 74F show phase servo patterns of data bit 0 and timing charts for the reading operation according to the invention.

The phase servo pattern corresponding to data bit 0 recorded on the data surface and its read-out waveform are as follows. FIG. 74A shows a phase servo pattern indicative of data bit 0. The servo pattern corresponding to the servo pattern deviated by only +1 cylinder on the ordinary servo surface is commonly recorded in a range of ±1.5 cylinders. Therefore, a read pulse of FIG. 74B is obtained with respect to the first to fourth fields (EVEN1, ODD1, ODD2, EVEN2). On the other hand, a master clock of FIG. 74C is a reference clock corresponding to the cylinder No. 0. Therefore, when the duty pulse forming circuit 120 is set in response to the leading edge of the master clock and is reset in response to the leading edge of the read pulse, a duty pulse of FIG. 74D is obtained. That is, in case of data bit 0, the duty pulse has a duty ratio 25% in the first and fourth fields (EVEN1, EVEN2) and a duty ratio 75% in the second and third fields (ODD1, ODD2). The duty pulse is extracted by a data window signal in FIG. 74E. An integrating voltage −V indicative of data bit 0 shown in FIG. 74F is derived by the integrating operation by the integrating circuit.

A phase servo pattern corresponding to data bit 1 recorded on the data surface and its read-out waveform are as follows. On the contrary to the case of data bit 0, as for the phase servo pattern corresponding to data bit 1 in FIG. 75A, the same phase servo pattern is recorded in a range of ±0.5 cylinder at the position that is phase deviated from the position of the inherent servo pattern for the target cylinder of the cylinder No. 0 by 1τ corresponding to the case where the head was sought by −1 cylinder. Therefore, a duty pulse of FIG. 75D is obtained by the setting responsive to the leading edge of a master clock corresponding to the target cylinder of the cylinder No. 0 of FIG. 75C and the resetting responsive to the leading edge of the read pulse of FIG. 75B. That is, the duty ratio of the duty pulse is set to 75% in the first and fourth fields (EVEN1, EVEN2) and to 25% in the second and third fields (ODD1, ODD2) and there is a relation opposite to the case of data bit 0. Therefore, the integrating voltage due to the duty pulse extracted by a data window signal of FIG. 75E is finally equal to +V as shown in FIG. 75F.

Figure 76:
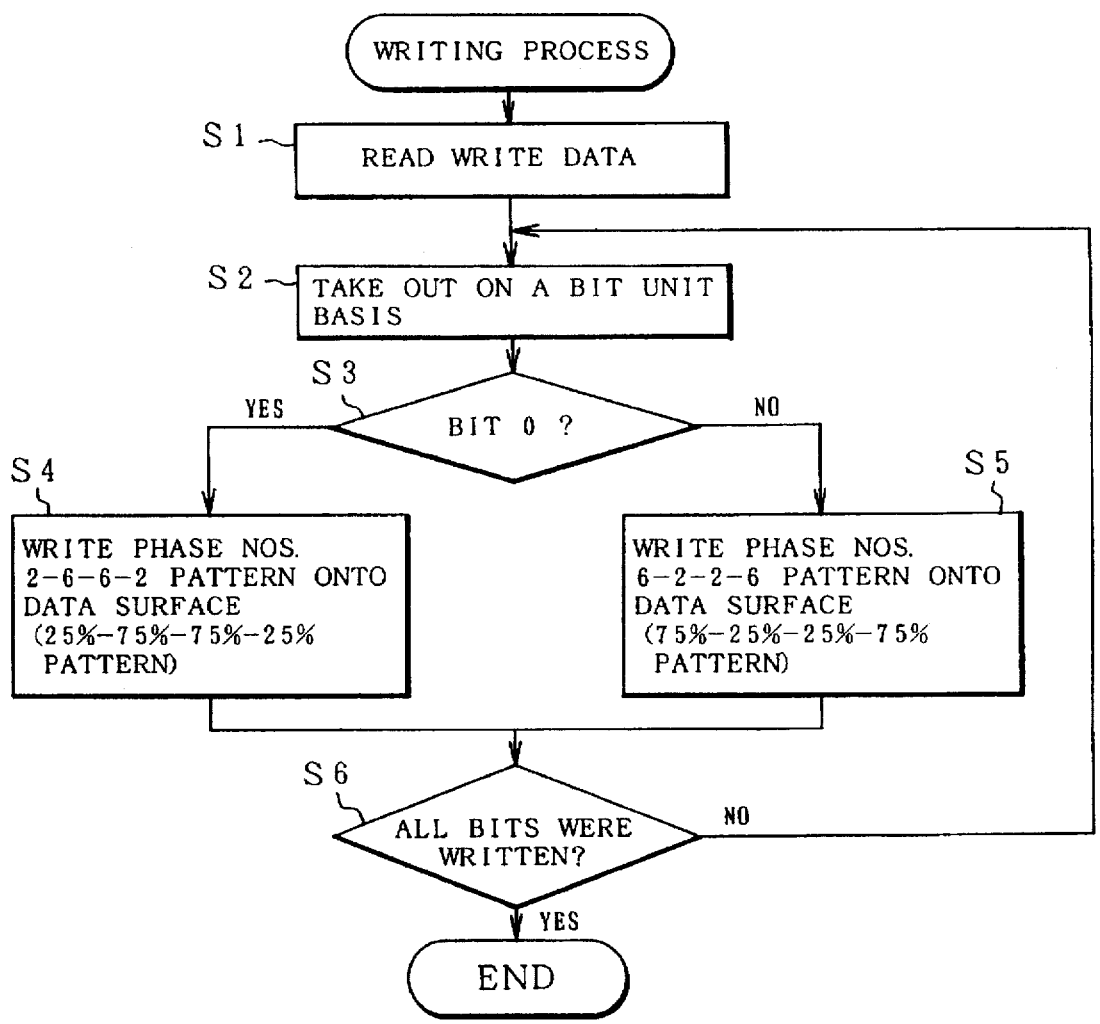
FIG. 76 is a flowchart for the writing process of the invention using the phase servo pattern.

A flowchart of FIG. 76 relates to a writing process of the phase servo patterns to the data surface corresponding to data bits 0 and 1 shown in FIGS. 74A and 75A. The writing process relates to the writing operation which is executed by the write head 400 in the data head 20 according to the pattern of the phase No. from the master clock forming circuit 110 in FIG. 10. The writing process can be performed in parallel with the on-track control based on the head position signal by the read signal of the servo head 18. Therefore, while positioning the head by the phase servo information on the servo surface, the phase servo pattern indicative of data bit 0 or 1 can be written into all of the servo frames of a specific cylinder on the data surface.

However, as for the reading process of the phase servo patterns on the data surface, the on-track control based on the read signal of the servo head 18 and the reconstruction of data bits 0 and 1 by the read signal from the read head 410 of the data head 20 must be time-divisionally executed by the same position signal forming circuit 36. For example, in case of reading every other 12 frames, the phase servo patterns are read in a manner such that the frames 0, 13, 26, ... are read at the first time, the frames 1, 14, 27, ... are read at the second time, ..., and the frames 12, 25, 38, ... are finally read while similarly shifting the frames one frame by one. Due to this, all of 216 frames can be read.

Figure 77:
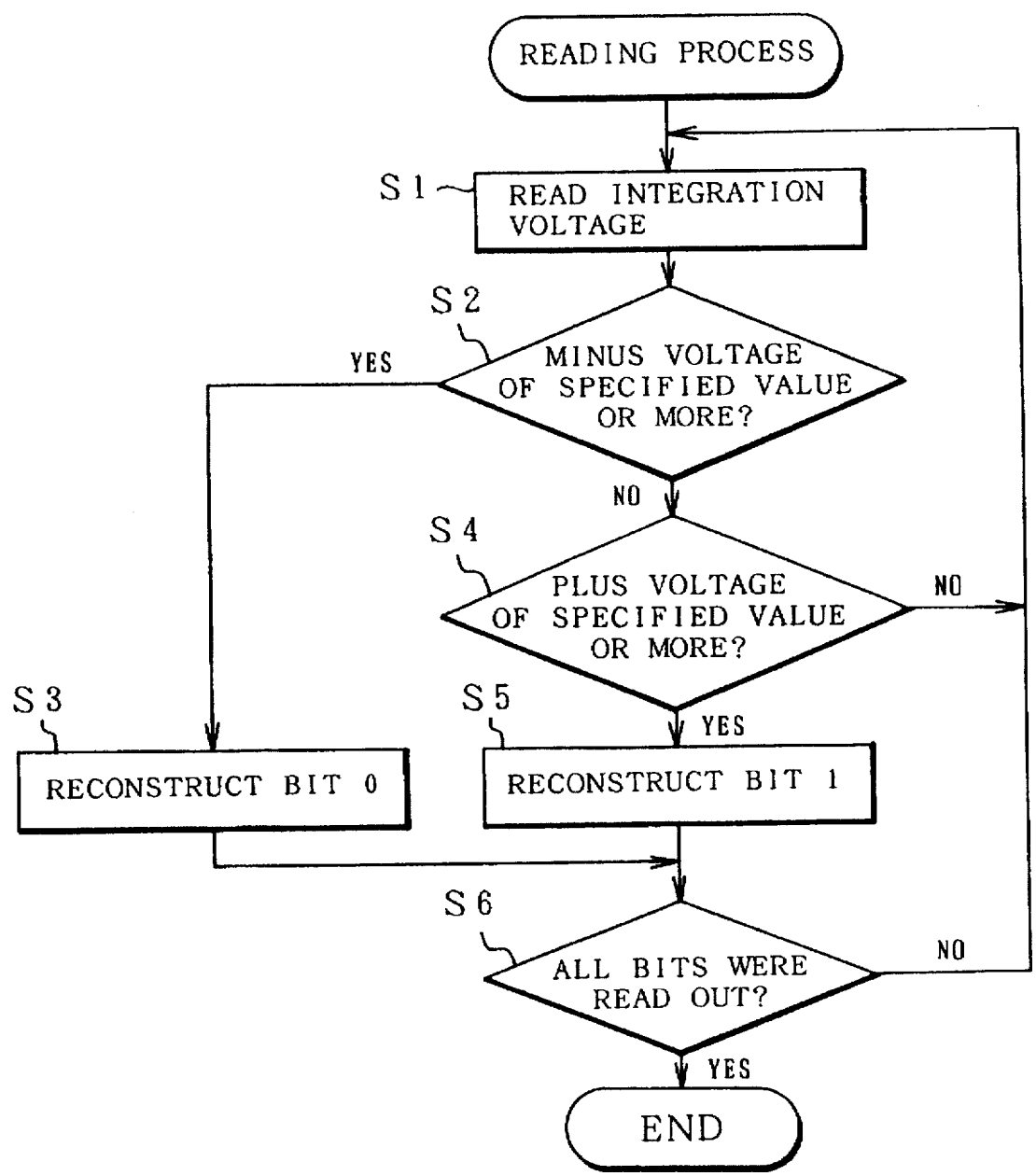
FIG. 77 is a flowchart for the reading process of the invention using the phase servo pattern.

A flowchart of FIG. 77 shows the reconstruction of data bits, namely, reading process based on the integrating voltage from the position signal forming circuit 36 with respect to 216 servo frames per one cylinder in the reading process which is executed by switching the servo head 18 and the read head 410 provided in the data head 20. First, in step S1, an interruption based on a predetermined servo frame on the data surface is accepted and the integrating voltage is read. In step S2, a check is made to see if the integrating voltage is a minus voltage that is equal to or higher than a specified value or not. When the integrating voltage is a minus voltage that is equal to or larger than the specified value, step S3 follows and bit 0 is reconstructed. On the other hand, if NO, step S4 follows and a check is now made to see if the integrating voltage is a plus voltage that is equal to or higher than the specified value or not. If YES in step S4, bit 1 is reconstructed in step S5. The above processes are repeated until all bits are read out in step S6. The above embodiment relates to an example of the data reading and writing processes of 16 servo frames per one cylinder on the data surface, namely, 16 bits. However, in the case where the user wants to increase a data amount, it is sufficient to increase the number of cylinders to be written.

[Measurement and correction of yaw angle offset]

Figure 78:
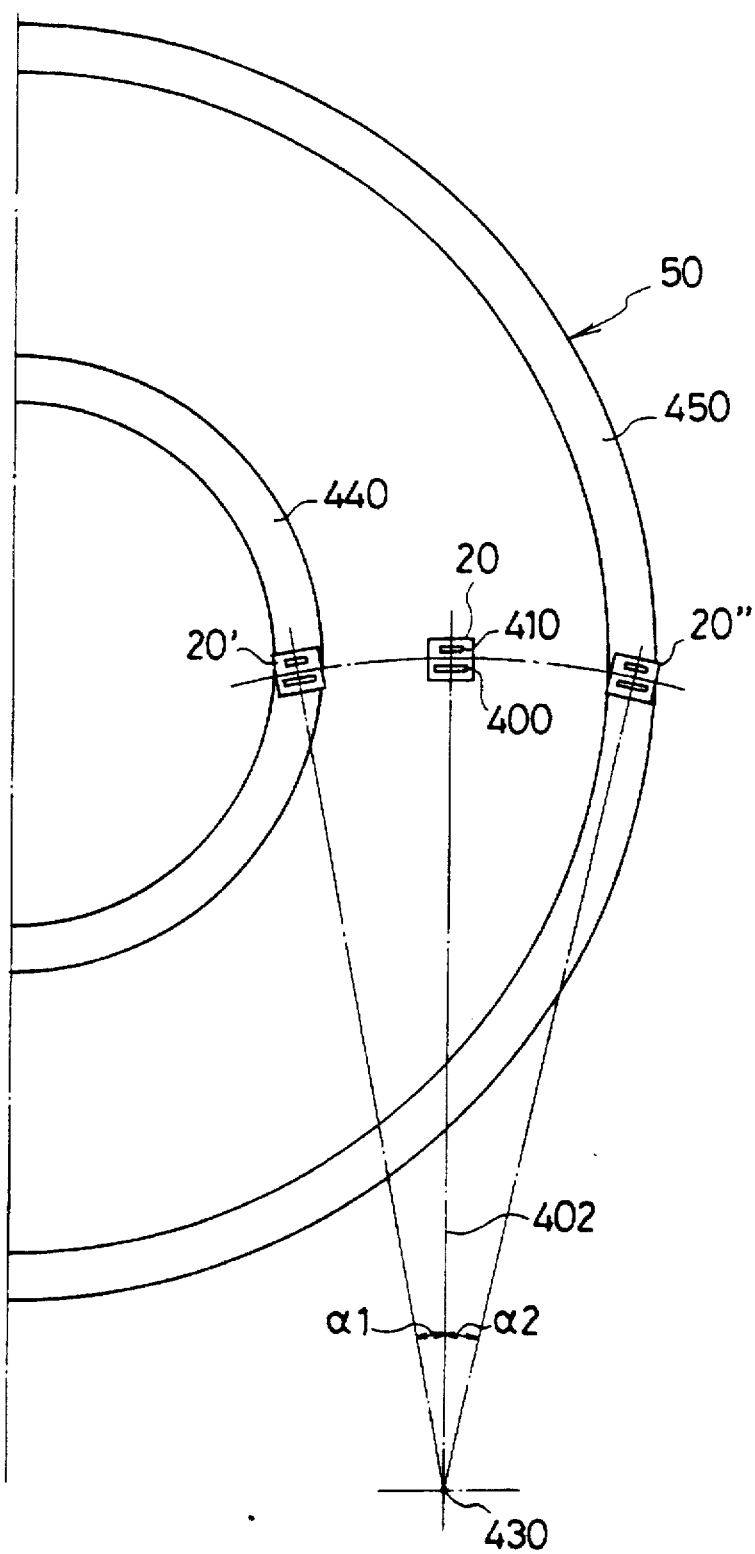
FIG. 78 is an explanatory diagram of the relation between the yaw angle and the data head.

In a magnetic disk apparatus using the small MR head as a read head of the data head, as shown in FIG. 78, a positional deviation occurs for the on-track state of the write head 400 between the case where the data head 20 is positioned to a position 20' on the innermost side and the case where the data head 20 is positioned to a position 20" on the outermost side. Such a positional deviation is called a yaw angle offset. That is, with respect to an inner maximum yaw angle α1 for the neutral position of a rotational center 430 of a head arm when the data head 20 is moved to the edge portion on the inner side and an inner maximum yaw angle α2 in the direction opposite to that of the inner maximum yaw angle α1, a positional deviation occurs between the write head 400 and read head 410 provided in the data head 20.

Figure 79:
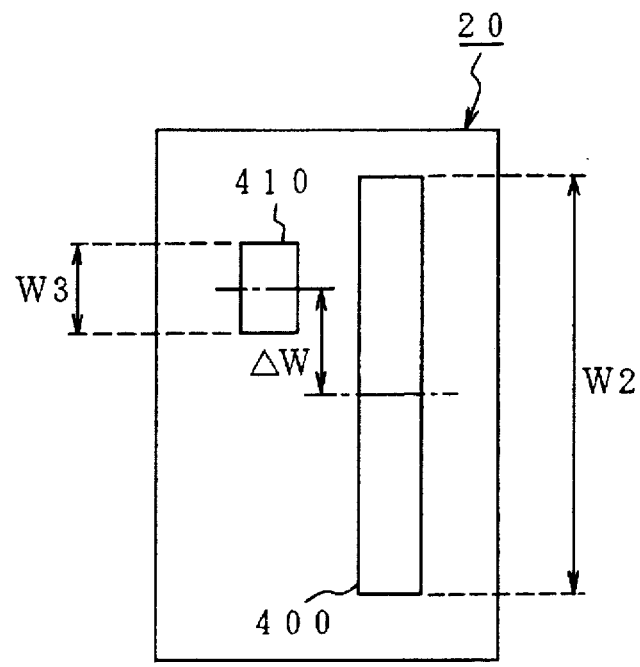
FIG. 79 is an explanatory diagram of a writing head and a reading head provided in the data head.

FIG. 79 enlargedly shows the data head 20. The write head 400 using the magnetic head and the read head 410 using the MR head are integratedly provided. A core width W2 of the write head 400 is equal to about 6 μm when it is now assumed that a track pitch is set to, for instance, 7.5 μm. On the other hand, the core width W3 of the read head 410 using the MR head is equal to or less than 3 μm that is equal to or less than the half of the core width W2. Although the center of the write head 410 is made to coincide by design, it actually has a mechanical offset ΔW due to the positional deviation. The data writing in the user region on the data surface is performed by the on-track control of the write head 400 based on the phase servo information on the servo surface. Therefore, in the case where the user wants to switch to the reading operation by the read head 410, the phase servo information is read at the position that is deviated from the track center by only the mechanical offset ΔW.

In addition to the mechanical offset ΔW of the write head 400 and the read head 410 in the data head 20 as mentioned above, as shown in FIG. 78, an offset which differs at every yaw angle by the VCM 16 also occurs between the write head 400 and the read head 410.

Figure 80A:
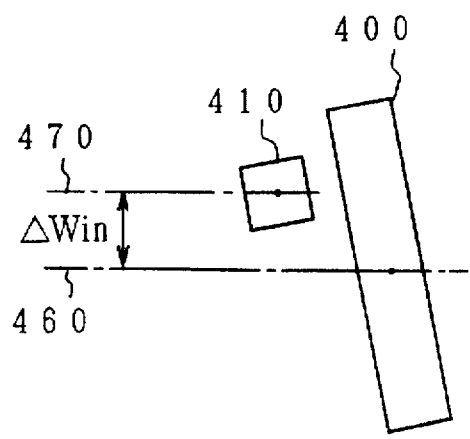
FIGS. 80A and 80B are explanatory diagrams of offsets of the reading head in the maximum yaw angle of the inner and outer cylinders.
Figure 80B:
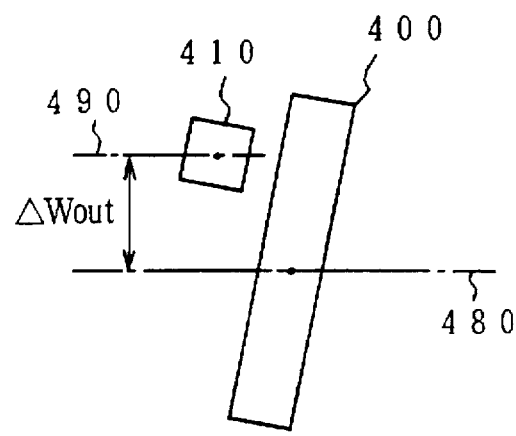

FIG. 80A shows a yaw angle offset of the read head 410 for a track center 460 at the inner maximum yaw angle α1 in FIG. 78. FIG. 80B shows a yaw angle offset of the read head 410 for a track center 480 at the outer maximum yaw angle α2 in FIG. 78. As will be obviously understood from a comparison between them, a yaw angle offset in the opposite direction occurs on the innermost side and the outermost side for the yaw angle offset 0 at a center position 402 in FIG. 78. $\Delta W_{in}$ is an offset at the inner maximum yaw angle and $\Delta W_{out}$ is an offset at the outer maximum yaw angle after "78".

Figure 81:
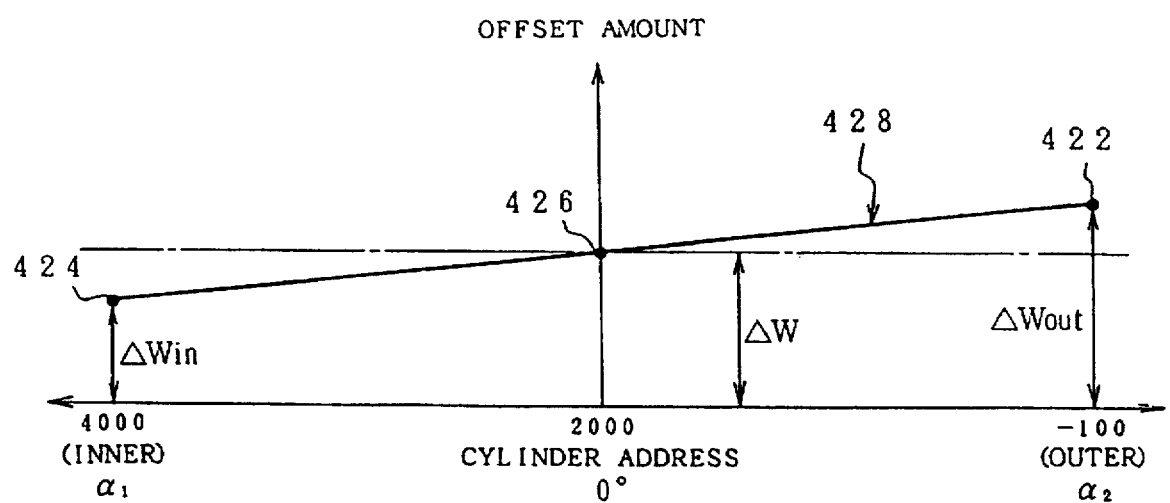
FIG. 81 is an explanatory diagram of a change due to a linear interpolation of the offsets for the yaw angle.

In FIG. 81, the center cylinder address in which the yaw angle offset ΔW is equal to 0°, for example, a cylinder address 2000 is set to an origin and offsets $\Delta W_{in}$ and $\Delta W_{out}$ at the inner maximum yaw angle on the left side and the outer maximum yaw angle on the right side are plotted. When innermost and outermost head positions 424 and 422 are determined, an offset between them can be estimated by a straight line 428 connecting those head positions. It is now assumed that a yaw angle at the center position is set to 0°, the outer side is set to the plus side, the inner side is set to the minus side, and the mechanical offset ΔW at the yaw angle 0° is set to an origin. When the maximum values of the yaw angle offsets on the inner side and outer side are seen, a plus offset relatively occurs on the outer side and a minus offset relatively occurs on the inner side.

In the disk apparatus of the invention, as shown in FIGS. 64 and 65, the phase servo patterns have previously been recorded in the special empty cylinder in the inner guard band region IGB1 on the data surface and the special empty cylinder in the outer guard band region OGB1. Therefore, for example, as shown in FIG. 8, the yaw angle offset process is executed at the assembly final stage before shipping an article and a correction table of the yaw angle offsets is formed.

Figure 82:
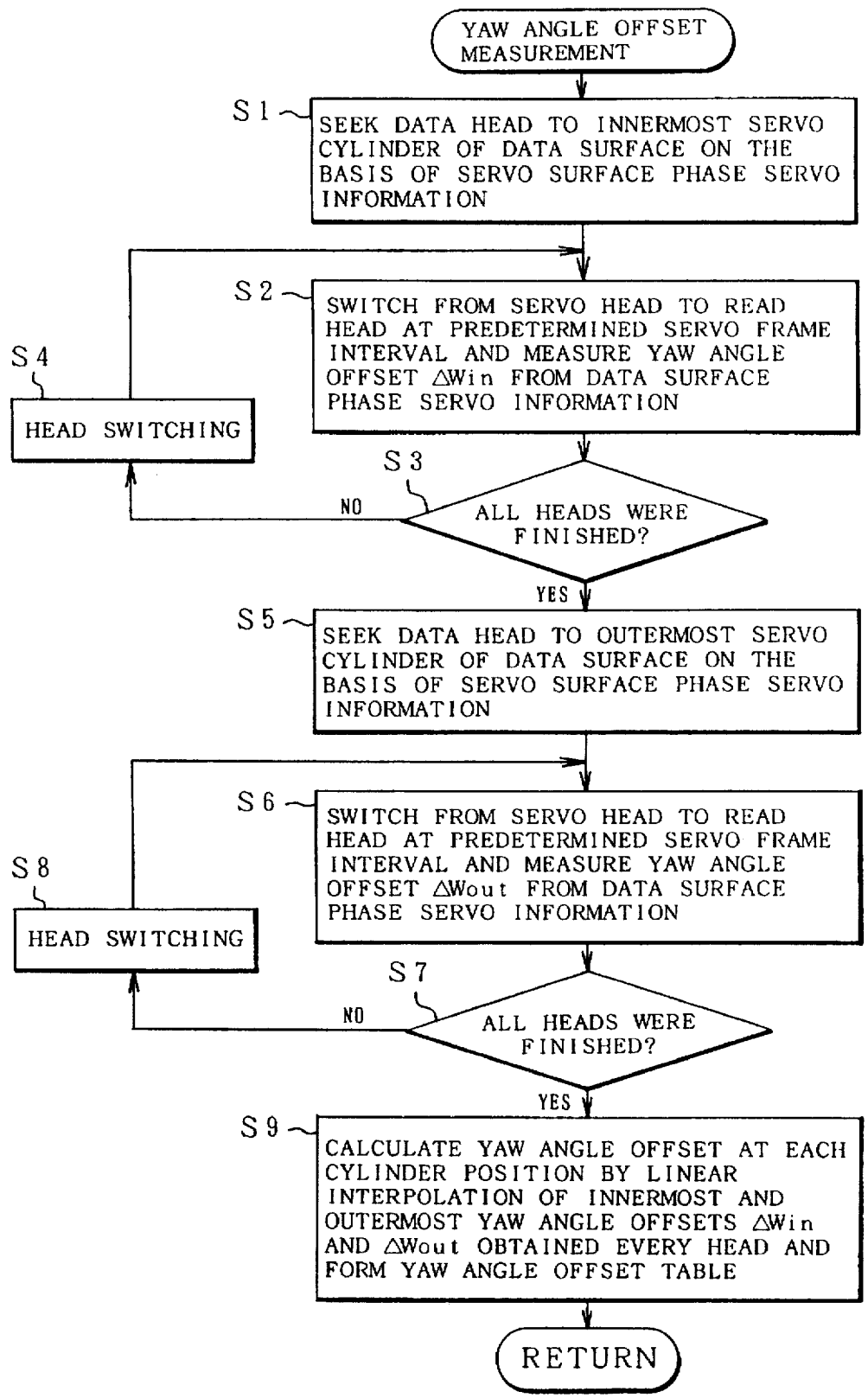
FIG. 82 is a flowchart for the yaw angle offset measurement of the invention.

A flowchart of FIG. 82 shows the measuring process of a yaw angle offset by the disk apparatus of the invention. First, in step S1, the data head 20 is sought onto a specific cylinder in the inner guard band region IGB on the innermost side of the data surface on the basis of the phase servo pattern on the data surface. In step S2, the yaw angle offset $\Delta W_{in}$ on the inner side is measured from the data surface phase servo pattern while switching from the servo head 18 to the read head 410 of the data head 20 at a predetermined servo frame interval. According to the measuring process of the data surface phase servo pattern, for example, among the 216 servo frames per one cylinder, each time 13 servo surface servo frames are processed, the operating mode is switched to the reading mode of the data surface servo frame and 16 yaw angle offsets are measured per one cylinder. Finally, the yaw angle offset $\Delta W_{in}$ is determined as an average value. The yaw angle offset process on the inner side in step S2 is executed with respect to all of the heads while switching the data head in step S4. After completion of the measuring processes of the inner yaw angle offsets in steps S1 to S4, the processing routine advances to step S5. On the basis of the phase servo pattern on the data surface, the data head 20 is sought onto the specific cylinder on which the phase servo pattern in the outer guard band region OGB1 locating at the outermost position of the data surface has been written.

After completion of the seeking operation, step S6 follows. In a manner similar to the case in step S2, the outer side yaw angle offsets are measured from the phase servo pattern of, for example, 16 data surface servo frames per one cylinder while switching from the servo head 18 to the read head 410 at a predetermined servo frame interval. The outer side yaw angle offset $\Delta W_{out}$ is determined as an average value of them. The process in step S6 is repeated while switching the head in step S8 until the process is finished with respect to all of the heads in step S7. After the inner side and outer side yaw angle offsets were measured, in step S9, the yaw angle offset is calculated at each cylinder position and a yaw angle offset table which is used for correction is formed as shown in FIG. 81 by a linear interpolation of the innermost and outermost yaw angle offsets $\Delta W_{in}$ and $\Delta W_{out}$ which are derived every data head.

FIG. 83 shows an example of a correction table of the yaw angle offsets formed by the yaw angle offset measuring process in FIG. 82. In the correction table, for example, the table in which one yaw angle offset was obtained every 50 cylinder addresses is formed.

Figure 84:
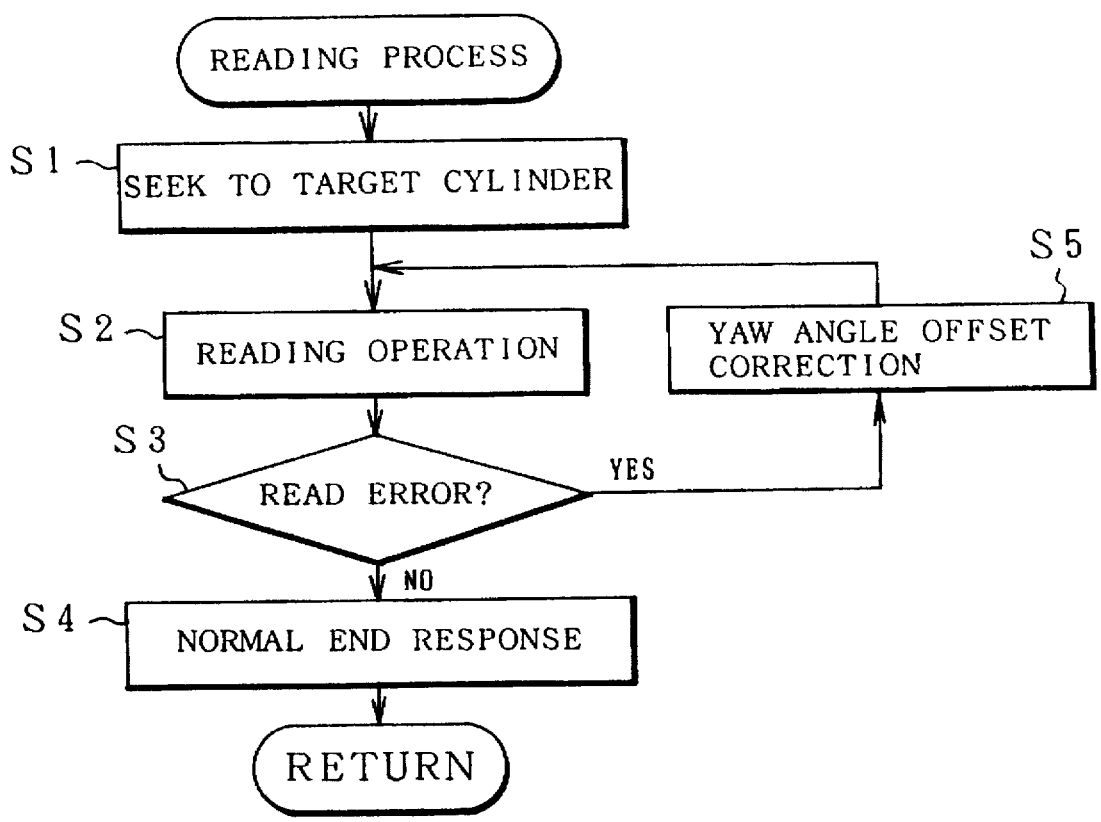
FIG. 84 is a flowchart for the reading process which is associated with the yaw angle offset correction.

A flowchart of FIG. 84 relates to the yaw angle offset correction that is executed by the reading process during the operation while assembling the disk apparatus of the invention into a system. First, in step S1, the head is sought onto the target cylinder. In step S2, the reading operation is performed. In the reading operation, if a read error is judged in step S3, step S5 follows. The yaw angle offset corresponding to the address of the target cylinder is read out with reference to the yaw angle offset table shown in FIG. 75 and the data head is positioned so as to correct the yaw angle offsets. Namely, the read error in step S3 occurs in the case where the read head is largely deviated due to the yaw angle from the recording pattern written by the write head and the read waveform is deteriorated. To compensate the deterioration of the read waveform, the yaw angle offset is performed, the position of the read head is corrected to the cylinder center side, and the reading operation is retried, thereby allowing the reading operation to succeed. When there is no read error in step S3, a normal end response is returned as a status response in step S4. The processing routine is returned to the main process. As mentioned above, by previously measuring the yaw angle offsets and forming the correction table, the read error can be certainly recovered by the correction of the yaw angle offsets at the time of the occurrence of the read error.

Figure 85:
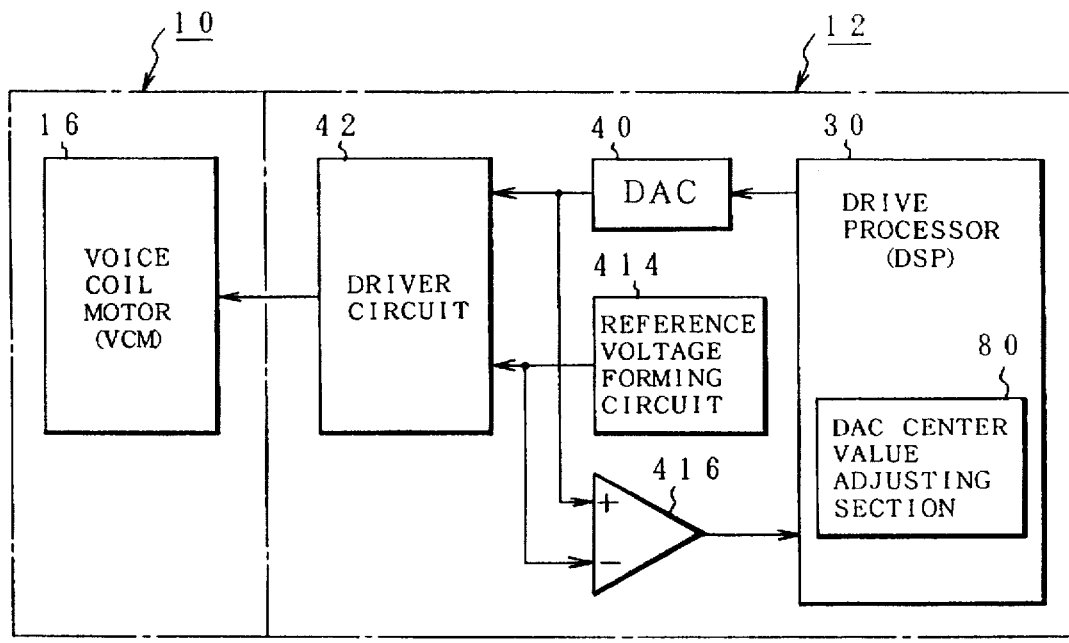
FIG. 85 is a block diagram of a drive circuit system of a VCM in the invention.

FIG. 85 is a drive circuit section of the VCM 16 provided for the drive controller 12 of the disk apparatus of the invention. Current instruction data to the VCM 16 from the drive processor 30 is converted to an analog signal by the D/A converter 40 and is further converted into a drive current by the driver 42 and is supplied. In the current control of the VCM 16, in the case where the current instruction data by the drive processor 30 is output as digital data of a few bits, in order to give a positive or negative sign and an operation amount to the instruction data, a reference voltage forming circuit 414 is provided for the driver 42. As for the reference voltage of the reference voltage forming circuit 414, a middle-point voltage of the conversion voltage of the D/A converter 40 is set. The driver circuit 42 forms a drive voltage having a polarity and an operation amount when the reference voltage is set into a center. The drive voltage is converted into the positive and negative drive currents. The VCM 16 is driven by those drive currents. Ideally, the conversion voltage when the instruction current 0 is instructed to the D/A converter 40 coincides with the reference voltage generated from the reference voltage forming circuit 414 and the drive current of the driver 42 is set to 0. However, in the D/A converter 40 and the component elements of the reference voltage forming circuit 414, there are variations in precision of the resistance values, constants, and the like. Therefore, an error occurs between the center instruction voltage converted and output by the D/A converter 40 and the reference voltage formed by the reference voltage forming circuit 414. An unnecessary current according to the error flows in the VCM 16, so called a center offset occurs, and an adverse influence is exerted on the servo control.

To solve the above problem, according to the disk apparatus of the invention, as shown in step S2 in the flowchart of FIG. 9, at the stage of the initializing process in the power-on-start, the error between the center instruction voltage of the D/A converter 40 and the reference voltage generated from the reference voltage forming circuit 414 is measured. In the reading and writing processes after completion of the initialization, the servo control in which the error was corrected is executed. To measure the error between the center instruction voltage and the reference voltage, in the embodiment of FIG. 85, a comparing circuit 416 to compare the conversion voltage of the D/A converter 40 and the reference voltage of the reference voltage forming circuit 414 is newly provided. The comparing circuit 416 measures the error by the DAC center value adjusting section 80 that is realized as a function of the drive processor 30 by using the comparison output, thereby performing the correction based on the measurement error in the ordinary reading and writing operations.

Figure 86:
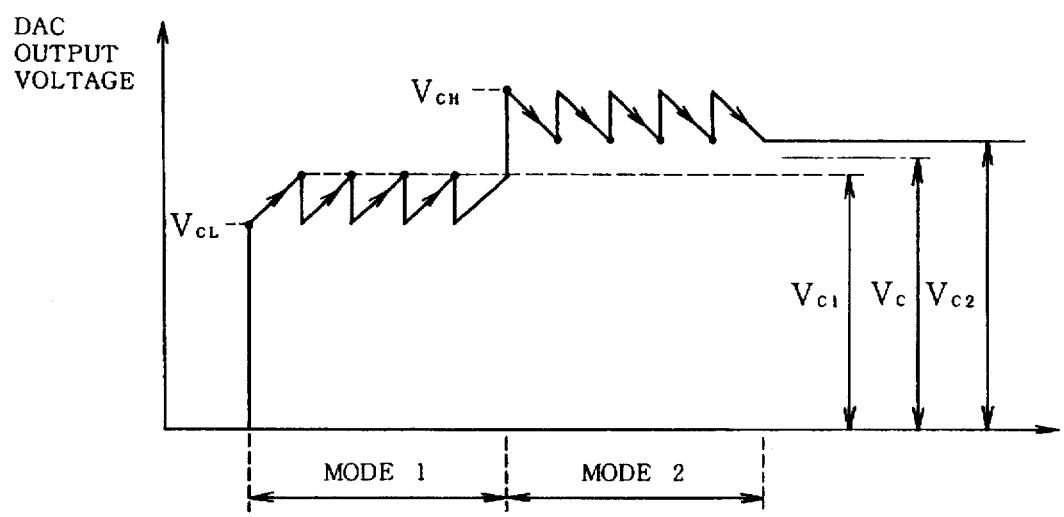
FIG. 86 is an explanatory diagram of the measuring operation of a center value of a D/A converter for the VCM.

FIG. 86 shows the measuring process by the DAC center value adjusting section 80 for VCM in FIG. 85. The measuring process is divided into the former half mode 1 and the latter half mode 2. In the measuring process in the mode 1, a lower limit center instruction value $V_{CL}$ that is lower than a predetermined center instruction data for the D/A converter 40 by a predetermined value is set. The instruction value is increased step by step, thereby raising the output voltage of the D/A converter 40 as shown in the diagram. Initially, since the lower limit center instruction voltage $V_{CL}$ of the D/A converter 40 is lower than the reference voltage, an output of the comparing circuit 416 is at the L level. When the instruction value to the D/A converter 40 is increased, the output of the comparing circuit 416 is inverted to the H level at a time point when the conversion voltage exceeds the actual reference voltage. A voltage $V_{C1}$ at the time when the output is inverted to the H level is held as a measurement value. In the mode 1, similar processes are repeated, for example, four times and the final first center voltage $V_{C1}$ in the mode 1 is obtained as an average value.

The measurement in the mode 2 is now started. In the measurement in the mode 2, a center upper limit instruction value higher than prescribed center instruction data is set into the D/A converter 40 and the conversion voltage is gradually decreased from a center upper limit instruction voltage $V_{CH}$. Initially, since the center upper limit voltage $V_{CH}$ is higher than the actual reference voltage, the comparing circuit 416 generates the H level output. When the conversion voltage is reduced, the output of the comparing circuit 416 is inverted to the L level at a time point when the conversion voltage is lower than the reference voltage. Therefore, a voltage $V_{C2}$ at that time is held as a second center upper limit voltage. In a manner similar to the case of mode 1, the measuring process is also executed four times with respect to the mode 2, thereby obtaining the final measurement voltage $V_{C2}$ as an average value.

After completion of the measurement in the modes 1 and 2 mentioned above, center instruction data for the D/A converter 40 is obtained from the voltage $V_C$ derived by adding the measurement voltage $V_{C2}$ in the mode 2 to the measurement voltage $V_{C1}$ in the mode 1 and by dividing the resultant voltage by 2 and is held in the drive processor 30 as corrected DAC center instruction data.

The conversion voltage of the center instruction data of the D/A converter 40 which was measured as mentioned above substantially perfectly coincides with the reference voltage of the reference voltage forming circuit 414 and the accurate center voltage can be set. As for the current instruction data in the VCM 16 in the drive processor 30, the data corresponding to the measured center instruction voltage $V_C$ is set to a zero point. The data according to the sign and operation amount is produced and is output to the D/A converter 40.

Figure 87:
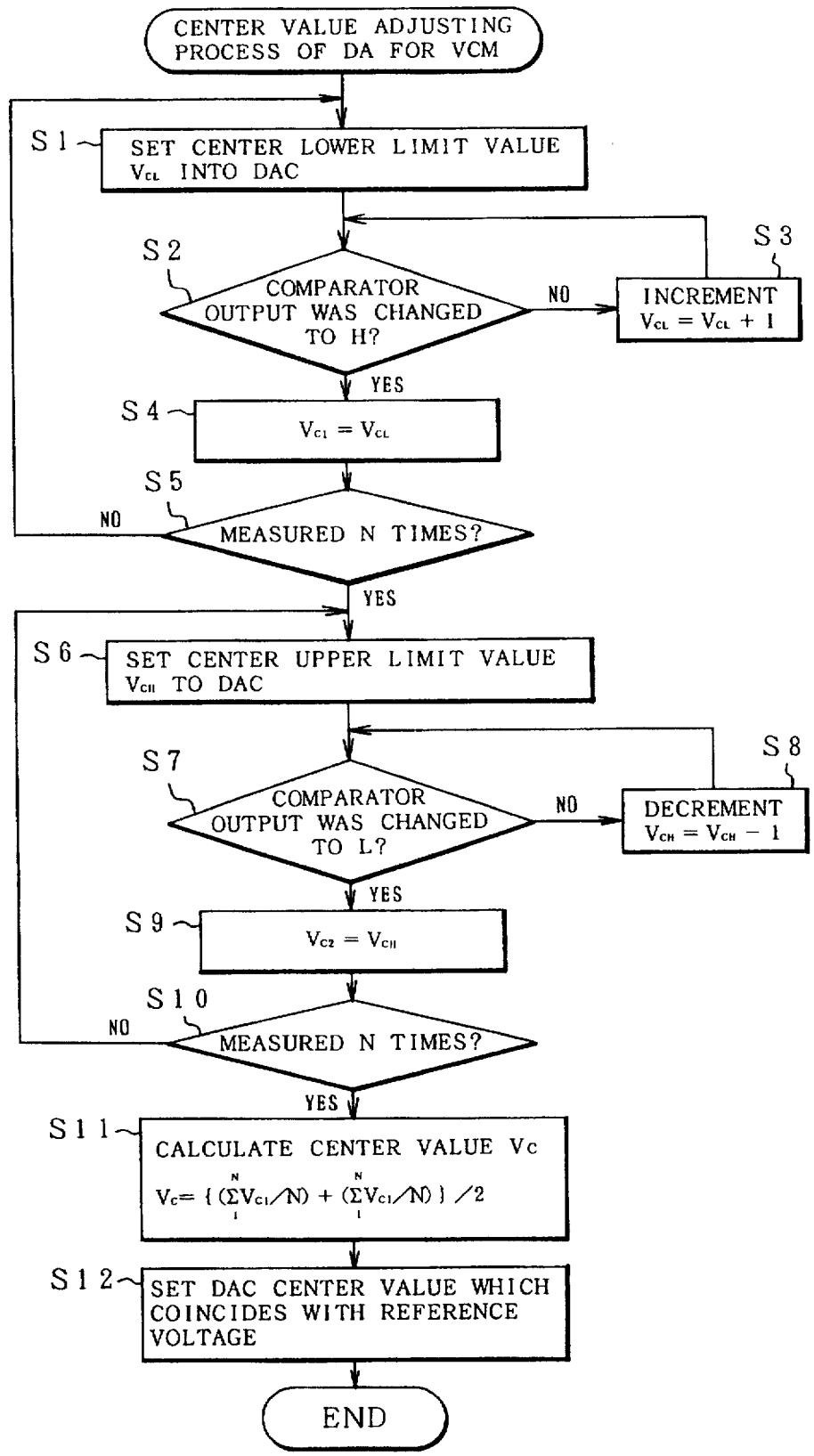
FIG. 87 is a flowchart for the center value adjusting process of the D/A converter for the VCM according to the invention.

A flowchart of FIG. 87 relates to the center value adjusting process of the D/A converter in FIG. 86. Processes in steps S1 to S5 correspond to the measuring process in the mode 1 in FIG. 86. Processes in steps S6 to S10 correspond to the measuring process in the mode 2 in FIG. 86. In step S11, a calculation is performed by using the average value of the final center value $V_C$. In step S12, the center instruction value of the D/A converter 40 which coincides with the reference voltage is set into the drive processor 30. The error between the conversion voltage of the center instruction data for the D/A converter 40 and the reference voltage from the reference voltage forming circuit 414 to set the operating point serving as a zero point into the driver 42 is measured and corrected, thereby enabling the servo control to be performed at a high precision.

[Rezero operation]

In the disk apparatus of the invention, as shown in step S3 in FIG. 9, at the stage of the initializing process in the power-on-start, the head is positioned to the outer guard band region OGB1 and the rezero operation to set the value of the counter forming the cylinder address as an initial value into the zero address is executed. However, since the absolute cylinder address is not known at the stage of the rezero operation, there is a problem in the speed control for seeking the head locating in the contact start/stop region (CSS region) on the innermost side to the outer guard band region.

That is, in the seek control of the invention using the phase servo pattern, the speed is detected at every sampling period of the head position detection and the speed control is performed while predicting the head position at the next sampling time point. However, at the stage when the absolute cylinder address is not determined, there is an error in the target cylinder address for cylinder switching based on the predictive cylinder position and the normal seeking operation cannot be expected.

In the rezero operation of the invention, therefore, after the head was thrust away to the outer side from the innermost contact start/stop region by the acceleration control and was driven, the rezero operation to relatively set the cylinder address to 0 by the integrating voltage of 0 that is obtained for the first time is executed. The target speed is determined while obtaining the number of remaining cylinders up to the target cylinder by the position prediction by the speed detection on the basis of the cylinder address, thereby performing the speed control. At a time point when the guard band detection signal is derived due to the arrival of the head at the outer guard band region OGB1, the absolute rezero operation to set the absolute value of the cylinder address to 0 is performed.

Figure 88:
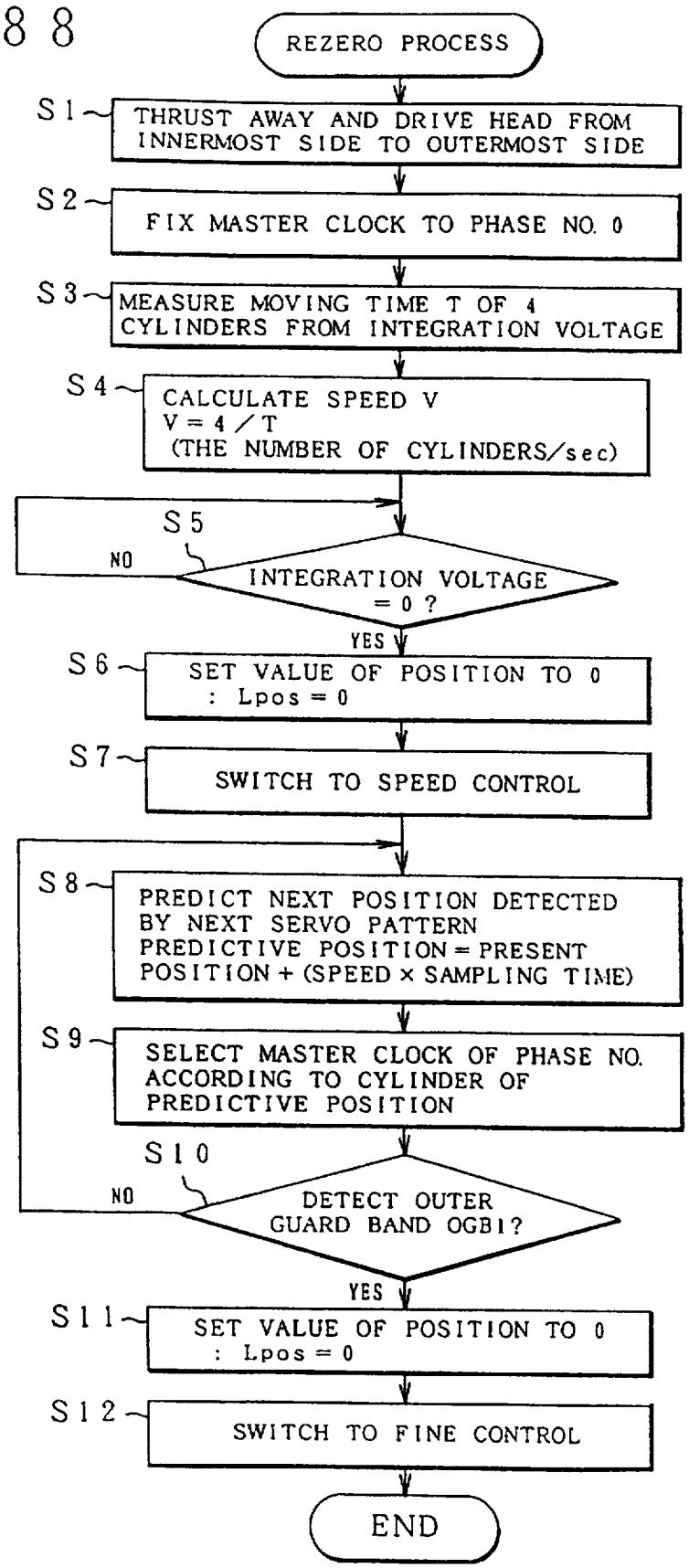
FIG. 88 is a flowchart for the rezero process according to the invention.

A flowchart of FIG. 88 shows in detail the rezero process in the disk apparatus of the invention. First, in step S1, the head floating in the contact start/stop region is thrust away from the inner side to the outer side by supplying an acceleration current to the VCM 16 and is driven. In this state, in step S2, the phase No. of the master clock due to the cylinder switching is fixed to 0. In step S3, a moving time T corresponding to four cylinders is measured from a change in integrating voltage. Specifically, since the integrating voltage changes by four stages due to the movement of four cylinders, a moving time T of four cylinders can be measured by detecting a change in integrating voltage at four stages. In step S4, by dividing the cylinder number 4 by the measured moving time T, the number of moving cylinders per unit time, namely, a speed V is calculated. When the speed V can be calculated, in step S5, a check is made to see if the integrating voltage is equal to the zero voltage or not, namely, whether the head has reached the cylinder corresponding to the phase No. 0 of the master clock or not. The processing routine advances to step S6 at the timing when the integrating voltage is equal to 0. In step S6, the relative rezero operation to relatively set a value $L_{pos}$ of the position indicative of the movement amount for the absolute position of the head to 0 is performed. In step S7, the control mode is switched to the speed control. At the stage of the speed control, since the head position has relatively been obtained in step S6, the position prediction at the next sampling time point can be performed in step S8. The position prediction can also include the acceleration component as shown in FIG. 43.

When the position at the next sampling time point can be predicted in step S8, the master clock of the phase No. according to the cylinder at the predictive position is selected and the target speed of the speed control pattern is obtained from the number of remaining cylinders up to the target cylinder in step S9. In step S10, the speed control is repeated until the outer guard band OGB1 is detected. When the outer guard band OGB1 is detected in step S10, the inherent rezero operation to set $L_{pos}$ indicative of the value of the position to 0 is again executed in step S11. The rezero operation is finished and the control mode is switched to the fine control for positioning the head onto the track in the cylinder address in which the outer guard band OGB1 was detected.

In the disk apparatus of the invention as mentioned above, even in the state of the rezero operation in which the absolute position of the head is not determined, the speed control can be certainly performed in accordance with the prediction of the next head position based on the speed detection. The head is certainly sought to the outer guard band region and the rezero operation can be certainly performed.

[Automatic adjustment of servo system]

To optimize the seek control in the magnetic disk apparatus, it is desirable to minimize the settling time at the time when switching from the coarse control by which the speed control is being executed to the fine control. As an adjusting method of the servo system for suppressing the settling time to the minimum time, there is a method of deciding a gain of the acceleration or deceleration in the target speed pattern as an adjustment value by measuring a position error absolute integration value in FIG. 89.

Figure 89:
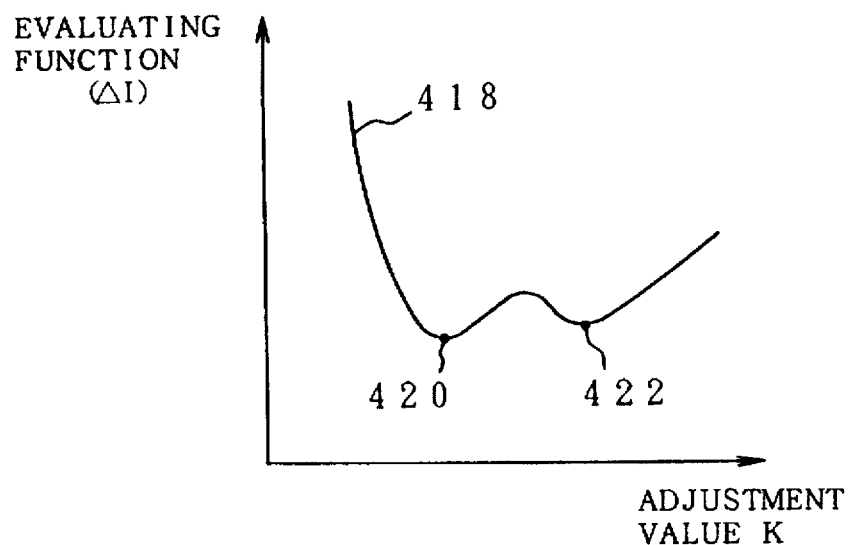
FIG. 89 is a characteristics diagram of the relation with adjustment value when the evaluating function is used as a position error absolute integration value.
Figure 90:
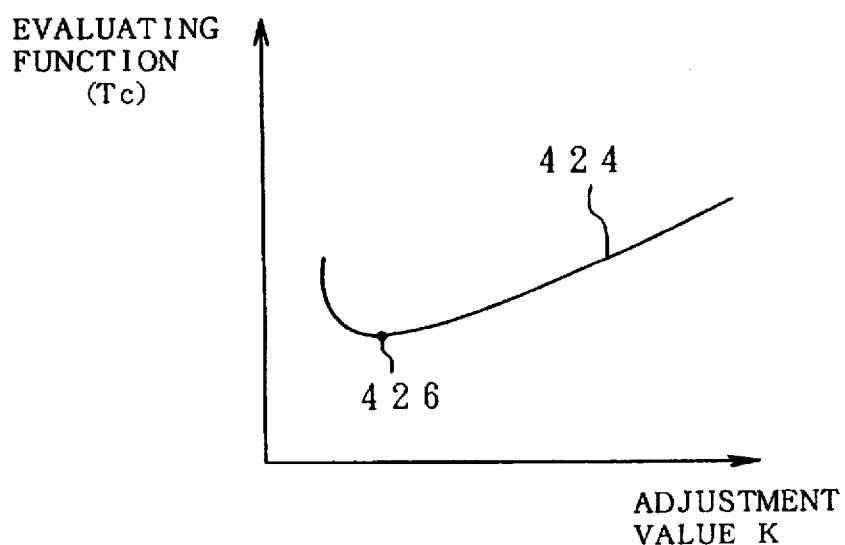
FIG. 90 is a characteristics diagram of the relation with the adjustment value when the evaluating function is set to a coarse time.
Figure 92A:
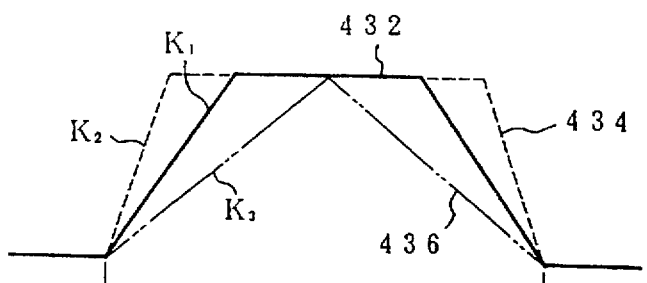
FIGS. 92A to 92C are timing charts for the position error absolute integration value and the coarse time in the seek control.
Figure 92B:
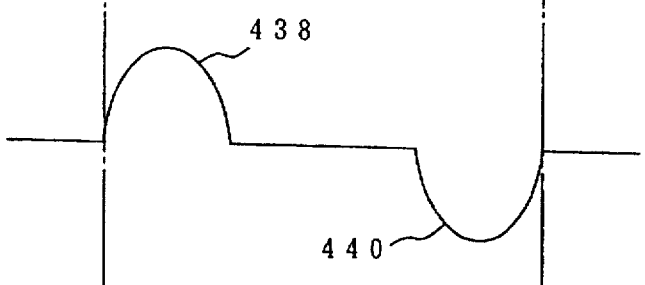

As another method, as shown in FIG. 90, there is an adjusting method of adjusting the speed gain in the acceleration or deceleration of the target speed pattern as an adjustment value K so as to minimize the coarse time as an evaluation function. The position error absolute integration value used as an evaluation function in FIG. 89 is obtained by calculating the absolute value by integrating the error of the position signal which occurs for a period of time from a time point after the head reached the position that is 0.5 cylinder before the target cylinder to a time point when the head enters the on-track state after switching from the coarse control to the fine control like a target speed patterns 432, 434 and 436 in FIG. 92A, seek current in FIG. 92B, and a position signal in FIG. 92C.

Figure 92C:
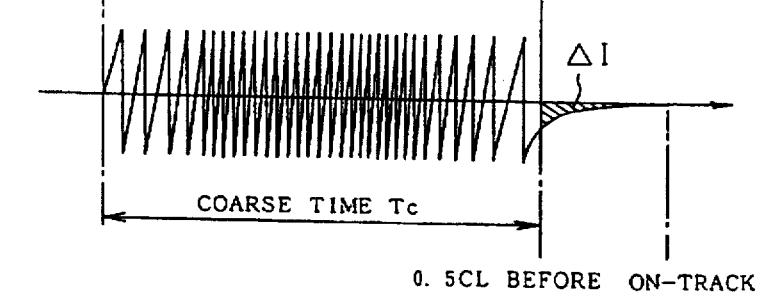

A coarse time $T_c$ used as an evaluation function in FIG. 90 is a time which is required until the head reaches the position that is 0.5 cylinder before the target cylinder from the start of the speed control as shown in FIG. 92C. A position error absolute integration value $\Delta I$ and the coarse time $T_c$ which are used as evaluation functions are changed by switching the speed gains at the time of acceleration and deceleration in the target speed pattern in FIG. 92A, for example, by switching speed gains K1, K2, and K3 indicative of the inclination with respect to the time of acceleration. That is, with regard to the position error absolute integration value $\Delta I$, as shown in FIG. 89, characteristics 418 are obtained for a change in adjustment value K as a speed gain and the optimum value of the evaluation function $\Delta I$ is derived by two singular points 420 and 422. With respect to the coarse time $T_c$, as shown in FIG. 90, the characteristics 424 are obtained for the adjustment value K. In this case, the optimum evaluation function $T_c$ is obtained by a singular point 426.

However, in case of using the position error absolute integration value $\Delta I$ as an evaluation function in FIG. 89, even if the evaluation function $\Delta I$ is set to the minimum value, the coarse time becomes too long and the seeking performance deteriorates as a whole. The optimum adjusting state of the servo system is not always obtained. Even in case of setting the coarse time $T_c$ in FIG. 90 into the evaluation function, the coarse time can be set to the minimum time. However, the settling time until the head enters the on-track state increases and the optimization of the overall seeking performance cannot be also expected with respect to it.

Figure 91:
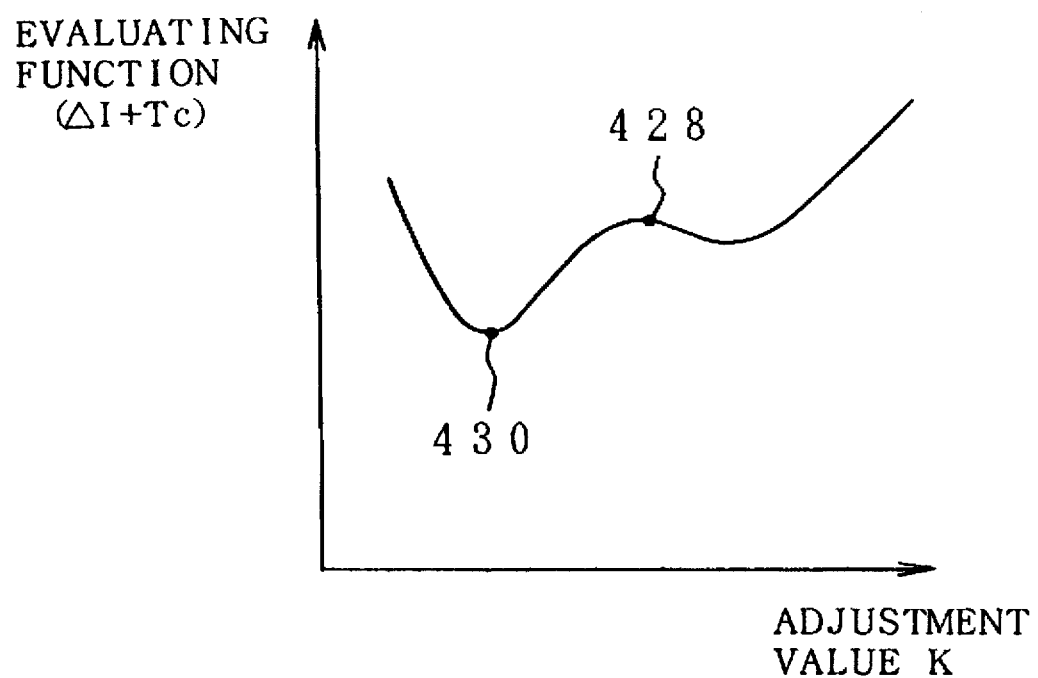
FIG. 91 is a characteristics diagram of the servo system automatic adjustment of the invention which decides the adjustment value by setting the evaluating function to the sum of the position error absolute integration value and the coarse time.

In the settling automatic adjustment of the servo system of the invention, therefore, both of the position error absolute integration value $\Delta I$ in FIG. 89 and the coarse time $T_c$ in FIG. 90 are fetched into the evaluation function, thereby optimizing the adjustment value K as a speed gain. Specifically, the seeking operation is repeated while increasing or decreasing the speed gain as an adjustment value K. The position error absolute integration value $\Delta I$ and coarse time $T_c$ are measured every seeking operation. The evaluation function $(\Delta I+T_c)$ obtained by adding those two values is set to an evaluation function and the characteristics 428 for the adjustment value K shown in FIG. 91 are measured. When the characteristics 428 are obtained, a singular point 430 is obtained as an optimum adjustment value in which the evaluation function $(\Delta I+T_c)$ is set to the minimum value. It is sufficient to set a speed gain in the acceleration or deceleration of a target speed pattern shown in FIG. 92A into the adjustment value K at the singular point 430. As shown in FIG. 8, the settling automatic adjustment of the servo system is executed in the final step at the stage of shipping of an article. By the settling adjustment in the seek control of the invention as mentioned above, the optimum adjustment value in which the coarse time and the position error absolute value are set to the minimum values can be obtained. The seeking performance can be remarkably improved. Moreover, since the settling automatic adjustment is performed for every individual disk apparatus, the optimum adjusting state in which the variations peculiar to the apparatus are also absorbed can be formed.

[Enlargement of on-track slice value upon erasing]

In the disk apparatus of the invention, when a padding command is received from an upper disk controller unit, an interval from an arbitrary record in the designated cylinder address to the detection of an index is erased by an alternating current by using the write head. In a manner similar to the reading operation and the writing operation, in case of the erasing operation in a padding process as well, when the position error in the on-track state by the servo head is larger than a preset on-track slice value, the occurrence of error is judged. In response to the error judgment, the retrying operation is executed in the reading or writing operation. However, in the padding process for erasing all of the contents in a range from the designated record to the index, if an error occurs due to the error for the on-track state, the padding process is forcedly finished.

Therefore, the data of the records after the padding process was forcedly finished is not erased but remains on the cylinder. A fact that the processes were finished as an abnormality during the padding process cannot be detected by the upper disk controller unit, so that another process is executed as it is. Thus, a difference occurs between the recognition of the managing state of the data in the upper disk controller unit and the data state on the actual disk apparatus side. For example, an abnormal situation such that the ID having the same number exists in the same cylinder occurs. There is consequently a problem such that the processes are finished by an error as an abnormality of the apparatus. The disk apparatus of the invention, therefore, is characterized in that in order to avoid the abnormal end by the on-track error as much as possible during the padding process, the on-track slice value used in the reading or writing operation is enlarged at the time of the padding process.

Figure 93:
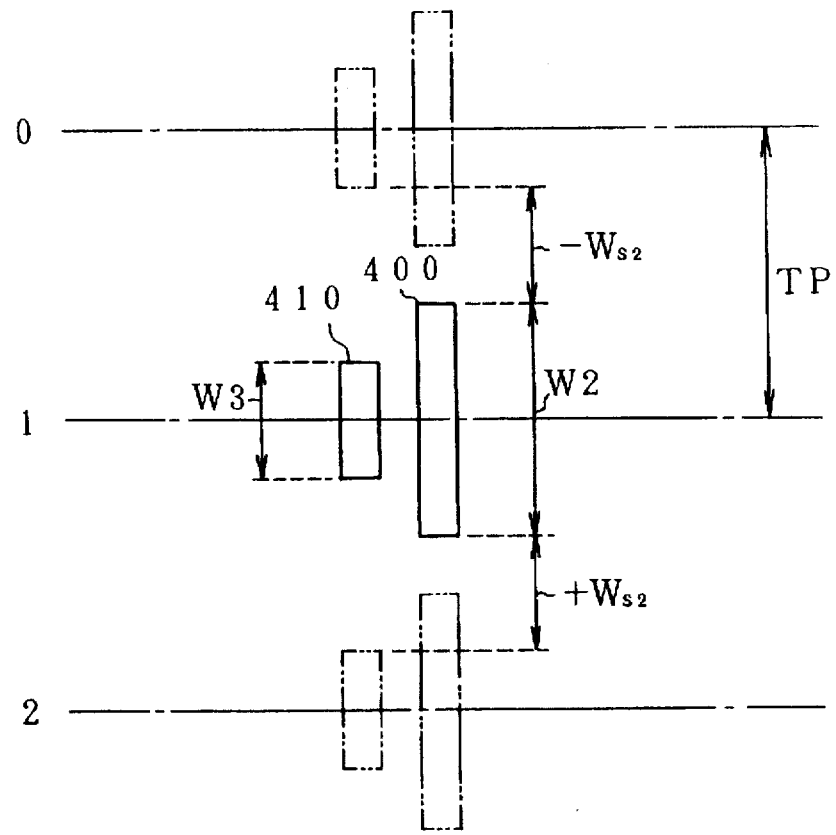
FIG. 93 is an explanatory diagram of the relation between the writing head and the reading head which are provided in the data head for the adjacent cylinder.

FIG. 93 shows a state in which the write head 400 and read head 410 provided in the data head are in the on-track state at the cylinder center of the cylinder No. 1. Now, assuming that a track pitch TP for the adjacent cylinder center is equal to, for example, 7.5 µm, the core width W2 of write head 400 is equal to, for example, 6 µm smaller than the value of TP. The core width W3 of read head 410 using the MR head is equal to about 3 µm that is the half of W3. In the padding process, the recording data on the cylinder is AC erased by the write head 400. So long as the reading region of the read head provided for the adjacent cylinder, no problem occurs even if the erasing range is deviated from the track center. That is, it is sufficient that the write head 400 at the time of the padding process lies within a range of $\pm W_{s2}$ as shown in the diagram. Now, $\pm W_{s2}=\pm 3$ µm.

Figure 94:
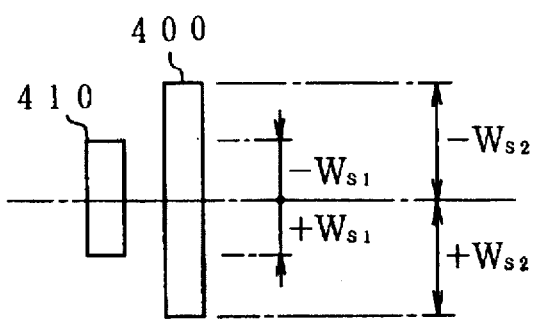
FIG. 94 is an explanatory diagram of the on-track slice value which is enlarged by the padding process of the invention.

FIG. 94 shows an on-track slice value $\pm W_{s1}$ at the time of reading/writing operation in the disk apparatus of the invention and an on-track slice value $\pm W_{s2}$ at the time of padding operation determined on the basis of FIG. 93. The on-track slice value $\pm W_{s1}$ upon reading or writing is generally equal to about $\pm 1$ μm. On the other hand, the on-track slice value $\pm W_{s2}$ upon padding according to the invention can be enlarged up to 3 μm at most. For example, it is proper to set it to $\pm 2$ μm.

Figure 95:
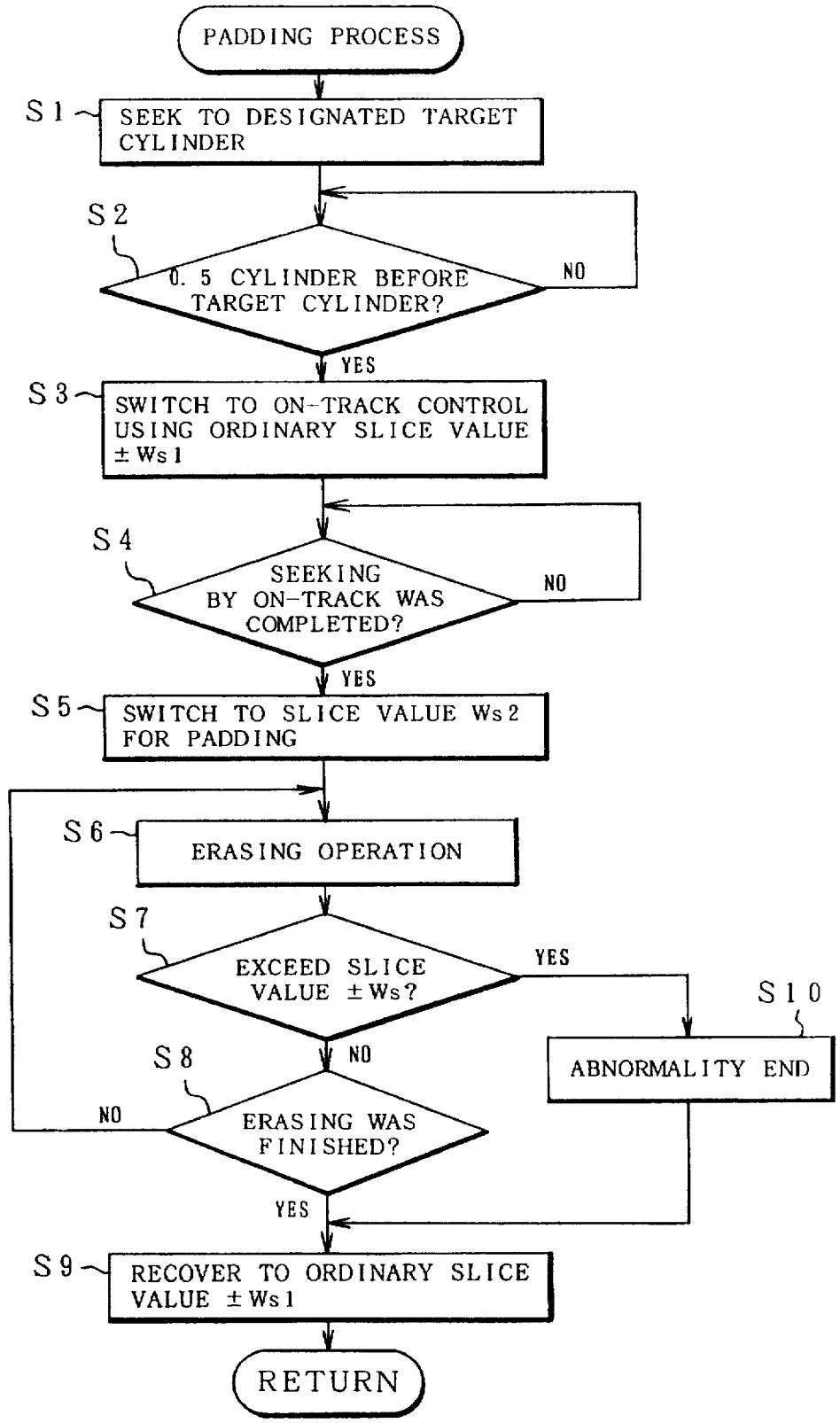
FIG. 95 is a flowchart for the padding process of the invention.

A flowchart of FIG. 95 relates to the padding process in the disk apparatus of the invention. According to the padding process, first, in step S1, the head is sought onto the target cylinder designated by the upper disk controller unit. In step S2, when the head reaches the position that is 0.5 cylinder before the target cylinder, step S3 follows and the control mode is switched to the fine control. In the fine control, the on-track state is monitored by using the on-track slice value $\pm W_{s1}$ used in the ordinary reading or writing operation. When the head position enters the range of $\pm W_{s1}$ of the target cylinder, an on-track detection signal is set to the high level completion of seek is judged in step S4 and the control mode is switched from the seek control to the on-track control. When the control mode is switched to the on-track control, in step S5, the ordinary on-track slice value is switched to the enlarged on-track slice value $\pm W_{s2}$ for padding. The erasing operation in a range from the designated decoding to the detection of the index is executed in step S6. During the erasing operation, a check is made in step S7 to see if the head position signal exceeds the range of the enlarged on-track slice value $\pm W_{s2}$ or not. If YES, the processes are finished as an abnormality in step S10. In the invention, however, since the on-track slice value is enlarged to the value that is sufficiently larger than the ordinary read/write value, a situation such that the on-track abnormality occurs and the processes are finished as an abnormality hardly occurs. The erasing operation can be normally finished in step S8. After completion of the erasing operation, the on-track slice value is again recovered to the original value $\pm W_{s1}$ in step S9. The processing routine is returned to the main process. As mentioned above, during the padding operation, by using the enlarged on-track slice value larger than the ordinary on-track slice value, a situation such that the padding process is finished as an abnormality on the halfway can be minimized.

[Others]

As shown in FIG. 10, the above embodiments have been shown and described with respect to the case where the zero-cross detecting circuit 112 is used for the read signal of the phase servo pattern as shown in FIG. 10 and the peak detecting circuit 100 is used for the other read signals. On the other hand, as a modification of the invention, a peak pulse detecting circuit can be also used with respect to all of the read signals of the servo frames. Practically speaking, the zero-cross detecting circuit 112 is eliminated, the servo head 18 and read head 410 are connected to the peak detecting circuit 100 through the selecting circuit 116, the output of the peak detecting circuit 100 is input to the variable delay circuit 114.

In this case, read pulses are produced by the detection of the peak timings of the read signals of all of the training region, index guard band region, marker region, and servo region of the servo frames. The adjustment to the duty ratio 50% by the shifter 108 and variable delay circuit 114 in this case guarantees the phase shift occurring due to the circuit delay.

On the contrary, as another modification of the invention, the peak detecting circuit 100 can be also replaced to the zero-cross detecting circuit. In this case, read pulses are produced by the detection of the zero-cross timings of the read signals of all of the training region, index guard band region, marker region, and servo region of the servo frames.

Specifically speaking, the peak detecting circuit 100 is excluded and the servo head 18 and read head 410 are connected to the zero-cross detecting circuit 112 through the selecting circuit 116 and the output of the zero-cross detecting circuit 112 is input to the PLL circuit 102, marker detecting circuit 104, guard band index detecting circuit 105, and further variable delay circuit 114. In this case as well, the adjustment to the duty ratio 50% by the shifter 108 and variable delay circuit 114 guarantees the phase shift occurring by the circuit delay.

The disk apparatus of the invention is not limited to the foregoing embodiments but many various combinations and modifications are possible within a scope of the invention disclosed in the embodiments. The invention is also not limited by the numerical values shown in the embodiments.

What is claimed is:

1. A disk apparatus comprising:

a disk medium having a servo surface said servo surface having a plurality of servo frames arranged in the circumferential direction of each of a plurality of cylinders each sequentially including a timing region having timing information used to phase synchronize a clock, a marker region having marker information indicative of a servo region start position, and a servo region having servo information;

a servo head, movable in the radial direction of said disk medium, for reading said timing, marker and servo information;

a read pulse detecting circuit section for detecting a read signal for said timing marker, and servo regions of said servo frames read by said servo head and for generating read pulses for said timing, marker and servo regions in accordance with a timing signal obtained from said timing information;

a clock generating circuit section for generating a reference clock in sync with the read pulse generated by said read pulse detecting circuit section;

a master clock forming circuit section for producing a plurality of master clocks having phases different from a reference phase of the reference clock of said clock generating circuit section and for selecting and outputting the master clock of a reference phase corresponding to a target cylinder in which said servo head is located on a track;

a duty pulse forming circuit section for generating a duty pulse signal of a duty ratio corresponding to a phase difference in a range from the reference phase of the master clock to a detection timing of said servo information by said read pulse detecting circuit section;

an integrating circuit section for integrating the duty pulse signal to obtain an integrated duty pulse signal and for generating a position signal indicative of the position of said servo head;

a duty measuring circuit section for measuring the duty ratio of said duty pulse signal for a specific target cylinder during an initializing process executed just after a power source is turned on;

a duty adjusting circuit section for producing an adjusting state for maintaining the duty ratio of said duty pulse signal at 50% using the result of the measurement of said duty measuring circuit section;

a speed detecting circuit section for detecting a head moving speed of the servo head during a seeking operation on the basis of a difference of the head position signals generated by the integrating circuit section at sampling periods; and a position predicting circuit section for predicting the servo head position corresponding to a target cylinder at the next sampling time point at said every sampling period, said clock generating circuit section selecting the master clock of a phase corresponding to the head position predicted by said position prediction.

2. An apparatus according to claim 1, wherein said servo region is divided into four fields, and servo information having a phase shift in one direction is recorded in first and fourth fields among said four fields, and servo information having a phase shift in an opposite direction is recorded in second and third fields among said four fields.

3. An apparatus according to claim 1, wherein said read pulse detecting circuit section comprises:

a peak detecting circuit section for detecting peak timings of the read signals of said timing region and said marker region by said servo head and for outputting a peak detection pulse; and a zero-cross detecting circuit section for detecting a zero-cross timing of the read signal of the servo region by said servo head and for outputting a zero-cross detection pulse.

4. An apparatus according to claim 1, wherein said read pulse detecting circuit section has a zero-cross detecting circuit section for detecting zero-cross timings of the read signals of said timing region, said marker region, and said servo region by said servo head and for outputting said read pulses.

5. An apparatus according to claim 3 or 4, wherein a low pass filter is provided at a front stage of said zero-cross detecting circuit section.

6. An apparatus according to claim 1, wherein said read pulse detecting circuit section has a peak detecting circuit section for detecting peak timings of the read signals of said timing region, said marker region, and said servo region by said servo head and for outputting a read pulse.

7. An apparatus according to claim 2, wherein said integrating circuit section integrates portions of said duty pulse signal corresponding to said first and fourth fields of said servo information as they are, and inverts the portions of the duty pulse corresponding to said second and third fields of the servo information and integrates the inverted portions, thereby obtaining an integration signal indicative of the duty ratio for said duty measuring circuit section.

8. An apparatus according to claim 1, wherein said duty adjusting circuit section comprises:

a first delay circuit section for delaying the reference phase of said master clock for reducing the duty ratio; and a second delay circuit section for delaying a detection timing of the read pulse of said servo information for increasing the duty ratio.

9. An apparatus according to claim 8, wherein said first delay circuit section has a shifting circuit for delaying the reference phase of said master clock step by step by every predetermined time that is determined by said reference clock in one period of the master clock to produce multiple stage outputs, and selects a shifting stage output of said shifting circuit to give a desired delay amount to said master clock.

10. An apparatus according to claim 8, wherein said second delay circuit section has a plurality of delay elements having predetermined delay amounts, serially selectively connects said plurality of delay elements, and gives a desired delay amount to the read pulse of said servo information.

11. An apparatus according to claim 1, wherein:

said disk medium further has a data surface, a plurality of servo flames arranged in the circumferential direction of a specific cylinder are provided on said data surface, and servo regions having servo information are provided in each of said servo frames of said data surface;

said apparatus further comprises a data head for reading said data surface, and a switching circuit section for switching the read signal of said servo head and a read signal from said data head of the servo information on the data surface and for inputting the switched read signal to said read pulse detecting circuit section, said duty measuring circuit section measures the duty ratio of the duty pulse derived form the servo information of said data surface, and said duty adjusting circuit section produces the adjusting state to keep the duty ratio of the duty pulse obtained from the servo information of the data surface to 50% in the on-track state of the target cylinder.

12. An apparatus according to claim 11, wherein the servo region of said data surface is divided into four fields, and servo information having a phase shift in one direction is recorded in first and fourth fields among said four fields, and the servo information having a phase shift in another opposite direction is recorded in second and third fields among said four fields.

13. An apparatus according to claim 1, further comprising:

an integration error measuring circuit section for supplying the duty pulse signal for an arbitrary target cylinder to said integrating circuit section during said initializing processing and for measuring an integration error; and an integration error correcting circuit section for correcting a position signal obtained from said integrating circuit section during said initializing process by said integration error and for producing a corrected position signal after completion of the initializing process.

14. An apparatus according to claim 13, wherein said servo region includes first through fourth fields and said integration error measuring circuit section includes a pseudo pulse generating circuit section for supplying a pseudo read pulse of the servo information to said duty pulse forming circuit section to generate a duty pulse whose duty ratio is equal to 50% for all of the first to fourth fields of said servo information.

15. An apparatus according to claim 1, further comprising:

a measuring circuit section for switching from the generation of the duty pulse corresponding to the on-track state in which said servo head was located onto an arbitrary target cylinder of said servo surface to the generation of a duty pulse that is equivalent to a pulse obtained when the servo head was moved in one direction by one cylinder from said arbitrary target cylinder and the generation of a duty pulse that is equivalent to a pulse obtained when the servo head was moved in an opposite direction by one cylinder, said integrating circuit section generating a position signal for each movement of the servo head and measuring each position change based upon the position signal; and a cylinder gain detection circuit section for detecting a position change amount per one cylinder as a cylinder gain on the basis of the results of the measurement of said measuring circuit section and said integrating circuit section.

16. An apparatus according to claim 15, wherein said servo region has first through fourth fields and said measuring circuit section includes a pseudo pulse generating circuit section for supplying a pseudo read pulse of the servo information to said master clock forming circuit section to generate either a duty pulse whose duty ratio is equal to 50% in all of the first to fourth fields of said servo information, a duty pulse whose duty ratio changes to 25%, 75%, 75%, and 25% in the first to fourth fields, or a duty pulse whose duty ratio changes to 75%, 25%, 25% and 75% in the first to fourth fields.

17. An apparatus according to claim 1, wherein said servo region has first through fourth fields and said position predicting circuit section switches the target cylinder and the clock circuit generating section selects the master clock of a corresponding phase for each of the first to fourth fields in said servo region in accordance with the head moving speed detected by said speed detecting circuit section.

18. An apparatus according to claim 17, wherein said position predicting circuit section increases the number of cylinder switching stages in the first to fourth fields and the number of changes of the target cylinder at every said cylinder switching as the head moving speed is high.

19. An apparatus according to claim 17, wherein the head moving speed is defined by the number of cylinder passing times at every said sampling period and when the head moving speed lies within a number of cylinders defined by separation of the servo information, said position predicting circuit section fixedly selects the master clock of the corresponding phase without switching the target cylinder in the first to fourth fields.

20. An apparatus according to claim 17, wherein the servo information is repeated every four cylinders, and said clock generating circuit section selects the master clock of the phase corresponding to the target cylinder as a center cylinder without switching the target cylinder in the first to fourth fields when said head moving speed lies within a range from −4 cylinders to +4 cylinders.

21. An apparatus according to claim 17, wherein each of the first to fourth fields includes a target cylinder and said position predicting circuit section separately switches the target cylinder at two stages for the first and second fields and for the third and fourth fields and selects the master clock of the phase corresponding to said switching when said head moving speed exceeds, during a sampling period, a repetitive number of cylinders which separates repeated servo information.

22. An apparatus according to claim 21, where said position predicting circuit section switches the target cylinder to a target cylinder that is smaller by one cylinder than the center cylinder in the first and second fields when the repetitive cylinder number of said servo information is equal to four cylinders, and switches to a target cylinder that is larger by one cylinder than the center cylinder in the third and fourth fields when said head moving speed lies within a range from −2 cylinders to +6 cylinders, thereby selecting the master clock of the corresponding phase, respectively.

23. An apparatus according to claim 17, wherein said position predicting circuit section switches the target cylinder at four stages when said head moving speed exceeds a number of cylinders separating repeated servo information, thereby separately selecting the master clock of the corresponding phase for the first to fourth fields.

24. An apparatus according to claim 23, wherein said position predicting circuit section switches the target cylinder at four stages on a cylinder unit basis, thereby allowing the master clock of the corresponding phase for the first to fourth fields to be selected.

25. An apparatus according to claim 23, wherein each of said fields includes a target cylinder and the number of cylinders separating the repeated servo information is equal to 4 cylinders, said position predicting circuit section switches the target cylinder to the target cylinder that is smaller by two cylinders than a center cylinder in the first field, switches to the target cylinder that is smaller by one cylinder than the center cylinder in the second field, switches to the target cylinder that is larger by one cylinder than the center cylinder in the third field, and further switches to the target cylinder that is larger by two cylinders than the center cylinder in the fourth field when said head moving speed lies within a range from −1 cylinder to +7 cylinders, thereby selecting the master clock of the corresponding phase, respectively.

26. An apparatus according to claim 25, wherein said position predicting circuit section switches the target cylinder at four stages on a unit basis of a plurality of cylinders, thereby selecting the master clock of the corresponding phase for each of the first to fourth fields.

27. An apparatus according to claim 26, wherein each of the first to fourth fields include a target cylinder and the number of cylinders separating the repeated servo information is equal to four cylinders, said position predicting circuit section switches the target cylinder to the target cylinder that is smaller by three cylinders than the center cylinder in the first field, switches to the target cylinder that is smaller by one cylinder than the center cylinder in the second field, switches to the target cylinder that is larger by one cylinder than the center cylinder in the third field, and switches to the target cylinder that is larger by three cylinders than the center cylinder in the fourth field when said head moving speed lies within a range from +4 cylinders to +10 cylinders, thereby selecting the master clock of the corresponding phase, respectively.

28. An apparatus according to claim 1 or 27, wherein said position predicting circuit section further detects an acceleration of the head movement and predicts the head position at the next sampling time point based upon the detected acceleration.

29. An apparatus according to claim 27, wherein said position predicting circuit section obtains the number of cylinders traversed during a sampling period depending on a head acceleration on the basis of a head drive current and adds the number of cylinders to the present position to calculate a predictive position.

30. An apparatus according to claim 1, further comprising:

a data surface on an opposite side of the disk medium from said servo surface;

a data head for moving in the radial direction of the disk medium with said servo head and for reading out information recorded on said data surface; and a data surface servo writing circuit section for recording servo information having a phase shift in one direction and for recording servo information having a phase shift in another opposite direction for each of a plurality of servo frames arranged in a circumferential direction of a specific cylinder on the data surface, thereby forming a servo region on the data surface.

31. An apparatus according to claim 30, wherein said data surface servo writing circuit section divides the servo region of the data surface into four fields, records the servo information having the phase shift in the one direction into the first and fourth fields among said four fields, and records the servo information having the opposite phase shift into the second and third fields among said four fields.

32. An apparatus according to claim 31, wherein a repetitive cylinder number of the servo information recorded on said servo surface is set to N, said data surface servo writing circuit section divides the frequency of the reference clock into 1/N, generates (4N) kinds of write pulses whose phases are different by (1/4N) period for said reference clock, selects the write pulse of a predetermined phase that is specified by a writing cylinder form said write pulses, and writes the selected write pulse as servo information into the servo region on said data surface.

33. An apparatus according to claim 31, wherein said data surface servo writing circuit section generates a write pulse synchronized with a leading edge of the reference clock of said reference clock generating circuit section and also generates a write pulse synchronized with a trailing edge of the reference clock.

34. An apparatus according to claim 33, wherein repetitive cylinder number of the servo information recorded on the servo surface is set to four cylinders, said data surface servo writing circuit section divides the frequency of the reference clock into 1/4, generates write pulses of eight phases synchronously with the leading edge of the reference clock, and also generates write pulses of eight phases synchronously with the trailing edge of the reference clock.

35. An apparatus according to claim 31, wherein said data surface servo writing circuit section records the servo information onto the data surface at a cylinder pitch equal to that of the servo information on the servo surface and also writes the servo information of the first and fourth fields and the servo information of the second and third fields to be respectfully deviated by a predetermined cylinder pitch.

36. An apparatus according to claim 35, wherein the servo information has been recorded on the servo surface it a cylinder pitch of 0.5, and said data surface servo writing circuit section writes the servo information onto the data surface at the same 0.5 cylinder pitch as that of the servo surface and also writes the servo information of the first and fourth fields and the servo information of the second and third fields so as to be deviated by a 0.25 cylinder pitch.

37. An apparatus according to claim 31, wherein said data surface servo writing circuit section writes the servo information into a predetermined off-track region centered around a write target cylinder.

38. An apparatus according to claim 31, wherein said data surface servo writing circuit section writes servo information to be used for off-track measurements of the data surface into an outer rim cylinder separate from a user accessible region on the data surface.

39. A disk apparatus comprising:

a disk medium having a servo surface said servo surface having a plurality of servo frames arranged in the circumferential direction of each of a plurality of cylinders each sequentially including a timing region having timing information used to phase synchronize a clock, a marker region having marker information indicative of a servo region start position, and a servo region having servo information;

a servo head, movable in the radial direction of said disk medium, for reading said timing, marker and servo information;

a read pulse detecting circuit section for detecting a read signal for said timing marker, and servo regions of said servo flames read by said servo head and for generating read pulses for said timing, marker and servo regions in accordance with a timing signal obtained from said timing information;

a clock generating circuit section for generating a reference clock in sync with the read pulse generated by said read pulse detecting circuit section;

a master clock forming circuit section for producing a plurality of master clocks having phases different from a reference phase of the reference clock of said clock generating circuit section and for selecting and outputting the master clock of a reference phase corresponding to a target cylinder in which said servo head is located on a track;

a duty pulse forming circuit section for generating a duty pulse signal of a duty ratio corresponding to a phase difference in a range from the reference phase of the master clock to a detection timing of said servo information by said read pulse detecting circuit section;

an integrating circuit section for integrating the duty pulse signal to obtain an integrated duty pulse signal and for generating a position signal indicative of the position of said servo head;

a duty measuring circuit section for measuring the duty ratio of said duty pulse signal for a specific target cylinder during an initializing process executed just after a power source is turned on;

a duty adjusting circuit section for producing an adjusting state for maintaining the duty ratio of said duty pulse signal at 50% using the result of the measurement of said duty measuring circuit section;

a data surface on an opposite side of the disk medium from said servo surface;

a data head for moving in the radial direction of the disk medium with said servo head and for reading out information recorded on said data surface;

a data surface servo writing circuit section for recording servo information having a phase shift in one direction and for recording servo information having a phase shift in another opposite direction for each of a plurality of servo frames arranged in a circumferential direction of a specific cylinder on the data surface, thereby forming a servo region on the data surface, wherein;

said data surface servo writing circuit section divides the servo region of the data surface into four fields, records the servo information having the phase shift in the one direction into the first and fourth fields among said four fields, and records the servo information having the opposite phase shift into the second and third fields among said four fields; and said data surface servo writing circuit section writes servo information to be used for measurement of a yaw angle offset of a head driving mechanism which drives the servo and data heads onto both an outer rim cylinder and an inner rim cylinder separate from a user accessible region on the data surface.

40. An apparatus according to claim 39, further comprising:

a yaw angle offset measuring circuit section for positioning a data head integratedly having a write head and a read head over each of the outer rim cylinder and inner rim cylinder of said data surface on the basis of servo information on the servo surface during said initializing process and for measuring a yaw angle offset of said read head in association with the rotation of a head arm; and a table forming circuit section for obtaining the yaw angle offset at every cylinder position of the medium by an interpolation calculation of each yaw angle offset of the inner and outer rims measured by said yaw angle offset measuring circuit section and for forming a correction table in which the yaw angle offsets for each cylinder address are stored.

41. An apparatus according to claim 40, wherein said correction table forming circuit section forms the correction table in which the yaw angle offsets have been stored on a unit basis using a predetermined number of cylinders.

42. An apparatus according to claim 40, further comprising a yaw angle offset correcting circuit section for reading out the yaw angle offsets in said correction table to correct the data head position when the data surface is read.

43. An apparatus according to claim 42, wherein said yaw angle offset correcting circuit section corrects the yaw angle offset when a data surface read error occurs and performs a retrying operation.

44. An apparatus according to claim 1, further comprising:
a data surface on an opposite side of said medium from said servo surface; a data writing circuit section for writing phase servo information onto a specific cylinder of said data surface outside of a user region of the data surface by using said servo information of said specific cylinder; and
a data reading circuit section for reading out the phase servo information written by said data writing circuit section.

45. An apparatus according to claim 44, wherein said servo region includes first through fourth servo fields and said data writing circuit section writes said phase servo information by using a duty pulse in which a ratio of the first and fourth fields differs form the duty ratio of the second and third fields in correspondence to write data bits 0 and 1.

46. An apparatus according to claim 45, wherein said data writing circuit section writes said phase servo information corresponding to the write data bits 0 and 1 by using two kinds of duty pulses in which the duty ratios of the first to fourth fields are equal to 25%, 75%, 75%, and 25% and duty pulse in which the duty ratios of the first to fourth fields are equal to 75%, 25%, 25%, and 75%.

47. An apparatus according to claim 44, wherein said data reading means supplies a read signal of the servo information of said data surface to said master clock forming circuit section and generates the duty pulse in accordance with the read signal and, further, reconstructs data bits 0 or 1 from a signal derived by integrating the duty pulse through said integrating circuit section.

48. An apparatus according to claim 1, further comprising:
a coarse time measuring circuit section for measuring a coarse time which is required until a control mode is switched from a coarse control to a fine control while varying a gain to determine an acceleration or deceleration of a target speed pattern that is used for the coarse control as an adjustment value during a seeking operation to move the servo head to the target cylinder;
an integration measuring circuit section for measuring an absolute integration value of a position error which occurs until the head is set into the on-track state after the control mode was switched to the fine control during the seeking operation while varying the gain to decide an acceleration or deceleration of the target speed pattern which is used for the coarse control as an adjustment value; and
an adjusting circuit section for automatically adjusting a servo operations by setting the sum of the coarse time and the absolute integration value of the position error derived by said measuring circuit section into an evaluation function.

49. An apparatus according to claim 1, further comprising a data surface on an opposite side of said medium from said servo surface; and
erasing means for changing an on-track slice value to change the on-track state of a data head corresponding to said data surface into an enlarged value larger than normal reading and writing on-track slice values when information recorded on the data surface is erased.

50. An apparatus according to claim 1, wherein an index guard band region is which a plurality of sets of index information and guard band information have simultaneously been recorded is provided between said marker region and said servo region, and said apparatus further has a detecting circuit section for detecting said marker and servo information by reading said plurality of sets of index information and guard band information.

51. A disk apparatus comprising:
a disk medium having a servo surface
said servo surface having a plurality of servo frames arranged in the circumferential direction of each of a plurality of cylinders each sequentially including a timing region having timing information used to phase synchronize a clock, a marker region having marker information indicative of a servo region start position, and a servo region having servo information;
a servo head, movable in the radial direction of said disk medium, for reading said timing, marker and servo information;
a read pulse detecting circuit section for detecting a read signal for said timing marker, and servo regions of said servo frames read by said servo head and for generating read pulses for said timing, marker and servo regions in accordance with a timing signal obtained from said timing information;
a clock generating circuit section for generating a reference clock in sync with the read pulse generated by said read pulse detecting circuit section;
a master clock forming circuit section for producing a plurality of master clocks having phases different from a reference phase of the reference clock of said clock generating circuit section and for selecting and outputting the master clock of a reference phase corresponding to a target cylinder in which said servo head is located on a track;
a duty pulse forming circuit section for generating a duty pulse signal of a duty ratio corresponding to a phase difference in a range from the reference phase of the master clock to a detection timing of said servo information by said read pulse detecting circuit section;
an integrating circuit section for integrating the duty pulse signal to obtain an integrated duty pulse signal and for generating a position signal indicative of the position of said servo head;
a duty measuring circuit section for measuring the duty ratio of said duty pulse signal for a specific target cylinder during an initializing process executed just after a power source is turned on;
a duty adjusting circuit section for producing an adjusting state for maintaining the duty ratio of said duty pulse signal at 50% using the result of the measurement of said duty measuring circuit section;
D/A converting means for converting servo control head drive data into an analog signal;

a reference voltage generating circuit section for generating a reference voltage to determine a center value of the analog signal corresponding to a center value of data input to said D/A converting means;

a drive circuit section for supplying a drive current to a head driving section in accordance with the polarity and magnitude of analog signal;

a center error measuring circuit section for changing the head drive data for said D/A converting means from said input center value at the time of said initializing process and for measuring errors which occur until said analog signal coincides with said reference voltage; and a center error correcting circuit section for correcting the head drive data after completion of said initializing process based upon the measured errors.

* * * * *

UNITED STATES PATENT AND TRADEMARK OFFICE
CERTIFICATE OF CORRECTION

PATENT NO. : 5,694,265
DATED : December 2, 1997
INVENTOR(S) : Kosugi et al.

It is certified that error appears in the above-identified patent and that said Letters Patent is hereby corrected as shown below:

Column 1, line 27, after "circuit" delete "of a"

Column 1, line 52, after "the" insert --cylinders, indicated by the arrow A, and where the radial direction is indicated by arrow B--

Column 2, line 47, delete "fluctuates" and insert --fluctuate-- therefor

UNITED STATES PATENT AND TRADEMARK OFFICE
CERTIFICATE OF CORRECTION

PATENT NO. : 5,694,265
DATED : December 2, 1997
INVENTOR(S) : Kosugi et al.

It is certified that error appears in the above-identified patent and that said Letters Patent is hereby corrected as shown below:

Column 3, line 6, delete "Generated" and insert --generated-- therefor

Column 5, line 58, delete "Guard" and insert --guard-- therefor

Column 10, line 47, delete "pain" and insert --gain-- therefor

Column 10, line 53, delete "pain" and insert --gain-- therefor

Figure 14D:
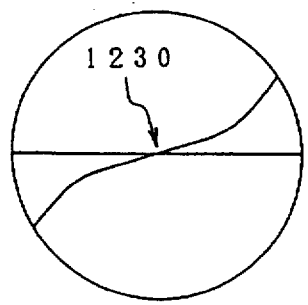

Column 11, line 35, after "signal" insert new paragraph --Fig. 14D is an enlarged view of a circled portion 1220 of Fig. 14C.--

UNITED STATES PATENT AND TRADEMARK OFFICE
CERTIFICATE OF CORRECTION

PATENT NO. : 5,694,265
DATED : December 2, 1997
INVENTOR(S) : Kosugi et al.

It is certified that error appears in the above-identified patent and that said Letters Patent is hereby corrected as shown below:

Column 16, line 17, delete "20" and insert

--20-- therefor

Column 16, line 21, delete "0-10" and insert

--20-10-- therefor

Column 16, line 22, delete "0-1" and insert

--50-1-- therefor

Column 18, line 37, delete "16" and insert

--16-- therefor

Column 19, line 1, delete "Generally" and insert --generally-- therefor

Column 19, line 15, delete "Guard" and insert --guard-- therefor

UNITED STATES PATENT AND TRADEMARK OFFICE
CERTIFICATE OF CORRECTION

PATENT NO. : 5,694,265
DATED : December 2, 1997
INVENTOR(S) : Kosugi et al.

It is certified that error appears in the above-identified patent and that said Letters Patent is hereby corrected as shown below:

Column 19, line 16, delete "Guard" and insert --guard-- therefor

Column 19, line 31, delete "on-start" (second occurrence)

Column 26, line 36, delete "216" and insert --216-- therefor

Column 26, line 37, delete "216" and insert --216-- therefor

Column 31, line 47, delete "pain" and insert --gain-- therefor

UNITED STATES PATENT AND TRADEMARK OFFICE
CERTIFICATE OF CORRECTION

PATENT NO. : 5,694,265
DATED : December 2, 1997
INVENTOR(S) : Kosugi et al.

It is certified that error appears in the above-identified patent and that said Letters Patent is hereby corrected as shown below:

Column 44, line 62, delete "216" (both occurrences in bold) and insert --216-- (both occurrences) therefor Column 51, line 3, delete "13"(in bold) and insert --13-- therefor Column 55, line 22, before "target" delete "a"

Column 56, line 27, delete "Judgement" and insert --judgement-- therefor

UNITED STATES PATENT AND TRADEMARK OFFICE
CERTIFICATE OF CORRECTION

PATENT NO. : 5,694,265
DATED : December 2, 1997
INVENTOR(S) : Kosugi et al.

It is certified that error appears in the above-identified patent and that said Letters Patent is hereby corrected as shown below:

Column 60, line 5, delete "flames" and insert --frames-- therefor

Column 62, line 19, delete "25" and insert --23-- therefor

Column 63, line 36, delete "it" and insert --at-- therefor

Column 63, line 66, delete "flames" and insert --frames-- therefor

Signed and Sealed this

Twenty-second Day of December, 1998

Attest:

BRUCE LEHMAN

Attesting Officer

Commissioner of Patents and Trademarks